United States Patent
Maleki

(10) Patent No.: US 12,221,101 B2
(45) Date of Patent: Feb. 11, 2025

(54) AUTOMATED CRUISE CONTROL SYSTEM

(71) Applicant: Traxen Inc., Plymouth, MI (US)

(72) Inventor: Ali Fani Maleki, Canton, MI (US)

(73) Assignee: Traxen Inc., Plymouth, MI (US)

( * ) Notice: Subject to any disclaimer, the term of this patent is extended or adjusted under 35 U.S.C. 154(b) by 401 days.

(21) Appl. No.: 17/588,096

(22) Filed: Jan. 28, 2022

(65) Prior Publication Data

US 2022/0219691 A1 Jul. 14, 2022

Related U.S. Application Data

(63) Continuation-in-part of application No. 17/371,088, filed on Jul. 8, 2021, which is a continuation-in-part of application No. 16/438,319, filed on Jun. 11, 2019, now Pat. No. 11,216,748, and a continuation-in-part of application No. 16/438,337, filed on Jun. 11, 2019, now Pat. No. 11,188,847, and a continuation-in-part (Continued)

(51) Int. Cl.
| | |
|---|---|
| G06F 13/40 | (2006.01) |
| B60W 30/14 | (2006.01) |
| B60W 40/13 | (2012.01) |
| G06F 1/26 | (2006.01) |
| G06F 16/29 | (2019.01) |

(52) U.S. Cl.
CPC .......... B60W 30/143 (2013.01); B60W 40/13 (2013.01); B60W 2520/10 (2013.01); B60W 2520/105 (2013.01); B60W 2720/10 (2013.01)

(58) Field of Classification Search
None
See application file for complete search history.

(56) References Cited

U.S. PATENT DOCUMENTS

| | | | |
|---|---|---|---|
| 5,608,843 A | 3/1997 | Baird | |
| 6,374,173 B1 * | 4/2002 | Ehlbeck | B60K 31/047 180/170 |

(Continued)

FOREIGN PATENT DOCUMENTS

DE   102016214045   2/2018

OTHER PUBLICATIONS

"Comprehensive Energy Management—Eco Routing & Velocity Profiles" to Watzenig et al. (Watz), published 2017, pp. 1-99 (Year 2017).

*Primary Examiner* — Hyun Nam

(57) ABSTRACT

An automated cruise control system is disclosed. Sensors detect driving parameters associated with the ground vehicle as the ground vehicle maneuvers along a segment of the roadway. A ground vehicle control detector detects ground vehicle control inputs associated with an operation of the ground vehicle. The ground vehicle control inputs are generated from a longitudinal operation of the ground vehicle. A energy consumption cruise controller automatically adjusts the operation of the ground vehicle as the ground vehicle maneuvers along the segment of the roadway to maintain the operation of the ground vehicle within an operation threshold based on the detected driving parameters and ground vehicle control inputs. The operation threshold is the operation of the ground vehicle that decreases an amount of overall energy consumed by the ground vehicle and maintains a longitudinal speed of the ground vehicle within a longitudinal speed threshold.

20 Claims, 73 Drawing Sheets

Related U.S. Application Data of application No. 16/438,223, filed on Jun. 11, 2019, now Pat. No. 11,227,234, and a continuation-in-part of application No. 16/438,305, filed on Jun. 11, 2019, now Pat. No. 11,210,609, and a continuation-in-part of application No. 16/355,641, filed on Mar. 15, 2019, now Pat. No. 11,072,329, and a continuation-in-part of application No. 16/355,657, filed on Mar. 15, 2019, now Pat. No. 11,107,002, and a continuation-in-part of application No. 16/212,108, filed on Dec. 6, 2018, now abandoned.

(60) Provisional application No. 63/049,611, filed on Jul. 8, 2020, provisional application No. 62/638,188, filed on Mar. 4, 2018.

(56) References Cited

U.S. PATENT DOCUMENTS

| | | | |
|---|---|---|---|
| 6,529,887 | B1 | 3/2003 | Doya |
| 7,837,543 | B2 | 11/2010 | Graepel |
| 8,001,063 | B2 | 8/2011 | Tesauro |
| 8,392,346 | B2 | 3/2013 | Ueda |
| 8,494,980 | B2 | 7/2013 | Hans |
| 8,682,572 | B2 | 3/2014 | Raz |
| 8,788,439 | B2 | 7/2014 | Martinez |
| 8,897,767 | B2 | 11/2014 | Kojima |
| 8,930,115 | B2 | 1/2015 | Filev |
| 9,002,757 | B2 | 4/2015 | Kojima |
| 9,020,726 | B2 | 4/2015 | Boeckenhoff |
| 9,050,200 | B2 | 6/2015 | Digiovanna |
| 9,569,736 | B1 | 2/2017 | Ghesu |
| 9,679,258 | B2 | 6/2017 | Mnih |
| 9,754,221 | B1 | 9/2017 | Nagaraja |
| 9,792,531 | B2 | 10/2017 | Georgescu |
| 9,934,470 | B2 | 4/2018 | Sasaki |
| 9,964,931 | B2 | 5/2018 | Genma |
| 9,977,411 | B2 | 5/2018 | Morita |
| 10,049,301 | B2 | 8/2018 | Kluckner |
| 10,096,107 | B2 | 10/2018 | Ghesu |
| 2007/0219682 | A1* | 9/2007 | Kumar ............... B61L 15/0058 701/19 |
| 2008/0249667 | A1 | 10/2008 | Horvitz |
| 2009/0171524 | A1* | 7/2009 | Pitzal ............... F02D 41/0215 701/31.4 |
| 2009/0299630 | A1* | 12/2009 | Denaro ............... G06F 16/29 707/999.001 |
| 2010/0114807 | A1 | 5/2010 | Ueda |
| 2010/0137734 | A1 | 6/2010 | Digiovanna |
| 2010/0168976 | A1* | 7/2010 | Andrasko ........ B60W 30/18136 701/70 |
| 2012/0124657 | A1 | 5/2012 | Band |
| 2014/0244129 | A1 | 8/2014 | Filev |
| 2014/0277835 | A1 | 9/2014 | Filver |
| 2015/0100530 | A1 | 4/2015 | Mnih |
| 2015/0120153 | A1* | 4/2015 | Heim ............... G06V 20/588 382/103 |
| 2015/0197247 | A1* | 7/2015 | Ichinokawa ........ B60W 30/143 701/93 |
| 2015/0232097 | A1* | 8/2015 | Luther ............... G01C 21/3415 701/1 |
| 2016/0028824 | A1* | 1/2016 | Stenneth ............... H04L 67/12 709/219 |
| 2017/0001639 | A1 | 1/2017 | Dempsey |
| 2017/0024643 | A1 | 1/2017 | Lillicrap |
| 2017/0076201 | A1 | 3/2017 | Van Hasselt |
| 2017/0103532 | A1 | 4/2017 | Ghesu |
| 2017/0278018 | A1 | 9/2017 | Mnih |
| 2018/0032863 | A1 | 2/2018 | Graepel |
| 2018/0032864 | A1 | 2/2018 | Graepel |
| 2018/0043793 | A1* | 2/2018 | Herb ............... B60W 10/08 |
| 2018/0072157 | A1 | 3/2018 | Koebler |
| 2018/0157973 | A1 | 6/2018 | El-Yaniv |
| 2018/0165602 | A1 | 6/2018 | Van Seijen |
| 2018/0165603 | A1 | 6/2018 | Seijen |
| 2018/0260691 | A1 | 9/2018 | Nagaraja |
| 2018/0260692 | A1 | 9/2018 | Nagendra |
| 2018/0260700 | A1 | 9/2018 | Nagaraja |
| 2018/0330633 | A1* | 11/2018 | Sweany ............... G09B 19/167 |
| 2019/0217724 | A1 | 7/2019 | Erb |
| 2019/0375404 | A1* | 12/2019 | Maleki ............... B60W 40/06 |
| 2019/0378041 | A1* | 12/2019 | Dhansri ............... B60W 30/14 |
| 2020/0156637 | A1 | 5/2020 | Donatantonio |
| 2021/0146803 | A1* | 5/2021 | Wu ............... B60W 60/001 |
| 2022/0219691 | A1* | 7/2022 | Maleki ............... G06F 11/079 |
| 2023/0260342 | A1* | 8/2023 | Alonso Baigorri .... G06N 5/045 701/29.3 |
| 2023/0294693 | A1* | 9/2023 | Husberg ............... B60W 30/143 701/53 |
| 2024/0239206 | A1* | 7/2024 | Choi ............... B60L 15/20 |

\* cited by examiner

6400

6410 Receiving input information associated with ground vehicle operation.

6420 Processing the input information, including a evaluating performance of the ground vehicle operation.

6430 Generating output information based upon evaluation of the ground vehicle operation, including output information associated with performance of the ground vehicle operation.

6440 Creating interface information configured to convey results of the evaluation.

6450 Presenting the interface information, including presenting information indicating metrics corresponding to performance of the ground vehicle operation.

FIG. 64

AUTOMATED CRUISE CONTROL SYSTEM

CROSS-REFERENCE TO RELATED APPLICATIONS

This application is a continuation-in-part application and claims the benefit of U.S. patent application Ser. No. 17/371,088 filed Jul. 8, 2021, U.S. Provisional Patent Application No. 63/049,611 filed Jul. 8, 2020, U.S. patent application Ser. No. 16/212,108 filed Dec. 6, 2018, U.S. patent application Ser. No. 16/355,641 filed Mar. 15, 2019, U.S. patent application Ser. No. 16/355,657 filed Mar. 15, 2019, U.S. patent application Ser. No. 16/438,319 filed Jun. 11, 2019, U.S. patent application Ser. No. 16/438,337 filed Jun. 11, 2019, U.S. patent application Ser. No. 16/438,223 filed Jun. 11, 2019, U.S. patent application Ser. No. 16/438,305 filed Jun. 11, 2019, and U.S. Provisional Patent Application No. 62/683,188 filed Jun. 11, 2018, all of which are incorporated herein in their entireties.

FIELD OF DISCLOSURE

The present disclosure generally relates to cruise control systems of ground vehicles and specifically to the automatic adjustment of the operation of the ground vehicle as the ground vehicle maneuvers along a roadway to decrease overall energy consumption.

BACKGROUND OF THE INVENTION

Conventional cruise control systems for ground vehicles that operate on roadways enable the driver of the ground vehicle to set the speed of the ground vehicle such that the conventional cruise control system maintains the ground vehicle at the selected set speed. The driver selects the set speed that is to be maintained without intervention by the driver. In doing so, the driver may no longer be required to operate the gas pedal of the ground vehicle but rather the conventional cruise control system maintains the ground vehicle at the set speed. The conventional cruise control system may also automatically adjust the set speed such that the ground vehicle maintains a specified distance from any ground vehicles positioned in front of the ground vehicle. As a result, the driver is not required to intervene and adjust the speed of the ground vehicle to account for ground vehicles positioned in front of the ground vehicle.

However, two different drivers may operate identical vehicles and maneuver the identical vehicles along identical routes of the identical roadway and be exposed to identical operating conditions and travel identical distances. The first driver may operate the ground vehicle with significantly less energy consumption than the second driver. Despite the identical driving environments, the first driver may operate the ground vehicle differently from the second driver thereby conserving significantly more energy consumption simply based on how the first driver operates the ground vehicle as compared to the second driver.

Any type of adjustment executed by a driver with regard to how the driver operates the ground vehicle as the driver maneuvers the ground vehicle along the roadway is simply conventionally executed by the natural intelligence of the driver. The first driver has significantly less energy consumption than the second driver simply by the decisions actually executed by the first driver. For example, the first driver applies the brake significantly less than the second driver who rides the break, the first driver coasts to a stop rather than the second driver abruptly applying to the stop, and the first driver accelerates quickly in passing and then cruises to a coasting speed while the first driver slowly accelerates and passes. Such decisions are manually executed by the first driver and results in significantly less energy consumption than the decisions of the second driver. Thus, any additional decrease in energy consumption is conventionally done by the manual decision making process of the driver and those decisions are not automatically executed by the conventional cruise control systems.

SUMMARY OF THE INVENTION

The present technology may best be understood by referring to the following description and accompanying drawings that are used to illustrate embodiments of the present technology directed toward ground vehicle control techniques.

In one embodiment, an automated cruise control system to automatically decrease overall energy consumption can include a plurality of sensors, a ground vehicle control detector, and an energy consumption cruise controller. The plurality of sensors can be associated with a ground vehicle that maneuvers on a roadway that is configured to detect a plurality of driving parameters associated with the ground vehicle as the ground vehicle maneuvers along a segment of the roadway, wherein the driving parameters are indicative to a driving environment that the ground vehicle is operating. The ground vehicle control detector can be associated with the ground vehicle that is configured to detect a plurality of ground vehicle control inputs associated with an operation of the ground vehicle as the ground vehicle maneuvers along the segment of the roadway, wherein the ground vehicle control inputs are generated from a longitudinal operation of the ground vehicle. The energy consumption cruise controller can be configured to automatically adjust the operation of the ground vehicle as the ground vehicle maneuvers along the segment of the roadway to maintain the operation of the ground vehicle within an operation threshold based on the detected driving parameters and ground vehicle control inputs, wherein the operation threshold is the operation of the ground vehicle that decreases an amount of overall energy consumption by the ground vehicle and maintains a longitudinal speed of the ground vehicle within a longitudinal speed threshold associated with the segment of the roadway.

In another embodiment, a method for automatically adjusting an operation of a ground vehicle as the ground vehicle maneuvers along a segment of a roadway to automatically decrease overall energy consumption of the ground vehicle can detect a plurality of driving parameters associated with the ground vehicle as the ground vehicle maneuvers along the segment of the roadway, wherein the driving parameters are indicative of a driving environment that the ground vehicle is operating. A plurality of ground vehicle control inputs associated with an operation of the ground vehicle as the ground vehicle maneuvers along the segment of the roadway can be detected, wherein the ground vehicle control inputs are generated from a longitudinal operation of the ground vehicle. The operation of the ground vehicle can be automatically adjusted as the ground vehicle maneuvers along the segment of the roadway to maintain the operation of the ground vehicle within an operation threshold based on the detected driving parameters and ground vehicle control inputs, wherein the operation threshold is the operation of the ground vehicle that decreases an amount of overall energy consumption by the ground vehicle as the ground vehicle operates along the segment of the roadway and maintains a longitudinal speed of the ground vehicle within a longitudinal speed threshold associated with the segment of the roadway.

In embodiments, the systems and methods can generate a target speed window and a target vehicle performance plan for controlling operation of a ground vehicle along a current and one or more upcoming segments of a roadway responsive to the dynamic driving environment. In embodiments, reinforcement learning based ground vehicle control techniques can be adapted to reduce energy consumption, braking, shifting, travel distance, travel time, and or the like. The reinforcement learning techniques can include training a reinforcement learning controller based on a simulated ground vehicle environment during a simulation mode, and then the reinforcement learning controller can be further trained based on a ground vehicle environment during an operating mode of a ground vehicle. In embodiments, the ground vehicle control system can include one or more predictive controllers configured to self-train for an energy consumption solution based on one or more control parameters including the environment information and the vehicle operating information. In embodiments, a Monte Carlo model can be utilized to perform pre-training of the ground vehicle controller. A sampled distribution of actions and corresponding states can be utilized to train a reinforcement learning controller policy, learn an action-value function, or select a set of control parameters with a predetermined loss. In embodiments, a normalized driver performance comparison framework can include predicting a plurality of scenarios of a ground vehicle. A Monte Carlo simulation can be utilized to determine results using the predicted plurality of scenarios and one or more predictive models. Best and worst possible scenarios and associated efficiency for an observed scenario can be determined based on the Monte Carlo simulation results. The efficiency for the observed scenario can be normalized as a function of the best and worst efficiencies. In embodiments, a user interface can be configured to convey information associated with operation of a vehicle to and from a user. Embodiments of the automated cruise controller can be implemented on a system include a plurality of sensors, a system-on-module, a safety microcontroller and a plurality of communication interfaces communicatively coupling the system-on-module, the safety microcontroller and the plurality of sensors together. The system-on module can include an integrated interconnection of a plurality of different types of cores and one or more different types of memory. The system-on module can be configured to control operation and or performance of a system. The safety microcontroller can be configured to provide safety supervision of the system-on-module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which:

FIG. 64 shows exemplary user interface method, in accordance with aspects of the present technology.

DETAILED DESCRIPTION OF THE INVENTION

Figure 1:
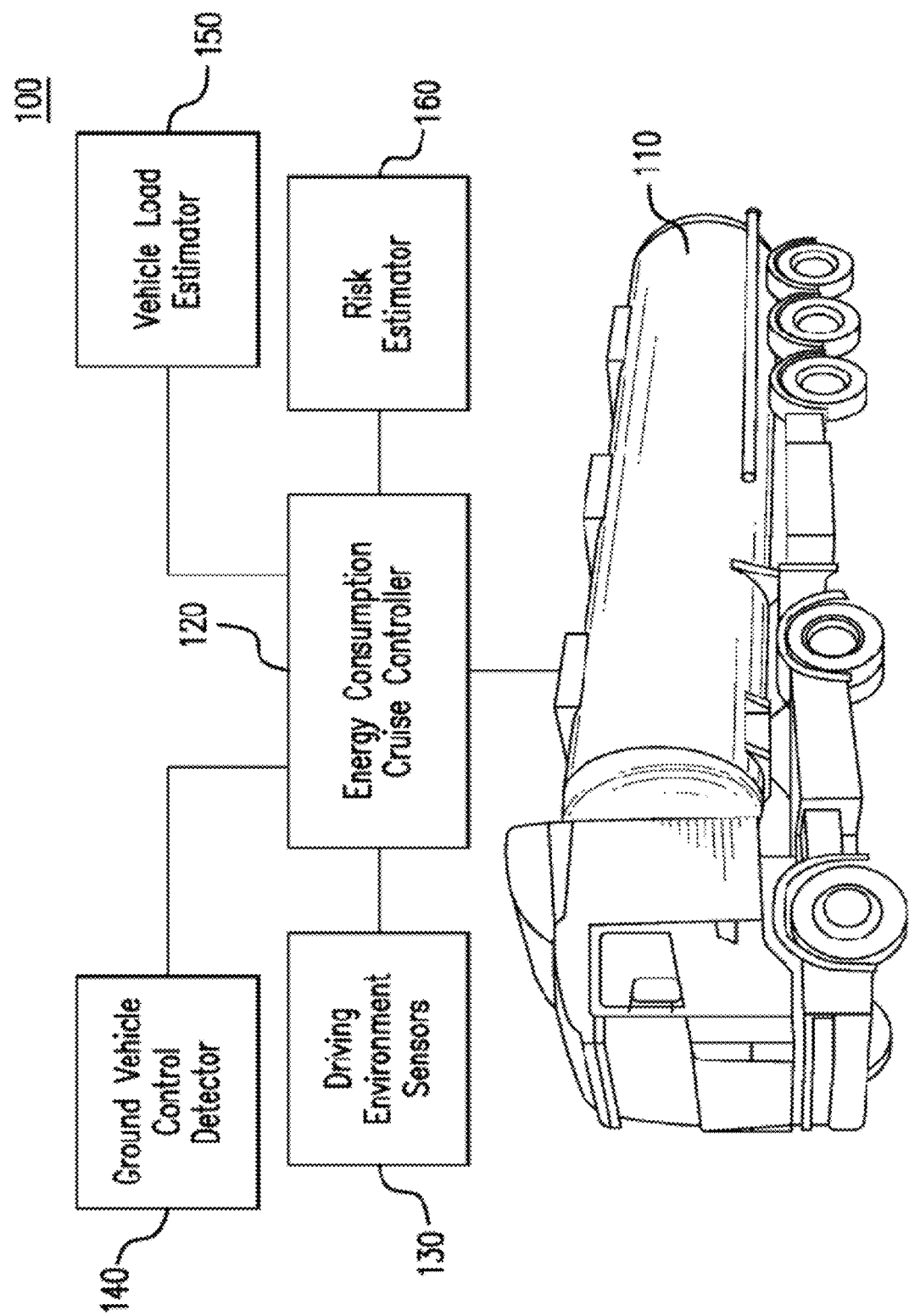
FIG. 1 shows an automated cruise control system that may automatically decrease an overall energy consumption of a ground vehicle as the ground vehicle operates on a roadway, in accordance with aspects of the present technology.

The following Detailed Description refers to accompanying drawings to illustrate exemplary embodiments consistent with aspects of the present technology. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

FIG. 1 illustrates a block diagram of an automated cruise control system that may automatically decrease an overall energy consumption of a ground vehicle as the ground vehicle operates on a roadway. An automated cruise control configuration 100 includes a ground vehicle 110 that may maneuver along a roadway. The ground vehicle 110 is a motorized vehicle with wheels that maneuvers along the roadway that is positioned on the ground such that wheels maintain contact with the roadway as the wheels rotate from the propulsion of a motor and the ground vehicle 110 then maneuvers along roadway via the rotation of the wheels. For example, the ground vehicle 110 may include but is not limited to a semi-truck and trailer, a semi-truck, an automobile, a motorcycle, a tractor, and/or any other ground vehicle that may maneuver along a roadway that will be apparent to those skilled in the relevant art(s) without departing from the spirit and scope of the disclosure.

An energy consumption controller 120 may automatically decrease the overall energy consumption of the ground vehicle 110 as the ground vehicle 110 maneuvers along the roadway. Rather than the driver simply setting the conventional cruise control at a set speed such that the conventional cruise control then maintains the longitudinal speed of the ground vehicle 110 at that set speed, the energy consumption controller 120 may dynamically adjust the operation of the ground vehicle 110 such that the energy consumption controller 120 automatically adjusts the operation of the ground vehicle 110 such that the ground vehicle 110 operates with a decrease in overall energy consumption. As the roadway and the conditions associated with the roadway and the driving environment of the ground vehicle 110 dynamically change, the energy consumption controller 120 may dynamically adjust the operation of the ground vehicle 110 in response to the dynamically changing conditions of the roadway and the driving environment to decrease the overall energy consumption of the ground vehicle 110. The roadway is a mapped and/or unmapped roadway that the ground vehicle 110 may operate to change locations and has a legal speed limit associated with the roadway that the ground vehicle 110 then operates at a longitudinal speed to maneuver along the roadway.

The energy when consumed by the ground vehicle 110 enables the ground vehicle 110 to operate as requested by the driver and thus the energy consumption cruise controller 120 may decrease the overall energy consumed by the ground vehicle 110 as the ground vehicle 110 operates. Energy that is consumed by the ground vehicle 110 as the ground vehicle 110 operates includes but is not limited to hydrocarbon fuels, such as gasoline and/or diesel, electric energy that is generated from coal, nuclear power, solar power, hydro power, hydrogen, natural gas and/or any other type of energy source that may generate energy that is consumed by the ground vehicle 110 as the ground vehicle 110 operates that will be apparent to those skilled in the relevant art(s) without departing from the spirit and scope of the disclosure. Energy that is consumed by the ground vehicle 110 as the ground vehicle 110 operates may also include but is not limited to liquid fuel, stored electric charge in a battery, and/or any other type of energy that is consumed by the ground vehicle 110 as the ground vehicle operates that will be apparent to those skilled in the relevant art(s) without departing from the spirit and scope of the disclosure.

The energy consumption cruise controller 120 may automatically adjust the operation of the ground vehicle 110 based on a plurality of driving environment sensors 130 that detect a plurality of driving parameters that are indicative to the driving environment that the ground vehicle 110 is operating and may change dynamically as the ground vehicle 110 maneuvers along the roadway. As the driving parameters detected by the driving environment sensors 130 change, the energy consumption cruise controller 120 may automatically adjust the operation of the ground vehicle 110 to accommodate the dynamic change in the driving parameters to thereby decrease the overall energy consumption of the ground vehicle 110 as the ground vehicle operates along the roadway. The overall energy consumption of the ground vehicle 110 is the overall energy consumed by the ground vehicle 110 as the ground vehicle maneuvers along the roadway. The energy consumption of the ground vehicle 110 may temporarily increase for a period of time, such as when the ground vehicle 110 is attempting to pass another ground vehicle as an increase in energy consumption to pass the ground vehicle 110 at a faster rate as opposed to a slower rate, may result in a greater decrease in overall energy consumption despite the temporary increase in energy consumption. Thus, a decrease in the overall energy consumption is a decrease in the energy consumed as the ground vehicle 110 maneuvers along the roadway as triggered by the automatic adjustment of the operation of the ground vehicle 110 by the energy consumption cruise controller 120 as opposed to if the energy consumption cruise controller 120 is not operating. In one embodiment, the energy consumption cruise controller 120 may automatically adjust the operation of the ground vehicle 110 based on a plurality of driving environment sensors 130 that detect a plurality of driving parameters as further described below with reference to FIGS. 6 and 7.

The energy consumption cruise controller 120 may also automatically adjust the operation of the ground vehicle 110 based on a plurality of ground control inputs that are generated from a longitudinal operation of the ground vehicle 110 and may change dynamically as the driver operates the ground vehicle 110 along the roadway. The ground control inputs may be detected by a ground vehicle control detector 140. As the driver of the ground vehicle 110 adjusts the manual operation of the ground vehicle 110, the energy consumption cruise controller 120 may automatically adjust the operation of the ground vehicle 110 to accommodate the dynamic change in the ground vehicle control inputs generated by the driver operating the ground vehicle 110 to thereby decrease the overall energy consumption of the ground vehicle 110 as the ground vehicle 110 operates along the roadway. The longitudinal operation of the ground vehicle 110 is the operation of the ground vehicle 110 as the ground vehicle 110 maneuvers in the longitudinal direction that typically follows the roadway. For example, the longitudinal speed of the ground vehicle 110 is the speed of the ground vehicle 110 as the ground vehicle 110 travels in the longitudinal direction of the roadway. In one embodiment, the energy consumption cruise controller 120 may also automatically adjust the operation of the ground vehicle 110 based on a plurality of ground control detectors 140 that detect a plurality of driving parameters as further described below with reference to FIGS. 6 and 7.

The energy consumption cruise controller 120 may also automatically adjust the operation of the ground vehicle 110 based on a plurality of vehicle load parameters that are generated from the vehicle load of the ground vehicle 110 and may change dynamically as the driver operates the ground vehicle 110 along the roadway. The vehicle load parameters may be detected by a vehicle load estimator 150. As the vehicle load parameters of the ground vehicle 110 change as the ground vehicle 110 maneuvers along the roadway, the energy consumption cruise controller 120 may automatically adjust the operation of the ground vehicle 110 to accommodate the dynamic change in the vehicle load parameters to thereby decrease the overall energy consumption of the ground vehicle 110 as the ground vehicle 110 operates along the roadway. The driving environment of the ground vehicle 110 is the overall driving environment that the ground vehicle 110 is experiencing as the ground vehicle 110 operates along the roadway such that the overall driving environment may be impacted by and/or include but is not limited to road surface conditions, the weather conditions, the traffic conditions, the visibility conditions, geometry of the roadway such as grade and curvature, speed limits, and/or any other type of condition that may impact the overall driving environment of the ground vehicle 110 that will be apparent to those skilled in the relevant art(s) without departing from the spirit and scope of the disclosure.

The energy consumption cruise controller 120 may also automatically adjust the operation of the ground vehicle based on a plurality of driving risk conditions that are associated with the driving environment of the roadway in real-time and may change dynamically as the ground vehicle 110 maneuvers along roadway. The driving risk conditions may be detected by the risk estimator 160. As the driving risk conditions of the ground vehicle 110 change as the ground vehicle 110 maneuvers along the roadway, the energy consumption cruise controller 120 may automatically adjust the operation of the ground vehicle 110 to accommodate the dynamic change in driving risk conditions to thereby decrease the overall energy consumption of the ground vehicle 110 as the ground vehicle 110 operates along the roadway. Real-time is the moment at which the ground vehicle 110 is operating along a portion of the roadway such that the driving parameters of the driving environment, the ground vehicle control inputs of the driver, vehicle load parameters of the vehicle load, driving risk conditions of the driving environment, the operation of the ground vehicle 110 and/or any other operation and/or condition and/or parameter that may be impacting the operation of the ground vehicle 110 at the moment the ground vehicle 110 is operating on that corresponding portion of the roadway that will be apparent to those skilled in the relevant art(s) without departing from the spirit and scope of the disclosure. Real-time may also include any designated period of time before the ground vehicle 110 is operating along the specific portion of the roadway as well as any designated period of time after the ground vehicle is operating along the specific portion of the roadway that will be apparent to those skilled in the relevant art(s) without departing from the spirit and scope of the disclosure.

The energy consumption cruise controller 120 may automatically adjust the operation of the ground vehicle 110 as the ground vehicle 110 maneuvers along a segment of the roadway to maintain the operation of the ground vehicle 110 within an operation threshold based on the various different parameters, inputs, conditions and/or any other type of characteristic that may impact the operation and/or maneuvering of the ground vehicle 110 as the ground vehicle maneuvers along the segment of the roadway that will be apparent to those skilled in the relevant art(s) without departing from the spirit and scope of the disclosure. The operation threshold is the operation of the ground vehicle 110 that decreases an amount of overall energy consumption by the ground vehicle 110 and maintains a longitudinal speed of the ground vehicle within a longitudinal speed threshold associated with the segment of the roadway. In one embodiment, the energy consumption cruise controller 120 may automatically adjust the operation of the ground vehicle 110 as the ground vehicle 110 maneuvers along a segment of the roadway to maintain the operation of the ground vehicle 110 within an operation threshold based on the various different parameters, inputs, conditions and/or any other type of characteristic that may impact the operation and/or maneuvering of the ground vehicle 110 as further described below with reference to FIGS. 6 and 7.

The energy consumption cruise controller 120 may automatically adjust the operation of the ground vehicle 110 as the ground vehicle maneuvers along the segment of the roadway to decrease the amount of overall energy consumption by the ground vehicle 110 during the maneuvering and/or operation of the ground vehicle 110 for that specific segment. As the ground vehicle 110 maneuvers along the roadway, the geometry of the roadway may change. The geometry of the roadway are the dimensions, curvature, and/or grade of the roadway. For example, the geometry of the roadway includes but is not limited to the width of the roadway, the quantity of lanes of the roadway, the width of each lane of the roadway, the grade of the roadway, the curvatures of the roadway, and/or any other type of geometry of the roadway will be apparent to those skilled in the relevant art(s) without departing from the spirit and scope of the disclosure.

Figure 2B:
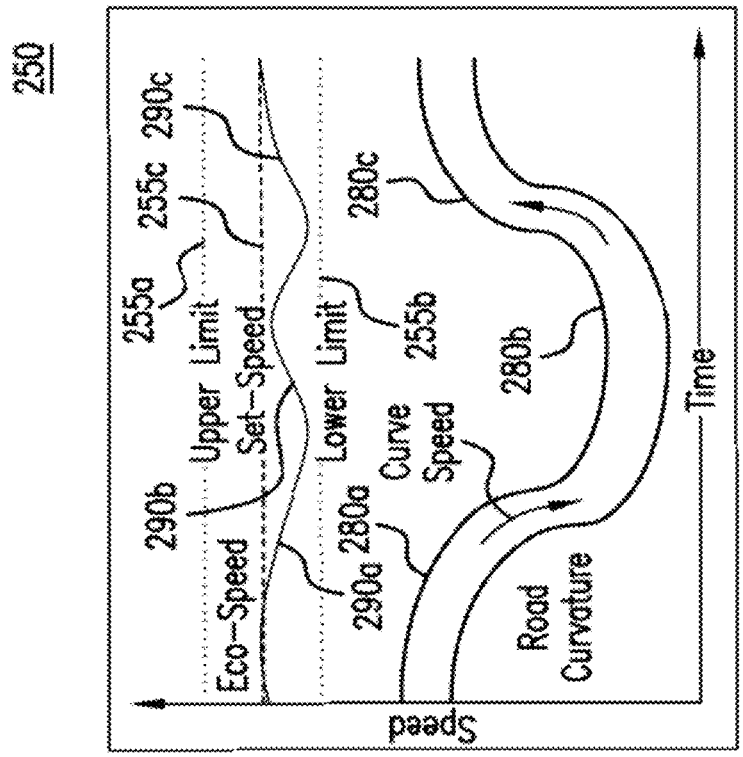
FIGS. 2A and 2B illustrate a top-elevational view of a roadway segment configuration as the geometry of the roadway changes as the grade of the roadway changes, in accordance with aspects of the present technology.
Figure 2A:
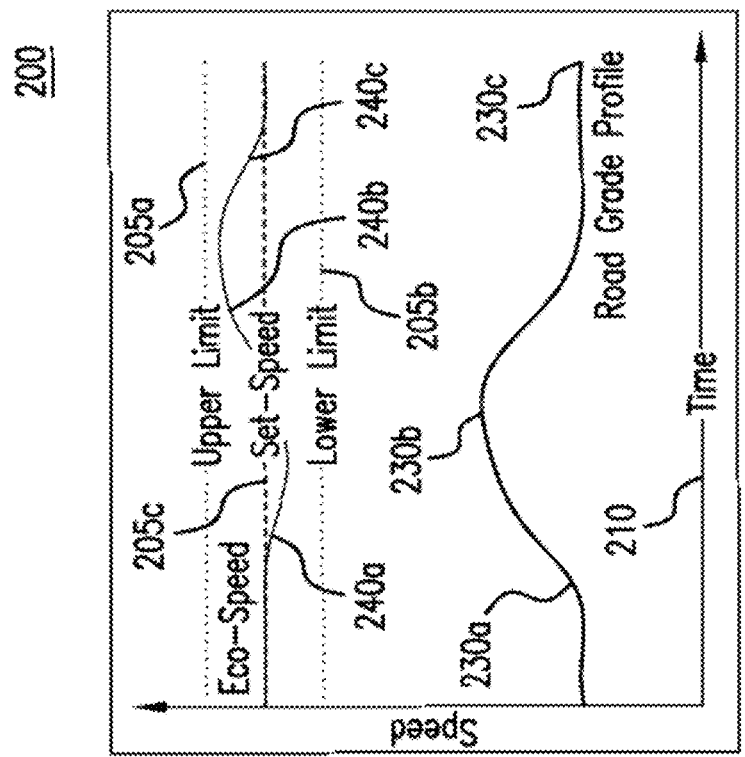

As the geometry of the roadway changes, the operation of the ground vehicle 110 in order to adapt to the change of the geometry of the roadway also changes. For example, as shown in a roadway segment configuration 200 as depicted in FIG. 2A, the geometry of the roadway changes as the grade 230(a-c) of the roadway changes. In such an example, the operating speed 240a of the ground vehicle 110 may decrease as the ground vehicle 110 attempts to transition from the flat grade 230a and to climb to the top grade 230b and the operating speed 240b may then increase as the ground vehicle 110 transitions from the top grade 230b to the flat grade 230c and the operating speed 240c may then level out as the ground vehicle maneuvers along the flat grade 230c. In another example, as shown in a roadway segment configuration 250 as depicted in FIG. 2B, the geometry of the roadway changes as the curvature 280(a-c) of the roadway changes. In another example, the operating speed 290a of the ground vehicle 110 may decrease as the ground vehicle 110 attempts to transition from the straight portion 280a and into the curvature 280b and then the operating speed 290b of the ground vehicle 110 may increase as the ground vehicle 110 departs the curvature 280b and into the straight portion 280c and the operating speed 290c may level out as the ground vehicle 110 maneuvers along the straight portion 280c. The operation of the ground vehicle 110 in order to adapt to the change of grade 230(a-c) of FIG. 2A is different from the operation of the ground vehicle 110 in order to adapt to the change of curvature 280(a-c) in FIG. 2B.

As the operation of the ground vehicle 110 changes in order to adapt to the change of the geometry of the roadway, the overall energy consumption of the ground vehicle 110 also changes. The overall energy consumption of the ground vehicle 110 to encounter the change of grade 230(a-c) in FIG. 2A is different from the overall energy consumption of the ground vehicle 110 to encounter the change of road curvature in FIG. 2B. For example, the ground vehicle 110 may steadily increase the energy consumed as the ground vehicle 110 attempts to compensate for the decrease in speed 240a as the ground vehicle 110 transitions from the flat grade 230a and to climb to the top grade 230b and the energy consumed may then steadily decrease as the ground vehicle 110 increases in speed 240b as the ground vehicle 110 transitions from the top grade 230b to the flat grade 240c. In another example, the ground vehicle 110 may rapidly decrease the energy consumed as the ground vehicle 110 quickly decreases the speed 290b to accommodate for the transition of the ground vehicle 110 from the straight portion 280c and into the curvature 280b and the energy consumed may then rapidly increase as the ground vehicle 110 increases in speed 290c as the ground vehicle 110 transitions from the curvature 280b and into the straight portion 280c.

The energy consumption cruise controller 120 may automatically adjust the operation of the ground vehicle 110 such that the operation of the ground vehicle 110 is customized to the segment of the roadway and thereby customizing the decrease in overall energy consumption to the segment of the roadway. The energy consumption cruise controller 120 may determine each segment of the roadway based on the geometry of the roadway and the corresponding operation of the ground vehicle 110 that is required to adequately maneuver along the segment of the roadway. For example, FIG. 2A depicts the first roadway segment configuration 200 in that a first segment of the roadway is depicted based on the change in grade of the roadway and then FIG. 2B depicts the second roadway segment configuration 250 in that a second segment of the roadway is depicted based on the change in curvature of the roadway. As noted above, the operation of the ground vehicle 110 as well as the overall energy consumption with regard to the change in grade in FIG. 2A differs significantly from the overall operation of the ground vehicle 110 as well as the overall energy consumption with regard to the change in curvature in FIG. 2B.

Thus, the segment of the roadway is a portion of the roadway that includes a specific geometry and thereby requires a customized operation of the ground vehicle 110 and customized overall energy consumption for the ground vehicle 110 to adequately maneuver through the segment. As the geometry of the roadway changes thereby triggering a change in operation of the ground vehicle 110 as well as a change in the overall energy consumption of the ground vehicle 110 to adequately maneuver along the change in the geometry of the roadway, the energy consumption cruise controller 120 may identify that the segment of the roadway is changing and automatically adjust the operation of the ground vehicle 110 to decrease the overall energy consumption of the ground vehicle 110 to accommodate the change in the segment of the roadway.

For example, the energy consumption cruise controller 120 may identify a first segment of the roadway to be a several mile stretch of roadway positioned on a four-lane interstate that runs through the rural train of Kansas. The grade of such a segment of the roadway may remain relatively constant for several miles due the flat terrain of Kansas. In doing so, the energy consumption cruise controller 120 may automatically adjust the operation of the ground vehicle 110 to accommodate the several mile stretch of the flat grade of the roadway to decrease the overall energy consumption of the ground vehicle 110 as the ground vehicle 110 operates along the several mile stretch of the flat grade of the roadway.

However, in another example, the energy consumption cruise controller 120 may identify a second segment to be a several hundred feet stretch of roadway that includes an abrupt curvature 280b as shown in FIG. 2B. In doing so, the energy consumption cruise controller 120 may automatically adjust the operation of the ground vehicle 110 to accommodate the several hundred feet stretch of roadway that includes the abrupt curvature 280b of the roadway to decrease the overall energy consumption of the ground vehicle 110 as the ground vehicle 110 operates along the several hundred feet stretch of the abrupt curvature 280b of the roadway. Thus, the energy consumption cruise controller 120 may automatically adjust the operation of the ground vehicle to decrease the overall energy consumption of the ground vehicle 110 for the segment of the roadway that the ground vehicle 110 is maneuvering.

As noted above, the energy consumption cruise controller 120 may automatically adjust the operation of the ground vehicle 110 to automatically adjust the operation of the ground vehicle 110 as the ground vehicle 110 maneuvers along the segment of the roadway to maintain the operation of the ground vehicle 110 within an operation threshold. The operation threshold is the operation of the ground vehicle that decreases an amount of overall energy consumption by the ground vehicle 110 and maintains a longitudinal speed of the ground vehicle 110 within a longitudinal speed threshold associated with the segment of the roadway. Rather than simply having the ground vehicle 110 operate at a set speed 205c that is set by the driver, the energy consumption cruise controller 120 may automatically adjust the operation of the ground vehicle 110 to operate within an operation threshold for the segment of the roadway and that automatic adjustment of the operation of the ground vehicle 110 may vary within the operation threshold for the segment of the roadway to decrease the overall energy consumption of the ground vehicle 110 for the segment of the roadway.

The operation threshold for the segment of the roadway is the operation that the ground vehicle 110 is to maintain in order to adequately maneuver through the segment of the roadway such that the ground vehicle 110 deviates from a set speed 205c but does so within the operation threshold such that the ground vehicle 110 adequately maneuvers throughout the segment. For example, each segment of each roadway has a specified speed limit that the ground vehicle 110 is to operate at to avoid the driver of the ground vehicle 110 to receive a traffic violation for speeding and/or for operating significantly below the speed limit. In such an example, the set speed 205c of the operation threshold may be the posted speed limit for the segment of the roadway. The energy consumption cruise controller 120 may then determine a longitudinal speed threshold associated with the segment of the roadway for the ground vehicle 110 to operate within based on the specified speed limit for the segment. The longitudinal speed threshold includes an upper limit 205a and a lower limit 205b such that as the ground vehicle 110 maneuvers along the segment of the roadway, the energy consumption cruise controller 120 may maintain the longitudinal speed of the ground vehicle to be within the upper limit 205a and the lower limit 205b of the longitudinal speed threshold. In another example, the driver may set the set speed 205c to be the speed at which the driver requests to operate. In such an example, the energy consumption cruise controller 120 may then determine the longitudinal speed threshold associated with the segment of the roadway for the ground vehicle 110 to operate within based on the specified set speed set by the user.

The energy consumption cruise controller 120 may determine the longitudinal speed threshold based on the upper limit 205a and the lower limit 205b that may ensure that the specified speed limit of the segment does not exceed and/or decrease below the specified speed limit such that the driver may be at an increased risk of receiving a traffic violation. For example, the energy consumption cruise controller 120 may incorporate that the upper limit 205a of the longitudinal speed threshold is not to exceed more than 20 mph over the specified speed limit and is not to decrease below more than 20 mph below the specified speed limit. The energy consumption cruise controller 120 may also incorporate maximum and minimum speed limits that are determined by fleet management of the fleet that the ground vehicle 110 is operating within. For example, the ground vehicle 110 may be a delivery semi-truck and trailer and the fleet management that the delivery semi-truck and trailer is operating within may require that the delivery semi-truck and trailer is not to exceed 70 mph at any time during operation. The energy consumption cruise controller 120 may then incorporate that 70 mph limit into the upper limit 205a.

The energy consumption cruise controller 120 may also determine the upper limit 205a and the lower limit 205b based on the geometry of the segment as well as the various different parameters, inputs, conditions and/or any other type of characteristics associated with the segment that may impact the operation of the ground vehicle 110 that the ground vehicle 110 should operate within a customized upper limit 205a and lower limit 205b such that the ground vehicle 110 adequately maneuvers along the segment of the roadway. For example, the energy consumption cruise controller 120 may incorporate into the upper limit 205a of the segment associated with the change in grade as shown in FIG. 2A to not exceed a specified upper limit 205a should the ground vehicle 110 increase significantly in speed transferring from the top grade 230b to the flat grade 230c to prevent the ground vehicle 110 from obtaining a longitudinal speed that may impact the ground vehicle 110 from safely maneuvering along the segment associated with the change in grade. In another example, the energy consumption cruise controller 120 may incorporate into the upper limit 255a of the segment associated with the curvature 280b as shown in FIG. 2B to not exceed a specified upper limit 255a to prevent the ground vehicle 110 from obtain a longitudinal speed that may impact the ground vehicle 110 from safely maneuvering along curvature 280b.

The energy consumption cruise controller 120 may also determine the upper limit 205a and the lower limit 205b based on an amount of time 210 that may be required by the ground vehicle 110 to adequately maneuver along the segment of the roadway. Typically, the lower the longitudinal speed that the ground vehicle 110 operates increases the likelihood that the ground vehicle 110 may safely maneuver along the segment of the roadway as well as decreasing the overall energy consumption of the ground vehicle 110. For example, the lower the longitudinal speed that the ground vehicle operates at to maneuver along the curvature 280*b* increases the likelihood that the ground vehicle 110 may safely maneuver along the curvature 280*b* while also decreasing the overall energy consumption of the ground vehicle 110. However, the ground vehicle 110 operating significantly below the posted speed limit may hinder the ground vehicle 110 from adequately operating along the segment such that the ground vehicle 110 may take an increased amount of time 210 to maneuver along the segment thereby significantly impacting the performance of the ground vehicle 110.

Thus, the energy consumption cruise controller 120 may determine the lower limit 205*b* of the longitudinal speed threshold to ensure that the ground vehicle 110 completes travel along the segment such that the lower limit 205*b* of the longitudinal speed threshold does not deviate significantly below the posted speed limit. In doing so, the energy consumption controller 120 may ensure that the ground vehicle 110 completes travel along the segment to be within a specified amount of time 210. The specified amount of time 210 may be determined by the energy consumption cruise controller 120 such that the ground vehicle 110 completes travel along the segment of the roadway without deviating significantly below the posted speed limit. In doing so, the energy consumption cruise controller 120 may determine the lower limit 205*b* of the longitudinal speed threshold to ensure that the ground vehicle 110 completes travel along the segment of the roadway without significantly impacting the performance of the ground vehicle 110.

The energy consumption cruise controller 120 may automatically adjust the operation of the ground vehicle 110 such that the overall energy consumption of the ground vehicle 110 may be decreased as the ground vehicle 110 maneuvers along the segment of the roadway while maintaining the longitudinal speed of the ground vehicle 110 within the longitudinal speed threshold associated with the segment of the roadway. Rather than simply having the ground vehicle operate at the set speed 205*c*, the energy consumption cruise controller 120 may automatically adjust the operating speed such that the overall energy consumption of the ground vehicle 110 for the segment of the roadway is decreased. In doing so, the energy consumption cruise controller 120 may automatically adjust the operating speed of the ground vehicle 120 as the ground vehicle 120 maneuvers along the segment of the roadway to ensure that the overall energy consumption is decreased.

For example, as shown in FIG. 2A, the energy consumption cruise controller 120 may automatically adjust the operating speed of the ground vehicle 110 in real-time such that the operating speed is continuously varied in real-time as the ground vehicle maneuvers along the grade 230(*a-c*). The energy consumption cruise controller 120 initially maintains the initial operating speed 240*a* at the set speed 205*c* as the ground vehicle attempts to climb from the flat grade 230*a* to the top grade 230*b*. The energy consumption cruise controller 120 then decreases the climbing operating speed 240*b* as the ground vehicle climbs the top grade 230*b*. Rather than have the ground vehicle 110 have a significant increase in energy consumption as the ground vehicle 110 attempts to climb the top grade 230*b* while maintaining the operating speed at the set speed 205*c*, the energy consumption cruise controller 120 may decrease the climbing operating speed 240*b* to the lower limit 205*b* of the longitudinal speed threshold in order to avoid any unnecessary increase in energy consumption by the ground vehicle 110 as the ground vehicle 110 attempts to climb the top grade 230*b*. The energy consumption cruise controller 120 may then increase the declining operating speed 240*c* to the upper limit 205*a* as the ground vehicle 110 transitions from the top grade 230*b* to the flat grade 230*c* as the amount of energy consumption of the ground vehicle 110 may be less as the ground vehicle 230*b* operates at the upper limit 205 for the declining operating speed 240*c* as compared to the energy consumption of the ground vehicle 110 should the ground vehicle 110 have attempted to maintain the operating speed at the set speed 205*c* when attempting to climb the top grade 230*b*.

Thus, the energy consumption cruise controller 120 may automatically adjust the operation of the ground vehicle 110 to decrease the overall energy consumption of the ground vehicle as the ground vehicle 110 maneuvers along the segment of the roadway. In doing so, the energy consumption cruise controller 120 may often times temporarily increase the operating speed of the ground vehicle 110 as the ground vehicle 110 maneuvers along the segment as such an increase in operating speed that does result in a temporary increase in energy consumption may actually result in a decrease in the overall energy consumption for the ground vehicle 110 based on the segment of the roadway that the ground vehicle 110 is operating.

In addition to the example above regarding FIG. 2A, an additional example is that the energy consumption cruise controller 120 may temporarily increase the operating speed of the ground vehicle 110 as the ground vehicle 110 is attempting to pass a second ground vehicle. Although the temporary increase in the operating speed of the ground vehicle 110 as the ground vehicle 110 accelerates to pass the second ground vehicle in a decreased amount of time, such an acceleration to pass the second ground vehicle in the decreased amount of time may result in a decrease in the overall energy consumption of the ground vehicle 110. The temporary increase in the operating speed of the ground vehicle 110 to accelerate in passing the second ground vehicle in the decreased amount of time may result in a decrease in the overall energy consumption as compared to if the ground vehicle 110 maintained the operating speed and slowly passed the second ground vehicle.

As a result, the energy consumption cruise controller 120 may automatically adjust the operation of the ground vehicle 110 to customize the operation of the ground vehicle 110 to the segment of the roadway that the ground vehicle 110 is operating to decrease the overall energy consumption of the ground vehicle 110. Rather than simply setting the operating speed and operating the ground vehicle 110 at the operating speed as well as maintaining the specified distance from other ground vehicles as conventional cruise control systems do, the energy consumption cruise controller 120 may continuously adjust the operation of the ground vehicle 110 such that the ground vehicle 110 reacts to the segment of the roadway that the ground vehicle 110 is maneuvering in real-time. Any additional adjustment to the operation of the ground vehicle 110 from operating the ground vehicle 110 at the set speed as well as maintaining a distance from other ground vehicles as provided by conventional cruise control systems to decrease the overall energy consumption has conventionally been implemented by the natural intelligence of the driver. However, any type of adjustment due to the natural intelligence of the drive obviously is limited to the natural intelligence of the driver but also any type of adjustment due to the natural intelligence of the driver is done by the perception of the driver.

For example, a driver with a higher level of natural intelligence may recognize that continuing to press on the gas pedal to maintain the operating speed at the set speed when climbing a steep incline may actually have a negative impact on the energy consumption. However, such a driver may decrease the amount of pressure on the gas pedal simply by what the driver perceives as the appropriate amount of pressure to put on the gas pedal. Such a perception may not be the actual amount of throttle to give the ground vehicle 110 in order to decrease the overall energy consumption of the ground vehicle 110 and again is limited to the natural intelligence of the driver and the driver may not continuously execute the appropriate adjustments to the operation of the ground vehicle 110. Thus, the energy consumption cruise controller 120 may significantly decrease the overall energy consumption of the ground vehicle 110 by continuously adjusting the operation of the ground vehicle 110 in real-time based on the real-time interaction of the ground vehicle 110 with the segment of the roadway.

The energy consumption cruise controller 120 may be a device that is capable of electronically communicating with other devices. Examples of the energy consumption cruise controller 120 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Figure 3:
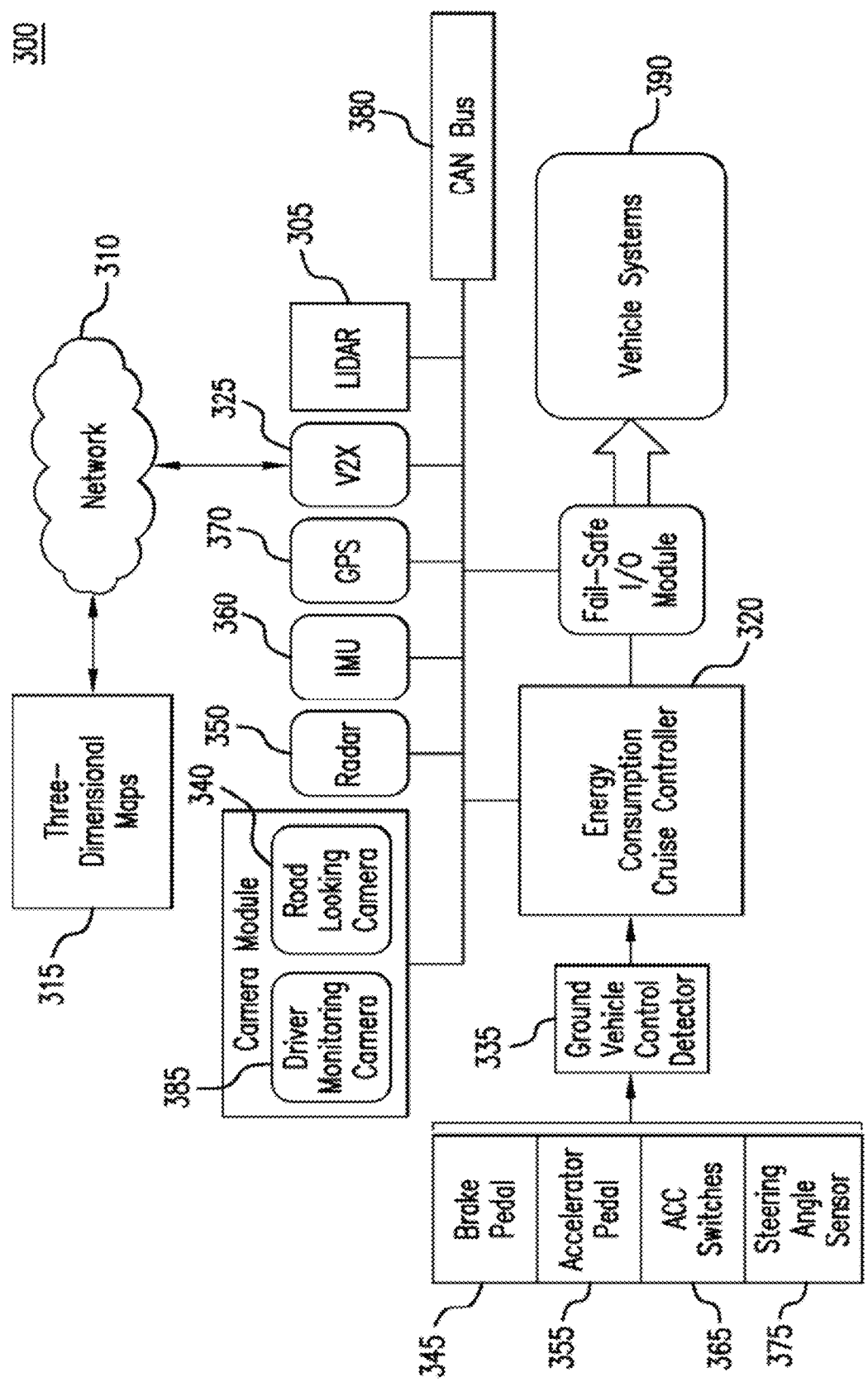
FIG. 3 shows an automated cruise control system that automatically decreases the overall energy consumption of the ground vehicle as the ground vehicle operates on a roadway, in accordance with aspect of the present technology.

FIG. 3 illustrates a block diagram of an automated cruise control system that automatically decreases the overall energy consumption of the ground vehicle as the ground vehicle operates on a roadway. An automated cruise control system configuration 300 includes a plurality of sensors that are associated with the ground vehicle 110. The sensors include but are not limited to a road looking camera 340, a radar 350, an inertial measurement unit (IMU) 360, a global positioning system (GPS) 370, and a control area network (CAN) bus 380. The sensors detect driving parameters associated with the ground vehicle 110 as the ground vehicle 110 operates. Additional driving parameters may be detected via the vehicle to everything (V2X) connection 325 to the network 310. The energy consumption cruise controller 320 may then incorporate the driving parameters into the automatic adjustment of the ground vehicle 110 as the ground vehicle 110 operates. In doing so, the energy consumption cruise controller 320 may adjust the vehicle systems 390 of the ground vehicle 110. The automated cruise control configuration 300 shares many similar features with the automated cruise control configuration 100; therefore, only the differences between the automated cruise control configuration 300 and the automated cruise control configuration 100 are to be discussed in further detail.

A plurality of sensors, such as but not limited to the road looking camera 340, the radar 350, the IMU 360, the GPS 370, the CAN bus 380, the LIDAR 305 and so on, are associated with the ground vehicle 110 that maneuvers along the roadway. The sensors detect a plurality of driving parameters associated with the ground vehicle 110 as the ground vehicle 110 maneuvers along the segment of the roadway. The driving parameters are indicative to a driving environment that the ground vehicle 110 is operating. The driving parameters provide insight to the energy consumption cruise controller 320 as to the current driving environment that the ground vehicle 110 is operating in real-time such that the energy consumption cruise controller 320 may then incorporate the driving parameters into the automatic adjustment of the operation of the ground vehicle 110 to account for the current driving environment of the ground vehicle 110 as the ground vehicle 110 maneuvers along the segment of the roadway.

For example, the driving parameters provide insight as to the current operation of the ground vehicle 110 such as but not limited to the acceleration of the ground vehicle 110, deceleration, wheel speed and so on. The driving parameters may also provide insight as to the current external environment that the ground vehicle 110 is operating such as but not limited road lane markings, other ground vehicles positioned around the ground vehicle 110, weather conditions and so on. The driving parameters may also provide insight as to the current terrain that the ground vehicle 110 is operating such as the grade of the roadway, the map of the roadway, and so on. The driving parameters may include but are not limited to acceleration, deceleration, ground vehicle speed, wheel speed, road lane markings, position of external vehicles, position of the ground vehicle, maps, posted speed limits, upper limit and lower limits of the operating speed, 3D road map, roadway curvature, roadway grade, YAW, windshield wiper operation, anti-lock brake (ABS) activation, visibility conditions, weather conditions, landmarks associated with the roadway, cabin air temperature, cabin air pressure, road surface temperature, exhaust dew point, intake dew point and/or any other type of driving parameter that is indicative to the driving environment of the segment of the roadway that will be apparent to those skilled in the relevant art(s) without departing from the spirit and scope of the disclosure.

The energy consumption cruise controller 320 may then automatically adjust the operation of the ground vehicle 110 as the ground vehicle 110 maneuvers along the segment of the roadway to maintain the operation of the ground vehicle 110 within the operation threshold based on the detected driving parameters. Each of the numerous driving parameters detected by the sensors may enable the energy consumption cruise controller 320 to automatically adjust the operation of the ground vehicle 110 to accommodate each of the numerous driving parameters that may be impacting the driving environment of the ground vehicle 110 in real-time.

Rather than simply having the ground vehicle 110 operate at the set speed, the energy consumption cruise controller 320 may identify each driving parameter and the corresponding impact of that driving parameter on the driving environment in real-time and then automatically adjust the operation of the ground vehicle 110 based on the overall state of the driving environment in real-time. In doing so, the energy consumption cruise controller 320 may automatically adjust the vehicle systems 390 of the ground vehicle 110. The vehicle systems 390 are the systems of the ground vehicle 110 that when adjusted trigger the ground vehicle 110 to operate accordingly. For example, the vehicle systems 390 may include but are not limited to the engine controller, brakes, steering, throttle, and/or any other type of system of the ground vehicle 110 that trigger the ground vehicle 110 to operate.

A plurality of visual detection devices detects a plurality of visual detection driving parameters that are associated with the ground vehicle 110 as the ground vehicle 110 maneuvers along the segment of the roadway. The visual detection driving parameters are driving parameters that are visually identifiable as detected by the visual detection devices and are indicative to the driving environment that the ground vehicle 110 is operating. For example, the visual detection devices may include devices that detect the visual detection driving parameters that are impacting the driving environment of the ground vehicle 110 in real-time. For example, the visual detection devices may include the road looking camera 340, the radar 350, the LIDAR 305, and/or any other type of visual detection device that may detect the visual detection driving parameters that are impacting the driving environment of the ground vehicle 110 that will be apparent to those skilled in the relevant art(s) without departing from the spirit and scope of the disclosure.

The road looking camera 340, the radar 350, and/or the LIDAR 305 may detect numerous visual detection driving parameters that impact the driving environment of the ground vehicle 110 in real-time as the ground vehicle maneuvers along the segment of the roadway. The visual detection driving parameters of the driving environment may include tangible characteristics of the driving environment that may be visually detected and/or identified by the road looking camera 340, the radar, and/or the LIDAR 305 such that the driver is not required to visually detect such visual detection driving parameters. Such visual detection driving parameters may provide the energy consumption cruise controller 320 with the insight as to the tangible and/or visually identifiable aspects of the driving environment that the ground vehicle 110 is operating in real-time.

The energy consumption cruise controller 320 may then identify the visual detection driving parameters as detected by the visual detection devices in real-time as the ground vehicle 110 maneuvers along the segment of the roadway. The energy consumption cruise controller 320 may determine an impact that each of the visual detection driving parameters are having on the driving environment that the ground vehicle 110 is operating in real-time. The energy consumption cruise controller 320 may automatically adjust the operation of the ground vehicle 110 as the ground vehicle 110 maneuvers along the segment of the roadway to maintain the operation of the ground vehicle 110 within the operation threshold to accommodate for each of the visual detection driving parameters as each visual detection driving parameter impacts the driving environment that the ground vehicle 110 is operating in real-time.

For example, the road looking camera 340 may identify the amount of other ground vehicles that are operating within the field of view (FOV) of the road looking camera 340 along with the ground vehicle 110. The radar 350 and/or the LIDAR 305 may also detect the amount of other ground vehicles and the position of those ground vehicles relative to the ground vehicle 110 as the ground vehicle 110 maneuvers along the segment. The road looking camera 340, the radar 350, and/or the LIDAR 305 may identify the amount of ground vehicles that are in front of the ground vehicle 110, driving along each side of the ground vehicle 110, as well as approaching the ground vehicle 110 from the rear of the ground vehicle 110. Such visual detection driving parameters provided by the road looking camera 340, the radar 350, the LIDAR 305 may enable the energy consumption cruise controller 320 to identify the other ground vehicles that are operating within the FOV of the road looking camera 340 and/or detected by the radar 350, the LIDAR 305 and may automatically adjust the operation of the ground vehicle 110 to maintain a distance from each of the other ground vehicles.

However, such a distance that is maintained by the energy consumption cruise controller 320 may be a dynamically changing distance as opposed to a static distance. Maintaining the same specified distance from each ground vehicle may not be feasible. Rather, the energy consumption cruise controller 320 may dynamically adjust the distance that the ground vehicle 110 maintains from other vehicles based on the driving environment of the ground vehicle 110. For example, the energy consumption cruise controller 320 may maintain the distance of the ground vehicle 110 from a single ground vehicle or two ground vehicles detected by the road looking camera 340 that are also operating along a segment of the roadway that stretches several miles on a flat grade and no curvature interstate at a larger distance based on the detected increased operating speed of the ground vehicle 110 and the detection of low traffic congestion. However, in another example, the energy consumption cruise controller 320 may maintain the distance of the ground vehicle 110 from numerous ground vehicles detected by the road looking camera 340 that are also operating along a congested segment of an urban interstate at a shorter distance based on the detected decreased operating speed of the ground vehicle 110 and the detection of high traffic congestion.

The radar 340 may identify the operating speed of each of the ground vehicles that are detected by the road looking camera 340 as being within the FOV of the road looking camera 340. In identifying the visual detection driving parameter of the operating speed of each of the ground vehicles that are detected by the road looking camera 340, the energy consumption cruise controller 320 may automatically adjust the operating speed of the ground vehicle 110 to remain a dynamic distance from the other ground vehicles. The distances are determined by the energy consumption cruise controller 320 to be a safe distance from each of the ground vehicles while also decreasing the overall energy consumption of the ground vehicle but doing so within the operating threshold of the segment of the roadway.

The radar 340 identifying the visual detection driving parameter of the operating speed of the ground vehicle 110 that the ground vehicle 110 is attempting to pass may also enable the energy consumption cruise controller 320 to automatically adjust the operating speed of the ground vehicle 110 such that the energy consumption cruise controller 320 may automatically increase the operating speed of the ground vehicle 110 to adequately pass the ground vehicle while decreasing the overall energy consumption of the ground vehicle 110 while also maintaining the operation speed of the ground vehicle to be within the longitudinal speed threshold associated with the segment of the roadway. For example, the radar 340 may identify that the operating speed of the ground vehicle that the ground vehicle 110 is attempting to pass is steadily increasing the operating speed as the ground vehicle 110 attempts to pass the ground vehicle. The energy consumption cruise controller 320 may then increase the operating speed of the ground vehicle 110 to accommodate for the increase of the operating speed of the ground vehicle while ensuring a decrease in the overall energy consumption of the ground vehicle 110 as well as maintaining the operating speed of the ground vehicle 110 to be within the longitudinal speed threshold of the segment of the roadway.

The road looking camera 340, the radar 350, and/or the LIDAR 305 may also identify the geometry of the segment of the roadway based on the width of the roadway, the amount of lanes of the roadway, as well as provide real-time updates as to the operation of the ground vehicle 110 relative to the operating lines of the roadway to determine whether the ground vehicle 110 is operating within the operating lines and/or moving across the operating lines. Such driving parameters provided by the road looking camera 340, the radar 350, and/or the LIDAR 305 may enable the energy consumption cruise controller 320 to determine whether the ground vehicle 110 is safely operating within the operating lines of the roadway. The energy consumption cruise controller 320 may automatically adjust the operation of the ground vehicle 110 to enable the ground vehicle 110 to operate at an increased operating speed when the ground vehicle 110 is safely operating within the operating lines of the roadway. However, the energy consumption cruise controller 320 may automatically adjust the operation of the ground vehicle to decrease the operating speed when the ground vehicle 110 is not safely operating within the operating lines of the roadway but is rather crossing the operating lines.

The road looking camera 340, the radar 350, and/or the LIDAR 305 may also identify the current state of the weather with regard to the current atmospheric conditions of the driving environment that the ground vehicle 110 is operating. The road looking camera 340 may identify when rain is initiated as well as the intensity of the rain as the ground vehicle 110 is operating with regard to the visibility of the roadway for the driver. The road looking camera 340 may identify when snow is initiated as well as the intensity of the snow as the ground vehicle is operating with regard to the visibility of the roadway for the driver. The road looking camera 340 may identify when the intensity of the sun is impacting the visibility of the roadway for the driver. The road looking camera 340 may determine when the glare of external lights not positioned on the ground vehicle 110 impact the visibility of the driver at night.

The driving parameters of the rain and/or snow may trigger the energy consumption cruise controller 320 to automatically adjust the operation of the ground vehicle 110 to decrease the operating speed of the ground vehicle 110 to account for the intensity of the rain and/or snow. The energy consumption cruise controller 320 may decrease the operating speed to be closer to the lower limit 205b of the longitudinal speed threshold based on the intensity of the rain and/or snow. As the intensity of the rain and/or snow increases, the energy consumption cruise controller 320 may decrease the operating speed to be significantly closer to the lower limit 205b. The energy consumption cruise controller 320 may adjust the longitudinal speed threshold to decrease the longitudinal speed threshold such that the upper limit 205a and the lower limit 205b are decreased further when the intensity of the rain and/or snow is significant.

The speed and/or operation of the windshield wipers positioned on the ground vehicle 110 may also provide the driving parameters as to the intensity of the rain and/or snow. As the speed of the windshield wipers increase, the energy consumption cruise controller 320 may recognize that the intensity of the rain and/or snow is also increasing. The application of the ABS positioned on the ground vehicle 110 may also provide the driving parameters as to the conditions of the segment of the roadway with regard to slickness of the segment of the roadway from rain, snow, and/or ice. As the ABS is applied, the energy consumption cruise controller 320 may recognize that the slickness of the segment of the roadway is increasing.

The road looking camera 340, the radar 350, and/or the LIDAR 305 may also identify the posted speed limit signs that are positioned along the segment of the roadway as well as any changes in the posted speed limit of the posted speed limit signs. A significant driving parameter for the segment of the roadway is the posted speed limit for the segment of the roadway. The energy consumption cruise controller 320 may determine the operating threshold for the segment of the roadway as well as the longitudinal speed threshold for the segment of the roadway that the ground vehicle 110 is to operate when maneuvering along the segment of the roadway based on the posted speed limit for the roadway. The energy consumption cruise controller 320 may ensure that the longitudinal speed threshold for the segment of the roadway is set such that the upper limit 205a and the lower limit 205b of the longitudinal speed threshold for the segment of the roadway decreases the likelihood that the driver may receive a traffic violation for either exceeding and/or decreasing below the posted speed limit for the segment of the roadway.

The road looking camera 340, the radar 350, and/or the LIDAR 305 may then provide the energy consumption cruise controller 320 with any change in the posted speed limit signs. The energy consumption cruise controller 320 may then automatically adjust the longitudinal speed threshold for the segment of the roadway to accommodate the change in the posted speed limit sign detected by the road looking camera, the radar 305, and/or the LIDAR 305. In doing so, the energy consumption cruise controller 320 may then ensure that the ground vehicle 110 operates within a longitudinal speed threshold that is adjusted to accommodate the change in the posted speed limit signs. The road looking camera 340, the radar 350, and/or the LIDAR 305 may detect and provide any type of visual detection driving parameter to the energy consumption cruise controller 320 that may enable the energy consumption cruise controller 320 to automatically adjust the operation of the ground vehicle 110 to account for the impact of the visual detection driving parameter detected by the camera 340, the radar 350, and/or the LIDAR 305 that will be apparent to those skilled in the relevant art(s) without departing from the spirit and scope of the disclosure.

The IMU 360 may detect numerous driving parameters that impact the driving environment of the ground vehicle 110 as the ground vehicle 110 maneuvers along the segment of the roadway. The IMU 360 may detect movement aspects of the driving environment in that the movement aspects include characteristics of the driving environment that are associated with the movement of the ground vehicle 110 that may be detected by the IMU 360. Such movement aspects may provide the energy consumption cruise controller 320 with the insight as to the aspects associated with the driving environment related to the movement of the ground vehicle 110 as the ground vehicle 110 maneuvers along the segment of the roadway in real-time.

For example, the IMU 360 may identify in real-time driving parameters such as but not limited to the operation speed of the ground vehicle 110, acceleration of the ground vehicle 110, deceleration of the ground vehicle 110, wheel speed of the ground vehicle 110, the YAW of the ground vehicle 110, and/or any other type of driving parameter that is associated with the movement of the ground vehicle 110 as the ground vehicle operates in the driving environment will be apparent to those skilled in the relevant art(s) without departing from the spirit and scope of the disclosure. The energy consumption cruise controller 320 may then incorporate the driving parameters detected by the IMU 360 in real-time to adjust the operation of the ground vehicle 110 in real-time based on the movement of the ground vehicle 110 as identified by the driving parameters detected by the IMU 360.

The IMU 360 may provide the acceleration and/or deceleration of the ground vehicle 110, wheel speed of the ground vehicle 110, and/or the YAW of the ground vehicle 110 to the energy consumption cruise controller 320. The energy consumption cruse controller 320 may then determine in real-time the status of the ground vehicle 110 regarding how the ground vehicle 110 is moving in the driving environment and then automatically adjust the operation of the ground vehicle based on the real-time status of the ground vehicle 110. For example, the IMU 360 detects that the ground vehicle 110 is accelerating and thereby increasing the operating speed of the ground vehicle 110 to reaching the upper limit 205*a* of the longitudinal speed threshold of the change in grade segment of the roadway depicted in FIG. 2A as the ground vehicle 110 transitions from the top grade 230*b* to the flat grade 230*c*. However, quickly following the flat grade 230*c* the segment of the roadway may change from the change in grade segment of the roadway depicted in FIG. 2A to the curvature segment of the roadway depicted in FIG. 2B.

Based on the driving parameters of the increase in acceleration and operating speed at the upper limit 205*a* as the ground vehicle 110 enters the curvature 280*b* as detected by the IMU 360, the energy consumption cruise controller 320 may then automatically adjust the deceleration of the ground vehicle 110 as well as decreasing the operating speed of the ground vehicle 110 to reach the lower limit 255*b* of the longitudinal speed threshold of the curvature segment of the roadway at an increased deceleration rate. The energy consumption cruise controller 320 may automatically increase the deceleration rate of the ground vehicle 110 as the ground vehicle reaches the curvature 280*b* to trigger the ground vehicle 110 to reach the lower limit 255*b* of the longitudinal speed threshold of the curvature segment of the roadway significantly quicker as compared to when the ground vehicle 110 is entering the curvature 280*b* at an operating speed that is at the set speed 255*c* for the curvature segment of the roadway with limited acceleration. In doing so, the energy consumption cruise controller 320 may automatically adjust the operation of the ground vehicle 110 in real-time to ensure that the ground vehicle 110 reaches the lower limit 255*b* of the longitudinal speed threshold of the curvature 280*b* such that the ground vehicle 110 maneuvers through the curvature 280*b* safely.

Thus, the driving parameters detected by the IMU 360 associated with the real-time movement of the ground vehicle 110 relative to the driving environment of the ground vehicle 110 may enable the energy consumption cruise controller 320 to automatically adjust the operation of the ground vehicle 110 to accommodate for the real-time movement of the ground vehicle 110. Rather than have the driver override the conventional cruise control should the ground vehicle 110 be approaching a segment of the roadway, such as the curvature 280*b* at such a high operating speed that is unsafe for the driver to maneuver through the curvature 280*b*, the energy consumption cruise controller 320 may automatically adjust the operating speed of the ground vehicle 110 to accommodate for the operating speed as the ground vehicle 110 encounters each segment of the roadway. The IMU 360 may detect and provide any type of driving parameter to the energy consumption cruise controller 320 that may enable the energy consumption cruise controller 320 to automatically adjust the operation of the ground vehicle 110 to account for the impact of the driving parameter detected by the IMU 360 that will be apparent to those skilled in the relevant art(s) without departing from the spirit and scope of the disclosure.

The GPS 370 may detect the position of the ground vehicle 110 as the ground vehicle 110 maneuvers along segment of the roadway relative to the roadway and the driving environment of the ground vehicle 110. As the position of the ground vehicle 110 changes in real-time, the GPS 370 may provide the driving parameter of the position of the ground vehicle 110 to the energy consumption cruise controller 320. In doing so, the energy consumption cruise controller 320 may automatically adjust the operation of the ground vehicle 110 based on the position of the ground vehicle 110 in real-time relative to the driving environment of the ground vehicle 110. The energy consumption cruise controller 320 may localize the position of the ground vehicle 110 relative to the driving environment of the ground vehicle 110 via the GPS 370 such that the energy consumption cruise controller 320 may incorporate the localized position of the ground vehicle 110 relative to three-dimensional (3D) maps 315 of the driving environment.

The V2X 325 of the ground vehicle 110 may continuously stream 3D maps 315 of the driving environment to the energy consumption cruise controller 320 based on the position of the ground vehicle 110 as detected by the GPS 370. The energy consumption cruise controller 320 may then incorporate the position of the ground vehicle 110 as detected by the GPS 370 into the 3D maps 315 of the driving environment and then analyze the 3D maps 315 as the position of the ground vehicle 110 changes in real-time relative to the driving environment as depicted in the 3D maps 315. The 3D maps 315 may provide numerous driving parameters that have terrain aspects of the driving environment in that the terrain aspects include characteristics of the driving environment that are associated with the geometry of the segment of the roadway as well as other aspects of the terrain surrounding the ground vehicle 110 as the ground vehicle 110 maneuvers along the segment of the roadway. Such terrain aspects may provide the energy consumption cruise controller 320 with the insight as to the aspects associated with the geometry of the driving environment as well as other aspects of the terrain of the driving environment as the ground vehicle 110 maneuvers along the segment of the roadway in real-time.

For example, the 3D maps 315 in real-time may provide driving parameters such as but not limited to ascending grades of the segment of the roadway, descending grades of the segment of the roadway, curvature of the segment of the roadway, posted signage, maps of the segment of the roadway, terrain of the segment of the roadway, look ahead maps of the roadway beyond the segment of the roadway, landmarks associated with the segment of the roadway, posted speed limit signs, and/or any other type of driving parameter that is associated with the geometry and/or terrain of the segment of the roadway as the ground vehicle 110 operates in the driving environment that will be apparent to those skilled in the relevant art(s) without departing from the spirit and scope of the disclosure. The energy consumption cruise controller 320 may then incorporate the driving parameters provided by the 3D maps 315 in real-time to adjust the operation of the ground vehicle 110 in real-time based on the geometry and/or terrain of the segment of the roadway as identified by the driving parameters provided by the 3D maps 315.

As discussed in detail above, the energy consumption cruise controller 320 may incorporate the driving parameters associated with the geometry and/or terrain of the segment of the roadway to automatically adjust the operation of the ground vehicle 110 based on the geometry and/or terrain of the segment of the roadway. The geometry and/or terrain of the segment of the roadway as determined from the 3D maps 315 by the energy consumption cruise controller 320 may have a significant impact as to how the energy consumption cruise controller 320 adjusts the operation of the ground vehicle 110 to accommodate for the geometry and/or terrain of the segment of the roadway. In doing so, the energy consumption cruise controller 320 may determine the necessary driving parameters associated with the geometry and/or terrain of the segment of the roadway as determined from the 3D maps 315 to adjust the operation of the ground vehicle 110 as the geometry and/or terrain of the segment of the roadway changes in real-time. The 3D maps 315 may provide any type of driving parameter to the energy consumption cruise controller 320 that may enable the energy consumption cruise controller 320 to automatically adjust the operation of the ground vehicle 110 to account for the impact of the driving parameters provided by the 3D maps 315 that will be apparent to those skilled in the relevant art(s) without departing from the spirit and scope of the disclosure.

The energy consumption cruise controller 320 may also monitor numerous driving parameters associated with the CAN bus 380 of the ground vehicle 110. The CAN bus 380 may be receiving numerous signals triggered by numerous components and/or sensors associated with the ground vehicle 110 as the ground vehicle maneuvers along the segment of the roadway. The energy consumption cruise controller 320 may monitor the numerous driving parameters associated with the CAN bus 380 and then automatically adjust the operation of the ground vehicle 110 based on the numerous driving parameters associated with the CAN bus 380.

The energy consumption cruise controller 320 may automatically adjust the operation of the ground vehicle 110 as the ground vehicle attempts to pass another ground vehicle when maneuvering along the segment of the roadway. Conventional cruise control systems require that the driver override the set speed in order to adequately maneuver into the contingent lane and then adequately accelerate to pass the other ground vehicle and then adequately maneuver back into the lane after passing the other ground vehicle. However, the energy consumption cruise controller 320 may identify the driving parameters that are indicating that the driver is requesting to pass the ground vehicle and in doing so may automatically adjust the operation of the ground vehicle 110 to adequately pass the other vehicle without requiring the driver to intervene and override the energy consumption cruise controller 320.

As the ground vehicle 110 approaches the other ground vehicle from the rear while in the same lane as the other ground vehicle, the road looking camera 340 and the radar 350 may detect the other ground vehicle as the ground vehicle 110 approaches the other ground vehicle. The driver may then initiate lateral movement via the steering wheel to transition the ground vehicle 110 to the contingent lane in order to pass the ground vehicle. At that point, the YAW of the lateral movement triggered by the driver initiating the lateral movement via the steering wheel to move the ground vehicle 110 into the contingent lane may be detected by the IMU 360.

The energy consumption cruise controller 320 may then recognize from the driving parameter that the other ground vehicle is initially captured by the road looking camera 340 and the radar 350 as being in front of the ground vehicle and then the driving parameter that the other ground vehicle is no longer captured by the road looking camera 340 and the radar 350 due to the lane change coupled with the driving parameter of the YAW as detected by the IMU 360 indicating a lane change that the driver is actually attempting to pass the other ground vehicle. Based on that recognition, the energy consumption cruise controller 320 may then automatically adjust the acceleration and increase the set speed of the ground vehicle 110 to pass the other ground vehicle but doing so within the operation threshold for the segment of the roadway. In doing so, the energy consumption cruise controller 320 may automatically adjust the acceleration and increase the set speed of the ground vehicle 110 to pass the other ground vehicle while maintaining the operating speed within the longitudinal speed threshold for the segment of the roadway while decreasing the overall energy consumption of the ground vehicle for the segment of the roadway.

The driver of the ground vehicle 110 may then laterally transition the ground vehicle back to the initial lane via the steering wheel after adequately passing the other ground vehicle. The IMU 360 may then detect the YAW of the ground vehicle 110 in the lateral transition to the initial lane. The sinusoidal reaction of the YAW as the ground vehicle 110 transitioned from the initial lane to the contingent lane to pass the other ground vehicle and then the transition back into the initial lane after completing the pass of the other vehicle may be recognized by the energy consumption cruise controller 320 as the driver attempting to pass the other ground vehicle regardless as to operating speed in which the ground vehicle 110 operates to complete the pass of the other ground vehicle. The energy consumption cruse controller 110 may then be based on the sinusoidal reaction of the YAW as detected by the IMU 360 recognize that the driver is attempting to complete the pass of the other ground vehicle and transition back into the initial lane. The energy consumption cruise controller 320 may then automatically adjust the operation of the ground vehicle 110 to accommodate the maneuvering along the segment of the roadway after completion of the pass of the other vehicle.

The automated cruise control system configuration 300 as shown in FIG. 3 also includes a ground vehicle control detector 335 that detects a brake pedal 345 of the ground vehicle 110, an accelerator pedal 355 of the ground vehicle 110, automatic cruise control (ACC) switches 365 of the ground vehicle 110, and a steering angle sensor 375 of the ground vehicle 110. The ground vehicle control detector 335 may detect driving parameters associated with the control of the ground vehicle 110 as the ground vehicle 110 operates. The energy consumption cruise controller 320 may then incorporate the driving parameters into the automatic adjustment of the ground vehicle 110 as the ground vehicle 110 operates. In doing so, the energy consumption cruise controller 320 may adjust the vehicle systems 390 of the ground vehicle 110.

The ground vehicle control detector 335 detects a plurality of ground vehicle control inputs, such as but not limited inputs generated from the brake pedal 345, accelerator pedal 355, ACC switches 365, steering angle sensor 375, the clutch, and so on, that are associated with an operation of the ground vehicle 110 as the ground vehicle 110 maneuvers along the segment of the roadway. The ground vehicle control inputs are generated from a longitudinal operation of the ground vehicle 110. The ground vehicle control inputs provide insight to the energy consumption cruise controller 320 as to the state of the control of the ground vehicle 110 in real-time as well as the intent of the driver with regard to operating the ground vehicle 110 in real-time. The energy consumption cruise controller 320 may then incorporate the ground vehicle control inputs into the automatic adjustment of the operation of the ground vehicle 110 to account for the current state of the control of the ground vehicle 110 as well as the intent of the driver with regard to operating the ground vehicle 110.

For example, the ground vehicle control inputs provide insight as to the current state of the control of the ground vehicle 110 as well as the intent of the driver such as but not limited to the deceleration and/or braking of the ground vehicle 110 based on the brake pedal 345, the acceleration and/or increase in operating speed of the ground vehicle 110 based on the accelerator pedal 355, the current status of the ACC based on the ACC switches 365 and/or any other type of ground vehicle control input that is indicative as to the current state of the operation of the ground vehicle 110 and/or the intent of the driver that will be apparent to those skilled in the relevant art(s) without departing from the spirit and scope of the disclosure.

The energy consumption cruise controller 320 may then automatically adjust the operation of the ground vehicle 110 as the ground vehicle 110 maneuvers along the segment of the roadway to maintain the operation of the ground vehicle 110 within the operation threshold based on the detected ground vehicle control inputs. Each of the ground vehicle control inputs detected by the ground vehicle control detector 335 may enable the energy consumption cruise controller 320 to automatically adjust the operation of the ground vehicle 110 to accommodate for the current state of the operation of the ground vehicle 110 as well as the driver intent in real-time.

The energy consumption cruise controller 320 may identify each ground vehicle control input as detected by the ground vehicle control detector 335 in real-time as the ground vehicle 110 maneuvers along the segment of the roadway. The energy consumption cruise controller 320 may determine a current state of the operation of the ground vehicle 110 and a driver intent from each ground vehicle control input as the ground vehicle 110 is operating in real-time. The current state of the operation of the ground vehicle 110 is indicative as to a current position of the ground vehicle 110 as the ground vehicle 110 is operating in real-time and the driver intent is an intent that the driver requests to operate the ground vehicle 110 in real-time. The energy consumption cruise controller 320 may then automatically adjust the operation of the ground vehicle 110 as the ground vehicle 110 maneuvers along the segment of the roadway to accommodate for the current state of the operation of the ground vehicle 110 and the driver intent of the ground vehicle 110 in real-time.

Rather than ignore the current state of the operation of the ground vehicle 110 as well as the driver intent, energy consumption cruise controller 320 may identify each ground vehicle control input and the corresponding state of the ground vehicle 110 based on each ground vehicle control input and then automatically adjust the operation of the ground vehicle 110 based on the current state of the ground vehicle 110 and the driver intent. For example, the vehicle systems 390 may include but are not limited to the engine controller, brakes, steering, throttle, and/or any other type of system of the ground vehicle 110 that trigger the ground vehicle 110 to operate.

For example, the current status of the brake pedal 345 in real-time as the ground vehicle 110 maneuvers along the segment of the segment of the roadway may indicate to the energy consumption cruise controller 320 as to whether the ground vehicle 110 is currently braking and thereby decelerating. The energy consumption cruise controller 320 may determine that the ground vehicle 110 is not currently in the braking status when there is no pressure applied to the brake pedal 345. In doing so, the energy consumption cruise controller 320 may automatically adjust the operation of the ground vehicle 110 as the ground vehicle maneuvers along the segment of the roadway based on the assumption that the ground vehicle 110 is not currently braking. The energy consumption cruise controller 320 may freely increase the operating speed of the ground vehicle 110 when appropriate without any concern that the ground vehicle is currently braking. Further, the energy consumption cruise controller 320 may further emphasize a decrease in the in the operating speed of the ground vehicle 110 knowing that the ground vehicle 110 is not currently braking when decreasing the operating speed of the ground vehicle 110 when appropriate.

Further, the energy consumption cruise controller 320 may determine that the ground vehicle 110 is currently in the braking status when there is pressure applied to the brake pedal 345. In doing so, the energy consumption cruise controller 320 may automatically adjust the operation of the ground vehicle 110 as the ground vehicle 110 maneuvers along the segment of the roadway based on the assumption that the ground vehicle 110 is currently braking. The energy consumption cruise controller 320 may freely decrease the operating speed of the ground vehicle 110 when appropriate without any concern that the ground vehicle 110 is currently being accelerated via the accelerator pedal 355. Further, the energy consumption cruise controller 320 may further emphasize an increase in the operating speed of the ground vehicle 110 knowing that the ground vehicle 110 is currently breaking when increasing the operating speed of the ground vehicle 110 when appropriate.

However, the energy consumption cruise controller 320 may be overridden by the intent of the driver with regard to the driver requesting a decrease in the operating speed based on the driver applying pressure to the brake pedal 345. The energy consumption cruise controller 320 may determine that the operating speed is to be increased and/or maintained in order to decrease the overall energy consumption of the ground vehicle 110 as the ground vehicle 110 maneuvers along the segment of the roadway. For example, the energy consumption cruise controller 320 may automatically increase the ground vehicle 110 as the ground vehicle 110 declines from the top grade 230b of the segment of the roadway to decrease the overall energy consumption of the ground vehicle 110. However, the driver may not feel comfortable operating the vehicle at the increased speed as automatically adjusted by the energy consumption cruise controller 320. The driver may further apply pressure to the brake pedal 345 with the intent of decreasing the operating speed of the ground vehicle 110. In doing so, the driver may override the energy consumption cruise controller 320 and the energy consumption cruise controller 320 may automatically concede to the driver with regard to the intent of the driver to decrease the speed of the ground vehicle 110.

In another example, the current status of the accelerator pedal 355 in real-time as the ground vehicle 110 maneuvers along the segment of the roadway may indicate to the energy consumption cruise controller 320 as to whether the ground vehicle 110 is currently accelerating due to the driver applying pressure to the accelerator pedal 355. The energy consumption cruise controller 320 may determine that the ground vehicle is not currently in the accelerating status when there is no pressure applied to the accelerator pedal 355. In doing so, the energy consumption cruise controller 320 may automatically adjust the operation of the ground vehicle 110 as the ground vehicle 110 maneuvers along the segment of the roadway based on the assumption that the ground vehicle 110 is not currently accelerating. The energy consumption cruise controller 320 may freely decrease the operating speed of the ground vehicle 110 when appropriate without any concern that the ground vehicle 110 is currently accelerating. Further, energy consumption cruise controller 320 may further emphasize an increase in the operating speed of the ground vehicle 110 knowing that the ground vehicle 110 is not currently accelerating when increasing the operating speed of the ground vehicle 110 when appropriate.

Further, the energy consumption cruise controller 320 may determine that the ground vehicle 110 is currently in the acceleration status when there is pressure applied to the accelerator pedal 355. In doing so, the energy consumption cruise controller 320 may automatically adjust the operation of the ground vehicle 110 as the ground vehicle 110 maneuvers along the segment of the roadway based on the assumption that the ground vehicle 110 is currently accelerating. The energy consumption cruise controller 320 may freely increase the operating speed of the ground vehicle 110 when appropriate without any concern that the ground vehicle 110 is currently braking via the brake pedal 345. Further, energy consumption cruise controller 320 may further emphasize a decrease in the operating speed of the ground vehicle 110 knowing that the ground vehicle 110 is currently accelerating when decreasing the operating speed of the ground vehicle 110 when appropriate.

However, the energy consumption cruise controller 320 may be overridden by the intent of the driver with regard to the driver requesting an increase in the operating speed based on the driver applying pressure to the accelerator pedal 355. The energy consumption cruise controller 320 may determine that the operating is to be decreased and/or maintained in order to decrease the overall energy consumption of the ground vehicle 110 as the ground vehicle 110 maneuvers along the segment of the roadway.

For example, the energy consumption cruise controller 320 may determine that the operating speed is to be decreased and/or maintained in order to decrease the overall energy consumption of the ground vehicle 110 as the ground vehicle maneuvers along the segment of the roadway. However, the driver may be attempting to accelerate quickly to speed across railroad tracks and is not interested in decreasing energy consumption but simply desires to move over the railroad tracks quickly. The driver may further apply pressure to the accelerator pedal 355 with the intent of increasing the operating speed of the ground vehicle 110. In doing so, the driver may override the energy consumption cruise controller 320 and the energy consumption cruise controller 320 may automatically concede to the driver with regard to the intent of the driver to increase the operating speed of the ground vehicle 110. The ground vehicle control detector 335 may detect and provide any type of ground vehicle control input to the energy consumption cruise controller 320 that may enable the energy consumption cruise controller 320 to automatically adjust the operation of the ground vehicle 110 to account for the impact of the ground vehicle control input detected by the ground vehicle control detector 335 that will be apparent to those skilled in the relevant art(s) without departing from the spirit and scope of the disclosure.

Figure 4:
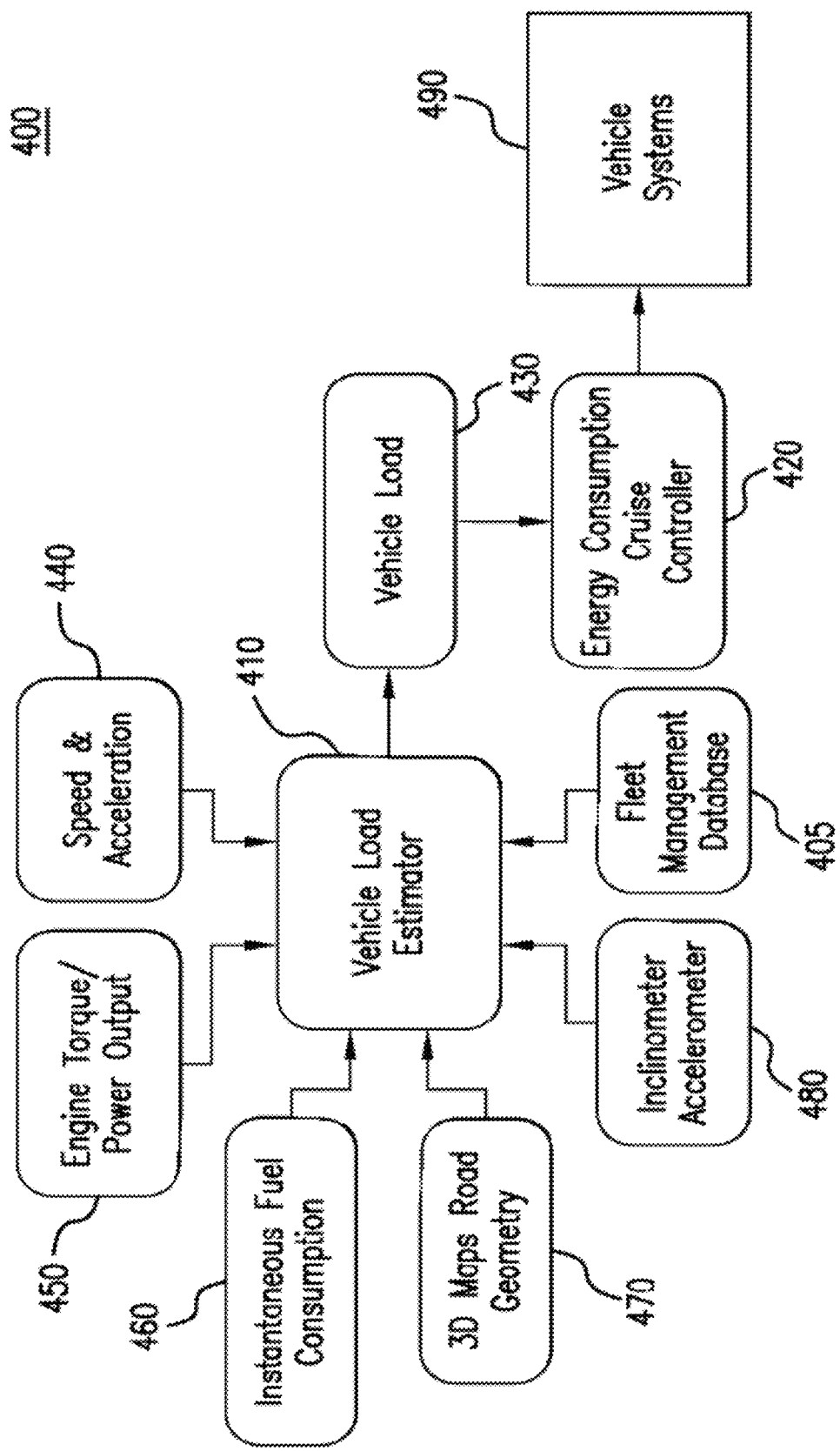
FIG. 4 shows an automated cruise control system that automatically decreases the overall energy consumption of the ground vehicle as the ground vehicle operates on a roadway based on the vehicle load of the ground vehicle, in accordance with aspects of the present technology.

FIG. 4 illustrates a block diagram of an automated cruise control system that automatically decreases the overall energy consumption of the ground vehicle as the ground vehicle operates on a roadway based on the vehicle load of the ground vehicle. An automated cruise control system 400 includes a vehicle load estimator 410 that determines an estimated load 430 of the ground vehicle 110 in real-time based on a plurality of vehicle load parameters. The vehicle load parameters include but are not limited to speed/acceleration 440 of the ground vehicle 110, engine torque/output power 450 of the ground vehicle 110, instantaneous energy consumption 460 of the ground vehicle 110, 3D maps road geometry 470 of the segment of the roadway, inclinometer/accelerometer 480, and a fleet management database 405. The vehicle load estimator 410 detects the vehicle load parameters as the ground vehicle 110 operates. The energy consumption cruise controller 420 may then incorporate the estimated vehicle load 430 into the automatic adjustment of the ground vehicle 110 as the ground vehicle 110 operates. In doing so, the energy consumption cruise controller 420 may adjust the vehicle systems 390 of the ground vehicle 110. The automated cruise control configuration 400 shares many similar features with the automated cruise control configuration 100 and the automated cruise control configuration 300; therefore, only the differences between the automated cruise control configuration 400 and the automated cruise control configuration 100 and the automated cruise control configuration 300 are to be discussed in further detail.

The vehicle load estimator 410 detects a plurality of vehicle load parameters that is associated with a vehicle load 430 of the ground vehicle 110 as the ground vehicle 110 maneuvers along the segment of the roadway. The vehicle load parameters are generated from the longitudinal operation of the ground vehicle 110 as the ground vehicle 110 reacts to the vehicle load 430 as the ground vehicle 110 maneuvers along the segment of the roadway and from a 3D geometry 470 of the segment of the roadway. The vehicle load estimator 410 then determines an estimated load 430 of the ground vehicle 110 in real-time as the ground vehicle 110 maneuvers along the segment of the roadway based on the vehicle load parameters detected in real-time. The estimated load 430 impacts the operation of the ground vehicle 110 in real-time as the ground vehicle 110 maneuvers along the segment of the roadway. The estimated load 430 provides insight to the energy consumption cruise controller 420 as to the vehicle load 430 of the ground vehicle 110 in real-time such that the energy consumption cruise controller 420 may then incorporate the driving parameters into the automatic adjustment of the operation of the ground vehicle 110 to account for the current vehicle load 430 of the ground vehicle 110 as the ground vehicle 110 maneuvers along the segment of the roadway.

The energy consumption cruise controller 420 may then automatically adjust the operation of the ground vehicle 110 as the ground vehicle 110 maneuvers along the segment of the roadway to maintain the operation of the ground vehicle 110 within the operation threshold based on the estimated load 430 of the ground vehicle 110 determined in real-time. The estimated load 430 of the ground vehicle 110 impacts the amount of overall energy consumption of the ground vehicle 110 as the ground vehicle 110 operates along the segment of the roadway in real-time.

Rather than simply having the ground vehicle 110 operate at the set speed, the vehicle load estimator 410 may determine the estimated load 430 of the ground vehicle 110 in real-time. The energy consumption cruise controller 420 may then determine the impact of the estimated load 430 of the ground vehicle 110 to the operation of the ground vehicle 110 relative to the segment of the roadway that the ground vehicle 110 is currently maneuvering. The energy consumption cruise controller 420 may then automatically adjust the operation of the ground vehicle 110 based on the estimated load 430 of the ground vehicle 110 relative to the 3D geometry 470 of the segment of the roadway that the ground vehicle 110 is currently maneuvering in real-time.

Each of the vehicle load parameters detected by the vehicle load estimator 410 may provide insight as to the current estimated load 430 of the ground vehicle 110. The estimated load 430 of the ground vehicle 110 may significantly impact how the energy consumption cruise controller 420 determines how to automatically adjust the ground vehicle 110 to maneuver along the segment of the roadway. For example, the acceleration and/or deceleration of the ground vehicle 110 relative to the 3D geometry 470 of the segment of the roadway may be significantly impacted by the vehicle load 430 of the ground vehicle 110 as the ground vehicle 110 engages the segment of the roadway. The energy consumption cruise controller 420 may automatically adjust a fully loaded semi-truck and trailer to accelerate and/or decelerate over longer periods of time due to the fully loaded semi-truck and trailer as compared to a similar semi-truck and trailer that is empty. The energy consumption cruise controller 420 may automatically adjust the empty semi-truck and trailer to accelerate and/or decelerate over shorter periods of time due to the significantly decreased load as compared to the fully loaded semi-truck and trailer.

In another example, how the energy consumption cruise controller 420 automatically adjusts the operation of the ground vehicle 110 relative to segments of the roadway with more extreme 3D geometry 470, such as the curvature 280b, may be significantly impacted by the vehicle load 430 of the ground vehicle 110 as the ground vehicle 110 engages the segment of the roadway with more extreme 3D geometry 470. The energy consumption cruise controller 420 may automatically adjust a fully loaded semi-truck and trailer to decelerate further and operate at the lower limit 255b of the longitudinal speed threshold when maneuvering through the curvature 280b as compared to a similar semi-truck and trailer that is empty. The energy consumption cruise controller 420 may automatically adjust the empty semi-truck and trailer to decelerate at a faster rate while operate at a higher operating speed when maneuvering through the curvature 280b due to the significantly decreased load as compared to the fully loaded semi-truck and trailer.

The vehicle load estimator 410 detects a speed/acceleration vehicle load parameter 440 associated with the vehicle load 430 of the ground vehicle 110 in real-time as the ground vehicle 110 maneuvers along the segment of the roadway. The speed/acceleration vehicle load parameter 440 is indicative as to the vehicle load 430 of the ground vehicle 110 in real-time as the speed/acceleration vehicle load parameter 440 varies in real-time as the ground vehicle 110 maneuvers along the segment of the roadway in real-time. The vehicle load estimator 40 determines the estimated load of the ground vehicle 110 in real-time as the ground vehicle 110 maneuvers along the segment of the roadway based on the speed/acceleration vehicle load parameter 440 detected in real-time. An increased speed/acceleration vehicle load parameter 440 corresponds to an increased vehicle load of the ground vehicle 110.

The vehicle load estimator 410 may incorporate the speed/acceleration vehicle load parameter 440 into the determination of the vehicle load 430 in real-time. The speed/acceleration 440 of the ground vehicle 110 in real-time is indicative to the vehicle load 430 of the ground vehicle 110. An increased speed/acceleration 440 of the ground vehicle 110 as the ground vehicle 110 is maneuvering along the segment of the roadway in real-time may be indicative that an increased vehicle load 430 is positioned on the ground vehicle 110 relative to the 3D geometry 470 of the segment of roadway. For example, as the fully loaded semi-truck and trailer is coming down from the top grade 230b to the flat grade 230c of the 3D geometry 470 of the segment of the roadway, the fully loaded semi-truck and trailer may have a significantly increased speed/acceleration 440 due to the fully loaded semi-truck and trailer as opposed to an empty semi-truck and trailer.

The energy consumption cruise controller 420 may then automatically adjust the operation of the ground vehicle 110 in real-time as the ground vehicle 110 maneuvers along the segment of the roadway to accommodate for the speed/acceleration vehicle load parameter 440 as the speed/acceleration vehicle load parameter 440 varies in real-time thereby impacting the vehicle load 430 of the ground vehicle 110 in real-time to maintain the operation of the ground vehicle 110 within the operation threshold of the segment of the roadway.

The vehicle load estimator 410 may incorporate the engine torque/power output vehicle load parameter 450 of the ground vehicle 110 into the determination of the vehicle load 430 in real-time. The engine torque/power output 450 is indicative to the vehicle load 430 of the ground vehicle 110. An increased engine torque/power output 450 of the ground vehicle as the ground vehicle 110 is maneuvering along the segment of the roadway in real-time may be indicative that an increased vehicle load 430 is positioned on the ground vehicle 110 relative to the 3D geometry 470 of the segment of the roadway. For example, as the fully loaded semi-truck and trailer is climbing from the flat grade 230a to the top grade 230b of the 3D geometry 470 of the segment of the roadway, the fully loaded semi-truck and trailer may have a significantly increased engine torque/power output 450 due to the fully loaded semi-truck and trailer as opposed to an empty semi-truck and trailer.

The vehicle load estimator 410 may incorporate the instantaneous energy consumption vehicle load parameter 460 of the ground vehicle 110 into the determination of the vehicle load 430 in real-time. An increased instantaneous energy consumption 460 of the ground vehicle 110 as the ground vehicle 110 is maneuvering along the segment of the roadway in real-time may be indicative that an increased vehicle load 430 is positioned on the ground vehicle 110 relative to the 3D geometry 470 of the segment of the roadway. For example, as the fully loaded semi-truck and trailer is climbing from the flat grade 230a to the top grade 230b of the 3D geometry 470 of the segment of the roadway, the fully loaded semi-truck and trailer may have a significantly increased instantaneous energy consumption 460 due to the fully loaded semi-truck and trailer as opposed to an empty semi-truck and trailer.

The vehicle load estimator 410 may also incorporate the 3D maps of the roadway geometry vehicle load parameter 470 into the determination of the vehicle load 430 in real-time. As discussed in detail above, the energy consumption cruise controller 420 may automatically adjust the operation of the ground vehicle 110 based on the 3D geometry 470 of the segment of the roadway. The vehicle load 430 of the ground vehicle 110 may significantly impact how the energy consumption cruise controller 420 automatically adjusts the operation of the ground vehicle 110 relative to the 3D geometry 470 of the segment of the roadway. As the energy consumption cruise controller 420 may adjust the operation of the fully loaded semi-truck and trailer significantly different than the empty semi-truck and trailer especially when maneuvering throughout more segments of the roadway with more extreme 3D geometries 470.

However, the 3D geometry 470 of the segment of the roadway may also impact the vehicle load 430 in real-time. As the ground vehicle 110 maneuvers along different segments of the roadway the differences in 3D geometry 470 of the different segments may impact the vehicle load 430 in real-time differently. For example, the fully loaded semi-truck and trailer that is transitioning down from the top grade 230*b* to the flat grade 230*c* may significantly increase the speed/acceleration 440, the engine torque/power output 450, instantaneous energy consumption 460 and so on based on the fully loaded semi-truck and trailer significantly impacting the fully loaded semi-truck and trailer as the fully loaded semi-truck and trailer transitions down from the top grade 230*b*. In doing so, the vehicle load estimator 410 may determine an increased vehicle load 430 for the segment of the roadway with the 3D geometry 470 of the change in grade.

However, the same fully loaded semi-truck and trailer that is maneuvering along a significantly long segment of the roadway with a flat grade and no curvatures may have a decrease in the speed/acceleration 440, the engine torque/power output 450, instantaneous energy consumption 460 and so on based on the fully loaded semi-truck and trailer having a significantly less impact as the fully loaded semi-truck and trailer maneuvers along the flat grade with no curvatures. In doing so, the vehicle load estimator 410 may determine a decreased vehicle load 430 for the segment of the roadway with the 3D geometry 470 of the limited change in grade and no curvature compared to the 3D geometry 470 of the change in grade.

Thus, the vehicle load estimator 410 may determine the vehicle load 430 of the ground vehicle 110 based on the vehicle load parameters in real-time and may do so relative to the 3D geometry 470 of the segment of the roadway that the ground vehicle is maneuvering in real-time. In doing so, the energy consumption cruise controller 420 may automatically adjust the operation of the ground vehicle 110 in real-time based on the vehicle load 430 of the ground vehicle 110 in real-time. The vehicle load estimator 410 may detect any type of vehicle load parameter and incorporate any type of vehicle load parameter into the determination of the vehicle load 430 in real-time that may enable the energy consumption cruise controller 320 to automatically adjust the operation of the ground vehicle 110 to account for the vehicle load 430 of the ground vehicle that will be apparent to those skilled in the relevant art(s) without departing from the spirit and scope of the disclosure.

The vehicle load estimator 410 may be a device that is capable of electronically communicating with other devices. Examples of the vehicle load estimator 410 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Figure 5:
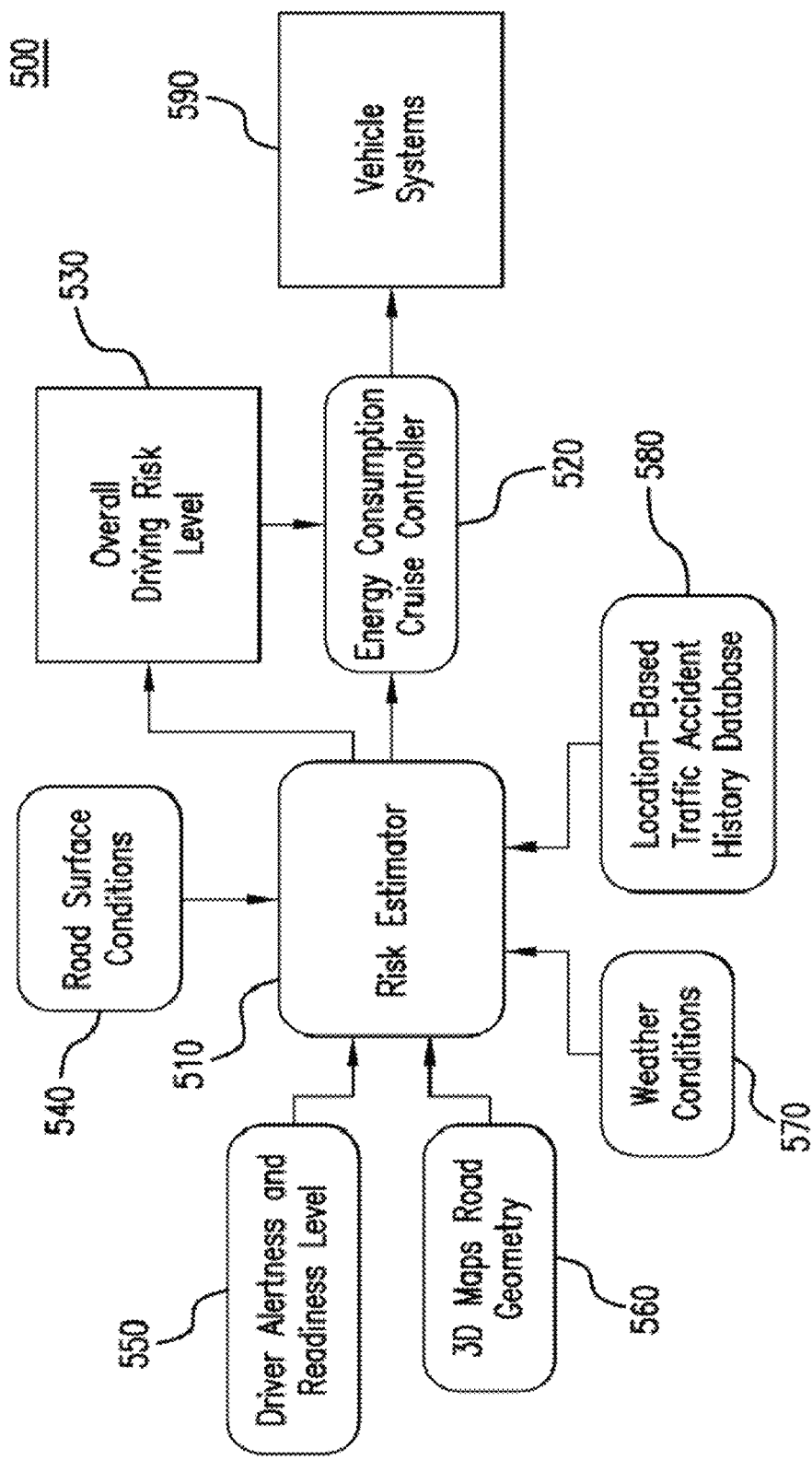
FIG. 5 shows an automated cruise control system that automatically decreases the overall energy consumption of the ground vehicle as the ground vehicle operates on a roadway based on an overall driving risk level of the ground vehicle, in accordance with aspects of the present technology.

FIG. 5 illustrates a block diagram of an automated cruise control system that automatically decreases the overall energy consumption of the ground vehicle as the ground vehicle operates on a roadway based on an overall driving risk level of the ground vehicle 110. An automated cruise control configuration 500 includes a risk estimator 510 that determines an overall driving risk level 530 of the ground vehicle 110 in real-time based on a plurality of driving risk conditions. The driving risk conditions include but are not limited to road surface conditions 540, driver alertness and readiness level 550, 3D maps road geometry 560, weather conditions 570, location-based traffic accident history database 580 and so on. The risk estimator 510 detects the driving risk conditions as the ground vehicle 110 operates throughout the driving environment of the segment of the roadway. In doing so, the energy consumption cruise controller 520 may adjust the vehicle systems 390 of the ground vehicle 110. The automated cruise control configuration 500 shares may similar features with the automated cruise control configuration 100, the automated cruise control configuration 300, and the automated cruise control configuration 400; therefore, only the differences between the automated cruise control configuration 500 and the automated cruise control configuration 100, the automated cruise control configuration 200, and the automated cruise control configuration 300 are to be discussed in further detail.

The risk estimator 520 detects a plurality of driving risk conditions associated with the driving environment of the ground vehicle 110 in real-time as the ground vehicle 110 maneuvers along the segment of the roadway. The driving risk conditions are generated from the driving environment of the segment of the roadway that the ground vehicle 110 is operating in real-time and a driver status of a driver of the ground vehicle 110 that is indicative of an engagement of the driver in operating the ground vehicle in real-time. The risk estimator 510 then determines an overall driving risk level 530 for the ground vehicle 110 as the ground vehicle 110 maneuvers along the segment of the roadway based on the driving risk conditions detected in real-time. The overall driving risk level 530 impacts the operation of the ground vehicle 110 in real-time as the ground vehicle 110 maneuvers along the segment of the roadway. The overall driving risk level 530 provides insight to the energy consumption cruise controller 520 as to the overall risk driving level 530 of the ground vehicle 110 in real-time such that the energy consumption cruise controller 520 may then incorporate the driving risk conditions into the automatic adjustment of the ground vehicle 110 to account for the current overall risk driving level 530 of the ground vehicle 110 as the ground vehicle 110 maneuvers along the segment of the roadway.

The energy consumption cruise controller 530 may then automatically adjust the operation of the ground vehicle 110 as the ground vehicle 110 maneuvers along the segment of the roadway to maintain the operation of the ground vehicle within the operation threshold based on the overall driving risk level 530 of the ground vehicle 110 in real-time. The overall driving risk level 530 for the ground vehicle 110 impacts the amount of overall energy consumption of the ground vehicle 110 as the ground vehicle 110 operates along the segment of the roadway in real-time.

Rather than simply having the ground vehicle 110 operate at the set speed, the risk estimator 510 may determine the overall driving risk level 50 of the ground vehicle in real-time. The energy consumption cruise controller 520 may then determine the impact of the overall driving risk level 530 of the ground vehicle to the operation of the ground vehicle 110 relative to the segment of the roadway that the ground vehicle is currently maneuvering. The energy consumption cruise controller 520 may then automatically adjust the operation of the ground vehicle 110 based on the overall risk driving level 530 of the ground vehicle 110 relative to the driving risk conditions of the driving environment and the driver status of the driver impacting how the ground vehicle 110 is currently maneuvering along the segment of the roadway in real-time.

Each of the driving risk conditions detected by the risk estimator 510 may provide insight as to the overall driving risk level 530 of the ground vehicle 110. The overall driving risk level 530 of the ground vehicle 110 may significantly impact how the energy consumption cruise controller 520 determines how to automatically adjust the ground vehicle 110 to maneuver along the segment of the roadway. For example, the driver performance data for the driver may significantly impact how the energy consumption cruise controller 520 determines how to automatically adjust the ground vehicle 110 to maneuver along the segment of the roadway. The driver performance data may be the data acquired from the operation of the ground vehicle 110 by the driver. The driver performance data may be indicative as to the quality and/or habits of the driver as the driver operates the ground vehicle 110. The driver performance data may also include past traffic violations and/or accidents that the driver has engaged. The energy consumption cruise controller 520 may automatically adjust the operation of the ground vehicle 110 for a driver with poor performance driver data differently than the for a driver with positive performance driver data.

In another example, how the energy consumption cruise controller 420 automatically adjusts the operation of the ground vehicle 110 relative to the overall risk of the segments of the roadway with more extreme 3D geometry 570, such as a curvature 280b, as well as a fully loaded ground vehicle 110 may be significantly impacted as the ground vehicle 110 engages the segment of the roadway with more extreme 3D geometry 570 and a full load. The energy consumption cruise controller 520 may automatically adjust a fully loaded semi-truck and trailer that is engaging the curvature 280b differently than an empty semi-truck and trailer that is engaging a flat grade and no curvature segment of the roadway.

The risk estimator 540 may incorporate the road surface driving risk conditions 540 into the determination of the overall driving risk level 530 in real-time. As discussed above in detail, the road surface conditions 540 may be monitored and provided to the energy consumption cruise controller 520. The road surface conditions 540 of the ground vehicle 110 in real-time is indicative to the overall driving risk level 530 of the ground vehicle 110. An increased intensity in road surface conditions 540 as the ground vehicle 110 is maneuvering along the segment of the roadway in real-time may be indicative that an increased overall driving risk level 530 is associated with the ground vehicle 110 as the ground vehicle 110 maneuvers along the segment of the roadway. For example, as the fully loaded semi-truck and trailer is coming down from the top grade 230b to the flat grade 230c of the 3D geometry 570 of the segment of the roadway with icy road conditions, the fully loaded semi-truck and trailer travelling down the top grade 230b with icy road conditions may have a significantly increased overall driving risk level 530 due to the icy road conditions as opposed to dry road conditions.

The risk estimator 510 may incorporate the weather driving risk conditions 570 into the determination of the overall driving risk level 530 in real-time. As discussed above in detail, the weather conditions 570 may be monitored and provided to the energy consumption cruise controller 520. The weather conditions 570 of the ground vehicle 110 in real-time is indicative to the overall driving risk level 530 of the ground vehicle 110. An increased intensity in the weather conditions 570 as the ground vehicle 110 is maneuvering along the segment of the roadway in real-time may be indicative that an increased overall driving risk level 530 is associated with the ground vehicle 110 as the ground vehicle 110 maneuvers along the segment of the roadway. For example, as the fully loaded semi-truck and trailer is coming down from the top grade 230b to the flat grade 230c of the 3D geometry 570 of the segment of the roadway with snowy weather conditions, the fully loaded semi-truck and trailer travelling down the top grade 230b with icy road conditions may have a significantly increased overall driving risk level 530 due to the snowy weather conditions as opposed to dry weather conditions.

The risk estimator 510 may incorporate the location-based traffic accident driving risk condition 580 of the segment of the roadway that the ground vehicle 110 is maneuvering into the determination of the overall driving risk level 530 in real-time. An increased traffic condition 580 of the segment of the roadway that the ground vehicle 110 is maneuvering in real-time may be indicative that an increased overall driving risk level 530 is associated with the ground vehicle 110 as the ground vehicle 110 maneuvers along the segment of the roadway. For example, as the fully loaded semi-truck and trailer is coming down from the top grade 230b to the flat grade 230c of the 3D geometry 570 of the segment of the roadway with an increased traffic condition 580, the fully loaded semi-truck and trailer travelling down from the top grade 230b with the increased traffic condition 580 may have a significantly increased overall driving risk level 530 due to the increased traffic condition 580 as opposed to no traffic conditions.

The risk estimator 530 may also incorporate the 3D maps of the roadway geometry vehicle load parameter 570 into the determination of the overall driving risk level 530 in real-time. As discussed in detail above, the energy consumption cruise controller 520 may automatically adjust the operation of the ground vehicle 110 based on the 3D geometry 570 of the segment of the roadway. The overall driving risk 530 of the ground vehicle 110 may significantly impact how the energy consumption cruise controller 520 automatically adjusts the operation of the ground vehicle 110 relative to the 3D geometry 570 of the segment of the roadway. As the energy consumption cruise controller 520 may adjust the operation of the fully loaded semi-truck and trailer significantly different than the empty semi-truck and trailer especially when maneuvering throughout more segments of the roadway with more extreme 3D geometries 570.

The risk estimator 530 may also incorporate the driver alertness and readiness level driving risk condition 550 for the driver as the driver maneuvers the ground vehicle 110 along the segment of the roadway into the determination of the overall driving risk level 530 in real-time. The driver monitoring camera 385 may capture the head and the body of the driver in real-time as the driver maneuvers the ground vehicle 110 along the segment of the roadway. The energy consumption cruise controller 520 may then identify the driver from the image captured by the driver monitoring camera 385 of the driver. As the driver continues to maneuver the ground vehicle 110 along the segment of the roadway, the driver monitoring camera 385 may continuously capture driver characteristics of the driver in real-time. The driver characteristics may be indicative as to an alertness and/or readiness level of the driver with regard to the driver adequately maneuvering the ground vehicle 110 along the segment.

For example, the driver characteristics may indicate that the driver is operating an alert level such that the driver is alert and cognizant of the driving environment of the segment of the roadway as well as the ground vehicle 110 itself that the driver is maneuvering along the segment of the roadway. However, the driver characteristics may also indicate that the driver is operating at a non-readiness level such that the driver is failing to be alert and/or cognizant of the driving environment of the segment of the roadway.

For example, the driver characteristics may indicate that the driver is failing to be alert such that the driver characteristics may indicate that the driver is drowsy and/or falling asleep while operating the ground vehicle 110. In another example, the driver characteristics may indicate that the driver is distracted such that driver characteristics is operating his smartphone while operating the ground vehicle 110. The driving characteristics that may be monitored by the driver monitoring camera 385 and evaluated by the energy consumption cruise controller 520 may include but are not limited to the distraction of the driver, drowsiness, of the driver, eye gaze of the driver, emotion of the driver, head-tilt of the driver, the face of the driver, gaze angle of the driver, blink rates of the driver, hands position of the driver, body position of the driver, head position of the driver, temperature of the driver, heartrate of the driver, respiration rates of the driver, and/or any other driver characteristic that may be indicative as to the driver alertness and readiness level driving risk condition 550 that will be apparent to those skilled in the relevant art(s) without departing from the spirit and scope of the disclosure.

The risk estimator 510 may then determine the alertness and readiness level driving risk condition 550 based on the driver characteristics detected by the driver monitoring camera 385. For example, the driver monitoring camera 385 may continuously monitor the head position of the driver as the driver operates the ground vehicle 110. The risk estimator 510 may be monitoring head position of the driver to determine if the head position of the driver deviates from a head tilt angle threshold. The head tilt angle threshold may be the threshold for the head tilt angle of the head of the driver that if deviates greater than the head tilt angle threshold from the head tilt angle of the head of the driver that is associated with the head of the driver being at a head tilt angle of 0 degrees for a period of time, then the risk estimator 510 may determine that the driver is falling asleep and may alert the driver. For example, the risk estimator 510 may monitor the head tilt angle of the driver to determine if the head tilt angle of the head of the driver deviates greater than 25 degrees for longer than 5 seconds. The risk estimator 510 may then determine that the driver is falling asleep when the head tilt angle of the driver deviates greater than 25 degrees for longer than 5 seconds and may alert the driver.

The risk estimator 510 may incorporate the driver alertness and readiness level driving risk condition 550 of the segment of the roadway that the ground vehicle 110 is maneuvering into the determination of the overall driving risk level 530 in real-time. A driver alertness and readiness driving risk condition 550 that is indicative that the driver is at a decreased level of alertness and/or readiness as the driver is maneuvering the ground vehicle 110 along the segment of the roadway may be indicative of an increased overall driving risk level 530 is associated with the ground vehicle 110 as the driver maneuvers the ground vehicle 110 along the segment of the roadway. For example, the driver that has the driver characteristic of an increased blink rate above a blink rate threshold is indicative that the driver is fighting drowsiness and that the alertness level of the driver may be decreasing. Such a driver may have a significantly increased overall driving risk level 530 due to the significant decrease in alertness level due to the increased blink rate of the driver as opposed to the driver who is alert and has a normal blink rate.

Thus, the risk estimator 510 may determine the overall driving risk level 530 of the ground vehicle 110 based on the driving risk conditions in real-time and may do so relative driving environment of the segment of the roadway as well as the driver status of the driver with regard to the driver engaging the operating of the ground vehicle in real-time. In doing so, the energy consumption controller 420 may automatically adjust the operation of the ground vehicle 110 in real-time based on the overall driving risk level 530 of the ground vehicle 110 in real-time. The risk estimator 510 may detect any type of driving risk condition and incorporate any type of driving risk condition into the determination of the overall driving risk level 530 in real-time that may enable the energy consumption cruise controller 520 to automatically adjust the operation of the ground vehicle 110 to account for the overall driving risk level 530 of the ground vehicle 110 that will be apparent to those skilled in the relevant art(s) without departing from the spirit and scope of the disclosure.

The risk estimator 510 may be a device that is capable of electronically communicating with other devices. Examples of the risk estimator 510 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Figure 6:
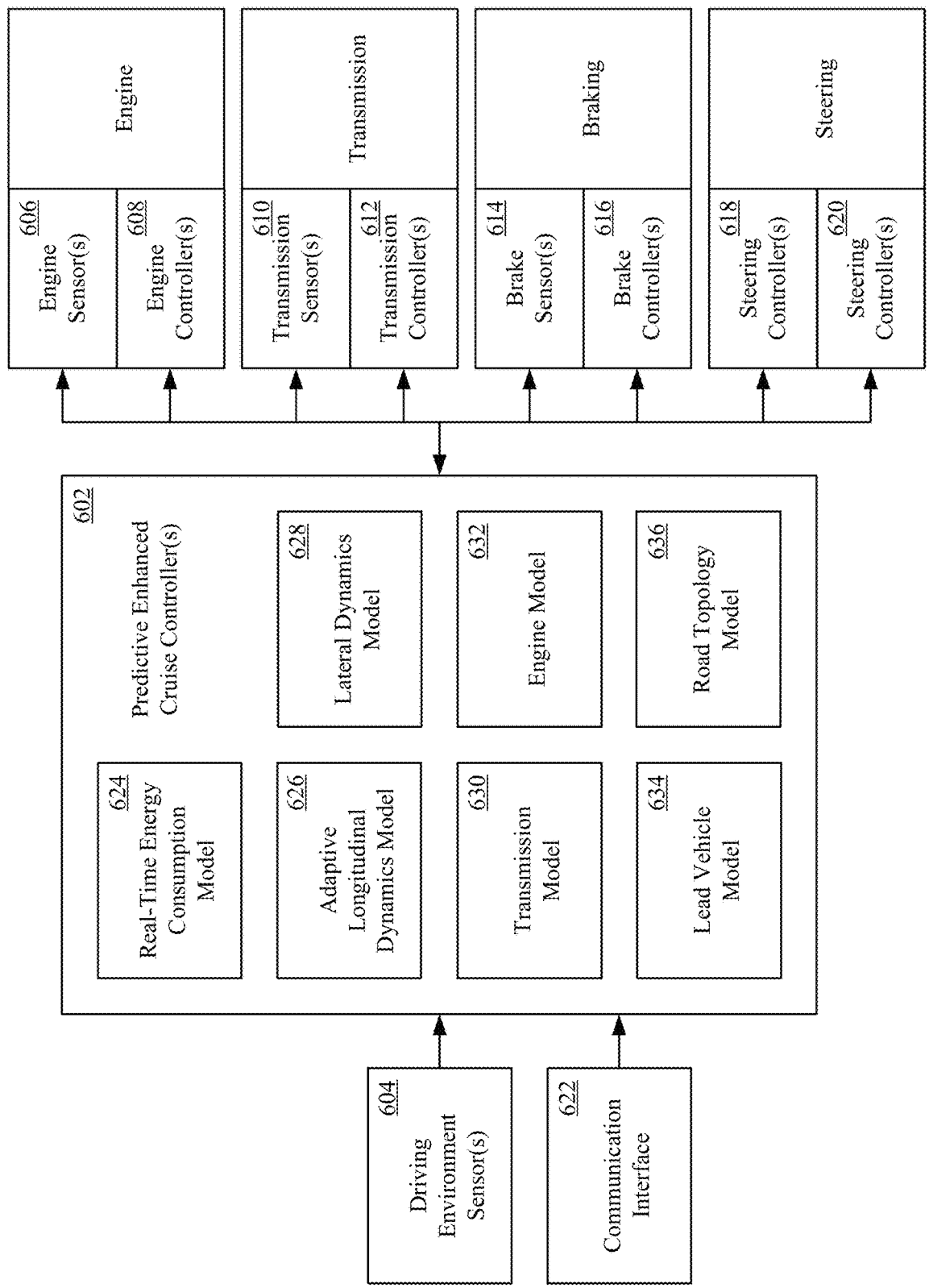
FIG. 6 shows a predictive enhanced cruise controller for use in a ground vehicle, in accordance with aspects of the present technology.

Referring now to FIG. 6, a predictive enhanced cruise controller for use in a ground vehicle, in accordance with aspects of the present technology, is shown. The predictive enhanced cruise controller can be configured to adjust the operation of the ground vehicle 110 based on a plurality of driving environment sensors that detect a plurality of driving parameters. The predictive enhanced cruise controller 602 can be communicatively coupled to one or more driving environment sensors 604, one or more engine sensors 606 and or one or more engine controllers 608. The predictive enhanced controller 602 can also be communicatively coupled to one or more transmission sensors 610, one or more transmission controllers 612, one or more brake sensors 614, one or more brake controllers 616, one or more steering sensors 618, one or more steering controllers 620, and or other similar sensors and controllers. The predictive enhanced cruise controller 602 can also be communicatively coupled to one or more external networks through one or more communication interfaces 622.

In one implementation, the one or more predictive enhanced cruise controllers 602 and one or more of the sensors and controllers can be integral to the ground vehicle 110. The one or more predictive enhanced cruise controllers 602 can be implemented in hardware, firmware, software or any combination thereof. In other implementation, the one or more predictive enhanced controllers 602 can be implemented in a distributed computing architecture. For example, some functions of the predictive enhanced cruise controller can be implemented as computing device-executable instructions (e.g., computer program) that are stored in computing device-readable media (e.g., computer memory) and executed by a computing device (e.g., processor) on the ground vehicle 110. One or more other functions can be implemented on one or more other computing devices external to the ground vehicle 110. The one or more other functions can for example be implement in the cloud, on a remote server, or the like.

The engine sensors 606 and engine controllers 608 can include, but not limited to, Engine Control Modules (ECM), Engine Control Units (ECU), throttle position sensors, fuel injector sensors, intake sensors, mass airflow sensors, oxygen sensors, exhaust sensors, engine tachometers, voltmeters, current meters, temperature sensors, fluid level sensors, and the like. The engine sensors 606 can for example provide ground vehicle operating parameters such as current fuel consumption, engine revolutions per minute (RPMs), and the like. The engine controllers 608 can for example control fuel injection parameters in response to throttle control inputs, and the like. The transmission sensors 610 and transmission controllers 612 can include, but not limited to, shift lever position sensors, gear selection sensors, clutch pedal position sensors, Transmission Control Units (TCU), tachometers, temperature sensors, fluid level sensors, hydraulic controllers, servos, and the like. The transmission sensors 610 can for example provide vehicle operating parameters such as transmission RPM, torque, current gear, and the like. The transmission controllers 612 can for example control clutch and shift control inputs and the like. The brake sensors 614 and brake controllers 616 can include, but not limited to, brake pedal position sensors, brake pedal force sensors, hydraulic pressure sensors, air pressure sensors, torque sensors, anti-lock brake system (ABS) controllers, and the like. The steering sensors 618 and steering controllers 620 can include, but not limited to, steering position sensors and the like. The driving environment sensors 604 can include, but not limited to, cameras, radar, inertial measurement units (IMU), global position systems (GPS), light detection and ranging (LIDAR), temperature sensors, dedicated short range communications (DSRC), and the like. The driving environment sensors 604 can for example provide driving environment parameters such as road surface condition, road width, lane markings, traffic control devices, traffic conditions, line of sight, visibility, lighting, current weather, location, and the like. The communication interface 622 can provide for downloading or streaming of two- or three-dimensional map data, current and future weather conditions, traffic conditions, and or the like. Some sensors and controllers can provide and or operate on the same, similar and or overlapping data, functions and the like. In addition, various data and or functions can be combined to increase confidence, increase accuracy, generate additional data, generate higher level functions, and or the like.

Figure 7:
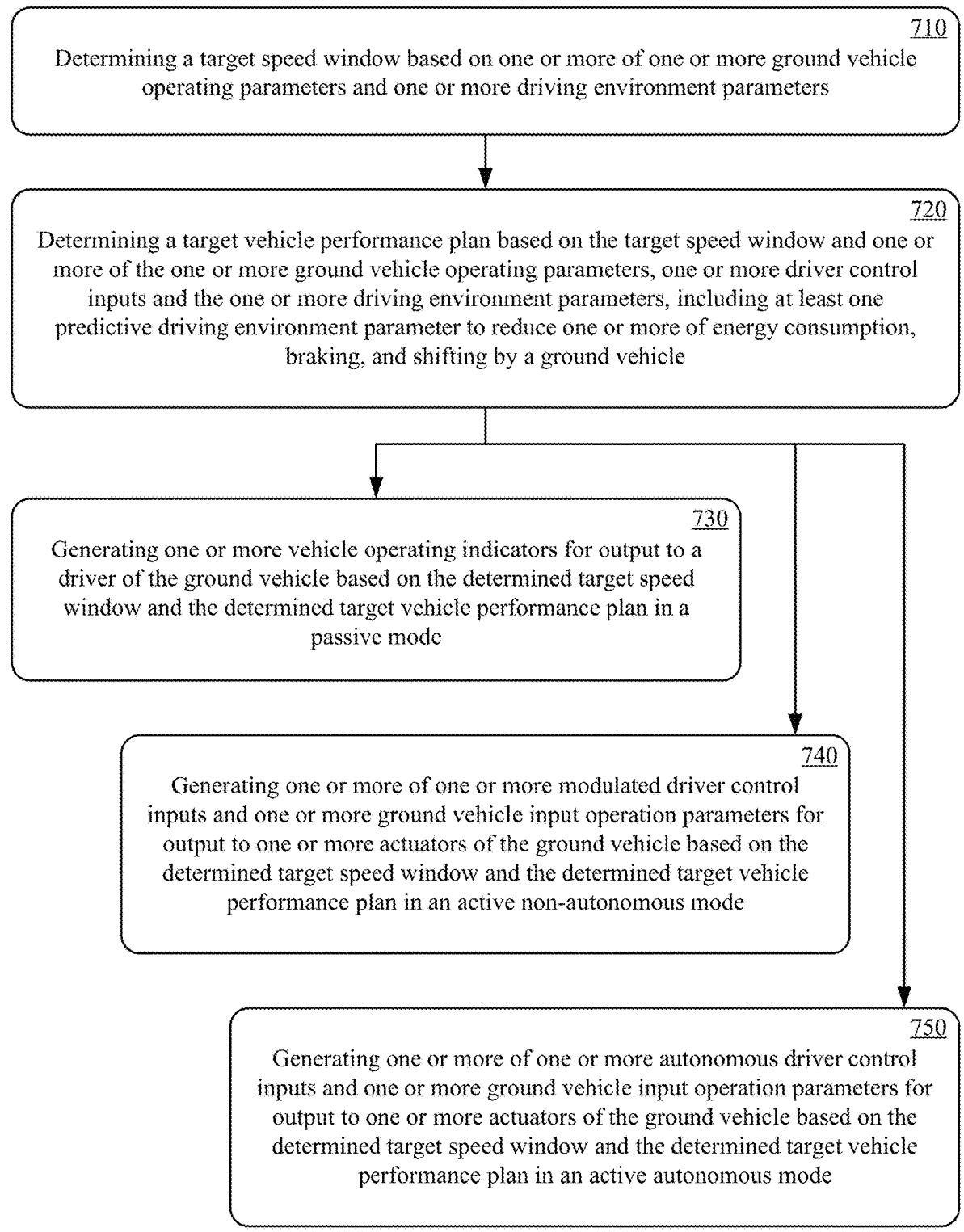
FIG. 7 shows a predictive enhanced cruise control method for use in a ground vehicle, in accordance with aspects of the present technology.

The predictive enhanced cruise controller 602 will be further explained with reference to FIG. 7. The predictive enhanced cruise controller 602 can be configured to determine an operation threshold such as a target speed window based on one or more of one or more ground vehicle operating parameters and one or more driving environment parameters, at 710. For example, posted speed limits (driving environment parameters) may specify maximum operating speeds on various segment of one or more roadways. The posted speed limits may also specify minimum operating speeds in some cases. The speed limits can, for example, be received from electronic map data sources, images of the roadway captured by cameras on the ground vehicle, or any other data that characterizes the roadway. Similarly, a minimum safe following distance determined from one or more forward looking cameras, LIDAR, radar or the like can be utilized to calculate an average speed for current traffic conditions. Similarly, weather conditions can be utilized by the predictive enhanced cruise controller 602 to calculate a safe speed for road conditions. A maximum speed can also be determined based on road curvature and safe lateral acceleration. An operator, such as the company operating the vehicle, may specify a maximum operating speed. The one or more different specified and or determined speeds can be combined to generate a target speed window.

For example, a posted speed limit, detected by a camera or determined from map data, may specify a maximum speed of 65 miles per hour (MPH) and a minimum speed of 45 MPH. In addition, an ambient outside temperature measured by a temperature sensor on the vehicle and current operation of the windshield wipers may indicate a freezing temperature and precipitation. In such case, the predictive enhanced cruise controller 602 may determine that the maximum safe speed for current road conditions should be limited to 55 MPH, and therefore determine a target speed window of between 45 and 55 MPH. In another example, a posted speed limit may specify a maximum speed of 55 MPH. However, stop and go traffic may be detected by forward looking cameras on the vehicle. The predictive enhanced cruise controller 602 may determine, based upon current minimum safe distance values, that the safe speed for current traffic conditions is between 0 and 25 MPH. Therefore, in the stop and go traffic conditions, the target speed window may be determined to be between 0 and 25 MPH. In yet another example, the posted speed limit for the current and next few segments of an interstate highway may be 55 MPH. However, topographical data for the next segment of roadway may indicate a curve in the road. The topographical data can, for example, be received from electronic map data sources, images of the roadway captured by cameras on the ground vehicle, or any other data that characterizes the roadway. In such case, the predictive enhanced cruise controller 602 may determine a safe speed for the curved segment of the road to be 45 MPH. In addition, based upon a scheduled delivery time and a predicted route, the predictive enhanced cruise controller 602 may determine that the minimum average speed to be 40 MPH. In such case the predictive enhanced cruise controller 602 may determine a target speed window for the segment including the curve to be between 40 and 45 MPH.

At 720, the predictive enhanced cruise controller 602 can further determine an adaptive target vehicle performance plan based on the target speed window and one or more of the one or more ground vehicle operating parameters, one or more driver control inputs and the one or more driving environment parameters. In one implementation, the adaptive target vehicle performance plan can be determined based upon the dynamic load on the ground vehicle, such as the load on the powertrain of the ground vehicle. The powertrain load can be determined from one or more ground vehicle operating parameters, driver control inputs and or driving environment parameters including, but not limited to, the ground speed, acceleration, engine torque, engine output power, transmission torque, transmission output power, gear ratio, current fuel consumption rate, roadway geometry, gross vehicle weight, cargo weight, rolling resistance of the vehicle, historical datasets, and the like. The historical datasets can include statistical data captured from different trips along the same or similar road segments, for the same or similar ground vehicles, during the same or similar traffic conditions, during the same or similar weather conditions, and or the like. The powertrain load along with one or more other ground vehicle operating parameters, driver control inputs and or driving environment parameters can be utilized to determine an adaptive target vehicle performance plan as the ground vehicle travels along a current roadway segment and or one or more upcoming roadway segments.

For example, the predictive enhanced cruise controller 602 may determine that the upcoming segment of roadway includes a short flat portion, a steep uphill grade and then continues along another flat grade, from three-dimensional map information. The predictive enhance cruise controller 602 may have also determined a target speed window of 55 to 65 MPH for the upcoming segment. The predictive enhanced cruise controller 602 may therefore generate an adaptive target vehicle performance plan that includes gradually increasing the ground speed of the vehicle from a current speed of 60 to 65 MPH as the vehicle proceeds through the initial flat portion of the segment. The gradual increase in speed along the short flat portion may incur a relatively small increase in fuel consumption, while allowing the vehicle to maintain the higher speed part way up the steep incline. The adaptive target vehicle performance plan may then provide for the vehicle to gradually slow from 65 MPH to 55 MPH as it continues to climb up the steep incline. In contrast, if the ground vehicle tried to maintain a constant speed up the incline, a significant amount of additional fuel would be consumed. Therefore, the adaptive target vehicle performance plan can provide for an overall reduction in fuel consumption by the ground vehicle while maintaining an average speed over the entire segment close to the center of the target speed window. In another example, predictive enhanced cruise controller 602 may determine that the powertrain is nearing an upper end of engine RPM versus fuel efficient curve for a given transmission gear and that a shift to a higher gear ratio should be executed soon. However, from LIDAR sensor data, the predictive enhanced cruise controller 602 may detect that traffic ahead is starting to slow. Therefore, the predictive enhanced cruise controller 602 may update the current adaptive target vehicle performance plan to hold off on the potential gear shift. The current ratio of relatively high engine RPM to torque can instead be utilized to maintain or even slightly slow the speed of the ground vehicle in response to the traffic ahead starting to slow. Avoiding the situation of shifting to a high gear and then shift back down a short period of time later, and vice versa. can reduce overall energy consumption over the course of a trip. Accordingly, by predicting the speed, acceleration, torque, power, braking and the like along an upcoming segment of the roadway, shifting can be reduced which can in turn reduce overall energy consumption. Similarly, predicted speed and gear selection along an upcoming segment of the roadway, can be utilized to reduce braking which can in turn reduce overall energy consumption.

The predictive enhanced cruise controller 602 can further determine the adaptive target vehicle performance plan based on one or more driving risk factors. The one or more driving risk factors can be determined from one or more of one or more of the plurality of ground vehicle operating parameters, driver control input, and or one or more driving environment parameters. The driving risk factors can for example be determined based on current and or future traffic conditions, roadway geometry and or topology, current and or future weather conditions, driver control inputs, driver alertness and readiness levels, location-based accident history data, and or the like. The driving risk factors along with one or more other ground vehicle operating parameters, driver control inputs and or driving environment parameters can be utilized to determine an adaptive target vehicle performance plan as the ground vehicle travels along one or more roadway segments. The driving risk factors may adjust the speed, shifting and or braking of the vehicle over the current and or future roadway segment. For example, when icy conditions are detected the adaptive target vehicle performance plan may provide for a further reduction of the speed of the vehicle around curves, and more gradual acceleration and braking. In another example, the following distance can be increased when the driver attentiveness is determined to be low from an in-cab camera.

The predictive enhanced cruise controller 602 can operate in one or more modes that can include a passive mode, an active non-autonomous mode, an active autonomous mode and or the like. In a passive mode, the predictive enhanced cruise controller 602 can generate one or more vehicle operating indicators for output to a driver of the ground vehicle based on the determined target speed window and the determined adaptive target vehicle performance plan, at 730. The target speed window and adaptive target vehicle performance plan can adjust vehicle operating indicators output to the driver to assist the driver in reducing overall energy consumption, reducing shifting, reducing braking, and or the like to increase performance. For example, audio, visual and or haptic clues can be utilized to indicate to the driver when he or she should shift a manual transmission. The predictive enhanced cruise controller 602 can also provide feedback on how the driver's manual performance compares to the predictive enhanced cruise control. The feedback can be used to train drivers, for logistics, and or the like.

In an active non-autonomous mode, the predictive enhanced cruise controller 602 can generate one or more of one or more modulated driver control inputs and one or more ground vehicle input operation parameters for output to one or more actuators of the ground vehicle based on the determined target speed window, the determined adaptive target vehicle performance plan and one or more driver control inputs, at 740. For example, the determined target speed window may be between 55 and 65 MPH, and the determined adaptive target vehicle performance plan may provide for the actual speed of the vehicle to decrease from 65 to 55 MPH as the vehicle climbs a steep grade in the upcoming segment of the roadway. As the driver operates the ground vehicle, the driver may depress the gas pedal further and further to try and maintain a constant speed of the vehicle as it proceeds up the hill. However, the increase in throttle may simply increase energy consumption without being able to maintain speed up the steep incline. In such case, the predictive enhanced cruise controller 602 can modify the throttle input determined from the gas pedal control input by the driver based on the determined target vehicle performance plan. As a result, the increasing throttle input by the driver can be modified to provide a decreasing throttle input to provide for the vehicle to slow from 65 to 55 MPH as the ground vehicle climbs the steep grade to decrease overall energy consumption.

In an active autonomous mode, the predictive enhanced cruise controller 202 can generate one or more of one or more autonomous driver control inputs and one or more ground vehicle input operation parameters for output to one or more actuators of the ground vehicle based on the determined target speed window and the determined adaptive target vehicle performance plan, at 750. For example, the predictive enhanced cruise controller 602 can control throttle inputs to the engine controller, synchronize engine and transmission speeds, and control shifting operations through the transmission controller. The predictive enhanced cruise controller 602 can also control braking and steering to autonomously control operation of the ground vehicle in accordance with the determined target speed window and adaptive target vehicle performance plan.

In addition, different driver control inputs and or ground vehicle input operation parameters can be generated as indicators, modulate inputs, or autonomous control inputs. For example, the predictive enhanced cruise controller 602 can generate one or more steering operation indicators for presentation as audio, visual and or haptic clues. However, the predictive enhanced cruise controller 602 can determine the smoothness of a road surface from a camera and generate an autonomous ground vehicle input operation parameter that controls the height of the ground vehicle. In such case, the suspension height of the ground vehicle can be automatically lowered to reduce airflow underneath the vehicle, thereby reducing the aerodynamic drag forces and increase energy efficiency when the roadway is smooth.

Referring again to FIG. 6, the one or more predictive enhanced cruise controllers 602 can include one or more models 624-636 for use in decreasing energy consumption by the ground vehicle. The models may be relatively simple to facilitate the design of optimization schemes. At the same time the models should include applicable information of the underlying process. The models should also facilitate the adoption of parameters in real-time to account for variations in real world conditions.

In ne implementation, the predictive enhanced cruise controller 602 can include a real-time energy consumption model 624. The real-time model can allow for the prediction of energy/unit time that is to be spent by the propulsion system to produce a certain amount of engine speed and torque in accordance with Equation 1:

$$\dot{e} = h(T_e, \omega_e)$$

$$\dot{e} = c_0 + c_1 T_e + c_2 \omega_e + c_3 T_e \omega_e + c_4 T_e^2 + c_5 \omega_e^2 + c_6 T_e^2 \omega_e^2 + \ldots + c_{3n-2} T_e^n + c_{3n-1} \omega_e^n + c_{3n} T_e^n \omega_e^n \quad (1)$$

In the case of an electric engine, this model may be used to predict the total amount of electrical energy required to drive the vehicle for a given set of vehicle and environment operating conditions. In case of internal combustion engine, it may be used to determine the total amount of chemical energy or directly the mass (kg) or fuel volume (liter). The model parameters may be continuously adopted online to account for variations due to real world operating conditions (for example, in an internal combustion engine, the variation could be because of ambient temperature, pressure, varying fuel quality, etc.). In another implementation, this real-time energy consumption model can be derived using neural networks based on offline training data.

The predictive enhanced cruise controller 602 can also include an adaptive vehicle longitudinal dynamic model 626. The longitudinal dynamics model of the ground vehicle can be derived using a force balance equation in accordance with Equation 2:

$$m\dot{v}_x = \qquad (2)$$
$$-\frac{1}{2}\rho C_d A(v_x - v_w)|v_x - v_w| + \frac{1}{r_w}(r_d r_g(\alpha)n(\alpha)T_e - r_d T_{trd} - T_b - I_w \dot{\omega}_w) -$$
$$mg(\mu_0 + \mu_1 v_x + \mu_x v_x^2)\cos\theta + mg\sin\theta$$

A simplified parametric model can be provided in accordance with Equation 3:

$$\dot{v}_x = -k_1 v_x^2 - k_2 v_x + k_3 r_g(\alpha)\eta(\alpha)T_e - k_4(T_b + k_5 T_{trd}) - k_6 \cos\theta + k_7 + g\sin\theta \quad (3)$$

The initial values of the coefficients of this parametric model can be derived based on offline data and further these coefficients may be adjusted online to account for ground vehicle variations (example, changing mass, etc.).

The predictive enhanced cruise controller 602 can also include a vehicle lateral dynamics model 628, a transmission model 630, an engine model 632, a lead vehicle model 634, a road topology model 636 and or the like. In a road topology model 636, data from maps can be used to determine useful properties of a roadway, such as road curvature, road gradients, safe and legal speed limits, and the like. Estimation of the future maximum speed that a ground vehicle can travel on a segment of a roadway can be utilized to optimize energy consumption and ensure safe operation by timely reduction of propulsion forces and or increasing retardation forces for example. The retardation forces can include transmission retarding, downshifting, engine retarding and or the like. One method of calculating the maximum safe speed is to parameterize the roadway. After having a parameterized representation of the roadway, curvature values can be calculated by analytical differentiation. The maximum speed of driving can then be calculated using the curvature information obtained from a map. A cubic parameterized curve results in a representation of roads which is twice differentiable and is suitable for curvature estimation. In such an approach, the preview horizon can be divided into a set of four or more consecutive points. For every four or more consecutive points the parameterized model can be obtained in real time from map data and the curvature can be calculated in accordance with Equations 4, 5 and 6:

$$x(s) = c_{11}s^3 + c_{12}s^2 + c_{13}s + c_{14} \quad (4)$$

$$y(s) = c_{21}s^3 + c_{22}s^2 + c_{23}s + c_{24} \quad (5)$$

$$k(s) = \frac{1}{r(s)} = \frac{x'(s)y''(s) - y'(s)x''(s)}{\left((x'(s))^2 + (y'(s))^2\right)^{2/3}} \quad (6)$$

where s=0 represent the first point and s=1 represent the last point. The curvature determined in accordance with Equations 4, 5 and 6 can be used to determine maximum travel speed. For a ground vehicle traveling along a curved path, a certain amount of centripetal acceleration is needed. The centripetal acceleration is orthogonal to the motion of the ground vehicle and towards a fixed point of the instantaneous center of curvature of the path. The magnitude of centripetal acceleration can be determined in accordance with Equation 7:

$$a_x = \frac{v_x^2}{r} = v_x^2 k \quad (7)$$

Because of the centripetal force, there will be a centrifugal force that is directed in the opposite direction. The centrifugal force causes a weight transfer in the ground vehicle in the direction of the centrifugal force. To prevent rollover, or in some cases to ensure comfort to the passengers, the centrifugal acceleration that is generated by the centrifugal forces should be within a certain limit, as indicated in Equations 8 and 9:

$$-a_{lim} < a_x < a_{lim} \quad (8)$$

$$v_x < \sqrt{\frac{|a_{lim}|}{k}} \quad (9)$$

The maximum allowed lateral acceleration can depend on several factors like the height of the center of gravity, the wheel base, track width, the suspension stiffness, driver comfort and the like, and can be estimated using a longitudinal and lateral dynamics model. Map data can also be used to calculate the upcoming road gradients. At each point the gradient can be calculated in accordance with Equation 10:

$$\sin\phi = \frac{z_2 - z_1}{\sqrt{(x_2 - x_1)^2 + (y_2 - y_1)^2 + (z_2 - z_1)^2}} \quad (10)$$

where $(x_1, y_1, z_1)$, $(x_2, y_2, z_2)$ are two consecutive points in the map. The future road gradient can be used to minimize the energy consumption by optimizing the propulsion forces, gear and retardation mechanisms.

The models can include observers and estimators, including a vehicle state estimator, a vehicle model parameter estimator, an energy consumption model parameter estimator, and the like. The predictive enhanced cruise controller 602 can work on the principle of minimizing energy consumption over a distance preview window or a time preview window by intelligently driving the control commands to optimal states for a given set of vehicle and environment operating conditions. To solve this energy minimization problem, the problem can be converted into either one centralized constrained mathematical optimization problem, or can be broken into multiple de-centralized mathematical optimization problems, to aid the feasibility of solution. In one example, the problem can be broken into two parts. In the first part, a short preview window optimization problem can be solved wherein the objectives of the controller can be stated as follows: minimize the consumption over the prediction window; ensure driver safety and comfort within the prediction window; maintain safe distance in the presence of traffic; maximize the distance travelled or reduce the travel time within the prediction. In the second part of this de-centralized approach example, there can be a long-term trip optimizer, whose requirements can be stated as follows: reduce the total fuel consumed over the total trip time; minimize the total trip time.

In one example, the constrained mathematical optimization problem can be formulated using a Generalized Predictive Control (GPC) methodology, which facilitates optimization of control actions over a receding time window, and considers the effects of external known disturbances, such as road inclination and speed limits and constraints on the state and control variable. A general GPC based controller can have a structure in accordance with Equations 11, 12 and 13:

$$\min_{u(0),\ldots,u(N)} l(x(N) + u(N)) + \sum_{k=0}^{N-1} f(x(k), u(k)) \quad 11)$$

such that $$x(k+1) = g(x(k), u(k)), \quad (12)$$

$$c(x(k), u(k)) \le 0, \quad (13)$$

$$x \in X, u \in U$$

The sampling instants for the above discretized functions can be chosen as either fixed time steps or fixed distance steps. In other words, to minimize the rate of energy consumption over time in the continuous-time domain, one can minimize over fixed time or fixed distance steps in accordance with Equation 14:

$$\int \dot{f} dt = \int \frac{\dot{f}}{v} dx \quad (14)$$

A cost function that would be used by GPC can take the form in accordance with Equation 15:

$$J = \quad (15)$$

$$q_e \sum_{k=1}^{N_p} \dot{e}(k) + q_v \sum_{k=1}^{N_p} \|v_{ref}(k) - v_x(k)\|_{n_1} + q_{vavg} \left\| \sum_{k=1}^{N_p} v_{ref}(k) - \sum_{k=1}^{N_p} v_x(k) \right\|_{n_2} +$$

$$q_{vrate} \sum_{k=1}^{N_p} \|v_x(k) - v_x(k-1)\|_{n_3} + q_{trate} \sum_{k=1}^{N_c} \|T_e(k) - T_e(k-1)\|_{n_4} +$$

$$q_t \sum_{k=1}^{N_c} \|T_e(k)\|_{n_5} + q_{rtdrate} \sum_{k=1}^{N_c} \|T_{rtd}(k) - T_{rtd}(k-1)\|_{n_6} +$$

$$q_{rtd} \sum_{k=1}^{N_c} \|T_{rtd}(k)\|_{n_7} + q_{grate} \sum_{k=1}^{N_c} \|\alpha(k) - \alpha(k-1)\|_{n_8}$$

The first term represents energy minimization; the second and third terms represent reference speed and average speed tracking respectively; the fourth term represents acceleration minimization for safety and comfort purposes; the fifth and sixth terms represent minimization of rate of change and the actual propulsion torques respectively for safety and comfort purposes; the seventh and eighth terms represent minimization of rate of change and the actual retardation torques respectively for safety comfort and fuel minimization purposes; and the last term represents the minimization of unnecessary gear change for comfort, safety and fuel minimization purpose. $q_e$, $q_v$, $q_{vavg}$, $q_{vrate}$, $q_{trate}$, $q_t$, $q_{rtdrate}$, $q_{rtd}$, $q_{grate}$ are their respective penalty weights. In addition, $\dot{e}$ is the energy consumption rate, k and k−1 represent the current and previous sample instant's respectively, $v_x$ and $v_{ref}$ are the vehicle longitudinal velocity and reference velocities respectively, $T_e$ and $T_{rtd}$ are propulsion and retardation torques respectively, a is the current gear, $n_1$, $n_2$, $n_3$, $n_4$, $n_5$, $n_6$, $n_7$ and $n_8$ are the respective norms of each part of the cost function. The energy minimization problem would be subject to the following constrains: vehicle speed, propulsion torque, retarding torque, distance to preceding vehicle and the like. The vehicle speed shall be within the minimum and maximum speeds in accordance with Equation 16:

$$v_{min}(k) \le v_x(k) \le v_{max}(k) \quad (16)$$

the minimum and maximum speed can be set by a high-level algorithm that arbitrates between posted speed limits, safe vehicle speed limits based on roadway geometry, current weather conditions, current traffic conditions, and the like. The posted speed limits, safe vehicle speed limits based on roadway geometry, current weather conditions, current traffic conditions, and the like data can, for example, be received from electronic map data sources, images of the roadway captured by cameras on the ground vehicle, or any other data source. The engine torque shall be within the minimum and maximum limits in accordance with Equation 17:

$$T_{e_{min}}(\alpha(k),\omega(k)) \leq T_e(k) \leq T_{e_{max}}(\alpha(k),\omega(k)) \quad (17)$$

The retarding torque is shall be within the minimum and maximum limits in accordance with Equation 18:

$$0 \leq T_{rtd}(k) \leq T_{rtd_{max}}(k) \quad (18)$$

Engine speed shall be within the permissible limits $$\omega_{min} \leq \omega(k) \leq \omega_{max} \quad (19)$$

The distance to the preceding ground vehicle in a prediction horizon can be the greater of the safe distance in accordance with Equation 20:

$$d_{min}(k) \leq d(k) \leq d_{max}(k) \quad (20)$$

The minimum and maximum distance can be set by a high-level algorithm depending on traffic information, GPS information, road conditions, and or the like. To ensure a feasible solution to the optimization problem, the above constraints can be imposed as soft constraints. In one example, the cost function weights can be adjusted by a higher-level planning algorithm. One example would be that, based on the time consumed up to a certain instant and total trip time allowed, the cost function weights can be reduced or increased. The optimizing variable of this Generalized Predictive Control (GPC) based example can be directly the engine torque, the retarding torque and gear trajectory. Alternatively, the vehicle acceleration, velocity and gear trajectories could be used as optimization variables and converted into engine torque, retarding torque and gear trajectory by a lower level controller. The selection of the strategy can depend on the availability of the control signals, and the feasibility of the solution of the optimization problem.

The optimal gear sequence should minimize energy consumption, minimize arrival time, minimize gear shifts and make sure that the gears are not shifted by more than a specific number at each time sample. There can be two strategies of optimizing the gear sequence. In a first strategy, a torque level can be requested that will indirectly control the transmission to be in a desired gear. For example, given a particular speed of the ground vehicle, less torque can be requested so that the transmission will not downshift and hence put the engine in a less efficient operating region. In a second strategy, the transmission can be controlled to directly select a desired gear. A number of methods can be used to find the optimal, or suboptimal solutions in some cases, engine torque ($T_e$) and gear (g) for each driving instant.

In a first implementation, non-linear optimization with the gear as an integer control variable can be utilized. To accommodate energy loss incurred by non-optimal gear selection, a model of gear behavior can be included in the constraints of the GPC optimization problem discussed above. The gear can be optimized in addition to torque. The vehicle model and the energy consumption models can be affected by the introduction of the gear variable, and therefore, the models can be amended to include the new variables. This problem can be tackled by Dynamic Programming (DP) method, by an outer approximation and generalized Bender decomposition method, or by a branch-and-bound method.

In a second implementation, the GPC can optimize engine torque ($T_e$) and velocity (V) with indirect gear control followed by another layer of gear optimization. The gear ratio ($r_g$) can be implicitly included in the equations describing the vehicle velocity and energy rate. The GPC can be utilized to find the optimal engine torque ($T_e$) and velocity (V) that minimize fuel and tracks the desired set speed. The optimal engine torque ($T_e$) and velocity (V) can be input to a gear optimization problem that selects the optimal gear for every sampling time of the GPC prediction horizon. The optimization problem should be able to handle integer decision variable as well as satisfy the constraints relating gear or torque and engine speed. Search methods such as dynamic programming can also be used. To reduce computation time, it can be assumed that gear control is sampled at slower time than GPC. Control and prediction horizons for the second block can vary from the first block. The following Equations 21, 22, 23 and 24 elaborate more on how to include gear as an implicit variable:

$$r_g = f_1(T_e, v_x), r_g \in \{r_{g1}, \ldots, r_{g_{max}}\} \quad (21)$$

$$\dot{e} = f_2(T_e, v_x, r_g) = f_5(T_e, v_x) \quad (22)$$

$$\dot{v}_x = f_3(T_e, v_x, r_g) = f_6(T_e, v_x) \quad (23)$$

$$\alpha = f_4(r_g), \alpha \in \{1, \ldots, \alpha_{max}\} \quad (24)$$

The optimal engine torque ($T_e$) and velocity ($V_x$) can utilize $f_5$ and $f_6$, while the $f_1$, $f_2$ and $f_4$ can be utilized to determine the optimal gear.

In a third implementation, the GPC can optimize engine torque ($T_e$) and gear (g) with direct gear control followed by another layer of gear optimization. The gear ratio ($r_g$), and hence the gear, can be a continuous-time variable. As a result, the GPC decision variable will be engine torque ($T_e$) and gear (g), and the constraints can ensure that the selected gear satisfies engine speed and torque requests. A second optimization block can select the optimal gear for each time step such that the output is an integer and optimal. The second optimization can be a simple round to the nearest integer operator or a more advanced optimization or search algorithm such as dynamic programming. To reduce computation time, it can be assumed that gear control is sampled at a slower time than GPC. In addition, control and prediction horizons for the second optimization can vary from the first optimization.

In a fourth implementation, GPC can minimize the energy consumption in a two-step approach. In the first step, the amount of energy that is needed to drive the vehicle (E) for a certain amount of distance for given operating conditions is minimized in accordance with Equation 25:

$$\min E = \min \int F dx = \\ \min \int \frac{T_a}{r_w} v_x dt = \min \int \frac{(\dot{v}_x + k_1 v_x^2 + k_2 v_x + k_6 \cos\theta - k_7 - g\sin\theta)}{k_3 r_w} v_x dt \quad (25)$$

An optimal vehicle longitudinal velocity ($v_x$) and drive torque at the wheels ($T_a$) can be found from the above minimization problem. In the second step, another optimization problem will be solved. In this step, the longitudinal velocity and drive torque sequences obtained above will be utilized to generate a set of engine torques ($T_e$), retardation torques ($T_b$) and ($T_{trd}$) and gears ($\alpha$) that minimize energy spent by the propulsion system (e), while tracking the longitudinal velocity ($v_x$) and drive torque derived ($T_a$) above in accordance with Equation 26:

$$\text{given } T_a \text{ and } v_x, \min \int \dot{e} dt \quad (26)$$

Where ė is given by (1). The GPC can include, but not be limited to, the cost and constraints in accordance with Equations 15, 16, 17, 18, 19 and 20. The optimization can be done using Dynamic Programming or any other search method. To reduce computation time, the gear control can be assumed to be sampled at a slower time than GPC. In addition, control and prediction horizons for the second optimization can vary from the first optimization.

Other gear control methods can include adding in linear gear ratio estimation to the cost function, GPC with linear gear ratio estimation to determine optimal gear, and or the like. Shift schedule can be similarly optimized based on mass. Either gear shifting can be controlled from a vehicle interface/integration control module (VICM) or accurate mass information can be provided to the transmission controller to handle shifting in an energy efficient manner. Intelligent shift logic can also include providing for shifting into neutral on descending grade or the like. Graphics processing units can be utilized for analyzing the models for distributed optimization to improve computation time for real-time GPC computing.

Parameter and state estimation can be utilized to determine vehicle velocity and acceleration, vehicle pitch angle, road gradient, vehicle mass, aerodynamic drag, coefficient of rolling resistance, brake pressure and drive force estimation. In one implementation, vehicle velocity and acceleration can be estimated from wheel speed information and map information using estimators such as the Kalman filter. Vehicle pitch angle can be estimated from vehicle pitch information, if available, and brake pressure information. Road gradient can be estimated from vehicle pitch angle estimation, vehicle acceleration estimation, map information using estimators such as the Kalman filter. Vehicle mass, aerodynamic drag, and coefficient of rolling resistance can be estimated from vehicle dynamic equation, vehicle velocity estimation, vehicle acceleration estimation, road gradient estimation, road data, environment data and combination of least square estimation and artificial intelligence algorithms. Brake pressure can be estimated from vehicle velocity, vehicle acceleration, vehicle pitch angle, road gradient, vehicle mass, aerodynamic drag, coefficient of rolling resistance, the vehicle dynamic equation using estimators such as the Kalman filter. Drive force can be estimated from vehicle velocity, vehicle acceleration, vehicle pitch angle, road gradient, vehicle mass, aerodynamic drag, coefficient of rolling resistance, brake pressure and camera information. Since the measurements are sampled at a much faster rate than the control signals, we can use dual rate observers or Kalman Filters to enhance our estimates of the unknown parameters mentioned above.

Ground vehicle mass estimation can be based on recursive least squares with multiple forgetting factors, or least squares with non-redundant data stacked up according to singular value decomposition. Vehicle states can be determined based on vehicle velocity and acceleration, pitch angle and road gradient, brake pressure, drive forces and the like. Engine and transmission parameters can be determined based on shifting, torque map, fuel map, and the like The predictive enhanced cruise controller 602 can dynamically adjust the operation of the ground vehicle such that energy consumption is decreased. As the roadway, driving environment, and conditions associated with the roadway dynamically change, the predictive enhanced cruise controller 602 can dynamically adjust the operation of the ground vehicle to decrease the overall energy consumption of the ground vehicle. For example, rather than simply having the ground vehicle operate at a set speed, the predictive enhanced cruise controller 602 may automatically adjust the operation of the ground vehicle to operate within a target vehicle performance plan bounded by a minimum and maximum speed of the target speed window. The predictive enhanced cruise controller 602 can identify various driving parameters and the corresponding impact of the driving parameters on the operation of the ground vehicle in real-time and automatically adjust the operation of the ground vehicle to also reduce braking, shifting, travel distance, travel time, and the like.

Figure 8:
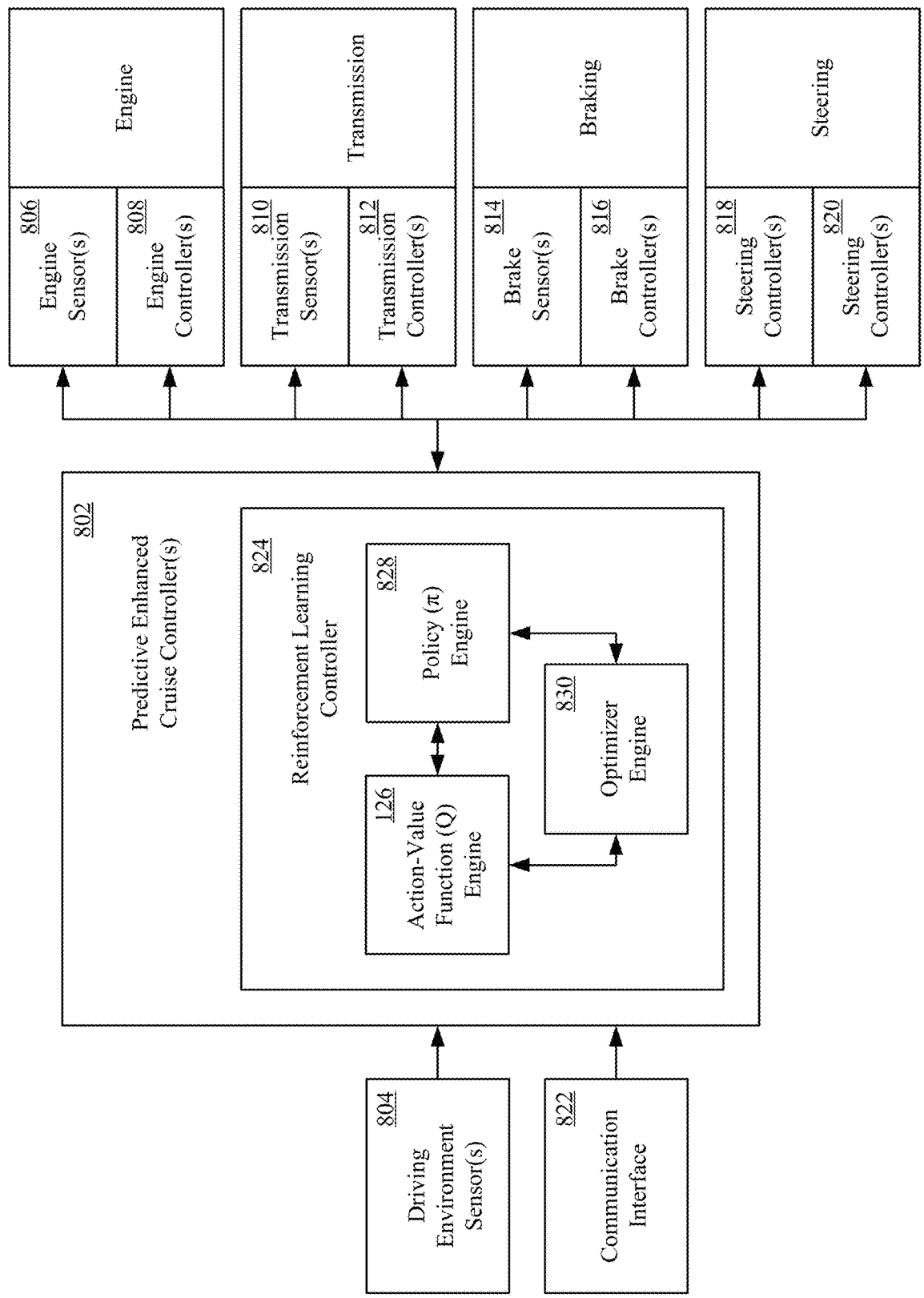
FIG. 8 shows a predictive enhanced cruise controller for use in a ground vehicle, in accordance with aspects of the present technology.

Referring now to FIG. 8, a predictive enhanced cruise controller for use in a ground vehicle, in accordance with aspects of the present technology, is shown. The predictive enhanced cruise controller can be configured to adjust the operation of the ground vehicle 110 based on a plurality of driving environment sensors that detect a plurality of driving parameters. The predictive enhanced cruise controller 802 can be communicatively coupled to one or more driving environment sensors 804, one or more engine sensors 806 and or one or more engine controllers 808. The predictive enhanced controller 802 can also be communicatively coupled to one or more transmission sensors 810, one or more transmission controllers 812, one or more brake sensors 814, one or more brake controllers 816, one or more steering sensors 818, one or more steering controllers 820, and or other similar sensors and controllers. The predictive enhanced cruise controller 802 can also be communicatively coupled to one or more external networks through one or more communication interfaces 822.

In one implementation, the one or more predictive enhanced cruise controllers 802 and one or more of the sensors and controllers can be integral to the ground vehicle 100. The one or more predictive enhanced cruise controllers 802 can be implemented in hardware, firmware, software or any combination thereof. In other implementation, the one or more predictive enhanced controllers 802 can be implemented in a distributed computing architecture. For example, some functions of the predictive enhanced cruise controller can be implemented as computing device-executable instructions (e.g., computer program) that are stored in computing device-readable media (e.g., computer memory) and executed by a computing device (e.g., processor) on the ground vehicle. One or more other functions can be implemented on one or more other computing devices external to the ground vehicle. The one or more other functions can for example be implement in the cloud, on a remote server, or the like.

The engine sensors 806 and engine controllers 808 can include, but not limited to, Engine Control Modules (ECM), Engine Control Units (ECU), throttle position sensors, fuel injector sensors, intake sensors, mass airflow sensors, oxygen sensors, exhaust sensors, engine tachometers, voltmeters, current meters, temperature sensors, fluid level sensors, and the like. The engine sensors 806 can for example provide ground vehicle operating parameters such as current fuel consumption, engine revolutions per minute (RPMs), and the like. The engine controllers 808 can for example control fuel injection parameters in response to throttle control inputs, and the like. The transmission sensors 810 and transmission controllers 812 can include, but not limited to, shift lever position sensors, gear selection sensors, clutch pedal position sensors, Transmission Control Units (TCU), tachometers, temperature sensors, fluid level sensors, hydraulic controllers, servos, and the like. The transmission sensors 810 can for example provide vehicle operating parameters such as transmission RPM, torque, current gear, and the like. The transmission controllers 812 can for example control clutch and shift inputs and the like. The brake sensors 814 and brake controllers 816 can include, but not limited to, brake pedal position sensors, brake pedal force sensors, hydraulic pressure sensors, air pressure sensors, torque sensors, anti-lock brake system (ABS) controllers, and the like. The steering sensors 818 and steering controllers 820 can include, but not limited to, steering position sensors and the like. The driving environment sensors 804 can include, but not limited to, cameras, radar, inertial measurement units (IMU), global position systems (GPS), light detection and ranging (LIDAR), temperature sensors, dedicated short range communications (DSRC), and the like. The driving environment sensors 804 can for example provide driving environment parameters such as road surface condition, road width, lane markings, traffic control devices, traffic conditions, line of sight, visibility, lighting, current weather, location, and the like. The communication interface 822 can provide for downloading or streaming of two- or three-dimensional map data, current and future weather conditions, traffic conditions, and or the like. Some sensors and controllers can provide and or operate on the same, similar and or overlapping data, functions and the like. In addition, various data and or functions can be combined to increase confidence, increase accuracy, generate additional data, generate higher level functions, and or the like.

The predictive enhanced cruise controller 802 can be configured to determine an operation threshold such as a target speed window based on one or more of one or more ground vehicle operating parameters and one or more driving environment parameters. For example, posted speed limits (driving environment parameters) may specify maximum operating speeds on various segment of one or more roadways. The posted speed limits may also specify minimum operating speeds in some cases. The speed limits can, for example, be received from electronic map data sources, images of the roadway captured by cameras on the ground vehicle, or any other data that characterizes the roadway. Similarly, a minimum safe following distance determined from one or more forward looking cameras, LIDAR, radar or the like can be utilized to calculate an average speed for current traffic conditions. Similarly, weather conditions can be utilized by the predictive enhanced cruise controller 802 to calculate a safe speed for road conditions. A maximum speed can also be determined based on road curvature and safe lateral acceleration. An operator, such as the company operating the vehicle, may specify a maximum operating speed. The one or more different specified and or determined speeds can be combined to generate a target speed window.

For example, a posted speed limit, detected by a camera or determined from map data, may specify a maximum speed of 65 miles per hour (MPH) and a minimum speed of 45 MPH. In addition, an ambient outside temperature measured by a temperature sensor on the vehicle and current operation of the windshield wipers may indicate a freezing temperature and precipitation. In such case, the predictive enhanced cruise controller 802 may determine that the maximum safe speed for current road conditions should be limited to 55 MPH, and therefore determine a target speed window of between 45 and 55 MPH. In another example, a posted speed limit may specify a maximum speed of 55 MPH. However, stop and go traffic may be detected by forward looking cameras on the vehicle. The predictive enhanced cruise controller 802 may determine, based upon current minimum safe distance values, that the safe speed for current traffic conditions is between 0 and 25 MPH. Therefore, in the stop and go traffic conditions, the target speed window may be determined to be between 0 and 25 MPH. In yet another example, the posted speed limit for the current and next few segments of an interstate highway may be 55 MPH. However, topographical data for the next segment of roadway may indicate a curve in the road. The topographical data can, for example, be received from electronic map data sources, images of the roadway captured by cameras on the ground vehicle, or any other data that characterizes the roadway. In such case, the predictive enhanced cruise controller 802 may determine a safe speed for the curved segment of the road to be 45 MPH. In addition, based upon a scheduled delivery time and a predicted route, the predictive enhanced cruise controller 802 may determine that the minimum average speed to be 40 MPH. In such case the predictive enhanced cruise controller 802 may determine a target speed window for the segment including the curve to be between 40 and 45 MPH.

The predictive enhanced cruise controller 802 can further determine an adaptive target vehicle performance plan based on the target speed window and one or more of the one or more ground vehicle operating parameters, one or more driver control inputs and the one or more driving environment parameters. In one implementation, the adaptive target vehicle performance plan can be determined based upon the dynamic load on the powertrain of the ground vehicle. The powertrain load can be determined from one or more ground vehicle operating parameters, driver control inputs and or driving environment parameters including, but not limited to, the ground speed, acceleration, engine torque, engine output power, transmission torque, transmission output power, gear ratio, current fuel consumption rate, roadway geometry, gross vehicle weight, cargo weight, rolling resistance of the vehicle, historical datasets, and the like. The historical data sets can include statistical data captured from different trips along the same or similar road segments, for the same or similar ground vehicles, during the same or similar traffic conditions, during the same or similar weather conditions, and or the like. The powertrain load along with one or more other ground vehicle operating parameters, driver control inputs and or driving environment parameters can be utilized to determine an adaptive target vehicle performance plan as the ground vehicle travels along a current roadway segment and or one or more upcoming roadway segments.

For example, the predictive enhanced cruise controller 802 may determine that the upcoming segment of roadway includes a short flat portion, a steep uphill grade and then continues along another flat grade, from three-dimensional map information. The predictive enhance cruise controller 802 may have also determined a target speed window of 55 to 65 MPH for the upcoming segment. The predictive enhanced cruise controller 802 may therefore generate an adaptive target vehicle performance plan that includes gradually increasing the ground speed of the vehicle from a current speed of 60 to 65 MPH as the vehicle proceeds through the initial flat portion of the segment. The gradual increase in speed along the short flat portion may incur a relatively small increase in fuel consumption, while allowing the vehicle to maintain the higher speed part way up the steep incline. The adaptive target vehicle performance plan may then provide for the vehicle to gradually slow from 65 MPH to 55 MPH as it continues to climb up the steep incline. In contrast, if the ground vehicle tried to maintain a constant speed up the incline, a significant amount of additional fuel would be consumed. Therefore, the adaptive target vehicle performance plan can provide for an overall reduction in fuel consumption by the ground vehicle while maintaining an average speed over the entire segment close to the center of the target speed window. In another example, predictive enhanced cruise controller 802 may determine that the powertrain is nearing an upper end of engine RPM versus fuel efficient curve for a given transmission gear and that a shift to a higher gear ratio should be executed soon. However, from LIDAR sensor data, the predictive enhanced cruise controller 802 may detect that traffic ahead is starting to slow. Therefore, the predictive enhanced cruise controller 802 may update the current adaptive target vehicle performance plan to hold off on the potential gear shift. The current ratio of relatively high engine RPM to torque can instead be utilized to maintain or even slightly slow the speed of the ground vehicle in response to the traffic ahead starting to slow. Avoiding the situation of shifting to a high gear and then shift back down a short period of time later, and vice versa. can reduce overall energy consumption over the course of a trip. Accordingly, by predicting the speed, acceleration, torque, power, braking and the like along an upcoming segment of the roadway, shifting can be reduced which can in turn reduce overall energy consumption. Similarly, predicted speed and gear selection along an upcoming segment of the roadway, can be utilized to reduce braking which can in turn reduce overall energy consumption.

The predictive enhanced cruise controller 802 can further determine the adaptive target vehicle performance plan based on one or more driving risk factors. The one or more driving risk factors can be determined from one or more of one or more of the plurality of ground vehicle operating parameters, driver control input, and or one or more driving environment parameters. The driving risk factors can for example be determined based on current and or future traffic conditions, roadway geometry and or topology, current and or future weather conditions, driver control inputs, driver alertness and readiness levels, location-based accident history data, and or the like. The driving risk factors along with one or more other ground vehicle operating parameters, driver control inputs and or driving environment parameters can be utilized to determine an adaptive target vehicle performance plan as the ground vehicle travels along one or more roadway segments. The driving risk factors may adjust the speed, shifting and or braking of the vehicle over the current and or future roadway segment. For example, when icy conditions are detected the adaptive target vehicle performance plan may provide for a further reduction of the speed of the vehicle around curves, and more gradual acceleration and braking. In another example, the following distance can be increased when the driver attentiveness is determined to be low from an in-cab camera.

The predictive enhanced cruise controller 802 can operate in one or more modes that can include a passive mode, an active non-autonomous mode, an active autonomous mode and or the like. In a passive mode, the predictive enhanced cruise controller 802 can generate one or more vehicle operating indicators for output to a driver of the ground vehicle based on the determined target speed window and the determined adaptive target vehicle performance plan. The target speed window and adaptive target vehicle performance plan can adjust vehicle operating indicators output to the driver to assist the driver in reducing overall energy consumption, reducing shifting, reducing braking, and or the like to increase performance. For example, audio, visual and or haptic clues can be utilized to indicate to the driver when he or she should shift a manual transmission. The predictive enhanced cruise controller 802 can also provide feedback on how the driver's manual performance compares to the predictive enhanced cruise control. The feedback can be used to train drivers, for logistics, and or the like.

In an active non-autonomous mode, the predictive enhanced cruise controller 802 can generate one or more of one or more modulated driver control inputs and one or more ground vehicle input operation parameters for output to one or more actuators of the ground vehicle based on the determined target speed window, the determined adaptive target vehicle performance plan and one or more driver control inputs. For example, the determined target speed window may be between 55 and 65 MPH, and the determined adaptive target vehicle performance plan may provide for the actual speed of the vehicle to decrease from 65 to 55 MPH as the vehicle climbs a steep grade in the upcoming segment of the roadway. As the driver operates the ground vehicle, the driver may depress the gas pedal further and further to try and maintain a constant speed of the vehicle as it proceeds up the hill. However, the increase in throttle may simply increase energy consumption without being able to maintain speed up the steep incline. In such case, the predictive enhanced cruise controller 802 can modify the throttle input determined from the gas pedal control input by the driver based on the determined target vehicle performance plan. As a result, the increasing throttle input by the driver can be modified to provide a decreasing throttle input to provide for the vehicle to slow from 65 to 55 MPH as the ground vehicle climbs the steep grade to decrease overall energy consumption.

In an active autonomous mode, the predictive enhanced cruise controller 802 can generate one or more of one or more autonomous driver control inputs and one or more ground vehicle input operation parameters for output to one or more actuators of the ground vehicle based on the determined target speed window and the determined adaptive target vehicle performance plan. For example, the predictive enhanced cruise controller 802 can control throttle inputs to the engine controller, synchronize engine and transmission speeds, and control shifting operations through the transmission controller. The predictive enhanced cruise controller 820 can also control braking and steering to autonomously control operation of the ground vehicle in accordance with the determined target speed window and adaptive target vehicle performance plan.

In addition, different driver control inputs and or ground vehicle input operation parameters can be generated as indicators, modulate inputs, or autonomous control inputs. For example, the predictive enhanced cruise controller 802 can generate one or more steering operation indicators for presentation as audio, visual and or haptic clues. However, the predictive enhanced cruise controller 802 can determine the smoothness of a road surface from a camera and generate an autonomous ground vehicle input operation parameter that controls the height of the ground vehicle. In such case, the suspension height of the ground vehicle can be automatically lowered to reduce airflow underneath the vehicle, thereby reducing the aerodynamic drag forces and increase energy efficiency when the roadway is smooth.

Machine learning can be utilized to configured and optimize the predictive enhanced cruise controller 802. In one implementation, reinforcement learning techniques can be utilized in the predictive enhanced cruise controller 802. In reinforcement learning, given a state of an environment, an agent takes an action and observes a reward returned by the environment. Given the observation, action and resulting reward tuple, the agent adapts its action policy given similar states (i.e. learns how to act) such that it increases an expected future reward returned by the environment. The process is iteratively performed until the agent takes actions which yield maximal rewards from the environment. The various sensors and controllers 804-822 are representative of a ground vehicle environment. The output of the sensors can represent the state of the ground vehicle operating environment, and the inputs to the controllers represent the actions for a current state of the ground vehicle operating environment. The one or more predictive enhanced cruise controllers 802 can include one or more reinforcement learning (RL) controllers 826. The one or more RL controllers 826 can be configured to receive states of the ground vehicle environment from the sensors 804, 806, 810, 814, 818, 822, and output actions to be performed by the controller 808, 812, 816, 820 on the ground vehicle environment.

Figure 9:
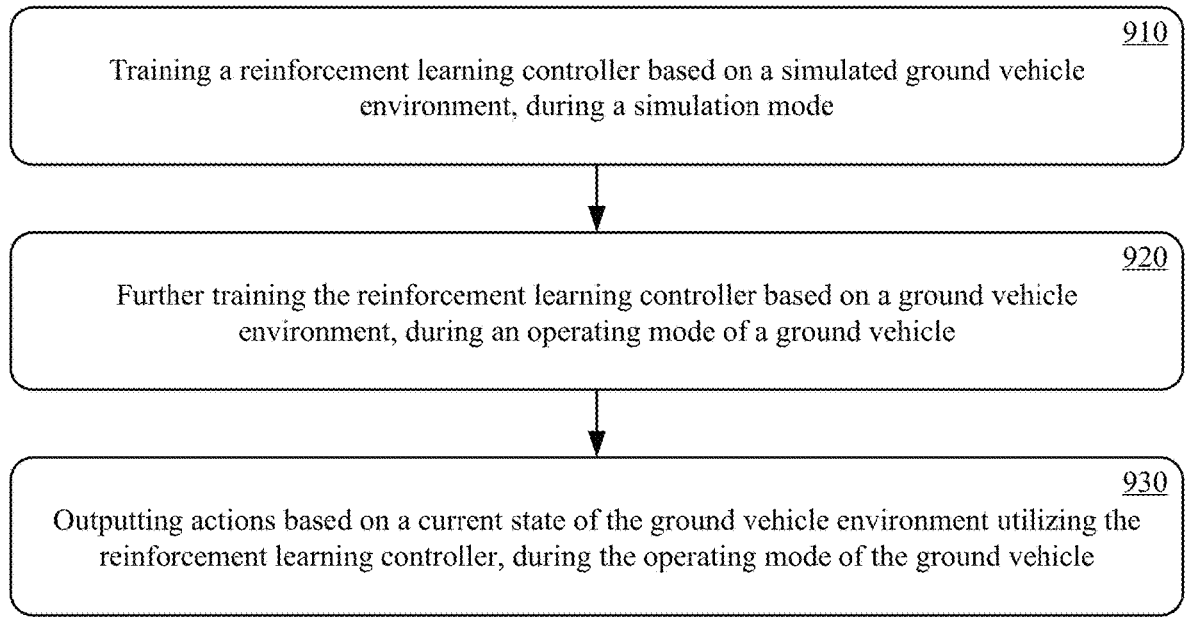
FIG. 9 shows a ground vehicle control learning method, in accordance with aspects of the present technology.

The RL controller 824 can include an action-value function (Q) engine 826, a policy ($\pi$) engine 828 and an optimizer engine 830. The operation of the RL controller will be further described with reference to FIG. 9, which shows a ground vehicle control learning method. The ground vehicle control learning method, in one implementation, can include a simulation based training mode and an operating based training mode. The simulated environment includes training data that mimics the ground vehicle operating parameters, driver control inputs and outputs, driving environment parameters and the like. In the simulation mode, a RL controller 824 can be trained based on a simulated ground vehicle environment, at 910. During the simulation mode, the optimization engine 830 monitors actions produced by the policy ($\pi$) engine 828 and the resulting states including composite states received at the action-value function (Q) engine 826. The optimization engine 830 can optimize the policy ($\pi$) engine 828 and the action-value function (Q) engine 826 without knowledge of a model of the environment. At 920, the RL controller 826 can be further trained based on a ground vehicle environment, during an operating mode of the ground vehicle. During the operating mode, the optimization engine 830 monitors actions produced by the policy ($\pi$) engine 828, the resulting states including composite states received at the action-value function (Q) engine 826 and the rewards returned by the environment. The policy ($\pi$) engine 828 and the action-value function (Q) engine 826 can be optimized by the optimization engine 830 during the operating mode to account for discrepancies between the simulated optimization and the real-world environment of the ground vehicle, as well as the discrepancies in the underlying environment statistics (Markov Decision Process) in the real world environment. At 930, one or more actions determined by the RL controller 825 based on a current state of the ground vehicle environment can be output, during the operating mode of the ground vehicle. The output actions can control operation of one or more ground vehicle subsystems, including the engine, transmission, steering and braking or the like, through one or more of the engine controllers 808, transmission controllers 812, brake controllers 816, steering controllers 820 and the like. The output actions, at 930, and resulting state changes can be utilized to continuously train the RL controller 824, at 920.

Figure 10:
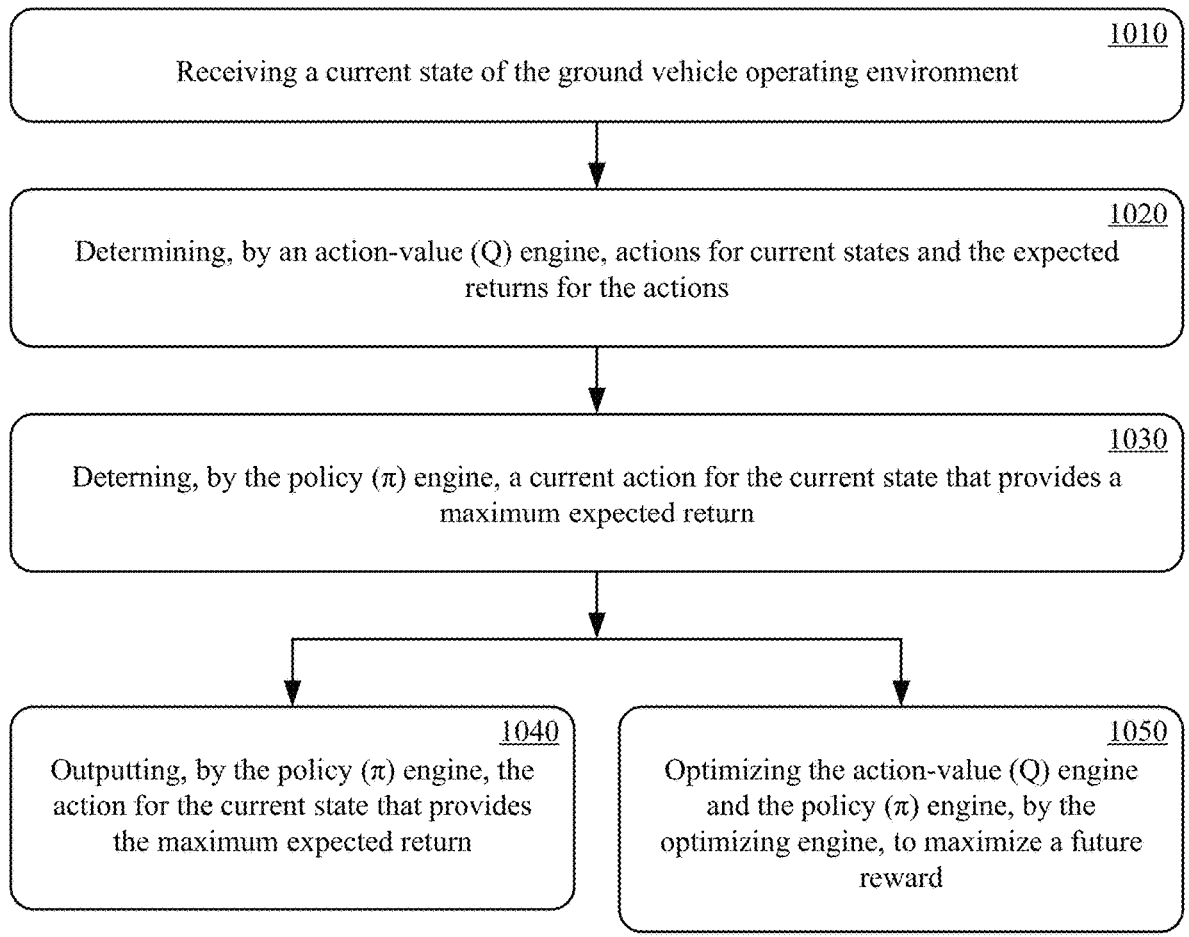
FIG. 10 shows a method of training a reinforcement learning controller, in accordance with aspects of the present technology.

Referring now to FIG. 10, a method of training the RL controller, in accordance with aspects of the present technology, is shown. Training the RL controller 824 can include receiving a current state of the ground vehicle operating environment, at 1010. At 1020, the action-value function (Q) engine 826 can determine actions for the current state and expected returns for the actions. At 1030, the policy ($\pi$) engine 828 can determine an action for the current state that provides a maximum expected return. At 1040, the policy ($\pi$) engine 828 can output the action for the current state that provides the maximum expected return. The optimization engine 830 can optimize the action-value function (Q) engine 826 and the policy ($\pi$) engine 828 to maximize an expected future reward. The method of training the RL controller 824 can be utilized in both the simulation mode and the operating mode of the ground vehicle.

Figure 11:
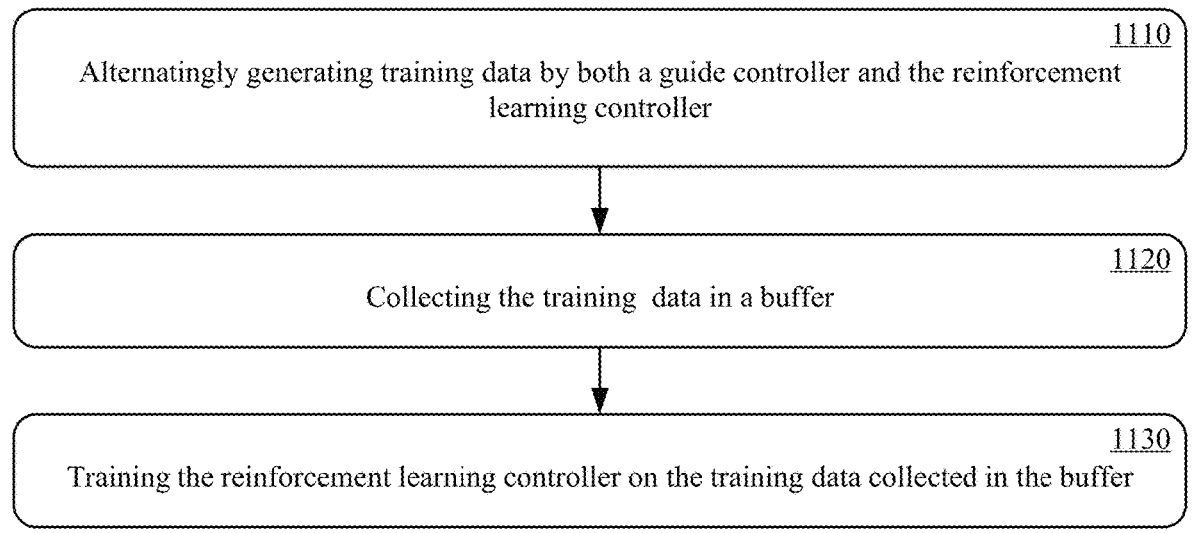
FIG. 11 shows a ground vehicle control learning method, in accordance with another aspect of the present technology.
Figure 12:
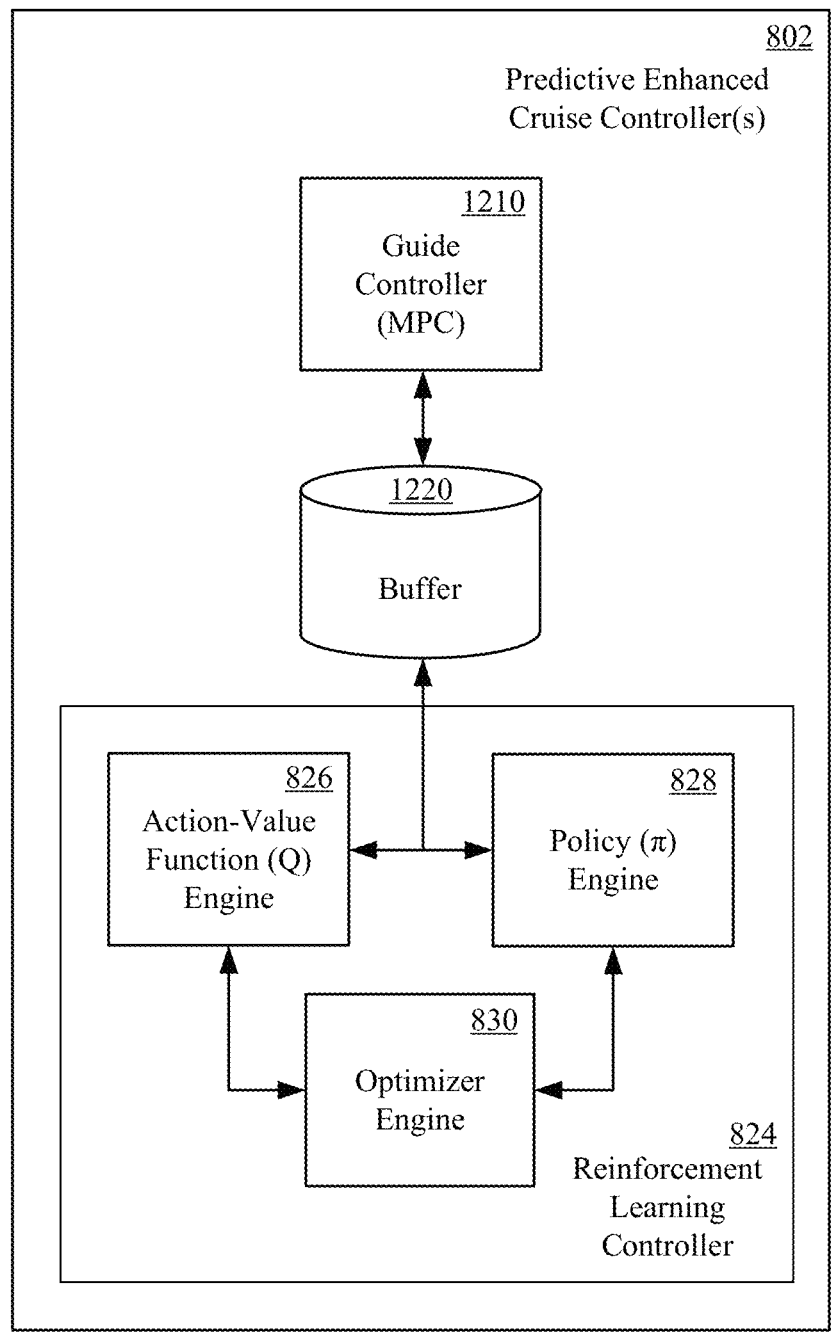
FIG. 12 shows a predictive enhanced cruise controller, in accordance with another aspect of the present technology.

Referring now to FIG. 11, a ground vehicle control learning method, in accordance with another aspect of the present technology, is shown. The ground vehicle control learning method will be further described with reference to FIG. 12, which shows a predictive enhanced cruise controller, in accordance with another aspect of the present technology. As illustrated in FIG. 12, the predictive enhanced cruise controller 802 can include the RL controller 824, a guide controller 1210 and a buffer 1220. When the RL controller 824 and the guide controller 1210 are generating training data they can be considered to be behavioral controllers. When the RL controller 824 is being trained, the RL controller 824 can be considered to be a target controller. In one implementation, the guide controller 1210 can be a model predictive controller (MPC). During the simulation mode, the ground vehicle control learning method can include alternating generating training data by both the guide controller 1210 and the RL controller 824 as behavioral controllers, at 1110. For example, the guide controller 1210 can perform a simulation to generate a first set of training data. The RL controller 820 can then perform a simulation to generate a second set of training data. The guide controller 1210 can perform a simulation to generate a third set of training data, and so on. The simulation generated by the guide controller 1210 and the RL controller 820, as behavioral controllers, can be used for off-policy training of the RL controller 824, as the target controller. In other implementations, the guide controller 1210 and the RL controller 824, as behavioral controllers, can generate sets of training data in various alternating sequences. For instance, the guide controller 1210 can generate one or more sets of training data, and then the RL controller 824 can generate one or more sets of training data. At 1120, the training data generated by both the guide controller 1210 and the action-value function (Q) engine 826, the policy ($\pi$) engine 828 and the optimizer engine 830 of the RL controller 824 can be collected in the buffer 1220, at 1120. The training data collected in the buffer 1220 can include states, actions and rewards. At 1130, the RL controller 824, as the target controller, can be trained on the training data collected in the buffer. The RL controller 824 can be optimized for energy efficiency, driveability costs, and the like based on the buffered data.

Optionally or alternatively, the RL controller 824, as the target controller, can be trained using initial training data generated by the guide controller 1210, as the behavioral controller, during the simulation mode. The use of the guide controller 1210 can provide for training the action-value function (Q) engine 826, the policy ($\pi$) engine 828 and the optimizer engine 830 of the RL controller 824 utilizing training data in stable environment regions. In other implementations, simulations can be run utilizing the RL controller 824, as the behavior controller, to generate off-policy training data.

Figure 13:
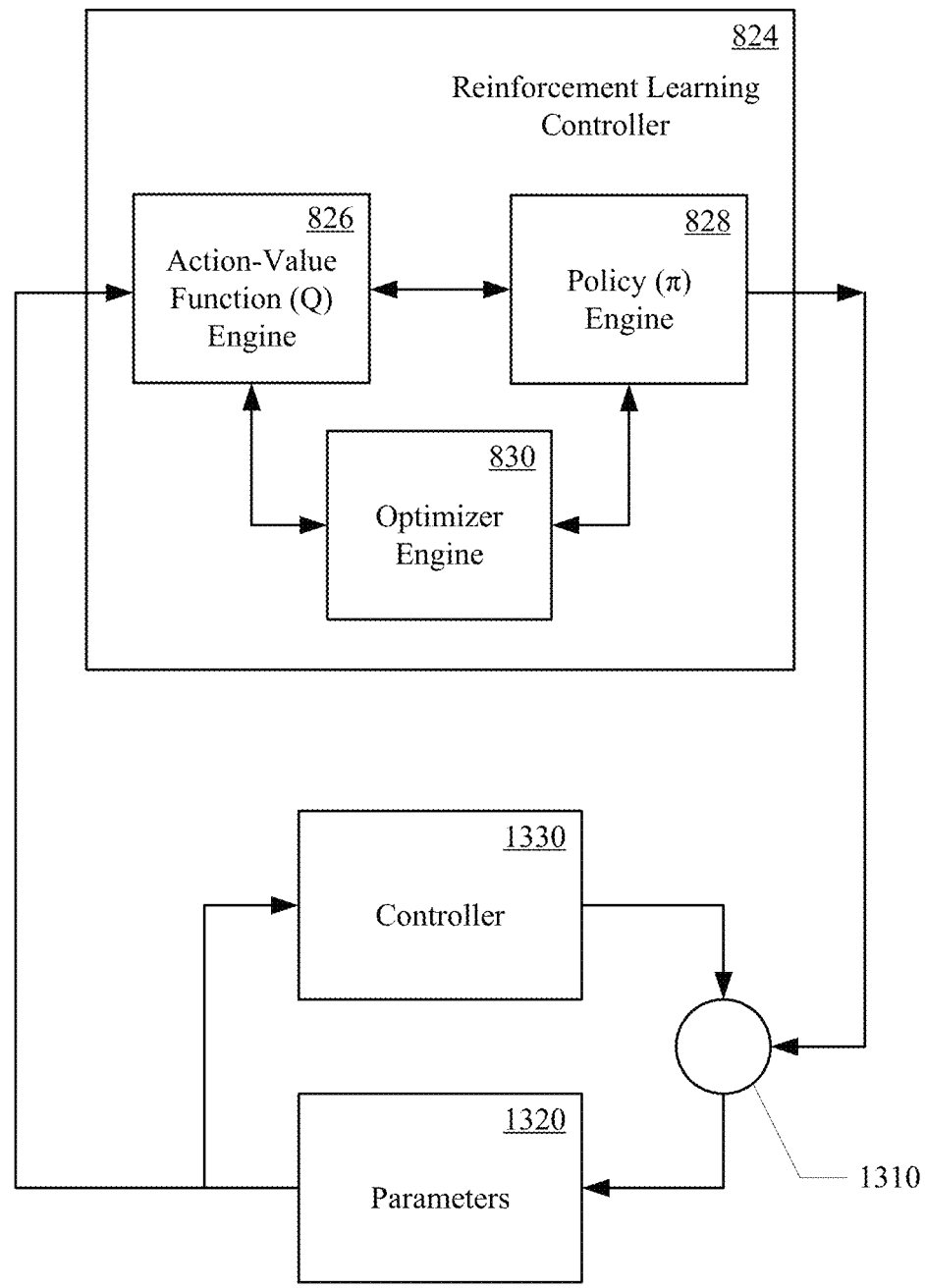
FIG. 13 shows a ground vehicle control learning method, in accordance with another aspect of the present technology.

Referring now to FIG. 13, a ground vehicle control learning method, in accordance with another aspect of the present technology, is shown. During the operating mode, training the RL controller can include modifying 1310 one or more parameters 1320 of a controller 1330 of the ground vehicle environment. The modified parameters can be utilized for optimization of the controller of the ground vehicle environment 1330 and can be utilized for training the RL controller 824. The controller of the ground vehicle environment 1330 can be any controller of the ground vehicle such as, but not limited to, one or more engine controllers 808, one or more transmission controllers 812, one or more brake controllers 816, one or more steering controllers 820 and or the like. The one or more parameters can include, but not limited to, ground vehicle operating parameters, driver control inputs, driving environment parameters and or the like. In this implementation, from the point of view of the RL controller 820, the controller of the ground vehicle environment 1330 becomes part of the environment.

In another implementation, the controller of the ground vehicle environment 1330 can be configured as a parametrized function $f_{i(\cdot|\theta_i)}$, s.t. $f_i \in \mathcal{F}$, where $\mathcal{F}$ is a family of controllers and $\theta \in \mathbb{R}^K$. This becomes the action of a reinforcement learning policy, which by acting selects a new function $f_i$ since $f_i$ is parameterized by $\theta_i$. The RL controller 824 can learn to select a particular function $f_i$ by defining its action $\theta_i \sim \pi(\theta|x_i)$, wherein "~" means sampled for a stochastic policy, and wherein if the policy is deterministic "~" becomes "="). The RL controller 824, as a target controller, can be optimized according to some criterion, such as a loss function.

In another implementation, a Lyapunov function of the longitudinal vehicle dynamics can be used to derive constraints on control commands that ensure that the RL controller 824, as a target controller, yields a stable behavior. A simplified vehicle longitudinal model can be expressed according to Equation 1:

$$\dot{v}_x = -k_1 v_x^2 - k_2 v_x + k_3 T_d - k_4 \cos\emptyset + k_5 + g \sin\emptyset \qquad (1)$$

wherein $T_d = r_g r_d T_e - T_d$

The Lyapunov function can be formulated as if $v_x > v_{max}$ then $J_1 = c(v_x - v_{max})^2$ if $v_x < v_{max}$ then $J_2 = c(v_x - v_{min})^2$ where c>0 is a tunable parameter.

Figure 14:
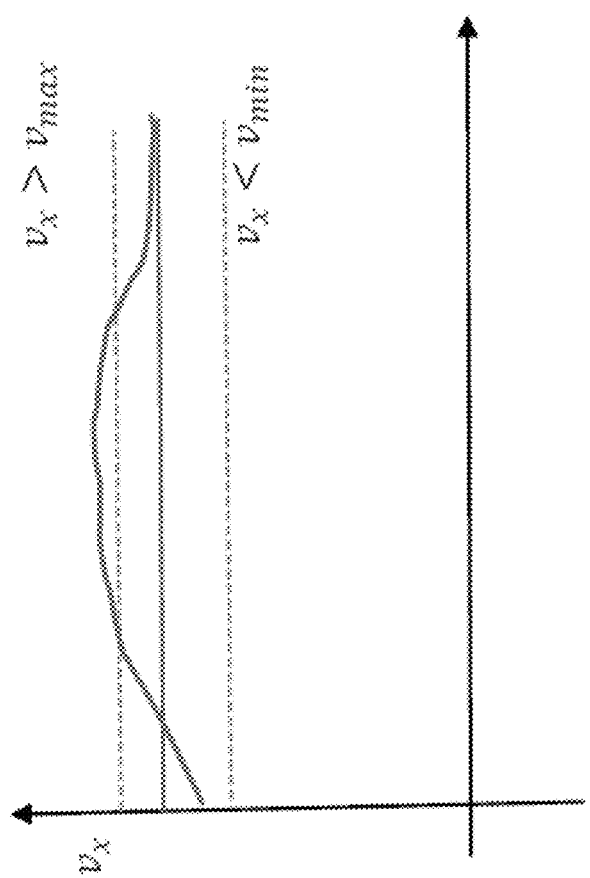
FIG. 14 shows a Lyapunov function, in accordance with aspects of the present technology.

Imposing the following constraints, that were derived on the requirement that the derivative of Lyapunov functions with respect to time shall be negative definite, will ensure stable operation of the vehicle when being controlled by the RL controller 824 according to:

if $v_x > v_{max}$ then $T_d < \frac{K_1}{K_3}V_x^2 + \frac{K_2}{K_3}v_x + \frac{K_4}{K_3}\cos\emptyset - \frac{K_5}{K_3} - \frac{g}{k_3}\sin\emptyset$ if $v_x < v_{min}$ then $T_d < \frac{K_1}{K_3}V_x^2 + \frac{K_2}{K_3}v_x + \frac{K_4}{K_3}\cos\emptyset - \frac{K_5}{K_3} - \frac{g}{k_3}\sin\emptyset$ and illustrated in FIG. 14.

Figure 15A:
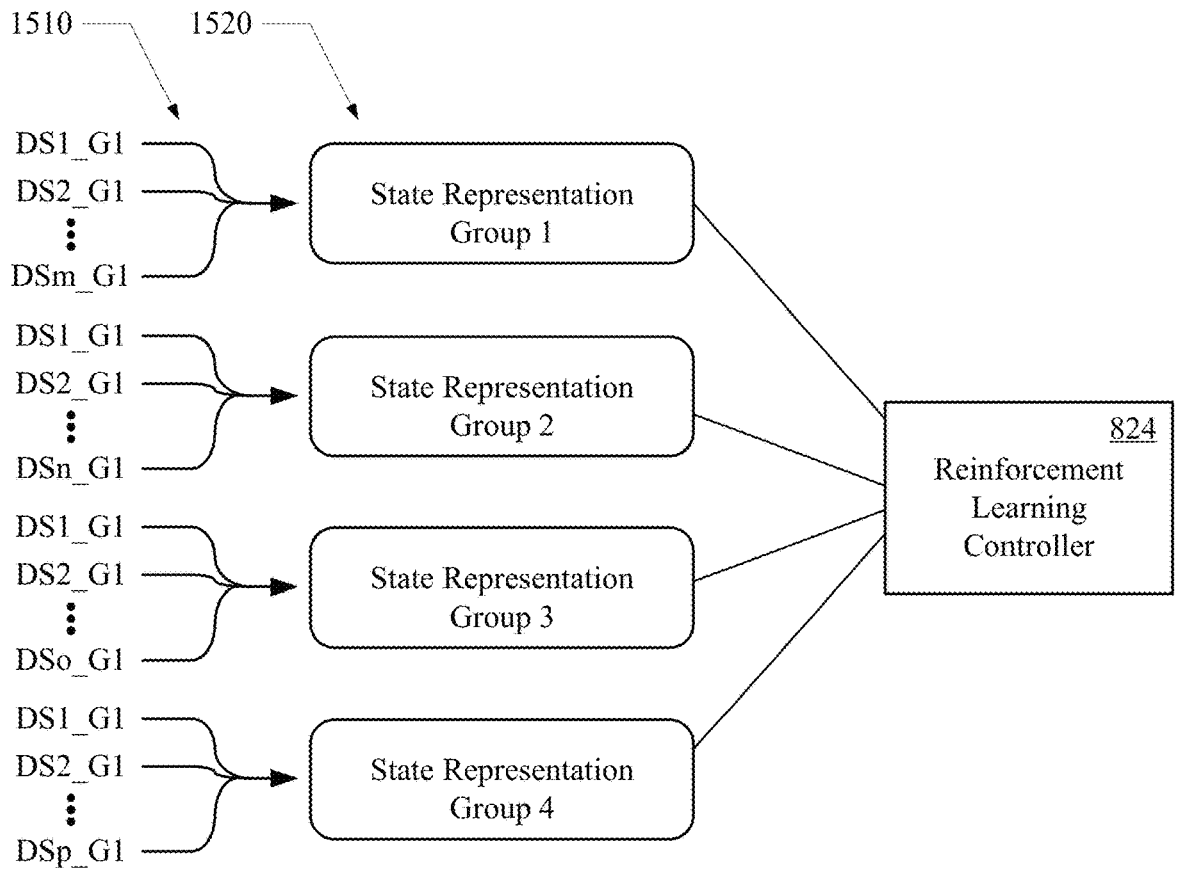
FIGS. 15A and 15B shows a method decoupling the reinforcement learning controller from a data source configuration, in accordance with aspects of the present technology.
Figure 15B:
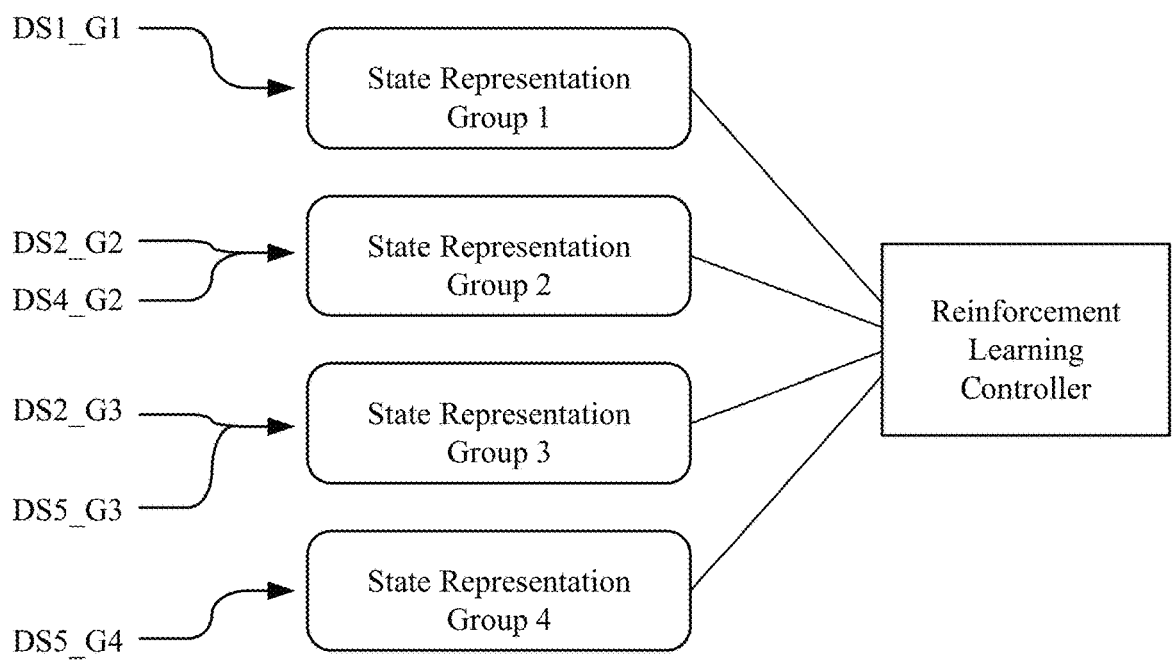
Figure 16A:
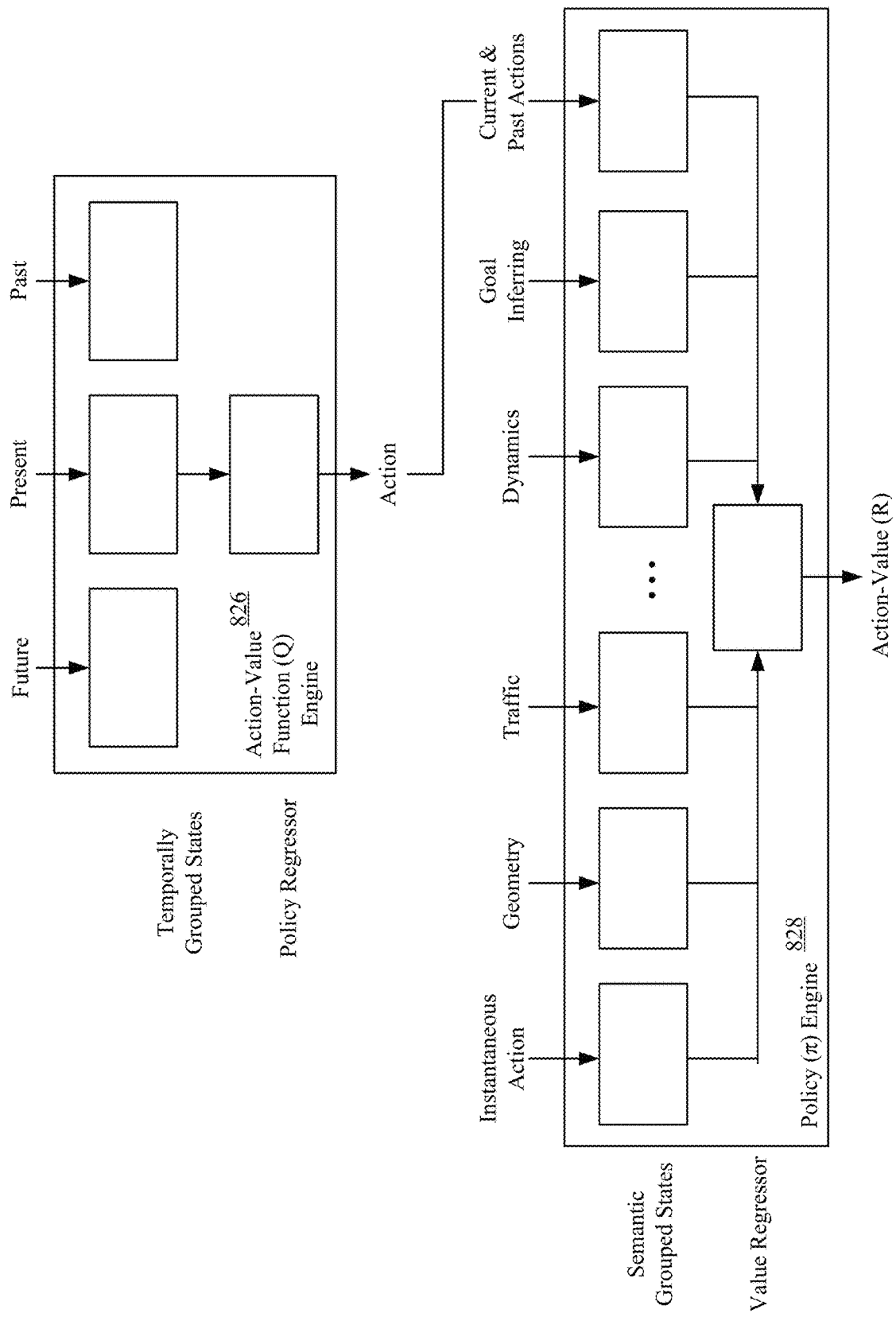
FIGS. 16A and 16B show a method decoupling the reinforcement learning controller from a data source configuration, in accordance with aspects of the present technology.
Figure 16B:
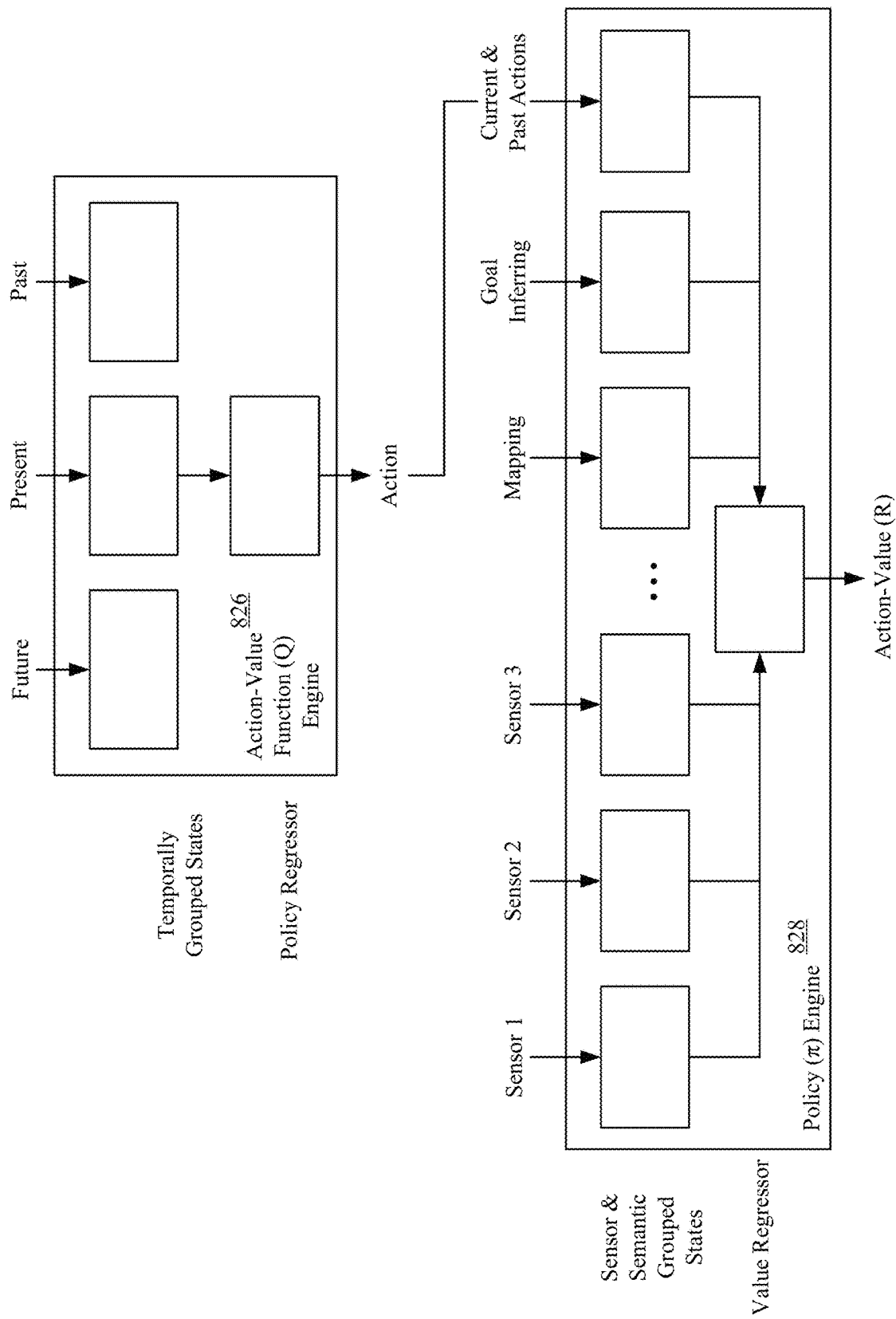

Referring now to FIGS. 9A 9B, 10A and 10B, a method of decoupling the RL controller 824 from a data source configuration, in accordance with aspects of the present technology, is shown. The RL controller 824 can receive data from various sources 1510. The data sources 1510 can be grouped 1520 into semantically similar data source group, temporal grouped states, and or the like. A state representation can be extracted for each data source group 1520. The state representation can be considered a compressed representation. For example, a set of various sensors may capture roadway geometry state information. A set of sensors can include a map application DS1_G1, a right-side forward-looking camera DS2_G1 and a left-side forward-looking camera, and a GPS receiver DSm–G1 can be provide semantically similar roadway geometry state information. The semantically similar roadway geometry sensors can be identified and grouped together utilizing a feature extractor. A state representation of the roadway geometry can be extracted by the feature extractor from the set of semantically similar sensors. The RL controller 824 can be trained on state representations inferred from the grouped sensory data as illustrated in FIG. 15A. During initial training the full set of sensor data can be used to extract maximal state representation. Using the reduced sensor set, a new feature extractor can be learned to reconstruct grouped state representation learned using the full set of sensors, as illustrated in FIG. 15B. For example, a given ground vehicle utilize the map application DS1_G1, but may not have the right- and left-side forward-looking cameras or the GPS receiver. A feature extractor can extract the roadway geometry state information from the map application. The RL controller 824 can continue to train on and control the operation of the ground vehicle using the roadway geometry state information even though the mix of sensors have changed. Accordingly, the trained RL controller 824 can advantageously be reused for implementations with differing data sources implementation, with minimal additional training for the given set of data sources. In one implementation, all the data sources can be grouped into semantically similar data source groups and used in the training of the action-value function (Q) engine 826 and the policy ($\pi$) engine 828, as illustrated in FIG. 16A. In another implementation, some sources can be grouped into semantically similar data source groups. A mix of individual sources and the grouped data sources can be used in the training of the action-value function (Q) engine 826 and the policy ($\pi$) engine 828, as illustrated in FIG. 16B.

Figure 17:
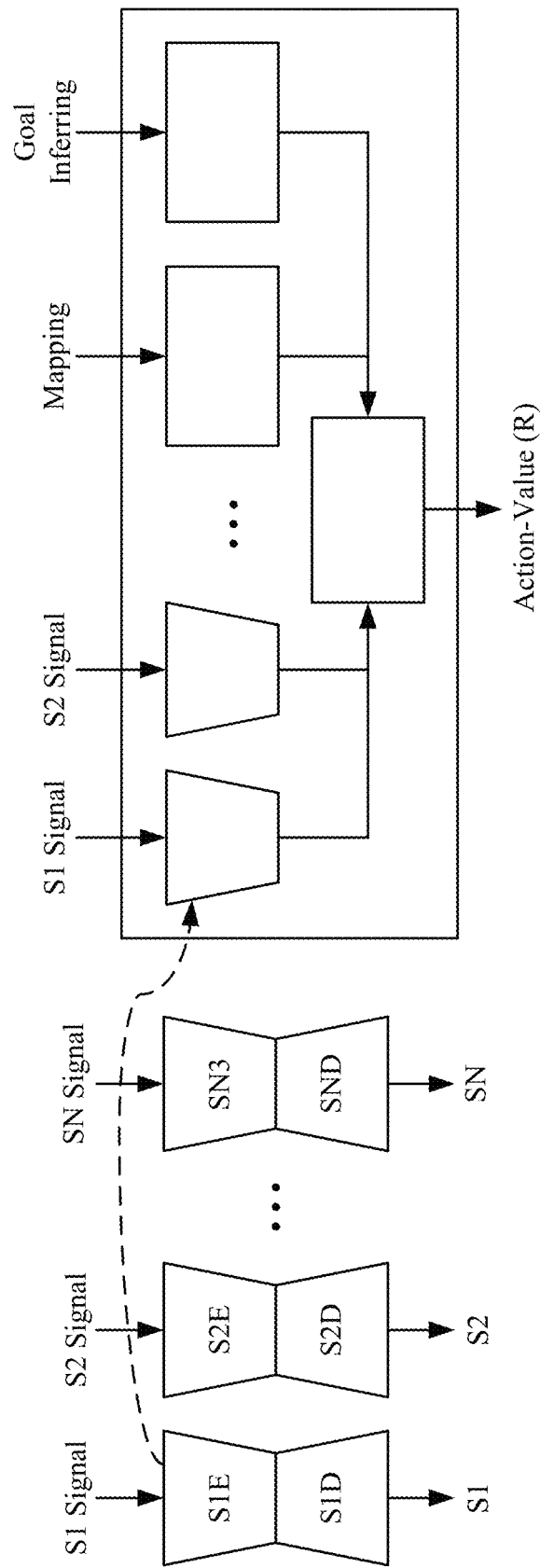
FIG. 17 shows a method decoupling the reinforcement learning controller from a data source configuration, in accordance with aspects of the present technology.

Referring now to FIG. 17, a method decoupling the reinforcement learning controller from a data source configuration, in accordance with aspects of the present technology. Dimensionality reduction techniques can be used to extract grouped state representation. In one implementation denoising or signal reconstruction auto-encoders can be used. The encoder can take one or more data sources and reconstruct a particular data source. The learned states can then be used to learn new feature extractors from a reduced set of data signal groups which target learned state representations. Thus, by learning state representation once and optimizing the controller once using the states, only new feature extraction need to be learned to accommodate different product configurations.

Figure 18:
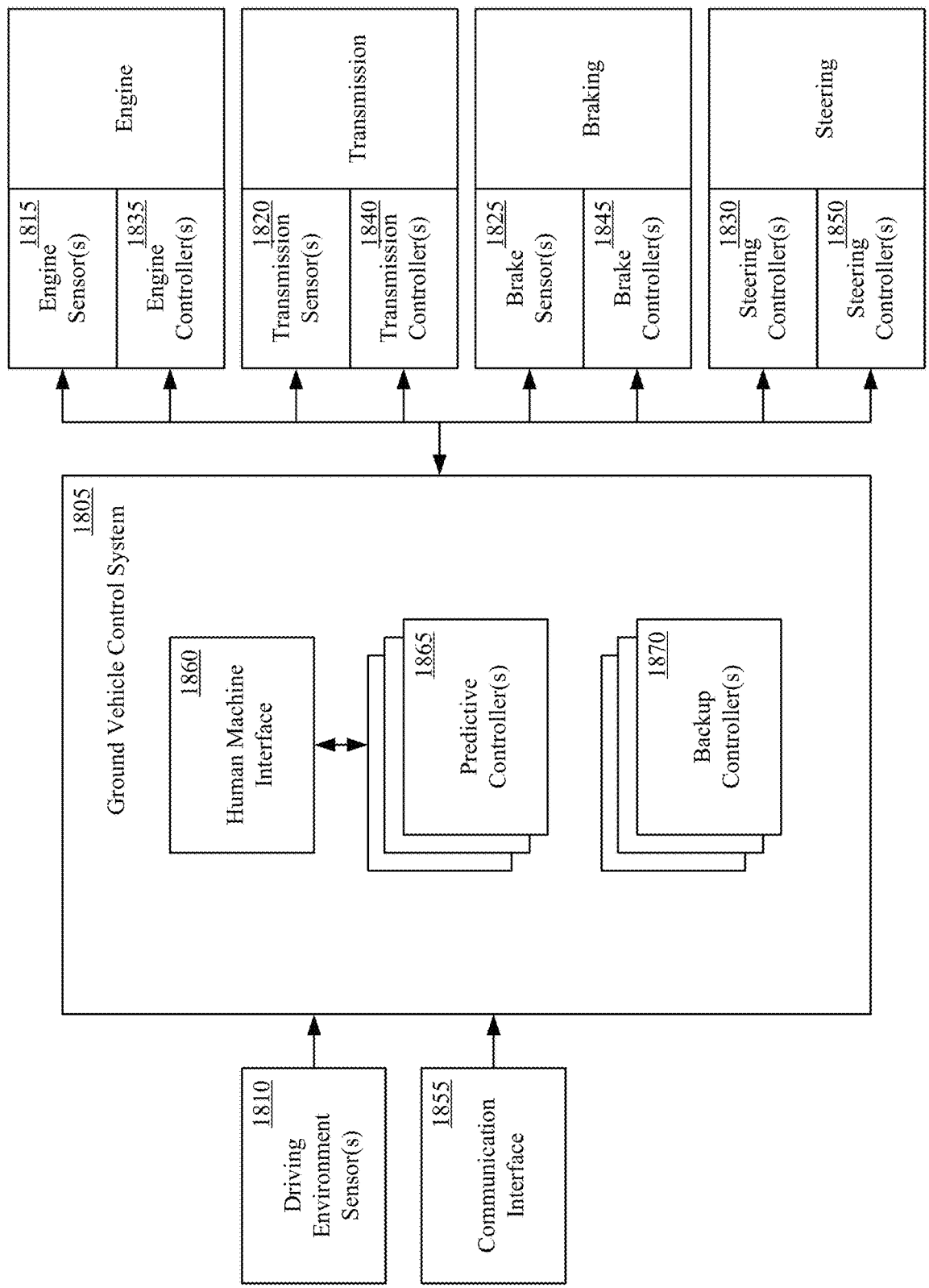
FIG. 18 shows a predictive enhanced cruise controller for use in a ground vehicle, in accordance with aspects of the present technology.
Figure 19:
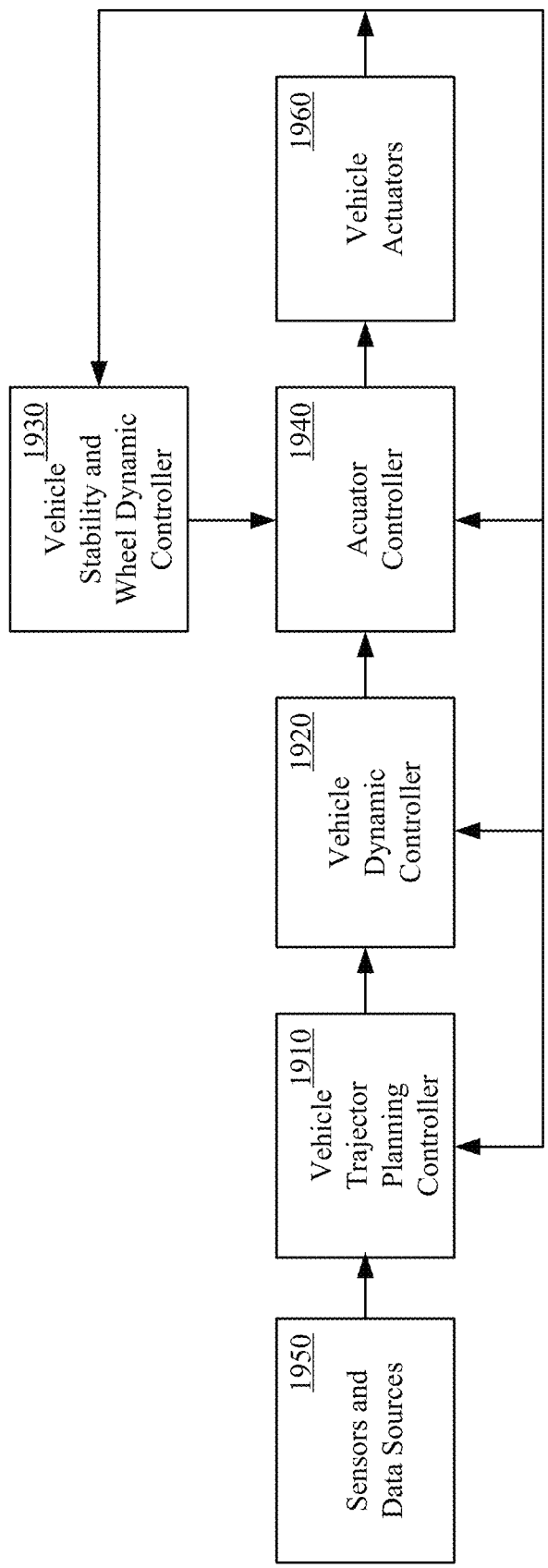
FIG. 19 shows functions performed by the one or more predictive controllers, in accordance with aspects of the present technology.

Referring to FIG. 18, a ground vehicle control system, in accordance with aspects of the present technology, is shown. The ground vehicle control system can implement aspects of the enhanced cruise controller to automatically adjust the operation of the ground vehicle 110. The ground vehicle control system 1805 can be communicatively coupled to one or more driving environment sensors 1810, one or more ground vehicle sensors 1815-1830, one or more ground vehicle controllers 1835-1850 and one or more communication interfaces 1855 of a ground vehicle. The one or more driving environment sensors 1810 can include one or more forward, side, rear view and cab cameras, one or more light detection and ranging (LIDAR) sensors, one or more radar sensors, global position systems (GPS), and or other similar sensors for detecting one or more elements of the driving environment. The one or more ground vehicle sensors can include one or more engine sensors 1815, one or more transmission sensors 1820, one or more brake sensors 1825, one or more steering sensors 1830, one or more accelerometers, one or more inertial measurement units (IMU), and or other similar sensors. The one or more ground vehicle controllers can include one or more engine controllers 1835, one or more transmission controllers 1840, one or more brake controllers 1845, one or more steering controllers 1850 and or other similar controllers. The one or more communication interfaces 1855 can include one or more communication interfaces internal to the ground vehicle, such as a CANN bus interface, and or one or more external communication interfaces such as WIFI, cellular telephone, satellite network interfaces, dedicated short range communications (DSRC), and or the like.

In one implementation, the ground vehicle control system 1805, and or the one or more of the sensors and controllers 1815-1855 can be integral to the ground vehicle. The ground vehicle control system 1805 can be implemented in hardware, firmware, software or any combination thereof. In other implementations, the ground vehicle control system 1805 can be implemented in a distributed computing architecture. For example, some functions of the ground vehicle control system can be implemented as computing device-executable instructions (e.g., computer program) that are stored in computing device-readable media (e.g., computer memory) and executed by a computing device (e.g., processor) on the ground vehicle. One or more other functions can be implemented on one or more other computing devices external to the ground vehicle. The one or more other functions can for example be implement in the cloud, on a remote server, or the like.

The engine sensors 1815 and engine controllers 1835 can include, but not limited to, Engine Control Modules (ECM), Engine Control Units (ECU), throttle position sensors, fuel injector sensors, intake sensors, mass airflow sensors, oxygen sensors, exhaust sensors, engine tachometers, voltmeters, current meters, temperature sensors, fluid level sensors, and the like. The engine sensors 1815 can for example provide ground vehicle operating parameters such as current fuel consumption, engine revolutions per minute (RPMs), and the like. The engine controllers 1835 can for example control fuel injection parameters in response to throttle control inputs, and the like. The transmission sensors 1820 and transmission controllers 140 can include, but not limited to, shift lever position sensors, gear selection sensors, clutch pedal position sensors, Transmission Control Units (TCU), tachometers, temperature sensors, fluid level sensors, hydraulic controllers, servos, and the like. The transmission sensors 1820 can for example provide vehicle operating parameters such as transmission RPM, torque, current gear, and the like. The transmission controllers 140 can for example control clutch and shift inputs and the like. The brake sensors 1825 and brake controllers 1845 can include, but not limited to, brake pedal position sensors, brake pedal force sensors, hydraulic pressure sensors, air pressure sensors, torque sensors, anti-lock brake system (ABS) controllers, and the like. The steering sensors 1830 and steering controllers 1850 can include, but not limited to, steering position sensors and the like. The driving environment sensors 1810 can include, but not limited to, cameras, radar, light detection and ranging (LIDAR), temperature sensors, and the like. The driving environment sensors 1810 can be used to determine driving environment parameters such as road surface conditions, road width, lane markings, traffic control devices, traffic conditions, line of sight, visibility, lighting, current weather, location, and the like. The one or more communication interfaces 1855 can provide for downloading or streaming of two- or three-dimensional map data, current and future weather conditions, traffic conditions, and or the like. Some sensors and controllers can provide and or operate on the same, similar and or overlapping data, functions and the like. In addition, various data and or functions can be combined to increase confidence, increase accuracy, generate additional data, generate higher level functions, and or the like.

The ground vehicle control system 1805 can receive a plurality of ground vehicle operating parameters, driver control inputs, and one or more driving environment parameters from the one or more ground vehicle sensors 1815-1830, one or more driving environment sensors 1810, and one or more communication interfaces 1855. One or more predictive controllers 1865 of the ground vehicle control system 1805 can be configured to self-train for determining an energy consumption optimal/sub-optimal solution based on the one or more ground vehicle operating parameters, driver control inputs, and one or more driving environment parameters. In addition or in the alternative, the one or more predictive controllers can be configured by tuning parameters manually. The one or more predictive controllers 1865 can also be configured to generate one or more control signals based on the energy consumption optimal/sub-optimal solution for output to one or more ground vehicle controllers 1835-1850, one or more communication interfaces 1855 and or one or more human-machine interfaces 1860.

The one or more control signals can be configured for output in one or more ground vehicle control modes, such as an active control mode, an assist control mode, a coaching control mode, or a passive control mode. In the active control mode, the control signals can actively control one or more of a throttle input, a brake input, a gear input and a steering input of the ground vehicle. However, the driver is paying attention in case the driver needs to take control of the ground vehicle. One or more performance parameters of the ground vehicle can also be reported to a driver or another entity in the active control mode. In the active control mode, one or more parameters of the ground vehicle, the driving environment and or driver control inputs can be recorded for review or further analysis. The parameters of the ground vehicle, the driving environment and the driver control inputs can capture both the performance of the ground vehicle and the behavior of the driver.

In the assist mode, the control signals can modify one or more of the throttle input, the brake input, the gear input and the steering input form the driver. Although the driver is actively controlling the throttle, brake, gear, shifting and steering, the ground vehicle control system can modify the input from the driver to improve performance of the ground vehicle. In one example, the driver may be providing a 100% throttle input, but the control vehicle control system may modulate the driver throttle input to provide an 80% throttle input to the engine controller to improve fuel efficiency. One or more performance parameters of the ground vehicle can also be reported to the driver or another entity in the assist mode. In the assist mode, one or more parameter of the ground vehicle, the driving environment and or driver control inputs can be also recorded for review or further analysis. Again, the parameters of the ground vehicle, the driving environment and the driver control inputs can capture both the performance of the ground vehicle and the behavior of the driver.

In the coaching mode, the ground vehicle control system is not controlling the throttle, brake, gear and steering inputs. Instead, the control signals can be output as one or more visual, audio, or haptic feedback to the driver through one or more human-machine-interface (HMI) of the ground vehicle. In the coaching mode, the driver is actively controlling the throttle input, brake input, steering input and optionally the gear input for manual transmissions and the ground vehicle control system is providing throttle, brake, gear, shift and steering suggestions to improve performance to the driver. One or more performance parameters of the ground vehicle can also be reported to the driver or another entity in the coaching mode. For example, the driver may be providing a 100% throttle input which is input to the engine controller. However, the ground vehicle control system may provide a recommendation to the driver to decrease the throttle input to 80% to improve fuel efficiency. In the coaching mode, one or more parameter of the ground vehicle, the driving environment and or driver control inputs can be also recorded for review or further analysis. Again, the parameters of the ground vehicle, the driving environment and the driver control inputs can capture both the performance of the ground vehicle and the behavior of the driver.

In the passive mode, the driver is actively controlling the throttle input, brake input, steering input and optionally the gear input for manual transmissions. The ground vehicle control system is not controlling or providing suggestions concerning throttle, brake, gear, shift and steering inputs to the driver. In the passive mode, one or more parameter of the ground vehicle, the driving environment and or driver control inputs can be recorded for review or further analysis. Again, the parameters of the ground vehicle, the driving environment and the driver control inputs can capture both the performance of the ground vehicle and the behavior of the driver.

The one or more predictive controllers 1865 can be configured to control one or more of vehicle torque, vehicle gear, vehicle retardation, vehicle speed, vehicle acceleration, vehicle fuel consumption and or the like to reduce fuel consumption. The one or more predictive controllers 165 can be configured to optimize energy consumption based on a cost function for one or more decision variable that can include engine torque, axle torque, retardation torque, vehicle speed, distance traveled and or the like, subject to the vehicle dynamics for a prediction horizon, and one or more soft and hard constraints, that can be time varying and or non-time varying.

In one implementation, the predictive controller can be configured to solve the following optimization problem using a mathematical model of longitudinal vehicle dynamics and a model predictive control technique to achieve energy optimization:

$$\text{minimize } J = \sum_{k=1}^{N_p} Q_e(k)\dot{e}(k) + \sum_{k=1}^{N_p} Q_d(k)(d_{ref}(k) - d(k))^2 + \quad (1)$$

$$\sum_{k=1}^{N_p} Q_v(k)(v_{ref}(k) - v(k))^2 + \sum_{k=1}^{N_p} Q_a(k)(a(k))^2 + \sum_{k=1}^{N_p} Q_j(k)(j(k))^2 +$$

$$\sum_{k=1}^{N_c} Q_{te}(k)\left(T_{e_{ref}}(k) - T_e(k)\right)^2 + \sum_{k=1}^{N_c} Q_{ta}(k)\left(T_{a_{ref}}(k) - T_a(k)\right)^2 +$$

$$\sum_{k=1}^{N_c} Q_{terate}(k)(T_{erate}(k))^2 + \sum_{k=1}^{N_c} Q_{tarate}(k)(T_{arate}(k))^2$$

subject to $$d(k) + T_{gap}v(k) \leq d_{lead}(k) - d_{\tau_{min}}(k) \quad (2)$$

$$v_{min}(k) \leq v(k) \leq v_{max}(k) \quad (3)$$

$$a_{min}(k) \leq a(k) \leq a_{max}(k) \quad (4)$$

$$T_{e_{min}}(v(k), r_g) \leq T_e(k) \leq T_{e_{max}}(v(k), r_g) \quad (5)$$

$$T_{a_{min}}(k) \leq T_a(k) \leq T_{a_{max}}(k) \quad (6)$$

$$\begin{bmatrix} \dot{d} \\ \dot{v} \\ \dot{a} \\ \dot{T}_e \\ \dot{T}_a \\ \dot{a} \end{bmatrix} = \begin{bmatrix} v \\ a \\ j \\ T_{erate} \\ T_{arate} \\ -k_1 v - k_2 v^2 - k_3 + g\sin\theta + k_4 r_g T_e + k_5 T_a \end{bmatrix} \quad (7)$$

where, $$\dot{e} = c_0 + c_1 T_e + c_2 r_g v + c_3 r_g T_e v + c_4 T_e^2 + c_5 r_g^2 v^2 + c_6 r_g^2 T_e^2 v^2 \quad (8)$$

$$T_{e_{max}} = b_{11} + b_{21} r_g v + b_{31} r_g^2 v^2 + b_{41} r_g^3 v^3 \quad (9)$$

$$T_{e_{min}} = b_{12} + b_{22} r_g v + b_{32} r_g^2 v^2 + b_{42} r_g^3 v^3 \quad (10)$$

The fourth equation of (7) was derived based on the mathematical model of the vehicle longitudinal dynamics:

$$ma = -\frac{1}{2}\rho C_d A(v - v_w)|v - v_w| + \quad (11)$$

$$\frac{1}{r_w}(r_d r_g(\alpha)\eta(\alpha)T_e + T_a - I_w \dot{\omega}_w) - mg(\mu_0 + \mu_1 v + \mu_2 v^2)\cos\theta + mg\sin\theta$$

Presence of a leading vehicle affects the following vehicle state. The relative spacing to the leading vehicle can be represented as follows:

$$d_r = d_{lead} - d \quad (12)$$

Where, the lead vehicle states can be found using $$\begin{bmatrix} \dot{d}_{lead} \\ \dot{v}_{lead} \\ \dot{a}_{lead} \end{bmatrix} = \begin{bmatrix} 0 & 1 & 0 \\ 0 & 0 & 1 \\ 0 & 0 & -\frac{1}{T_{lead}} \end{bmatrix} \begin{bmatrix} d_{lead} \\ v_{lead} \\ a_{lead} \end{bmatrix} \quad (13)$$

Where A is the maximum vehicle cross section area, a is the vehicle acceleration in longitudinal direction, $a_{lead}$ is a lead vehicle acceleration, $C_d$ is the aerodynamic drag coefficient, d is the distance travelled along the longitudinal direction, $d_{lead}$ is the distance travelled by the lead vehicle along the longitudinal direction, $d_{r_{min}}$ is the minimum allowed relative distance between the leading vehicle and following vehicle, $d_{ref}$ is the reference vehicle longitudinal distance travelled, ė is the energy spent per unit time to move the vehicle, g=9.81 m/s² is the acceleration due to gravity, $I_w$ is the total rotational inertia of all the wheels, j is the vehicle jerk in longitudinal direction, k is the prediction horizon step, m is the combined vehicle mass (includes the mass of tractor, trailer and all other attached components), $N_p$ is the number of steps in the prediction horizon, $N_c$ is the number of steps in control horizon, Q's are the cost function weight, $r_d$ is the drive ratio, includes all the additional gearing and excludes gear ratios from gear box, $r_g(\alpha)$ is the gear box gear ratio in gear α, $r_w$ is the wheel radius, $T_a$ and $T_e$ is the total torque produced at the wheels by all the actuators that reside after and before the gearbox respectively in vehicle transmission, $T_{a_{ref}}$ and $T_{e_{ref}}$ are the reference axle torque and the reference torque, for example driver desired torque, $T_{a_{max}}$, $T_{a_{min}}$ and $T_{e_{max}}$, $T_{min}$ are the maximum and minimum torques of the respective actuators, $T_{arate}$ and $T_{erate}$ are rate of changes of respective torque, $T_{gap}$ is the time gap to the leading vehicle, $T_{lead}$ is the leading vehicle acceleration or deceleration time constant, v is the vehicle velocity in longitudinal direction, $v_{lead}$ is the leading vehicle velocity, $v_{max}$ and $v_{min}$ are the maximum and minimum allowed vehicle speeds respectively, $v_{ref}$ is the reference vehicle longitudinal velocity, $v_w$ is the wind velocity, $\alpha$ is the current gear, $\mu_0$, $\mu_1$, $\mu_2$ are the static and speed dependent rolling resistance coefficients, $\eta(\alpha)$ are the driveline efficiencies in gear $\alpha$, $\dot{\omega}_w$ is the average wheel rotational acceleration, $\rho$ is the wind density and $\theta$ is the gradient angle. The decision variables in this optimization problem are $$x = \begin{bmatrix} d \\ v \\ a \\ j \\ \dot{T}_e \\ \dot{T}_a \\ T_e \\ T_a \end{bmatrix}, \text{ where } \begin{bmatrix} d \\ v \\ a \\ j \end{bmatrix} \text{ are vehicle states and} \quad (14)$$

$$\begin{bmatrix} \dot{T}_e \\ \dot{T}_a \\ T_e \\ T_a \end{bmatrix} \text{ are vehicle controls}$$

The above model predictive control problem involves solving a nonlinear optimization problem at each time step to obtain a control action. After achieving the control action sequence, the immediate control action can be applied to the vehicle, and the future control actions can be ignored. This process is repeated at each control step. If general purpose optimization solvers are used for solving this model predictive control problem, they could be very slow, thereby imposing a serious restriction to implement it on real time embedded or rapid prototyping platforms. A custom solver can be implemented for this purpose which can be tailored to this application that significantly reduces the computational speed. In one implementation, a nonlinear interior point line search method can be used to solve the nonlinear optimization problem, where in the inequality constraints would be converted into equality constraints by using new variables called slack variables. To minimize infeasibilities and potentially to reduce the number of iterations at each control cycle, the optimization problem can be slightly relaxed to result in near optimal solutions. This can be done by converting the hard inequality constraints mentioned in (2) to (6) into soft inequality constraints by utilizing softening variables. The new optimization problem can be formulated as:

min $f_1(x)+f_2(e)$ subject to $g_i(x)=0, i=1,2,\ldots,m$ $r_i(x)+w_ie_i-s_i=0, i=1,2,\ldots,q$ $s_i \geq 0, i=1,2,\ldots,q$ \hfill (15)

Where x are the decision variables which are vehicle states and controls as mentioned in (14), $s_i$ are slack variables and $e_i$ are the softening variables. $f_1(x)$ is a cost function designed for a fuel-efficient adaptive cruise control, as mentioned in (1); $g_i(x)$ represents the vehicle dynamics equations for the entire prediction horizon from (7); $r_i(x)$ represent time-varying inequality constraints from (2) to (6) for the entire prediction horizon. $f_2(e)$ can be written as $$f_2(e) = \sum_{i=1}^{N_i} \sum_{k=1}^{N_p} Q_{e_i}(k)(e_i(k))^2 \quad (16)$$

Where $N_i$ represents the number of inequality constraints. Interior point method requires to find solution of a series of barrier problems of the form $$\min f_1(x) + f_2(e) - \mu \sum_{j=1}^{q} \ln(s_j) \quad (17)$$

subject to $g_i(x) = 0, i = 1, 2, \ldots, m$ $r_i(x) + w_i e_i - s_i = 0, i = 1, 2, \ldots, q$ The solution of the above problem can involve formulating the following Lagrangian function:

$$L(x,e,s,\lambda,z) = f_1(x) + f_2(e) - \mu \sum_{j=1}^{q} \ln(s_j) - \sum_{i=1}^{m} \lambda_i g_i(x) - \sum_{j=1}^{q} z_j(r_j(x) + w_j e_j - s_j) \quad (18)$$

Let $x^*$ be a regular point and a local minimum of the problem, if the functions are designed to be continuously differentiable, then KKT necessary conditions for optimality conditions for the barrier problem state that for a certain $\mu$, there exist unique Lagrange multipliers vectors $\lambda^*$ and $z^*$ such that $$\nabla_x L(x^*, e^*, s^*, \lambda^*, z^*) = 0 \quad (19)$$

$\nabla_e L(x^*, e^*, s^*, \lambda^*, z^*) = 0$ $-\frac{\mu}{s_j^*} + z_j^* = 0, \ldots, q$ $j = 1, 2, \ldots, q$ $g_i(x^*) = 0, i = 1, 2, \ldots, m$ $r_i(x^*) + w_i e_j^* - s_j^* = 0, j = 1, 2, \ldots, q$ $s_j^* \geq 0$, for all $j = 1, 2, \ldots, q$ $z_j^* \geq 0$, for all $j = 1, 2, \ldots, q$ The above are called Karush-Kuhn-Tucker (KKT) optimality conditions for the barrier problem. Since the optimization problem is nonlinear in nature, the equations that are resulting from KKT optimality conditions are also nonlinear. The optimal solution for the barrier problem (17) can be found by iteratively linearizing the nonlinear KKT equations (19) using Taylor's series expansion and solving the simultaneous linear algebraic equations. The simultaneous algebraic are of the form:

$$\begin{bmatrix} a_{11} & 0 & 0 & a_{14} & a_{15} \\ 0 & a_{22} & 0 & a_{24} & 0 \\ 0 & 0 & a_{33} & I & 0 \\ a_{14}^T & a_{24}^T & I & 0 & 0 \\ a_{15}^T & 0 & 0 & 0 & 0 \end{bmatrix} \begin{bmatrix} dx \\ de \\ ds \\ dz \\ d\lambda \end{bmatrix} = - \begin{bmatrix} R_1 \\ R_2 \\ R_3 \\ R_4 \\ R_5 \end{bmatrix} \quad (20)$$

$$\begin{bmatrix} dx \\ de \\ ds \\ dz \\ d\lambda \end{bmatrix}$$

Where is defined as the search direction. After obtaining the search direction, the new iterates can be found using:

$$\begin{bmatrix} x \\ e \\ s \\ \lambda \end{bmatrix}_{i+1} = \begin{bmatrix} x \\ e \\ s \\ \lambda \end{bmatrix}_i + \alpha_{1_i} \begin{bmatrix} dx \\ de \\ ds \\ d\lambda \end{bmatrix}_i \text{ and } z_{i+1} = z_i + \alpha_{2_i} dz_i \quad (21)$$

Where 'i' is the iteration counter of a barrier problem. The step sizes $\alpha_{1_i}$ and $\alpha_{2_i}$ can be found by line search algorithms. After finding the optimal solution of each barrier problem (17) by the above-mentioned method, the solution of the original optimization problem (16) can be found by iteratively reducing μ.

The optimization problem in (17) will have in $23N_p + 15N_c$ number of decision variables. The presence of high number of decision variables and nonlinear nature of the problem imposes a huge computational burden. To speed up the computation, sparsity of the matrix on the left of left-hand side of equation (20) can be utilized along with some modifications to the optimization. In the first step this matrix can be reduced in size by performing some row operations and eliminating row 3 as follows:

$$ds = -a_{33}^{-1}(dz + R_3) \quad (22)$$

The reduced problem can be written as:

$$\begin{bmatrix} -Q & F \\ F^T & M \end{bmatrix} \begin{bmatrix} -dU \\ dV \end{bmatrix} = -\begin{bmatrix} W_1 \\ W_2 \end{bmatrix} \quad (23)$$

Where $$Q = \begin{bmatrix} a_{11} & 0 \\ 0 & a_{22} \end{bmatrix}, qF = \begin{bmatrix} a_{14} & a_{15} \\ a_{24} & 0 \end{bmatrix}, M = \begin{bmatrix} a_{33}^{-1} & 0 \\ 0 & 0 \end{bmatrix}, \quad (24)$$

$$dU = \begin{bmatrix} dx \\ de \end{bmatrix}, dV = \begin{bmatrix} dz \\ d\lambda \end{bmatrix}, W_1 = \begin{bmatrix} R_1 \\ R_2 \end{bmatrix}, W_2 = \begin{bmatrix} a_{33}^{-1} R_3 - R_4 \\ -R_5 \end{bmatrix}$$

In one implementation, the optimization problem can be designed such that matrix Q is of block diagonal form with no zero eigen values. Then, instead of solving (23) as whole, it can be broken down into smaller parts, which can be solved separately:

$$(M + F^T Q^{-1} F) dV = -(W_2 + F^T Q^{-1} W_1) \quad (25)$$

$$QdU + FdV = -W_2 \quad (26)$$

Where $Q = \begin{bmatrix} Q_{11} & 0 & \cdots & 0 \\ 0 & Q_{22} & \cdots & 0 \\ \vdots & \vdots & \ddots & \vdots \\ 0 & 0 & \cdots & Q_{pp} \end{bmatrix}$ and $Q^{-1} = \begin{bmatrix} Q_{11}^{-1} & 0 & \cdots & 0 \\ 0 & Q_{22}^{-1} & \cdots & 0 \\ \vdots & \vdots & \ddots & \vdots \\ 0 & 0 & \cdots & Q_{pp}^{-1} \end{bmatrix} \quad (27)$ This can significantly speed up the computation time.

In one implementation, the matrix $(M + F^T Q^{-1} F)$ can be designed such that it always positive definite. In this case, equation (25) can be solved by taking Cholesky factorization of this matrix. Let $$Y = (M + F^T Q^{-1} F) \quad (28)$$

In addition, if Q is block diagonal, as described above, then Y can take the form:

$$Y = \begin{bmatrix} Y_{11} & Y_{12} & 0 & \cdots & 0 & 0 \\ Y_{12}^T & Y_{22} & Y_{23} & \cdots & 0 & 0 \\ 0 & Y_{23}^T & Y_{33} & \cdots & 0 & 0 \\ \vdots & \vdots & \vdots & \ddots & \vdots & \vdots \\ 0 & 0 & 0 & \cdots & Y_{T-1,T-1} & Y_{T-1,T} \\ 0 & 0 & 0 & \cdots & Y_{T-1,T}^T & Y_{TT} \end{bmatrix} = LL^T \quad (29)$$

where $$L = \begin{bmatrix} L_{11} & 0 & 0 & \cdots & 0 & 0 \\ L_{21} & L_{22} & 0 & \cdots & 0 & 0 \\ 0 & L_{32} & L_{33} & \cdots & 0 & 0 \\ \vdots & \vdots & \vdots & \ddots & \vdots & \vdots \\ 0 & 0 & 0 & \cdots & L_{T-1,T-1} & 0 \\ 0 & 0 & 0 & \cdots & 0L_{T,T-1} & L_{TT} \end{bmatrix} \quad (30)$$

Let $$L^T dV = T \quad (31)$$

Then, (28) can be re-written as $$LL^T dV = LT = -(W_2 + F^T Q^{-1} W_1) \quad (32)$$

The above equation can be first solved to obtain T. Next, after obtaining T, the below could be solved to obtain dV $$L^T dV = T \quad (33)$$

Solving both (32) and (33) can be very inexpensive in terms of computation time because of the block lower triangular nature of the matrix L.

In another implementation, computation time can be reduced by using a fixed iteration limit. Although this might affect optimality of the solution, the effect can be minimal since only a small part of the solution can be implemented as the actual control command and the optimization problem can be solved again at the next time step, and therefore the solution will improve over time. In another implementation, a warm start can be utilized when possible. The use of a warm start means that the solution to the previous time step should be an initial guess for the solution of the next step.

Many vehicles now a days have more than one driving mechanism and more than one retardation mechanism. For example, there are vehicles with a combination of an internal combustion engine, electric motor etc. For retardation some vehicles use a combination of regenerative brakes, service brakes, engine brakes, transmission brakes, etc. Considering all the actuators directly in predictive control problem (1) could significantly increase the complexity of problem. Specifically, if the higher-level control is based on optimization, the number of optimization variables increase significantly. In addition to this, these actuator dynamics are faster than the vehicle dynamics. This adds a requirement that the vehicle dynamic control algorithms need to be run at a faster sampling time, which results in a significantly increased computation burden. The hierarchical control architecture of the functions performed by the one or more predictive controllers 165 can reduce the computation burden and at the same time not impact the control performance. In this implementation, the torque actuators can be faster than the vehicle dynamics. Therefore, the actuator control can separate from the vehicle dynamics and a lower level controller can be designed which considers the actuator dynamics and generates desired torque signal for each individual actuator. This approach does not significantly impact the performance, while significantly reducing the computation time of optimization based higher level control algorithms.

Since different actuators have different dynamics and different operating costs, they can be associated with different priorities in different scenarios. An optimization-based control scheme naturally enables priorities to be set for different controllers. The controller performance can be improved if a constrained optimization is used because all these actuators have their own limitations (different minimum and maximum torques are supported by each actuator). A constrained-optimization based control approach enables the limitations to be considered explicitly in the control design. Control performance can be further improved by preview control. A preview control in this context enables the planning of the actuator resources by utilizing the preview information pertaining to the total desired torque from the vehicle dynamic controller/vehicle stability controller/wheel dynamic controller. The priorities, constraints and preview information can be for example be derived based on location, overheating, brake pad life, high wheel/vehicle dynamics, minimizing switching between different actuators and the like. With regard to location, there can be certain location where engine retardation is not permitted. Using GPS, camera and maps, such locations can be determined and the engine retardation mechanism can be disabled. In hilly areas excessive usage of service brakes might result in overheating and increased wear on the brake pads. In these scenarios, the higher priority can be given to the other retardation mechanisms. When the service brakes are overheated, it reduces the braking performance and might reduce the brake pad life if the brakes are continued to be used. In these scenarios, lower priority could be given to the service brakes. A high wheel dynamic scenario (for example, high wheel longitudinal slip and/or side slip) could cause the vehicle to be near the limits of stability and traction. This could result in an activation of one or more controllers such as vehicle stability control, traction control, antilock-brakes etc. Vehicle stability control systems can utilize the differential braking mechanism to generate/counteract a yaw movement by manipulating brake pressures on each wheel. Wheel dynamic control systems such as anti-lock brakes and traction control improves the braking/traction/lateral forces by manipulating the wheel slips. In these scenarios, service brakes shall be used, and other forms of braking may have to be disabled. The priorities and constraints of these different actuators can hence be derived accordingly.

In one implementation, the preview control problem can be formulated by finding the desired torque from all actuators that lie before the gearbox $T_{e_{des}}$ and or the desired torque from all the actuators that lie after gearbox $T_{a_{des}}$, in accordance with Equations (34)-(40).

$$\text{minimize } J = \sum_{k=1}^{N_p} Q_{te}(k)\left(T_{e_{ref}}(k) - T_e(k)\right)^2 + \quad (34)$$

$$\sum_{k=1}^{N_p} Q_{ta}(k)\left(T_{a_{ref}}(k) - T_a(k)\right)^2 + \sum_{i=1}^{n}\sum_{k=1}^{N_p} Q_{e_i}(k)\left(T_{e_{i_{ref}}}(k) - T_{e_{i_{des}}}(k)\right)^2 +$$

$$\sum_{i=1}^{m+p}\sum_{k=1}^{N_p} Q_{a_i}(k)\left(T_{a_{i_{ref}}}(k) - T_{a_{i_{des}}}(k)\right)^2 +$$

-continued $$\sum_{i=1}^{n}\sum_{k=1}^{N_p} Q_{erate_i}(k)\left(T_{e_{i_{des}}}(k) - T_{e_{i_{des}}}(k-1)\right)^2 +$$

$$\sum_{i=1}^{m+p}\sum_{k=1}^{N_p} Q_{arate_i}(k)\left(T_{a_{i_{des}}}(k) - T_{a_{i_{des}}}(k-1)\right)^2$$

subject to the dynamics $$T_e = T_{e_1} + T_{e_2} + \ldots T_{e_n} \quad (35)$$

$$T_a = r_d(T_{a_1} + T_{a_2} + \ldots T_{a_m}) + (T_{a_{m+1}} + T_{a_{m+2}} + \ldots T_{a_{m+p}}) \quad (36)$$

$$T_{e_i} = \frac{e^{-\tau_{ed_i}s}}{\tau_{e_i}s + 1} T_{e_{i_{des}}}, i = 1, 2 \ldots n \quad (37)$$

$$T_{a_i} = \frac{e^{-\tau_{ad_i}s}}{\tau_{a_i}s + 1} T_{a_{i_{des}}}, i = 1, 2 \ldots m + p \quad (38)$$

and subject to the constraints of $$T_{e_{i_{min}}} < T_{e_{i_{des}}} < T_{e_{i_{max}}}, i = 1, 2, \ldots n \quad (39)$$

$$T_{a_{i_{min}}} < T_{a_{i_{des}}} < T_{a_{i_{max}}}, i = 1, 2, \ldots m + p \quad (40)$$

Where k is a prediction horizon step, $T_{e_i}$ and $T_{a_i}$ are the actual torque of each individual actuator that lie before and after the gearbox respectively in a vehicle transmission, $$T_{a_{i_{des}}} \text{ and } T_{e_{i_{des}}}$$

are the desired torques from their respective actuators which are also the control signals, $$T_{e_{i_{min}}}, T_{e_{i_{max}}} \text{ and } T_{a_{i_{min}}}, T_{a_{i_{max}}}$$

are minimum and maximum torques provided by their respective actuators, $T_{e_{ref}}$ and $T_{a_{ref}}$ are total reference torque signals that can be derived from higher level optimization based vehicle dynamic controllers, such as the one presented in [0031]. $\tau_{e_i}, \tau_{a_i}$ refer to the time constant and $\tau_{ed_i}, \tau_{ad_i}$ refer to the pure time delay of the respective actuator dynamics. n is the number of torque actuators that reside before the gearbox, m is the number of torque actuators that reside after the gearbox and before the wheels and finally p is the number of torque actuators that are connected directly to the wheels. Q's are respective weights and $Q_{e_i}$, $Q_{a_i}$ are the weights that are to be set according to the desired priorities, which may be set according to the scenarios mentioned in the previous section.

Figure 20:
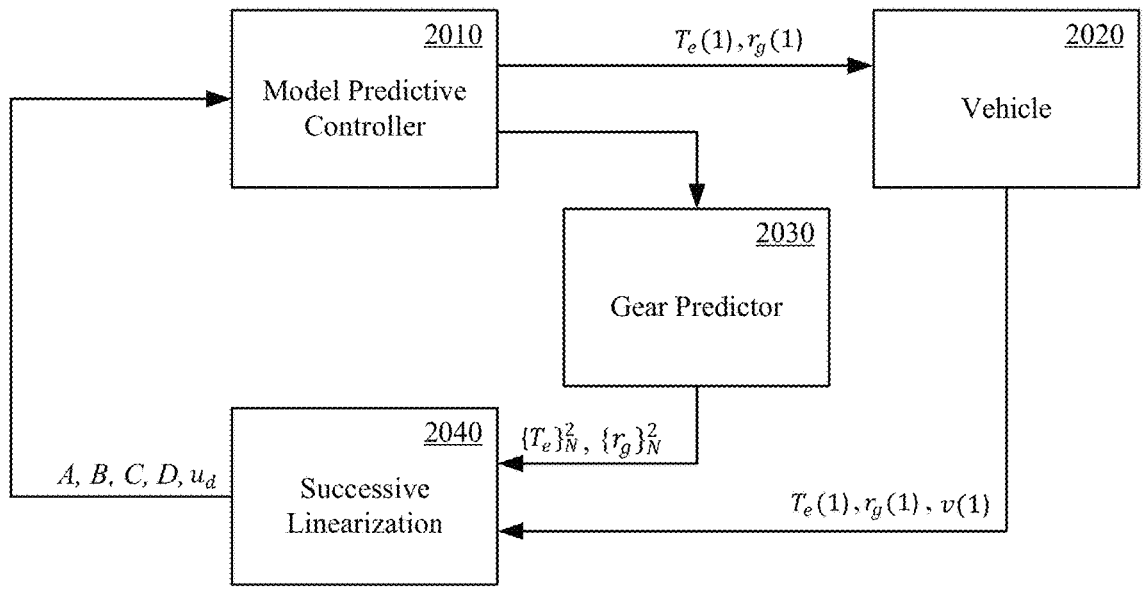
FIG. 20 shows a predictive controller utilizing linearization, in accordance with aspects of the present technology.

Referring now to FIG. 20, a predictive controller utilizing linearization, in accordance with aspects of the present technology. The predictive controller 2010 can be coupled to the ground vehicle 2020, a gear predictor 2030 and a successive linearization module 2040. The predictive controller 2010 can be a Model Predictive Controller (MPC). One or more of vehicle dynamics can be subject to successive linearization. In one implementation, nonlinearities of Equations 7-10 can be subject to successive linearization at each sample time, and then Equations 1-10 can be solved using the linearized form of Equations 7-10. The first output of the optimized control sequence can be applied to the vehicle 2020, while the rest of the sequence can be used for predicting a likely gear and can be used for linearization of equations 7-10 during the next control cycle. The (A, B, C, D) matrices represent the linearized dynamics and $u_d$ represents the road gradient for the next prediction horizon. The MPC can be responsible for finding the optimal Torque sequence $\{T_a\}k$ where N represents the control horizon as described in Equation 2. Finding the gear ratio (which belongs to a set of discrete elements) can be found using several methods.

Figure 21:
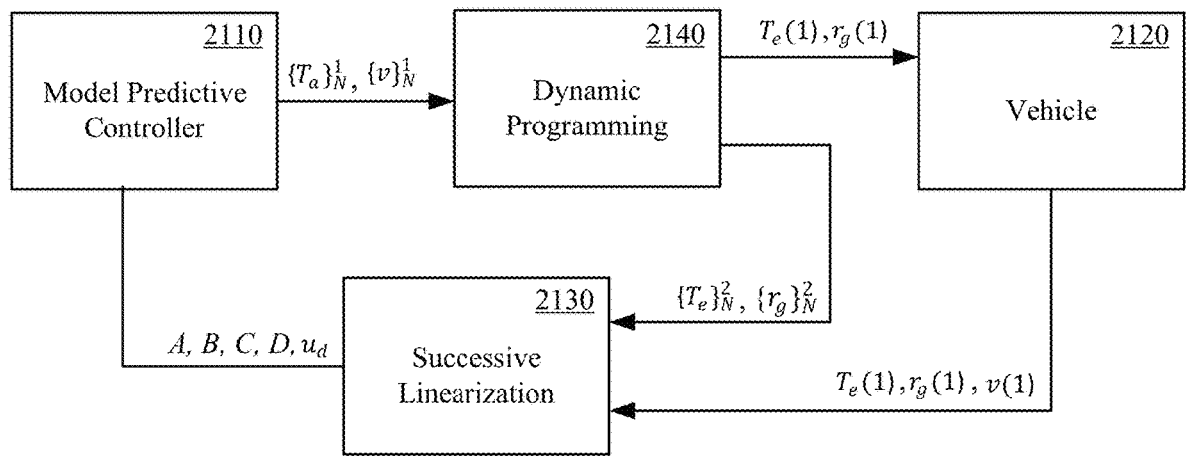
FIG. 21 shows a predictive controller utilizing linearization, in accordance with aspects of the present technology.

Referring now to FIG. 21, a predictive controller utilizing linearization, in accordance with aspects of the present technology, is shown. The predictive controller 2110 can be coupled to the ground vehicle 2120, a successive linearization module 2130 and a dynamic programming module 2140. In one implementation, the predictive controller 2110 can be a model predictive controller (MPC). The MPC can be utilized to find the optimal Torque ($T_e$) and then a search algorithm such as dynamic programming can find the optimal corresponding gear ratio ($r_g$).

Figure 22:
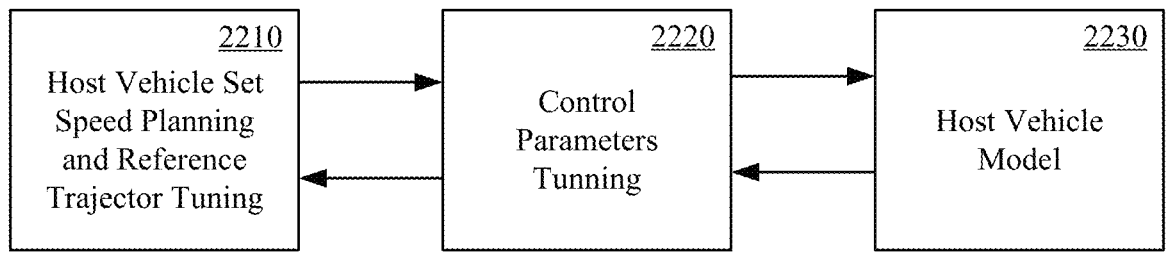
FIG. 22 shows a system for tuning weights of the vehicle control model, in accordance with aspects of the present technology.

Since the control parameters including weight factors, prediction horizons and constraint parameters can influence the closed-loop behavior, stability, robustness, safety and economic issues, development of a model predictive control parameter tuning system can be important. Also, set speed planning and tuning of the reference trajectories used to ensure a smooth transition from the current output values to the desired set point values can be important for performance as well. Referring now to FIG. 22, a system for tuning parameters of the vehicle control model, in accordance with aspects of the present technology, is shown. The system can include a reference trajectory tuning and set speed planning module 2210, a tuning module for a model predictive controller 2220 and a vehicle model 2230. The tuning modules can be formulated as a learning, optimization or logic based problems. Reinforcement learning, Monte Carlo Simulation technique and fuzzy rule-based inference system are some ways to deal with the problem. The energy efficient driving controls can be enhanced with prior knowledge of the current route as well as detailed knowledge of route characteristics.

Figure 23:
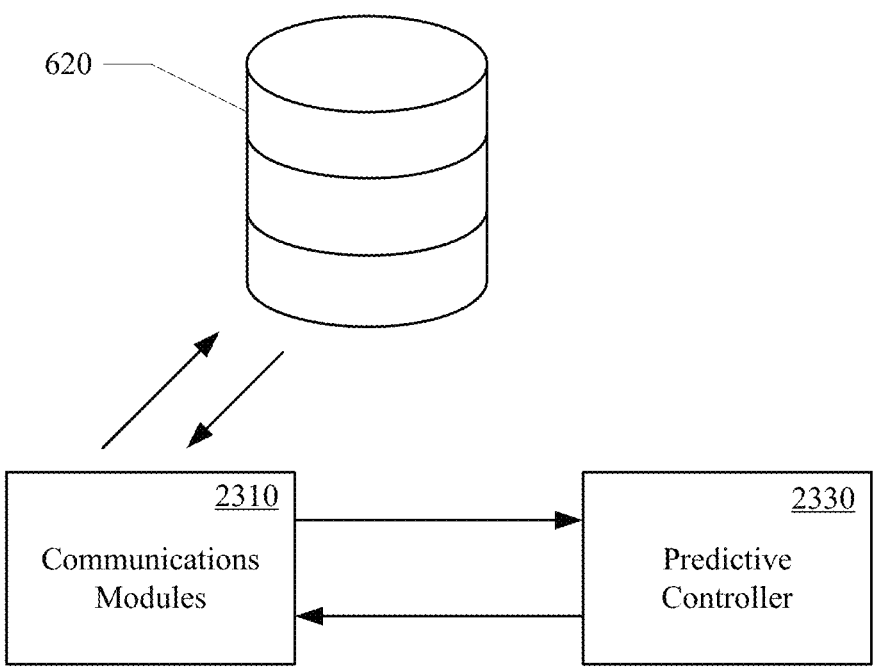
FIG. 23 shows a data communication interface, in accordance with aspects of the present technology.

Referring now to FIG. 23, a data communication interface, in accordance with aspects of the present technology, is shown. The one or more data communication interfaces 2310 can be receive information from one or more data sources 2320 that can be utilized by the one or more predictive controllers 2330. For example, one or more current roadway topography, future roadway topography, traffic information, traffic control device status and environment information include curvature information, grade information, traffic conditions, weather, road conditions, posted speed limits can be received in real time from one or more of a cloud sources. The cloud data can be transmitted to the communications module via WIFI or cellular and then to the predictive controller over CAN using the ADASIS standard. In other instance, the information can be received from maps stored on the ground vehicle. The route information can be used to accurately optimize the behavior of the ground vehicle over the route or a portion of the route that the ground vehicle is currently on. Additionally, onboard sensors can be used to estimate the current route characteristics and update the map if there are discrepancies.

The ground vehicle control system should maintain a safe distance to one or more leading vehicles, while trying to follow a set speed. The set speed could come from the driver or from the one or higher level controllers, that may take into account one or more of safe travel speeds, map data, curvature and posted speed limits, or autonomous driving agents. The one or more predictive controllers can be configured to optimize energy consumption based on a lead vehicle model. The lead vehicle model is based on one or more of a predicted future acceleration, a velocity, and or a position of one or more lead vehicles, and a receding horizon control strategy. A lead vehicle model that captures the leading vehicle driver's or autonomous system's intent can help improve not only the speed and distance control performance, but can also improve the fuel efficiency of the ground vehicle. The lead vehicle's future acceleration, velocity and position, along with a receding horizon control strategy can be utilized to optimize the control performance and the fuel efficiency of the given ground vehicle.

In one implementation, the driving pattern of the leading vehicle can be observed using radars, cameras, LIDAR's, etc. The driving pattern along with posted speed limits, traffic information and other environment information can be used by machine learning algorithms to predict its future acceleration or speed. In one example, if the turn signal of the leading vehicle is on, the map data indicates that there is an exit and the lead vehicle is decelerating, machine learning can be used to predict the likelihood of the vehicle taking the exit and hence its probable future lead vehicle speed. This speed information can then be used to determine the lead vehicle future position. In another example, a lead vehicle might exhibit oscillatory speed behavior. This information along with traffic information that is determined using camera or other sources can be used to predict the likelihood of the lead vehicle continuing to exhibit this behavior in the future. The lead vehicle's probable future acceleration/speed can be determined accordingly. By identifying driving cycles of a lead vehicle, not only can the one or more predictive controller better predict the leading vehicle state in the future which helps with the controller performance, the one or more predictive controllers can also dynamically change the control strategy or parameters thereof to adapt to the changes of the observed driving patterns.

The ground vehicle control system 1805 can further include one or more backup controllers 1870. The control of the ground vehicle can switch to control by one or more backup controllers 1870 when energy consumption optimization is not feasible, there is a convergence issue, in the event accurate mass or other parameters are not available or accurate, or in high deceleration events. The ground vehicle control system 1850 can switch to a backup controller 1870 that becomes response for providing a safe, fuel efficient cruise control, until the predictive controller can come back online. Control of the ground vehicle can switch back from the one or more backup controllers 1870 when the one or more predictive controllers 1865 can converge to energy consumption optimization within a prescribed iteration limit, the one or more controllers calculate a satisfactory control signal and the backup controller has been operating for a predetermined amount of time In one implementation, feedback linearization can be utilized to transform a system based on Equation 11 to a linear system. In another implementation, a disturbance observer can be utilized to compensate for the disturbances in the uncertainties in Equation 11. In yet another implementation, a Linear Quadratic (LQR) controller can be utilized for reference tracking, such as speed and relative distance, while minimizing instantaneous fuel consumption. In other implementation, a robust adaptive controller can be utilized that estimate the varying parameters and provides a corresponding stabilizing control signal that is robust to uncertainties in Equation 11. Furthermore, if robustness is critical for safe operation, the disturbance observer and the Linear Quadratic (LQR) controller can be replaced by either a robust $H_\infty$ controller, a mu-controller, a mixed objective $H_2/H_\infty$, or the like.

Figure 24A:
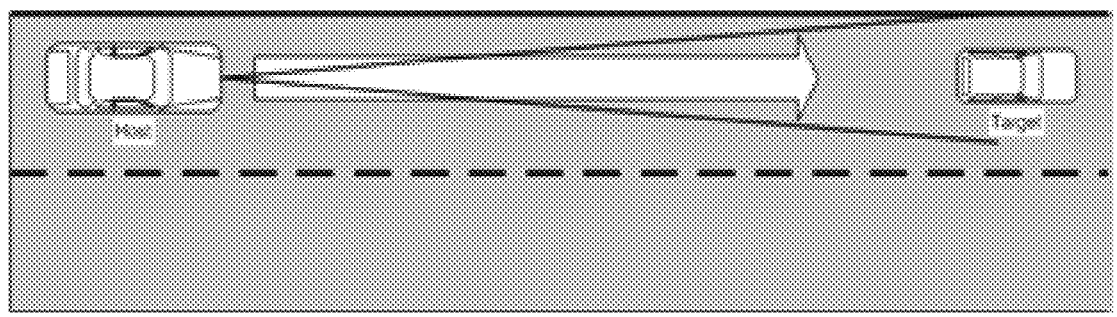
FIGS. 24A-24E illustrate various lead vehicle scenarios.
Figure 24B:
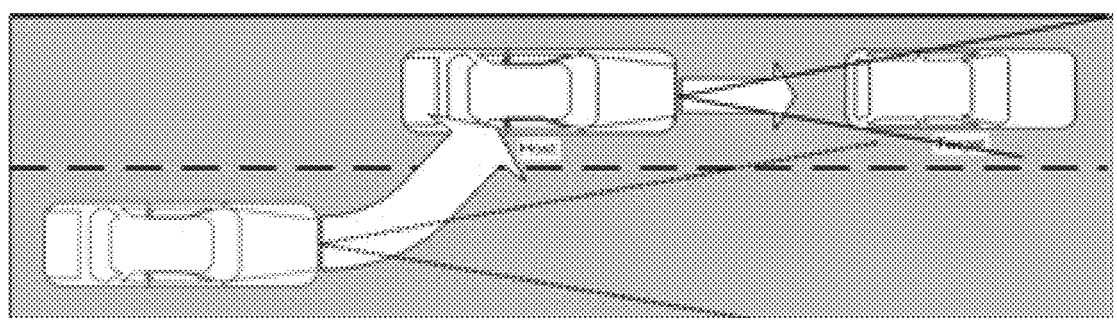
Figure 24C:
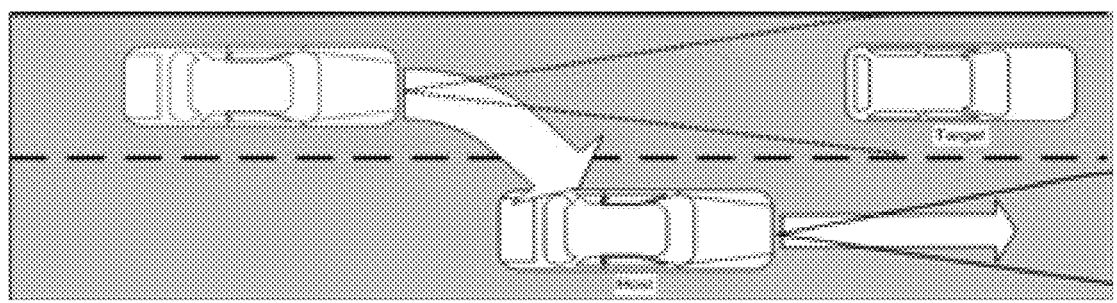
Figure 24D:
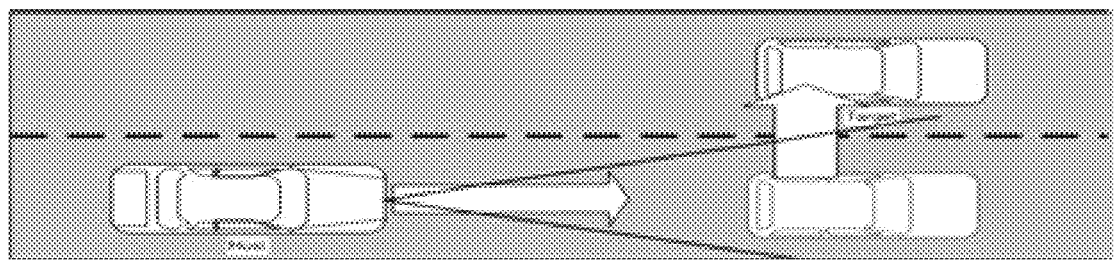
Figure 24E:
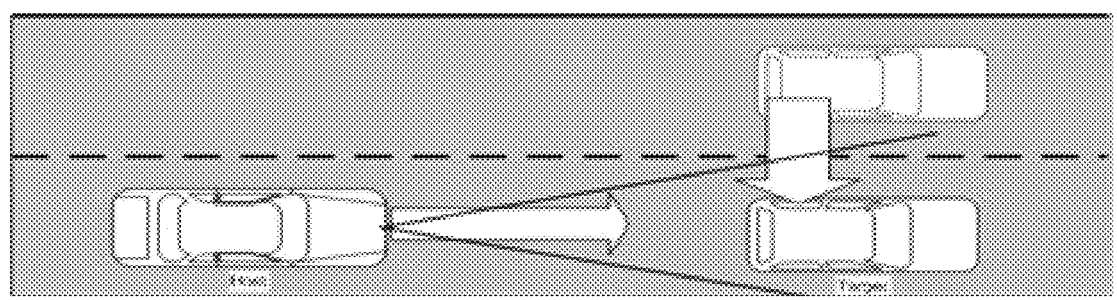

Referring again to FIG. 18, the ground vehicle control system can be configured to identify particular scenarios that the vehicle is in. The scenarios can include, but are not limited to, approaching an impeding vehicle as illustrated in FIG. 24A, the host vehicle driving in behind an impeding vehicle as illustrated in FIG. 24B, the host vehicle driving out from behind an impeding vehicle as illustrated in FIG. 24C, an impeding vehicle cutting out as illustrated in FIG. 24D, and an impeding vehicle cutting in as illustrated in FIG. 24E. The identified scenarios describe the behavior of the surrounding traffic relative to the host ground vehicle, the state of the host ground vehicle, the intention of the drivers, map data and or the like. The scenarios can be determined using information about the surrounding vehicles, such as the velocity, distance, type of vehicle brake light activation, current lane, past behavior and the like of one or more surrounding vehicles. Additionally, information can be utilized from the host vehicle, including velocity, current lane, acceleration, and mass, as well as driver input information such as steering wheel angle, brake activation, and throttle percentage, which can also be used to determine the driver's intended behavior. In one implementation, all this information can be used by machine learning classification algorithms to perform scenario classification. After classifying the scenarios appropriately, the predictive controller tuning can be adjusted online to improve energy efficiency and safety. In one implementation, the classification information can be utilized by optimization based predictive controller mentioned in equations (1) to (14) to adjust the cost function weights of equation (1) and/or relax or tighten the constraints mentioned in (2)-(6). In one example, if an impeding vehicle cuts in, is travelling faster than the host vehicle, and the relative distance is not too small, then the constraint (2) may be relaxed. This helps to reduces the necessity for the host vehicle to decelerate while also maintaining safe operating conditions. In another example, an impeding vehicle drives out that was originally travelling slower than the set speed of the host vehicle. Until the absence of another lead vehicle that is travelling slower than the host vehicle is confirmed or a certain time elapses, the weights weight $Q_v$ can be reduced and/or $Q_a$ from equation (1) can be increased to help reduce unnecessary host vehicle acceleration/decelerations. This particularly helps when there is an impeding vehicle that is travelling slower in the same lane immediately after a drive out. In both these example scenarios, scheduling the gains online based on scenario recognition not only helps reduce the energy consumption, but also improves safety, comfort, reduces the usage of brakes, etc.

The one or more controllers can include one or more predictive controllers configured to determine a target speed window based on one or more of one or more ground vehicle operating parameters and one or more driving environment parameters. The one or more predictive controllers can also be configured to determine a host vehicle performance plan based on the target speed window and one or more of the one or more ground vehicle operating parameters, the driver control inputs and the one or more driving environment parameters including the at least one predicted driving environment parameter to reduce one or more of energy consumption and vehicle retardation by a ground vehicle.

Figure 25:
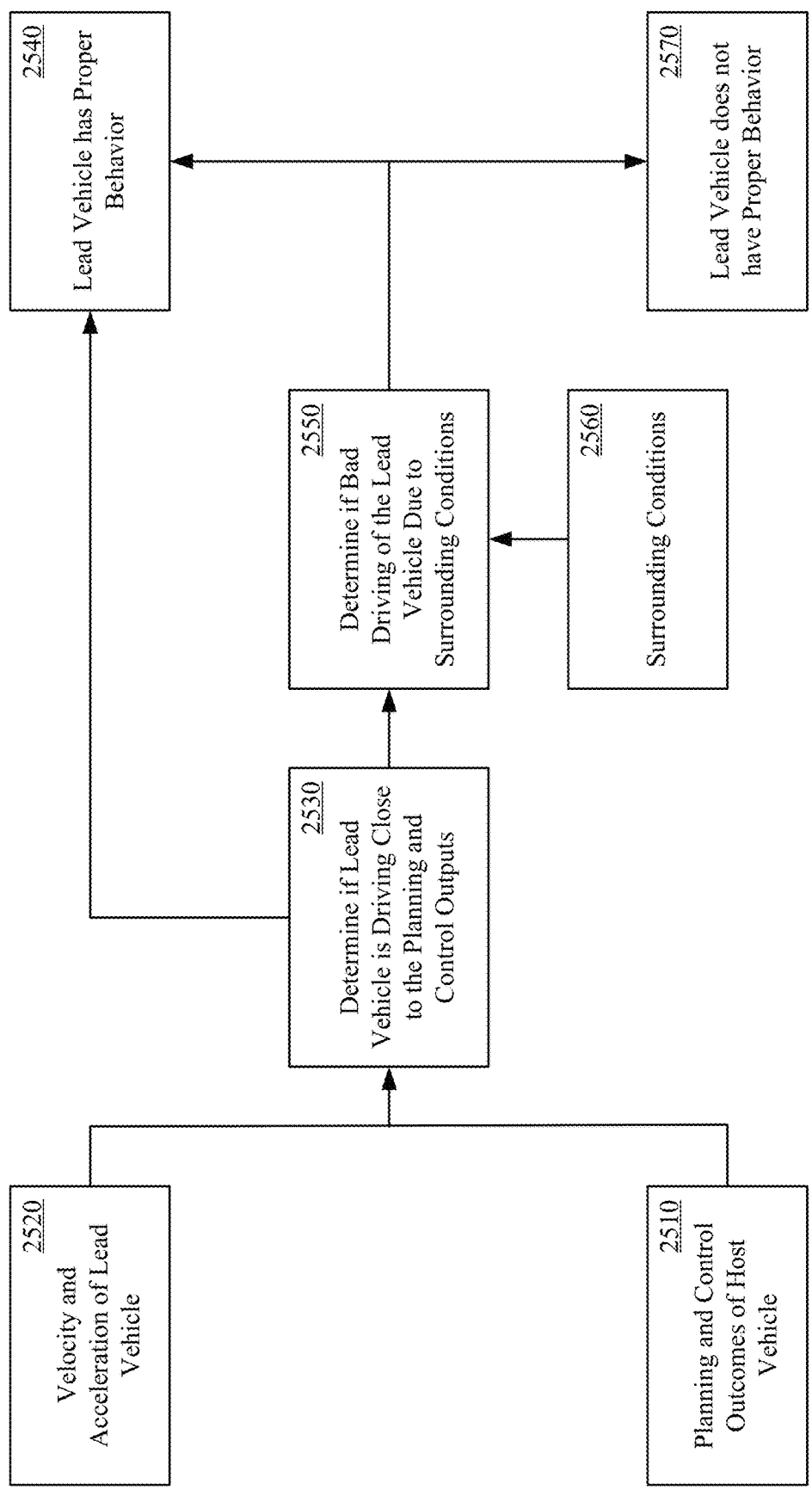
FIG. 25 shows a method of classifying behaviors of lead vehicles, in accordance with aspects of the present technology.

Referring now to FIG. 25, a method of classifying behaviors of lead vehicles, in accordance with aspects of the present technology, is shown. The one or more controllers can be further configured to compare the host vehicle performance plan 2510 to the one or more driving scenarios of the one or more surrounding vehicles 2520. Based on the comparison, it can be determined if the lead vehicle is driving close to the planning and control output for the host vehicle 2530. If the lead vehicle is driving close to the planning and control outputs, the lead vehicle can be categorized as having proper behavior 2540. If it is determined that the lead vehicle is not driving close to the planning and control outputs of the host vehicle, it can be determined if the potentially bad driving of the lead vehicle is due to surrounding conditions 2550, 2560. If the potentially bad driving of the lead vehicle is due to surrounding conditions, the lead vehicle can be categorized as having proper behavior 2540. If the potentially bad driving of the lead vehicle is not due to surrounding conditions, the lead vehicle can be categorized as not having proper behavior 2570. Accordingly, the one or more controllers can classify one or more surrounding vehicles based on differences between the host vehicle performance plan and the one or more driving scenarios of the one or more surrounding vehicles. The one or more controllers can also be configured to tune the one or more driver control inputs and the one or more ground vehicle operating parameters based on the one or more driving scenarios. The ground vehicle control system can have parameters that can be tuned to achieve a desired performance, although certain parameter values that are optimal in one scenario may not be optimal in others. One strategy can be to manually or automatically tune the parameters for each of the identified scenarios and implement the corresponding tuning once the scenario is recognized.

In comparing the host vehicle performance plan 2520 to the one or more driving scenarios of the one or more surrounding vehicles 2520, the one or more controllers can be configured to initially compare the acceleration/deceleration profile plan to a velocity and an acceleration of the one or more surrounding vehicles to initially determine a good or bad categorization 2530, 2540 for each of the one or more surrounding vehicles using machine learning. The one or more controllers can then further compare operating parameters, driver control inputs, and one or more driving environment parameters for the host vehicle to the velocity, acceleration, distance, type of vehicle signal light activation, current lane, and past behavior of the one or more surrounding vehicles to determine the good or bad categorization 2530, 2540 of each of the one or more surrounding vehicles. The one or more controllers can be configured to generate a suggested lane change signal for output to a driver of the host ground vehicle on one or more of the human-machine-interfaces when a bad categorization of a given one of the one or more surrounding vehicles indicates a velocity of the host ground vehicle is greater than the given surrounding vehicle or one or more inappropriate accelerations or braking events by the given surrounding vehicle. However, when one or more of the velocity, acceleration/deceleration, distance or type of vehicle signal light activation is due to heavy traffic or approaching a traffic control signal the one or more controllers can be configured to not generate the suggested lane change signal. In addition, the one or more controllers can be configured to not generate the suggested lane change signal until the bad categorization of the given surrounding vehicle persists for a predetermined period of time.

In one implementation, the information for both the lead vehicle and the host vehicle can then be compared. If the velocity and acceleration of the lead vehicle is close to the planning and control outputs of host vehicle, it can be concluded that the lead vehicle is exhibiting proper behavior. Otherwise, the behavior of the lead vehicle can be classified based on velocity and acceleration characteristics, such as low constant speed, sharp brakes, numerous speed fluctuations and the like. Next, various conditions, such as traffic, weather and the like, can be collected and combined with the classification part to make a final decision as to whether the lead vehicle is exhibiting a good behavior or not. On the other hand, there can be some input that can directly help to determine the behavior of the lead vehicle, such as activation of warning flasher on the lead vehicle.

Sometimes lane changes are inevitable, and it can result in better fuel efficiency. There can be a couple of technical reasons for changing lanes. For example, if a motion planner is used for determining set speed and it suggests a velocity for the ground vehicle that is more than the lead vehicle's velocity, a lane change is desired. In another example, a lead vehicle can exhibit inappropriate acceleration and braking cycles which can adversely affect the fuel efficiency of the host ground vehicle, even though the lead vehicle is driving at an acceptable velocity. However, if the lead vehicle is move at a very low speed, it may be advantageous to determine the reason behind the slow speed of the lead vehicle. For example, if it is due to heavy traffic or an approaching traffic control signal, it may be beneficial to avoid a lane change. In addition, it may be advantageous for the lane change algorithm to wait for a period of time before outputting a signal for executing a lane change. The waiting period can prevent lots of possible lane changes that could have an adverse effect of fuel efficiency. In addition, it can be advantageous for the ground vehicle control system to recognize specific types of lead vehicle, such as police cars, to make a next decision.

The one or more controllers can also be tuned based on a driver state. In such case, the one or more controllers can be configured to determine a driver attention state based on or more of driver gaze information or head position information. The one or more controllers can include one or more machine learning vision controllers configured to determine one or more of the drive gaze information or the head position information. The one or more controllers can also be configured to determine a sleepy driver attention state from one or more of the driver gaze information or head position information. The one or more controllers can also be configured to determine a distracted driver attention state from one or more of the driver gaze information or the head position information. The one or more control parameters can be tuned by the one or more controllers based on the determined driver attention state. In one implementation, if we determine that the driver is inattentive, the following distance to a leading vehicle can be increased and/or the vehicle set speed can be set towards the lower end of minimum maximum speed band. The one or more controllers can be further configured to determine the driver attention state based on how much the driver complies with the one or more driver recommendation type control signals output to the driver on one or more human-machine-interfaces.

To understand how many time a driver is sleepy and for how long, visual eye recognition can be a good option. Another way to recognize a sleepy driver can be to detect head drop movement and head acceleration and/or velocity. Machine learning techniques can be used to extract sleepy state from eye recognition and or head drop recognition.

The planning of the acceleration/deceleration profile can include determining one or more traffic control devices within a prediction horizon segment from one or more of the road preview information and the environment information. A traffic control strategy can be determined based on timing information for the one or more traffic control devices within the prediction horizon.

In one implementation, the one or more predictive controllers can detect traffic control devices, such as traffic lights, in a prediction horizon and can access signal timing information. Based on the number of traffic signal in the prediction horizon, an optimization problem can be formulated to figure out what is the optimal strategy in terms of saving fuel and time. Based on the length of the prediction horizon, and depending upon the location of the traffic signal, the predictive controller can estimate an upper limit on the number of signal that can be present in the prediction horizon, and solve a permutation the optimization problem to determine the optimal scenario. For example, if there are two traffic signal present in the prediction horizon, the predictive controller can solve for the four possible scenarios to determine the optimal solution which can include: 1) accelerate to pass all signals without stopping, 2) accelerate to pass the first signal and then slow down to wait for the second signal to turn green, 3) decelerate to wait for the first signal to turn green and then accelerate to pass the second signal before it turns red, and 4) decelerate to wait for both signals to turn green. A main constraint, in such examples, can be to avoid stopping the vehicle and thereby save energy from the momentum of the ground vehicle, and also to reduce travel time.

The one or more controllers can be configured to determine a difference between driver inputs and the one or more control signals in the assist mode or coaching mode. The one or more controllers can also be optimized based on the difference between the driver inputs and the one or more control signal in the assist mode. Alternatively, the difference can be used by introducing another term in the optimization cost function or in the constraints as described above with reference to FIG. 18. Similarly, the one or more controllers can be configured to determine a rate of change in the difference between driver inputs and the one or more control signals over time in the assist control mode. The one or more controllers can also be optimized based on the rate of change in the difference between driver inputs and the one or more control signals over time in the assist mode. The difference between driver input and the one or more control signals can be used to assess the performance of the driver in coaching mode. The rate of change in the difference between driver inputs and the one or more control signals over time can provide an indication of the learning capability of the driver.

Figure 26:
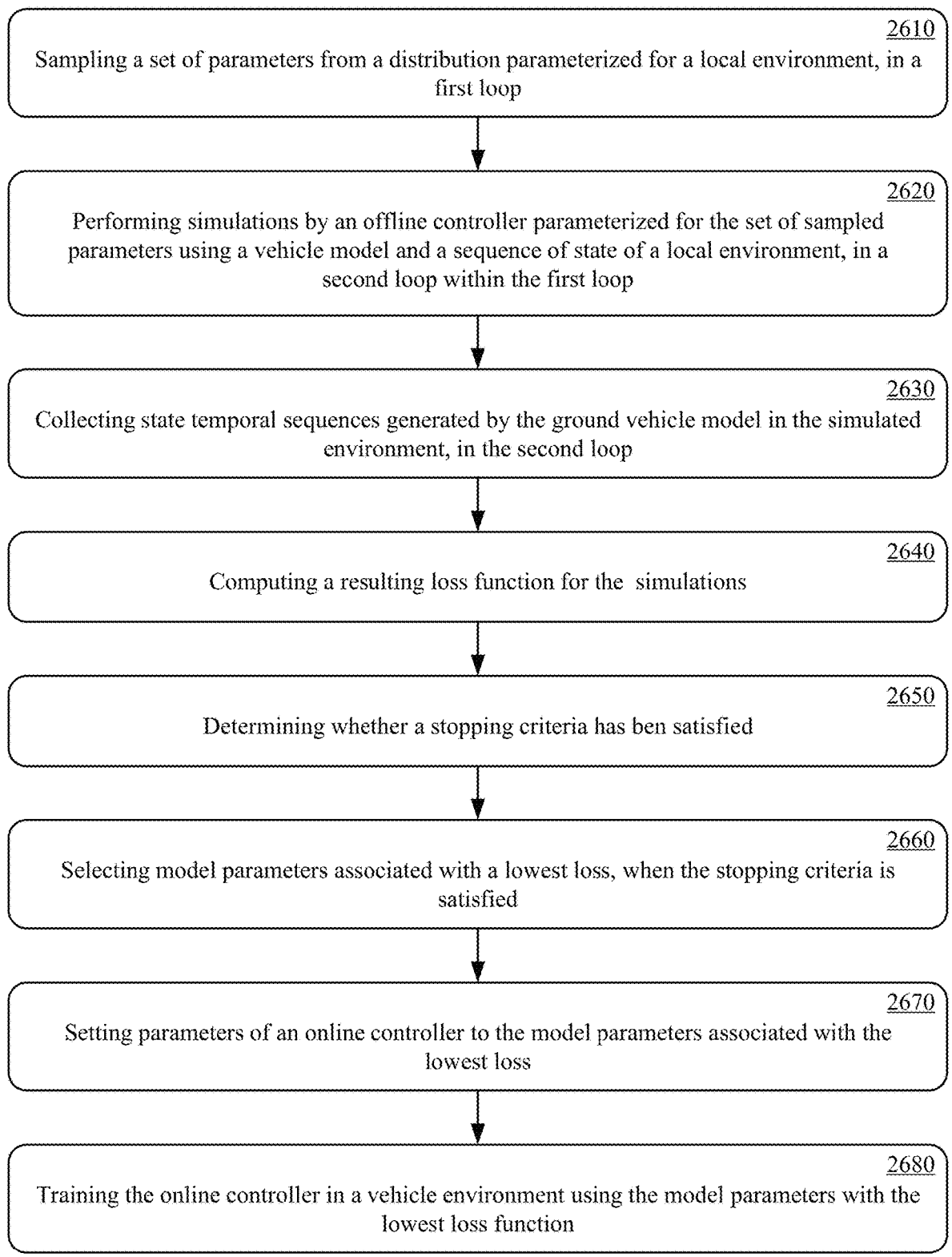
FIG. 26 shows a Monte Carlo base training of a reinforcement leaning controller, in accordance with aspects of the present technology is shown.
Figure 27:
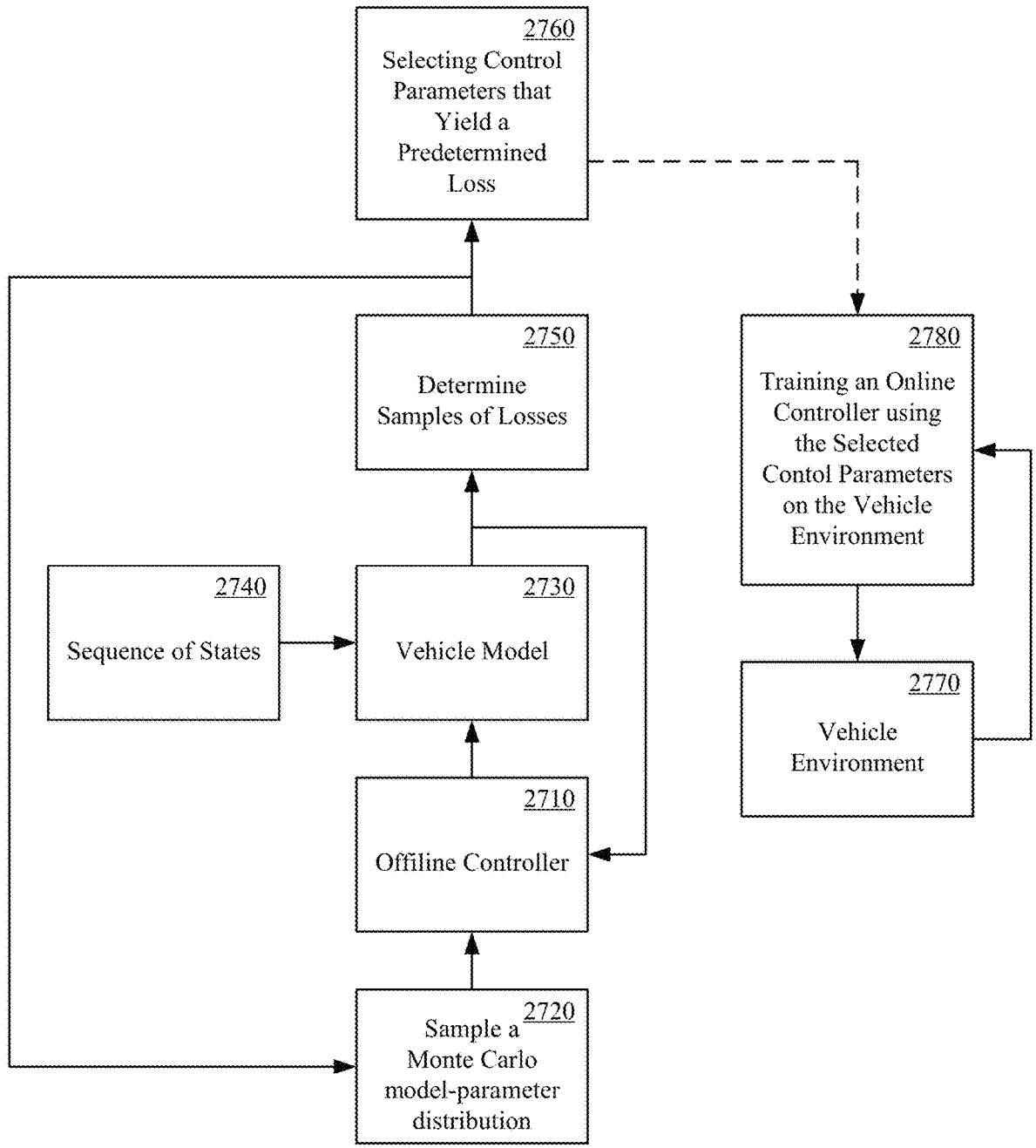
FIG. 27 shows a Monte Carlo base training of a reinforcement leaning controller, in accordance with aspects of the present technology is shown.

Referring now to FIG. 26, a Monte Carlo base training of a reinforcement leaning controller, in accordance with aspects of the present technology is shown. The method can begin with receiving a model-parameter distribution D, itself a parametrized distribution for the $k^{th}$ environment $\varphi_k$, at 2610. An environment can represent any set of driving scenarios, such as region, road type, or the like. In one implementation, a sample set of model parameters $w_i$ are obtained for an offline controller F. The offline controller F can be any vehicle controller parameterized by the sample set of model parameters $w_i$. For example, offline controller F can be a model predictive controller parameterized by the sample set of model parameters $w_i$. The offline controller F is a controller that is not controlling operation of a ground vehicle. Instead, the offline controller F can be a controller performing the simulation on the cloud, on a secondary computing platform on the ground vehicle or the like. In one implementation, the parameters can be sampled from a first distribution parameterized for a local environment.

At 2620, a controller can run a simulation using local environment states $\{S_t^k\}$, $\{S_t^{m,k}, S_t^{s,k}\}$, wherein $S_t^{m,k}$ are the measured states and $S_t^{s,k}$ are the simulates states for t vehicles in k environments. The measured state can be static states, and the simulated states can represent dynamic states, such as lead vehicle states. In one implementation, the simulation can be run on an offline controller 2710 parameterized for the set of sampled parameters 2720 using a vehicle model 2730 and a sequence of states 2740 of a local environment, in a second loop within the first loop. At 2630, state temporal sequences $y_t$ generated by the ground vehicle model in the simulated environment can be collected. At 2640, a resulting loss function can be computed for the simulations 2750. At 2650, a determination of whether a stopping criterion has been satisfied or not. The stopping criterion can be a predetermined number of repetitions of the processes at 2620-2640, observation of a minimum change in the computed loss, or the like. If the stopping criterion has not been satisfied, the processes at 2620-2650 can be repeated. If the stopping criterion has been satisfied, the model parameters associated with the lowest loss w* can be selected 2760, at 2660. At 2670, parameter of an online controller can be set to the model parameters with the lowest loss w*. The online controller can be a controller that is controlling operation of a ground vehicle in a driving environment. The online controller can, for example, be a model predictive controller that generates command and the model parameters with the lowest loss w*. At 2680, the online controller can be trained in a vehicle environment 2770 using the model parameters with the lowest loss w* 2780.

Figure 28:
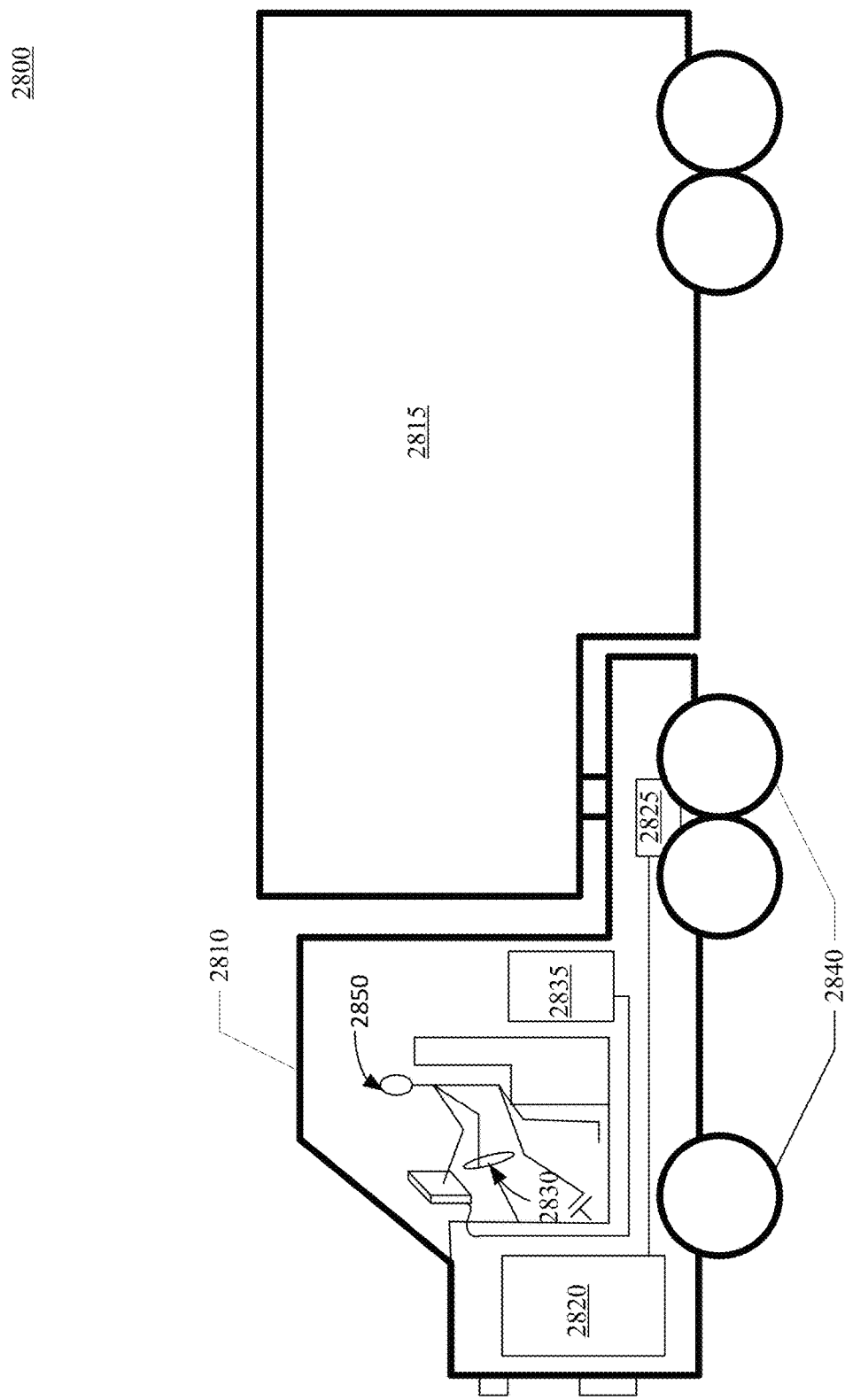
FIG. 28 shows an exemplary ground vehicle, in accordance with aspects of the present technology.

Referring to FIG. 28, an exemplary ground vehicle, in accordance with aspects of the present technology, is shown. The ground vehicle 2800 can include one or more vehicle bodies 2810, 2815, one or more engines 2820, one or more transmissions 2825, one or more braking system, a steering system 2830, one or more operation expert systems 2835, one or more sensors, one or more controllers, one or more communication interfaces, a set of wheels 2840, and the like. The ground vehicle 2800 can, for example, be a tractor trailer. The ground vehicle 2800 can include, for example, an internal combustion engine, an electric motor or a combination of an internal combustion and an electric motor. The one or more engines can create propulsion drive for the vehicle. The one or more transmissions 2825 can transmit the propulsion drive from the one or more engines to one or more wheels. The one or more operation expert systems 2835 can receive information from various components of the ground vehicle and can perform various analysis with regard to the operation of the ground vehicle. The one or more operation expert systems 2835 can include an energy consumption cruise controller, a predictive enhanced cruise controller, and or the like.

Figure 29:
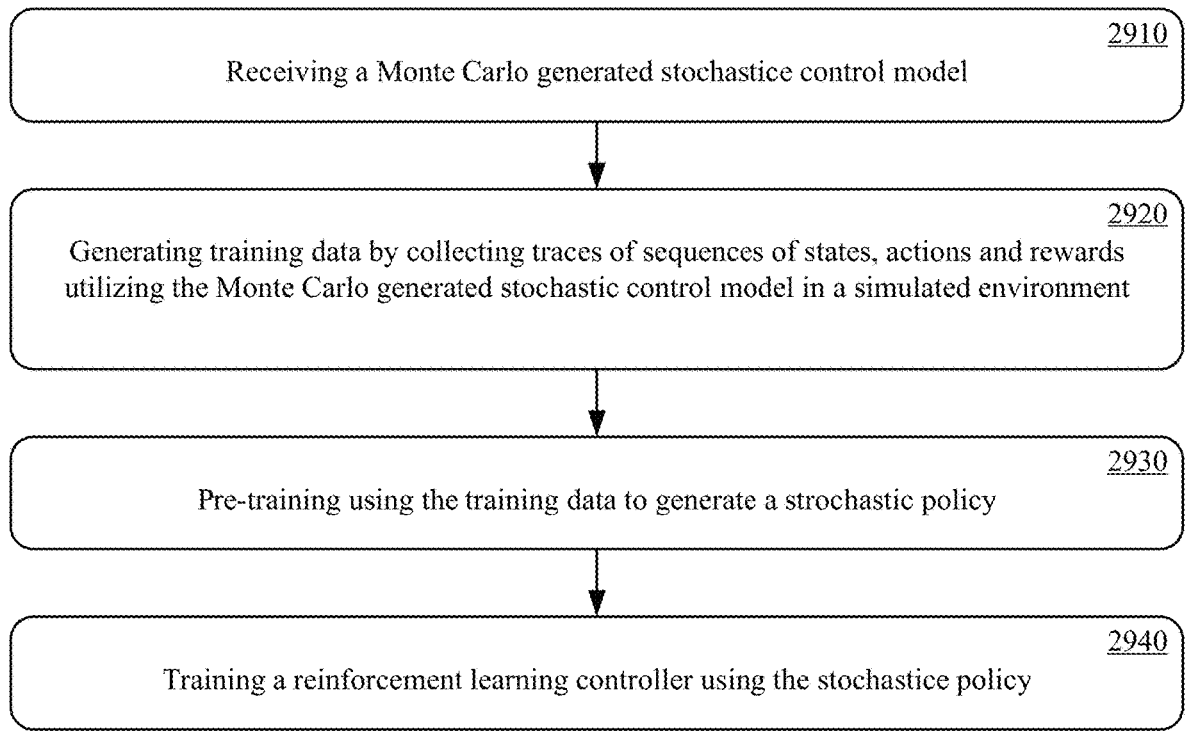
FIG. 29 shows a Monte Carlo base training of a reinforcement leaning controller, in accordance with aspects of the present technology is shown.
Figure 30:
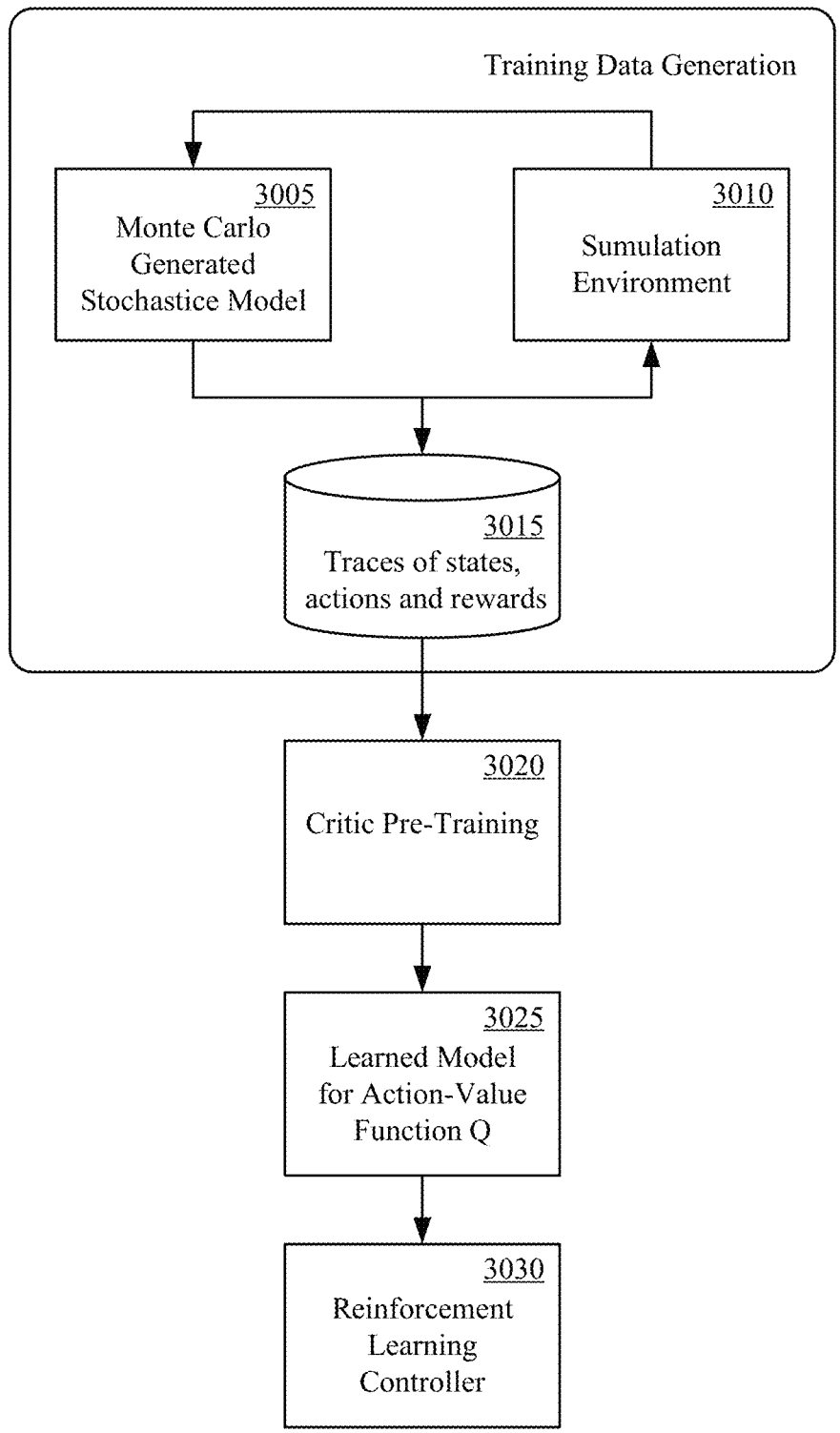
FIG. 30 shows a Monte Carlo base training of a reinforcement leaning controller, in accordance with aspects of the present technology is shown.

Referring now to FIG. 29, a Monte Carlo base training of a reinforcement leaning controller, in accordance with aspects of the present technology, is shown. The Monte Carlo based training of a reinforcement learning controller, will be further explained with reference to FIG. 30. The method can include receiving a Monte Carlo generated stochastic control model, at 2910. The Monte Carlo generated stochastic control model 3005 can be a fitted or inferred model.

Figure 31:
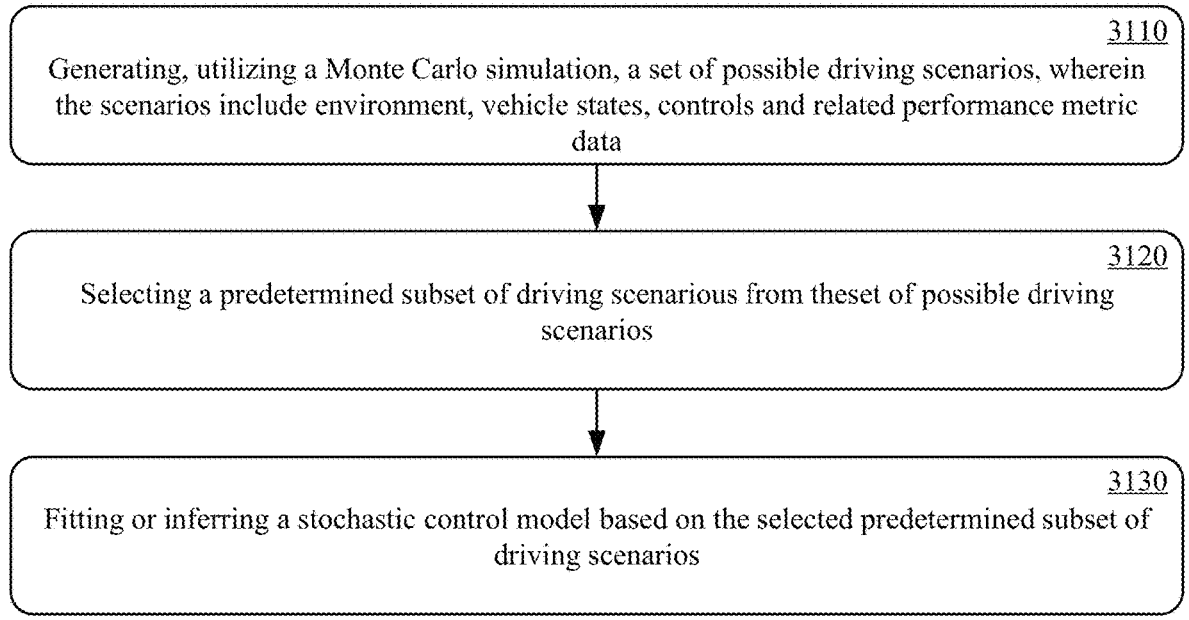
FIG. 31 shows a method of generating a stochastic model utilizing a Monte Carlo simulation paradigm, in accordance with aspects of the present technology.

A method of generating a stochastic model utilizing a Monte Carlo simulation paradigm, in accordance with aspects of the present technology, is shown in FIG. 31. The method can include generating a set of possible driving scenarios utilizing a Monte Carlo simulation, at 3110. The driving scenarios can include environment, vehicle state, control and related performance metric data. In one implementation, the set of possible driving scenarios can include all possible driving scenarios generated utilizing the Monte Carlo simulation. The performance metric data can include fuel efficiency, safety or the like. In one implementation, the environment, vehicle state, control and related performance metric data for all possible driving scenarios can be stored in a table. At 3120, a predetermined subset of the possible driving scenarios can be selected. For example, scenarios having performance metric values of the upper quartile of fuel-efficient can be selected from the table of data for all the possible driving scenarios. At 3130, a stochastic control model can be fitted to or inferred from the environment, vehicle state, control and related performance metric data of the predetermined subset of driving scenarios. In one implementation, a stochastic control model can be fitted to the selected predetermined subset of driving scenarios.

Referring again to FIG. 29 and FIG. 30, the Monte Carlo generated stochastic control model $\Phi(\tilde{a}|s)$ 405 can be utilized in a simulation environment 3010 to generate training data 3015, at 2920. The training data 3015 can be generated by sampling actions $\tilde{a}_i$ for given states $s_i$ using the Monte Carlo stochastic control model $\Phi(\tilde{a}|s)$ 3005 in the simulated ground vehicle environment 3010 and collecting traces of sequences of states, actions, and rewards $\{s_i, \tilde{a}_1, r_i\}_\tau$. In one implementation, the training data 3015 comprising the collected traces of sequences of states, action, and rewards $\{s_i, \tilde{a}_i, r_i\}_\tau$ can be stored in a data structure for use in the subsequently described pre-training 3020-3030.

At 2930, pre-training 3020 can be performed to generate a learned model for an action-value function Q, parametrized by $\psi$, belonging to a family of action-value functions $\mathcal{K}$, 3025 using the training data 3015 including the collected traces of sequences of states, actions and rewards $\{s_i, \tilde{a}_i\}_\tau$. The pre-training can be performed in a supervised learning context. The action-value function Q can be learned for the expected discounted future returns, under an actor-critic reinforcement learning framework. In one implementation, the learned model for the function Q can be optimized as a regression problem in accordance with Equations 1, 2 and 3.

$$R_i = \Sigma_{y=i}^T \gamma^{y-i} \{r_i\}_\tau \qquad (1)$$

$$\overline{R}_i = Q(s_{i,v}, \tilde{a}_{i,\tau} | \psi^k) \qquad (2)$$

$$\psi^\# = \min_\psi \|\hat{R} - R\|_p \qquad (3)$$

Where the i-th estimated sum of discounted rewards, $R_i \in \mathbb{R}$, over the rewards collected over a given simulation episode i of temporal length T using $\Phi$, starting from state $s_{i,\tau}$ to the end of episode $\tau$, is the target to be estimated by the action-value function Q. The optimal function $Q^\#$ in $\mathcal{K}$, parametrized by $\psi^\#$, which best estimates the sum of discounted future rewards over the pre-training samples, is found by minimizing p-norm between the set of the estimations R̂ and the corresponding sum of discounted rewards R, generated by following Φ(ã|s) during the training data generation.

At 3040, a reinforcement learning controller 3030 can be trained using the learned model for an action-value function Q 3025. The reinforcement learning controller 3030 can be trained during a simulation mode or an operating mode of a ground vehicle. The Monte Carlo process generates data to train stochastic control model Φ(ã|s), which is used to generate off-policy pre-training samples from regions of high reward density, guiding the initial policy search outside of the RL framework thus improving the optimal policy search in a reinforcement learning framework. However, these guiding samples will continue to expose the critic, as well as the actor to samples of high reward density regions. Moreover, adaptations to Φ(ã|s), via variations in the Monte Carlo data generation process can continue to contribute to the reinforcement learning controller via off-policy samples. This approach can thus be used to expose the controller to new or under-represented scenarios.

Adaptations to the stochastic control model Φ via the Monte Carlo generation process can continue to contribute to the online controller via off-policy samples. Even after the controller has been pretrained and placed the actor+critic in the reinforcement learning framework for a while, a new stochastic control mode Φ can be generated by Monte Carlo by following some different criterion and used to further guide the online search process. This approach can thus be used to adapt the controller to new driving scenarios. This would be useful in cases where these new driving scenarios have not been experienced by the agent or were under-represented during pre-training and or online reinforcement learning.

Figure 32:
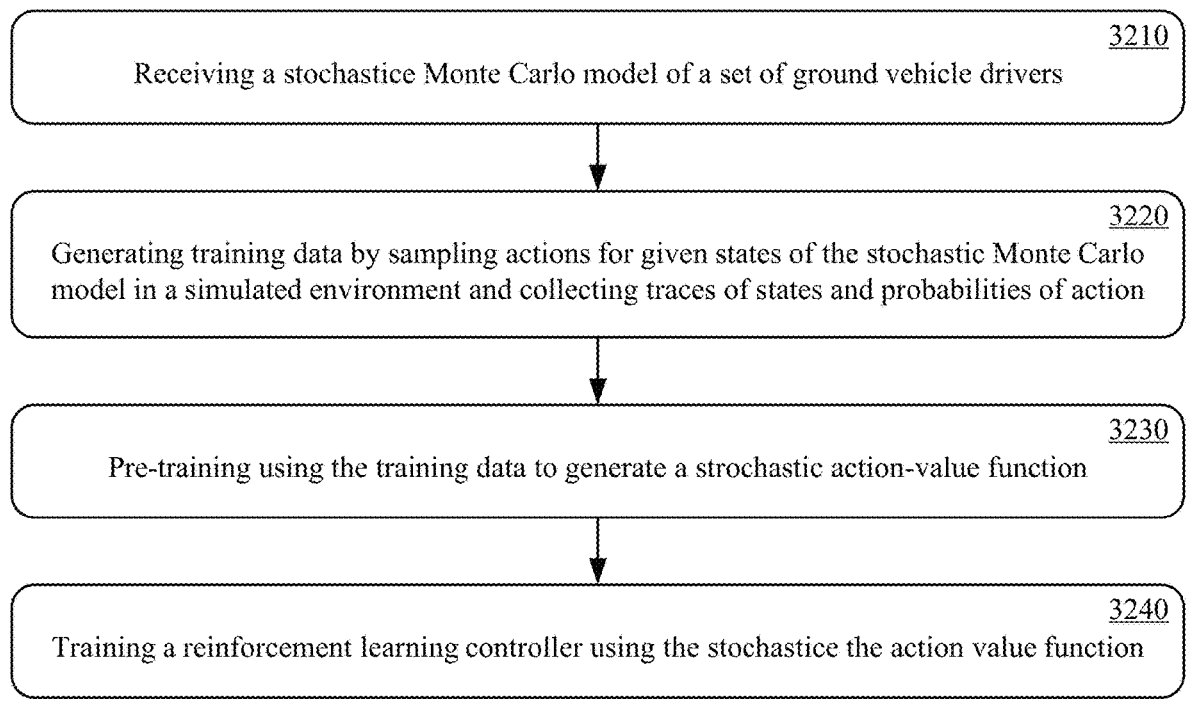
FIG. 32 shows a Monte Carlo base training of a reinforcement leaning controller, in accordance with aspects of the present technology is shown.
Figure 33:
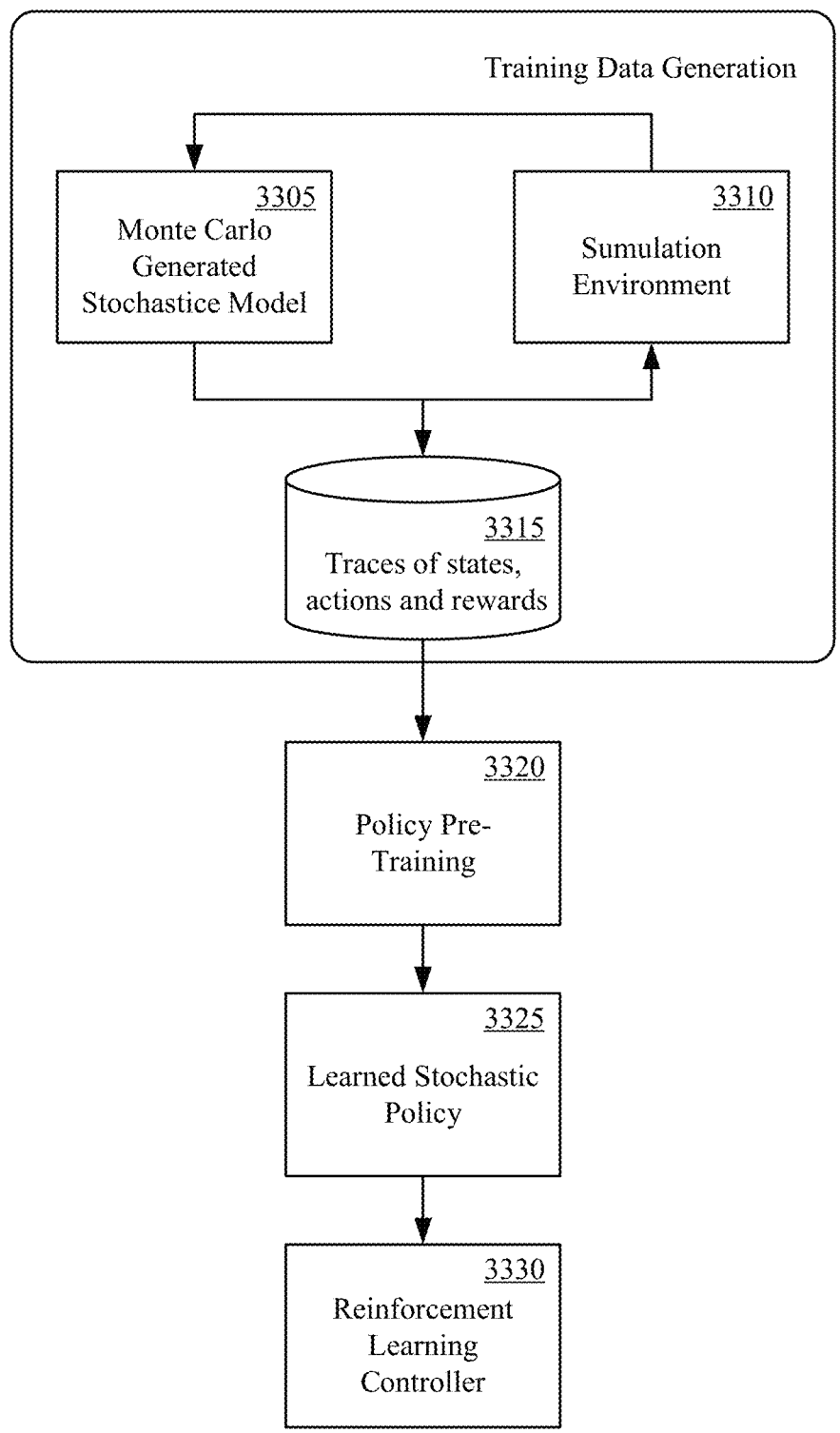
FIG. 33 shows a Monte Carlo base training of a reinforcement leaning controller, in accordance with aspects of the present technology is shown.

Referring now to FIG. 32, a Monte Carlo base training of a reinforcement leaning controller, in accordance with aspects of the present technology is shown. The Monte Carlo based training of a reinforcement learning controller, will be further explained with reference to FIG. 33. The method can include receiving a Monte Carlo generated stochastic control model 3305, at 3210. The Monte Carlo generated stochastic control model 3305 can be a fitted or inferred model. In one implementation, the Monte Carlo generated stochastic control model 3305 can be generated as described above with reference to FIG. 31.

At 3220, the Monte Carlo generated stochastic control model Φ(ã|s) 705 can be utilized in a simulation environment 3310 to generate training data 3315. The training data 3315 can be generated by capturing traces of states and probabilities of actions $\{s_i, p_\Phi(\tilde{a}_i)\}$. In one implementation, the collected traces of sequences of states and probabilities of actions $\{s_i, p_\Phi(\tilde{a}_i)\}$ can be stored in a data structure for use in the subsequently described pre-training 3320-3330.

At 3230, pre-training 3320 can be performed to a stochastic policy using the training data including the collected traces of sequences of states and probabilities of actions $\{s_i, p_\Phi(\tilde{a}_i)\}$. The pre-training 3320 can be performed in a supervised learning context. In one implementation, a stochastic policy can be trained such that a distribution of the policy is as close a possible to the Monte Carlo generated stochastic control model Φ(ã|s) 3305. The probability of an action â given a state s for the stochastic policy can be estimated in accordance with Equation 4.

$$p_{\theta^n}(\hat{a}_i|s_i) = \pi(\hat{a}_i|s_i, \theta^n) \qquad (4)$$

Where the policy π, parametrized by θ, belongs to a family of distributions $\mathcal{N}$. The closest distribution to Φ, $p_{\theta^\#}$ also in $\mathcal{N}$, parametrized by $\theta^\#$, can be found by minimizing a dissimilarity metric (D), such as cross entropy measurement in accordance with Equation 5.

$$\theta^\# = \min_\theta D_{KL}(p_\Phi(\tilde{a}|s)|p_{\theta^n}(\hat{a}|s)) \qquad (5)$$

where $D_{KL}$ is a Kullbak-Leibler divergence function. Alternatively, the closest distribution can be determined by maximizing a distribution similarity metric.

At 3240, a reinforcement learning controller 3330 can be trained using the learned stochastic policy 3325. The reinforcement learning controller 3330 can be trained during a simulation mode or an operating mode of a ground vehicle. The Monte Carlo stochastic control model Φ(ã|s) advantageously provides for pre-training in a high-rewards density thereby reducing the computational workload of training the reinforcement learning controller. By pre-training the reinforcement learning controller in a high-reward density, the search for the optimal policy in reinforcement learning is improved.

Figure 34:
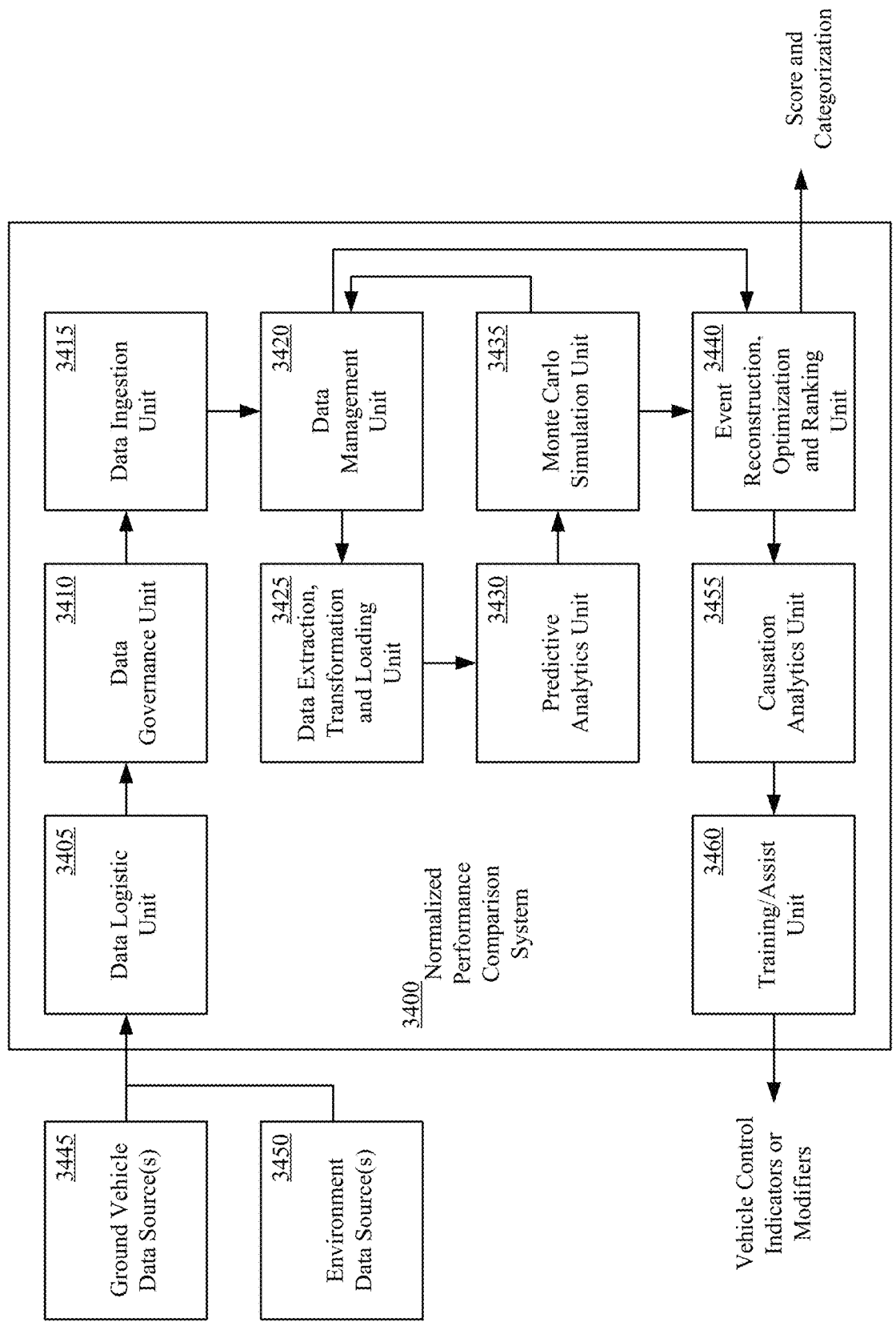
FIG. 34 shows a normalized performance comparison system, in accordance with aspects of the present technology.

Referring to FIG. 34, a normalized performance comparison system, in accordance with aspects of the present technology, is shown. The normalized performance comparison system can be utilized to compare drivers, routes, vehicle fuel efficiency, safety and or other similar ground vehicle or driver metric in a normalized manner. For convenience, aspects of the present technology will be described with reference to fuel efficiency. However, the present technology can be applied to normalized performance comparison of any other driver and/or ground vehicle metric. The normalized performance comparison system 100 can be configured to construct one or more predictive models of the operation of a ground vehicle. The normalized performance comparison system 3400 can be configured to predict a plurality of scenarios of the ground vehicle operation and determine Monte Carlo simulation results using the predicted plurality of scenarios and the one or more predictive models. The normalized performance comparison system 3400 can also be configured to receive an observed scenario and one or more of observed energy efficiency parameters of the ground vehicle operation. The normalized performance comparison system 3400 can be configured to determine a best and worst possible scenario and associated best and worst energy efficiency parameters that could have happened for the observed scenario based on the Monte Carlo simulation results, and normalize the observed energy efficiency parameters.

The normalized performance comparison system 3400 can include a data logistic unit 3405, a data governance unit 3410, a data ingestion unit 3415, a data management unit 3420, a data extraction, transformation and loading unit 3425, a predictive analytic unit 3430, a Monte Carlo simulation unit 3435, and an event reconstruction, optimization and ranking unit 3440. The data logistic unit 3405 can be configured to received data from one or more data sources, including but not limited to ground vehicle data sources 3445 and or environment data sources 3450. The data logistic unit 3405 can be configured to expand and contract in response to one or more of an analytical scenario and a computational workload.

The ground vehicle data sources 3445 can include, but are not limited to, engine sensors, throttle position sensors, fuel injector sensors, intake sensors, mass airflow sensors, oxygen sensors, exhaust sensors, engine tachometers, voltmeters, current meters, temperature sensors, fluid level sensors, and the like of the ground vehicle. The ground vehicle data sources 3445 can also include data describing the driver, the make and model of the ground vehicle, and the like. The environment data sources 3450 can include, but are not limited to, cameras, radar, inertial measurement units (IMU), global position systems (GPS), light detection and ranging (LIDAR), temperature sensors, dedicated short range communications (DSRC), and the like that generally characterize the driving environment in which the ground vehicle is operating. The data can include road data including, but not limited to, map data, road grade, road surface type and or quality, road curvature, speed limit, and road construction data. The data can also include ambient temperature, road surface temperature, visibility condition, precipitation condition, wind speed and direction, and wind gust data. The data can also include road traffic conditions, such as changes in speed limits, lead vehicle distance, speed, acceleration and the like. The data can also be collected from other sources such as map applications, weather forecasting stations, websites and the like via one or more networks, such as cellular telephone, Bluetooth, WiFi, satellite networks and the like. Accordingly, the data logistics unit 105 can be configured communicate with a plurality of data systems and to support a plurality of different data types and structures. The data logistic unit 105 can be configured to cleanse the data, unify the data from different runs and or different data sources, convert the data to a desired structured or unstructured type and or compress the data.

Figure 35:
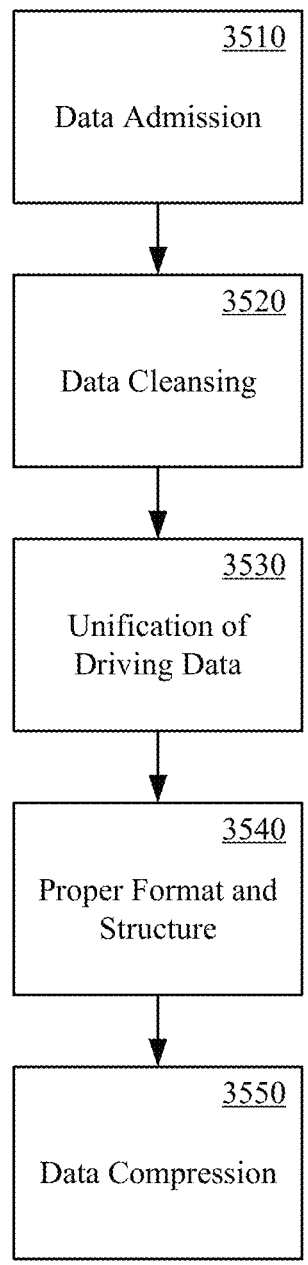
FIG. 35 shows functions of the data logistic unit, in accordance with aspects of the present technology.

Referring now to FIG. 35, functions of the data logistic unit, in accordance with aspects of the present technology, is shown. The data logistic unit can admit 3510 driving data in common formats, such as *.txt and *.csv from different data sources. Upon admission, the data can be cleansed 3520 to improve data quality. The data can be cleansed by cleansing undesirable special characters that carry high computational burdens to the computational platforms such as distributed clusters. The cleansed data can be unified 3530. In one implementation, a data unification algorithm in a Python/Apache Spark environment can be applied to unify the driving data from different data runs and or sources. The unified data can also be formatted and or structured 3540. In one implementation, integrated data can be converted to proper columnar data structures like parquet or optimal row columnar (ORC). The formatted data can then be compressed 3550. In one implementation, a data compression algorithm like gzip or snappy can be applied to compress data and improve the data storage efficiency. Using a proper data compression algorithm can reduce the data storage costs by approximately 70% or more.

Referring again to FIG. 34, the data governance unit 3410 can be configured to determine if the data received from the one or more data sources 3445, 3450 conforms with one or more regulations before ingestion by the data ingestion unit 3415. For example, the data governance unit can be utilized to determine if the data meets one or more government regulations, industry regulations, standards or norms, and or organization regulations, standards or norms.

The data ingestion unit 3415 can be configured to ingest the data received by the data logistic unit and prepare the data for further analysis. The data ingestion unit 3415 can also be configured to expand and contract in response to different workloads. The data ingestion unit 3415 can be configured to be elastic such that different workloads can be efficiently handled. The data ingestion unit 3415 can also be configured to tolerate unexpected faults. The data ingestion unit 3415 in one implementation can utilize Hadoop distributed file system (HDFS) complemented by Spark directed acyclic graph (DAG) technologies to provide fault tolerance. The data ingestion unit 3415 can be configured to have one or more atomicity, consistency, isolation and durability properties. The data ingestion unit 3415 can be configured to provide an interface for transferring the data between data structures and formats. The data ingestion unit 3415 can utilize Apache Sqoop or the like to enable compatibility with various legacy applications. Accordingly, the data ingestion unit 3415 can be responsible for obtaining and importing data for immediate storage in one or more databases, data repositories, or the like. The data ingestion unit 3415 can be configured as a cluster-computing framework for a parallelization and distributed computation implementation. The parallelization/distribution framework can be implemented utilizing Apache Spark, Python Dask, Python Numba, gpuR or the like.

The data management unit 120 can be configured to store, manage, query, and retrieve that data from the data ingestion unit 115, the extraction, transformation and loading unit 125, the Monte Carlo simulation unit 135, and the events reconstruction, optimization and ranking unit 140. The data management unit can store, manage, query, and retrieve data for analytical purposes such as constructing predictive models. The data management unit 120 can be configured to receive queries and return data, metadata, or file pointers to one or more file-residing directories. The major functionality of the data management unit can be to store data, query and retrieve ground vehicle operating and corresponding environment data in a computationally economic manner. In one implementation, a hyper algorithm can be constructed on top of a data reservoir, such as a farm of parquet files. The hyper algorithm can be responsible for interacting with data extraction, transformation and loading algorithms to admit queries and return appropriate file pointers. The pointers can direct the data extraction, transformation and loading algorithms to the right directory of the parquet files. The hyper algorithm can also provide meta data and meta information related to the driving files and processes. The hyper algorithm can provide meta data including information such as file size, number of signals received from vehicle sensors and or the like. In one example, an anonymized implementation of the hyper algorithm is illustrated in Table 1.

TABLE 1

| file_name | fleet_name | driver_name | vehicle_id | size_csv_MB |
|---|---|---|---|---|
| fleetname1_drivername1_vin1_2019-01-04 06:53:22 | fleetname1 | drivername1 | vin1 | 14.0 |
| fleetname1_drivername1_vin1_2019-01-04 07:12:53 | fleetname1 | drivername1 | vin1 | 15.0 |
| fleetname1_drivername1_vin1_2019-08-08 08:10:20 | fleetname1 | drivername1 | vin1 | 15.0 |
| fleetname1_drivername1_vin1_2019-08-08 08:29:58 | fleetname1 | drivername1 | vin1 | 14.0 |
| fleetname2_drivername2_vin2_2019-01-04 08:10:20 | fleetname2 | drivername2 | vin2 | 15.0 |
| fleetname2_drivername2_vin2_2019-01-04 08:29:58 | fleetname2 | drivername2 | vin2 | 14.0 |
| fleetname2_drivername2_vin2_2019-01-08 08:10:20 | fleetname2 | drivername2 | vin2 | 15.0 |
| fleetname2_drivername2_vin2_2019-01-08 08:29:58 | fleetname2 | drivername2 | vin2 | 14.0 |

TABLE 1-continued

| file_name | size_parquet_MB | row_nmb | signal_nmb |
|---|---|---|---|
| fleetname1_drivername1_vin1_2019-01-04 06:53:22 | 4.0 | 11711 | 248 |
| fleetname1_drivername1_vin1_2019-01-04 07:12:53 | 4.0 | 11785 | 268 |
| fleetname1_drivername1_vin1_2019-08-08 08:10:20 | 4.0 | 11779 | 276 |
| fleetname1_drivername1_vin1_2019-08-08 08:29:58 | 3.0 | 11639 | 248 |
| fleetname2_drivername2_vin2_2019-01-04 08:10:20 | 4.0 | 11779 | 276 |
| fleetname2_drivername2_vin2_2019-01-04 08:29:58 | 3.0 | 11639 | 248 |
| fleetname2_drivername2_vin2_2019-01-08 08:10:20 | 4.0 | 11779 | 276 |
| fleetname2_drivername2_vin2_2019-01-08 08:29:58 | 3.0 | 11639 | 248 |

Major characteristics like Vehicle Identification Number (VIN) and data acquisition timestamps can be utilized to index driving data. The data management unit 120 can be designed to be horizontally and vertically scalable such that upon adding worker and master nodes, the system can horizontally expand. Such a scaling process can be economically cost efficient. The output of the hyper algorithm can be a Relational Database Management System (RDBMS) developed utilizing tools such as MySQL or Apache Hive. Using this composite data management system, millions to billions of process files can be seamlessly stored, managed, queried and mined at low latency and low computational costs. Millions to billions of compressed parquet files can be translated to tera bytes to peta bytes of driving data.

The data extraction, transformation and loading unit 3425 can be configured to extract and mine the data from the data management unit and transform the data to a data format appropriate for the predictive analytics unit 3430. The data extraction, transformation and loading unit 3425 can be configured to be fault tolerant. The data extraction, transformation and loading unit 3425 can be configured to be compatible with a plurality of development environments. The data extraction, transformation and loading unit 3425 can be configured to be elastic. The data extraction, transformation and loading unit 3425 can be configured to support a plurality of application programming interfaces (APIs), from low level APIs for Spark Datasets and Hadoop map/reduce operations to Spark high-level DataFrames. The data extraction, transformation and loading unit 3425 can be configured to support a plurality of data management solutions. The data management solutions can include Apache Spark which is capable of efficiently mining the relational or non-relational data repositories, SQL and NoSQL databases. The data extraction, transformation and loading unit 3425 can be configured to provide end-to-end data pipelining. In one implementation, Apache Spark can ensure compatibility of data query and data mining algorithms with machine learning algorithms if Spark MLLib framework is used to develop predictive models. The data extraction, transformation and loading unit 3425 can be configured to provide data serialization. In one implementation, the extraction, transformation and loading algorithm can be capable of serializing the extracted data, a property that is significant for algorithm and cluster communication purposes.

The predictive analytics unit 3430 can be configured to predict a plurality of scenarios based on a construct parametric or non-parametric model. The predictive analytics unit 130 can be used to predict un-seen scenarios based on the constructed predictive models for event reconstruction purposes. In one implementation, the predictive analytics units 3430 can provide a confidence interval analysis along with an energy efficiency prediction.

Figure 36:
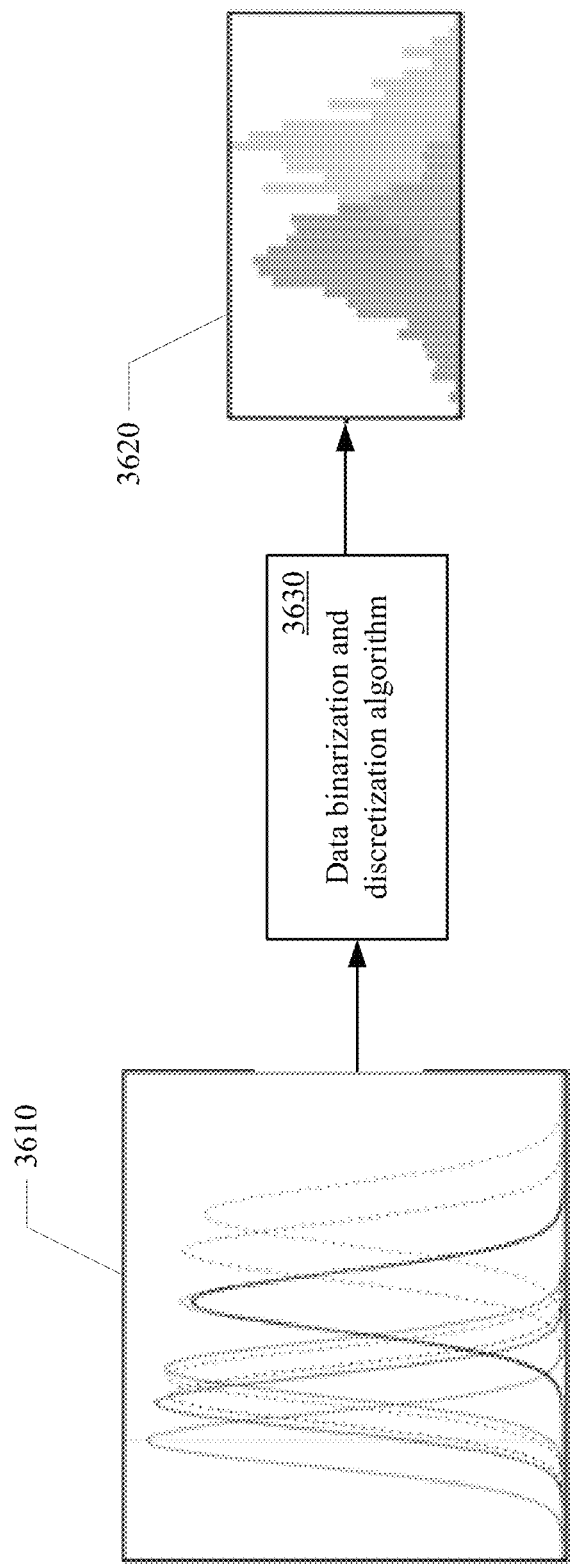
FIG. 36 shows an exemplary data binarization and discretization algorithm, in accordance with aspects of the present technology.

The predictive analytics unit 3430 can be further configured to binarize and discretize continuous input data, construct one or more predictive models, and analyze the robustness of the plurality of predictive models for accuracy and variability. Referring now to FIG. 36, an exemplary data binarization and discretization algorithm, in accordance with aspects of the present technology, is illustrated. The data received from various data sources 3445, 3450 can be continuous and or decimal data. The continuous and or decimal data 3610 can be converted into discrete binary data 3620 by the binarization and discretization algorithm 3630. For example, engine temperatures of 202 and 213, received from a temperature sensor, can be discretized as 200 and 210 respectively. The values can also be binarized by converting the decimal numbers to binary numbers. The binarization and discretization advantageously controls the computational workload of the Monte Carlo simulation of the driving scenarios. The binarization and discretization algorithm has a significant impact on the granularization of the analytics result.

Figure 37:
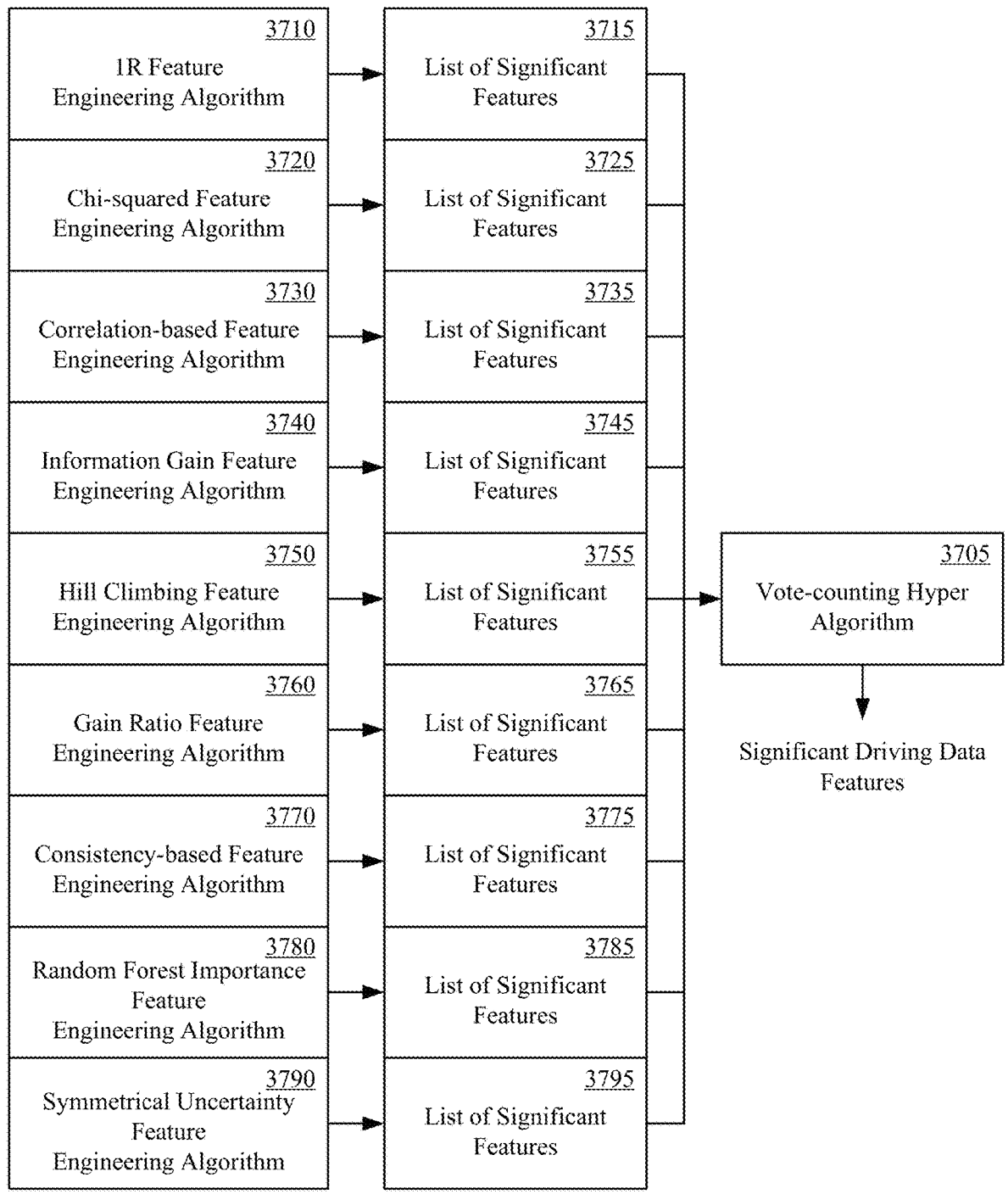
FIG. 37 shows an exemplary feature engineering and dimensionality reduction function, in accordance with aspects of the present technology.

The significant features can be selected utilizing one or more feature selection algorithms, a dimensionality reduction algorithm, and a vote-counting algorithm. In one implementation, a subset of significant driving features can be selected from the set of available features. However, different feature selection techniques generally return different subset of significant features. To resolve this issue and have a consistent subset of significant features, a vote-based feature selection algorithm can be utilized. Referring now to FIG. 37, an exemplary feature engineering and dimensionality reduction function, in accordance with aspects of the present technology, is illustrated. A plurality of feature selection algorithms can be deployed. For example, a 1R feature engineering algorithm 3710 can generate a corresponding list of significant features 3715, a chi-squared feature engineering algorithm 3720 can generate a corresponding list of significant features 3725, a correlation-based feature engineering algorithm 3730 can generate a corresponding list of significant features 3735, an information gain feature engineering algorithm 3740 can generate a corresponding list of significant features 3745, a hill climbing feature engineering algorithm 3750 can generate a corresponding list of significant features 3755, a gain ratio feature engineering algorithm 3760 can generate a corresponding list of significant features 3765, a consistency-based feature engineering algorithm 3770 can generate a corresponding list of significant features 3775, a random forest importance feature engineering algorithm 3780 can generate a corresponding list of significant features 3785, and a symmetrical uncertainty feature engineering algorithm 3790 can generate a corresponding list of significant features 3795. For dimensionality reduction purposes, principal component analysis (PCA) is the major candidate. Each individual feature engineering algorithm can be applied to the driving data. The hyper vote-counting algorithm 3705 can be applied to enumerate the votes and return the most significant process features.

To construct one or more predictive models, the driving data can be split into training, validation and testing datasets. Depending on the availability of driving data and operational requirements, the following strategies having been utilized to split data: 1) 50%+25%+25%, 2) k-fold cross-validation, 3) 50-50 swapping, 4) bootstrapping, 5) one-out n-fold cross validation, 6) back-bundling, and or the like. To combat overfitting, grid search or drop-out algorithms can be utilized to tune the hyper parameters of the predictive models. To evaluate prediction performance of the predictive algorithms, a Mean Absolute Error (MAE) metric in accordance with Equation 1 can be utilized:

$$MAE = \frac{1}{n}\sum_{i=1}^{N}|y_i - \hat{M}(X_i)| \quad (1)$$

where n is the number of instances, $X_i$ represent input factor, $y_j$ is the observed continuous response, and $\hat{M}(X_i)$ is the predicted response estimated by the prediction model like M. To have deeper insights regarding the prediction performance of the predictive models, a ZeroR algorithm can be used to baseline the comparisons.

Figure 38A:
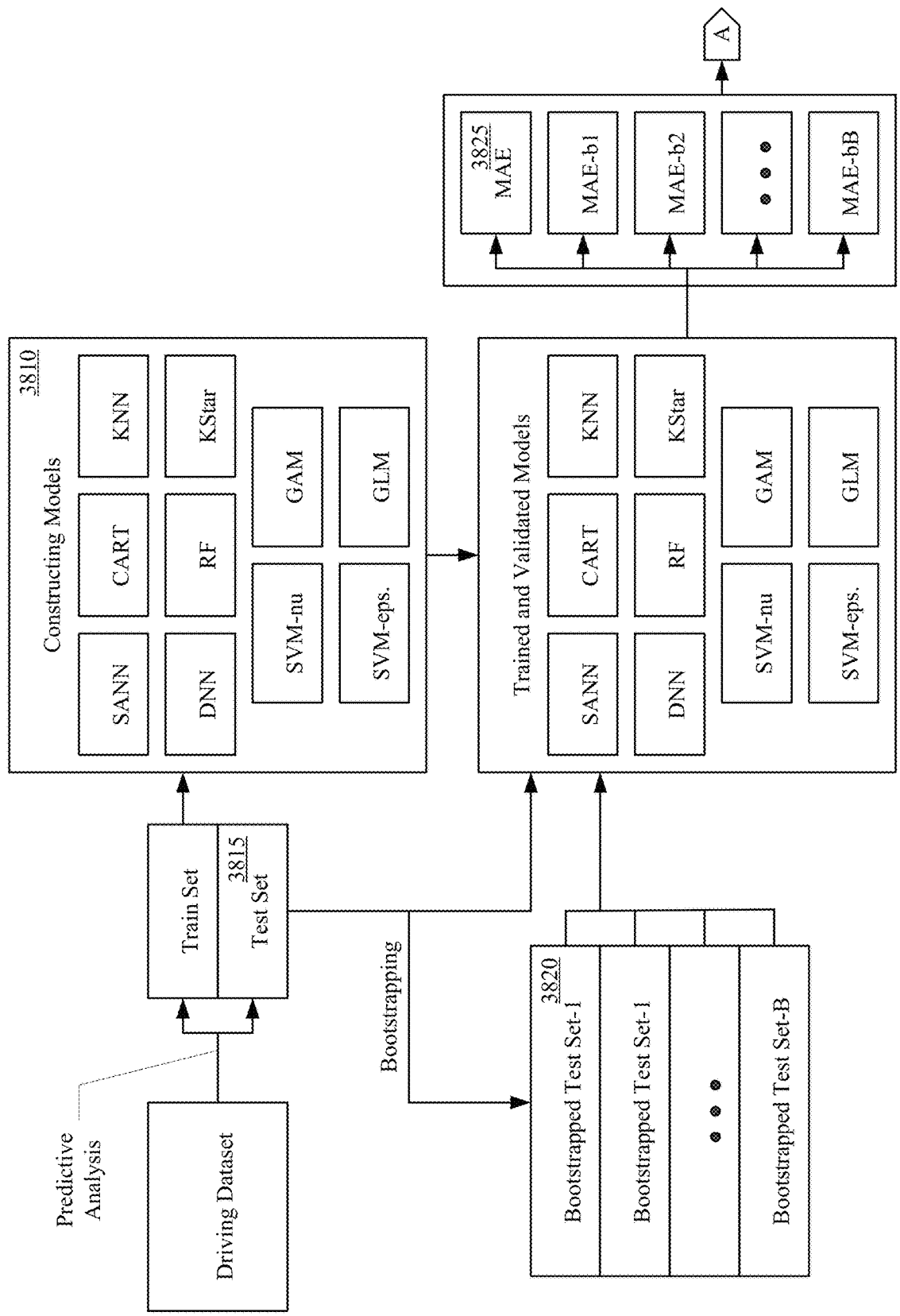
FIGS. 38A and 38B show a prediction robustness analysis algorithm, in accordance with aspects of the present technology.
Figure 38B:
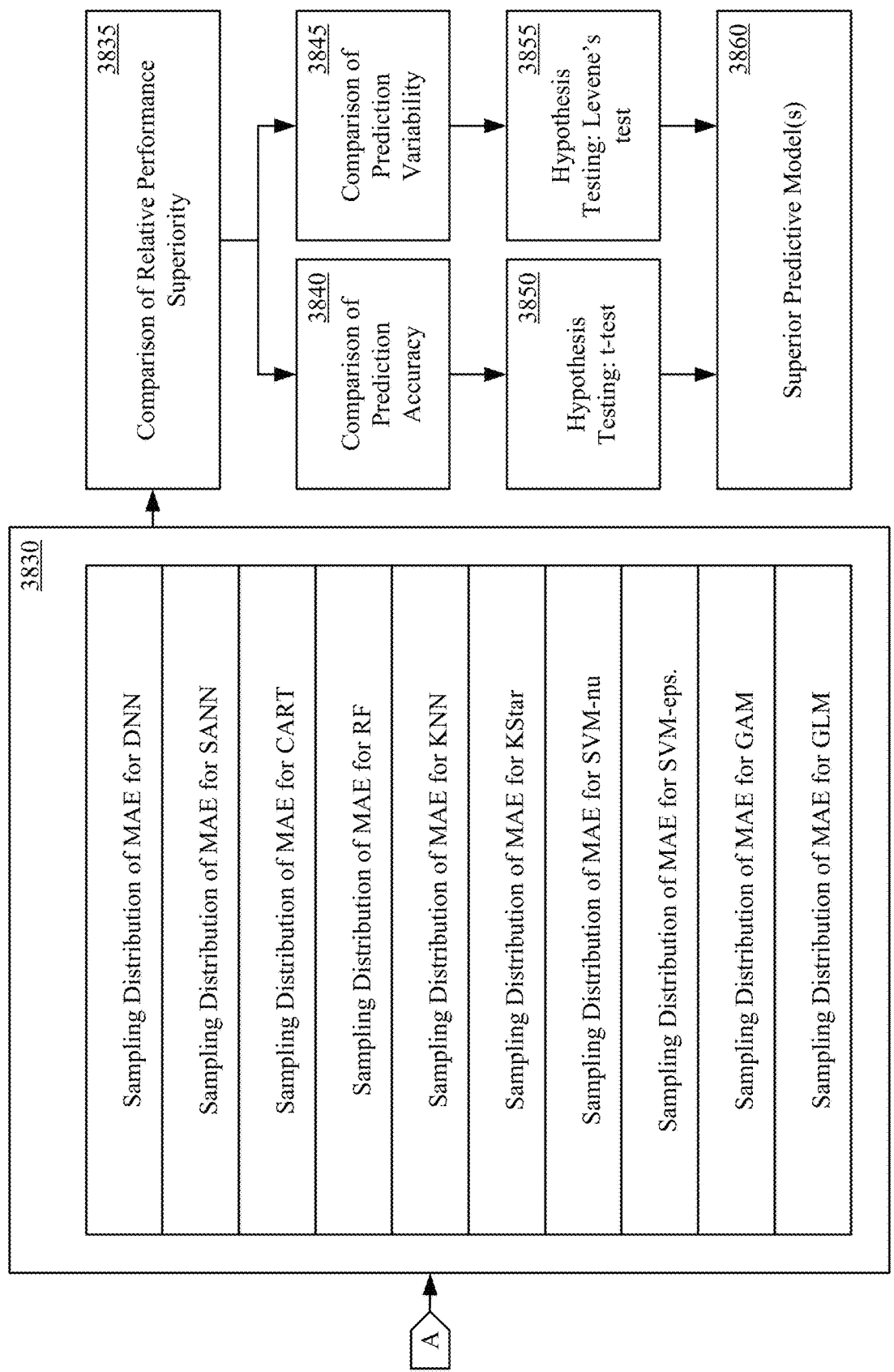

Predictive models are not equally accurate and are not at the same level of robustness and prediction accuracy for drive analytics applications. To find the best model for drive analytics purposes, a brute force approach can be utilized. Referring now to FIGS. 38A and 38B, a prediction robustness analysis algorithm, in accordance with aspects of the present technology, is shown. The most common predictive algorithms can be selected to generate a pool of predictive models 3810. The pool can contain several models from different classes of predictive algorithms. From a class of artificial neural nets, a shallow artificial neural net (SANN) and a deep neural net (DNN) can be chosen. From a class of tree-based algorithms, classification and regression tree (CART) and random forest (RF) can be selected. The pool can also contain two lazy models including k-nearest neighbor (KNN) and KStar. A support vector machine (SVM-nu) and an SVM-epsilon support vector machine can also be incorporated. From the class of statistical models, a generalized adaptive model (GAM) and generalized linear model (GLM) can be chosen.

The constructed models 3810 can be tested using an original test set 3815 and a pool of B bootstrapped test sets 3820. The mean absolute error 3825, according to Equation 1, can be used to assess prediction performance of predictive models. By applying the original and bootstrapped test sets to the pool of constructed predictive models, associate MAEs can be estimated and sampling distributions of MAE for fuel, safety, behavioral, and the like efficiency metrics can be generated. The generated sampling distributions 3830 can be used to assess accuracy and robustness conditions of the associated predictive models. Accuracy of predictive models can be analyzed and compared by performing comparative experiments 3835, 3840, 3845. A two-sample t-test 3850 can be utilized to analyze the accuracy condition of the predictive models. The variability of condition of the predictive models can be assessed using Levene's test 3855. The total prediction performance of the predictive models can be analyzed, compared and the superior predictive models 560 can be recognized based on the developed statistical inference paradigm. The superior predictive algorithms can be utilized as a prediction agent to perform the Monte Carlo simulation.

Figure 39:
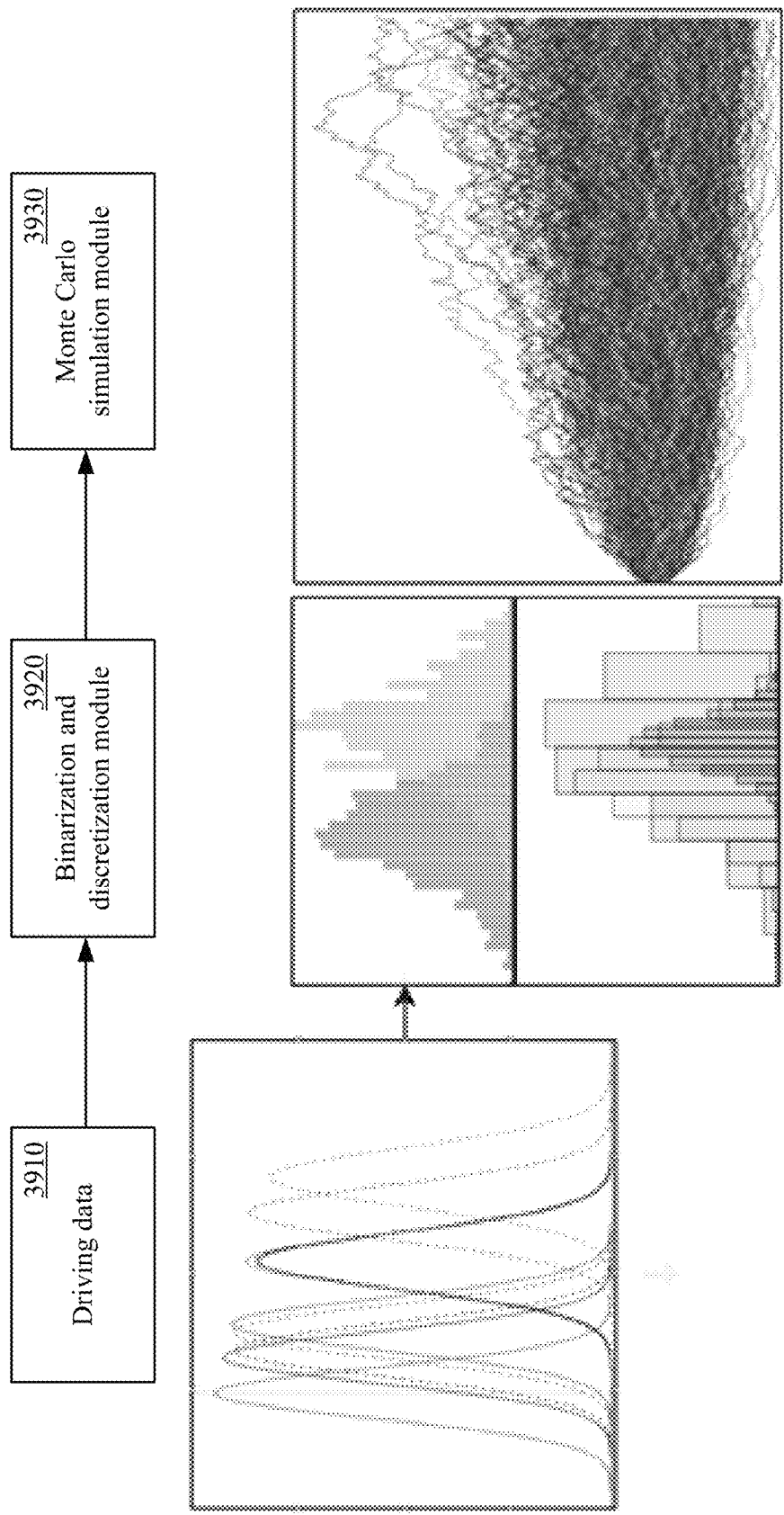
FIG. 39 shows an exemplary Monte Carlo simulation, in accordance with aspects of the present technology.

Referring again to FIG. 34, the Monte Carlo simulation unit 3435 can be configured to perform statistical Monte Carlo simulations using the predicted plurality of scenarios and the one or more predictive models. The Monte Carlo simulation unit 3435 can be configured to assess a plurality of possible scenarios based on binarized and discretized input data. One or more of a number, a type, and a scope of input features to the Monte Carlo simulation unit can be adjustable. The Monte Carlo simulation unit 3435 can apply all possible scenarios, including unseen scenarios, to the predictive models in a brute force manner to predict the possible outputs, such as fuel safety behavior or the like. Referring now to FIG. 39, an exemplary Monte Carlo simulation, in accordance with aspects of the present technology, is illustrated. Admitted driving data 3910 can be binarized and discretized 3920. The binarized and discretized data can then be analyzed by the Monte Carlo simulation module 3930 to assess a plurality of possible scenarios. The binarization and discretization of the driving data advantageously controls the computational costs.

Referring again to FIG. 34, the Monte Carlo simulation unit 3430 can be designed to be flexible such that the number, type and scope of the input features can be adjusted. To reduce the computational cost of the Monte Carlo simulation, massively parallel processing platforms, such as CUDA, can be employed. Such integration enables dramatic increases in computing performance by harnessing the power of the graphics processing unit (GPU). Parallel processing in the GPU can allow the Monte Carlo algorithm to perform the nested loop operation in an efficient manner. The Monte Carlo simulation operation can be optimized by using Python's Numba package where nested loops have been evaluated in an accelerated mode.

The events reconstruction, optimization and ranking unit 3440 can be configured to reconstruct driving events, evaluate driving scenarios and determine best case or near best case driving scenarios. The events reconstruction, optimization and ranking unit 3440 can be configured to receive an observed scenario and associated observed energy efficiency. The events reconstruction, optimization and ranking unit 140 can be configured to determine best and worst possible scenarios and associated best and worst efficiencies that could have happened for the observed scenario based on the Monte Carlo simulation results. The normalized observed energy efficiency can comprise a ranking, score or the like.

In one implementation, a best and worst driver can be determined. The best driver can be a driver who drives each individual driving scenario or driving scenario segment in the most efficient way such that no other driver can surpass the best driver in terms of efficiency. On the other hand, the worst driver can be a driver that performs each driving scenario or driving scenario segment in the most inefficient way such that no other driver can be more inefficient than the worst driver. By employing this rational, the upper and lower boundaries of driver efficiency for comparison purposes have been deployed. Synthesizing or generating these two hypothetical drivers is mathematically feasible and guaranteed in the Monte Carlo simulation as Monte Carlo simulation generates all possible driving scenarios in an exhaustive (i.e., brute force) manner.

Figure 40:
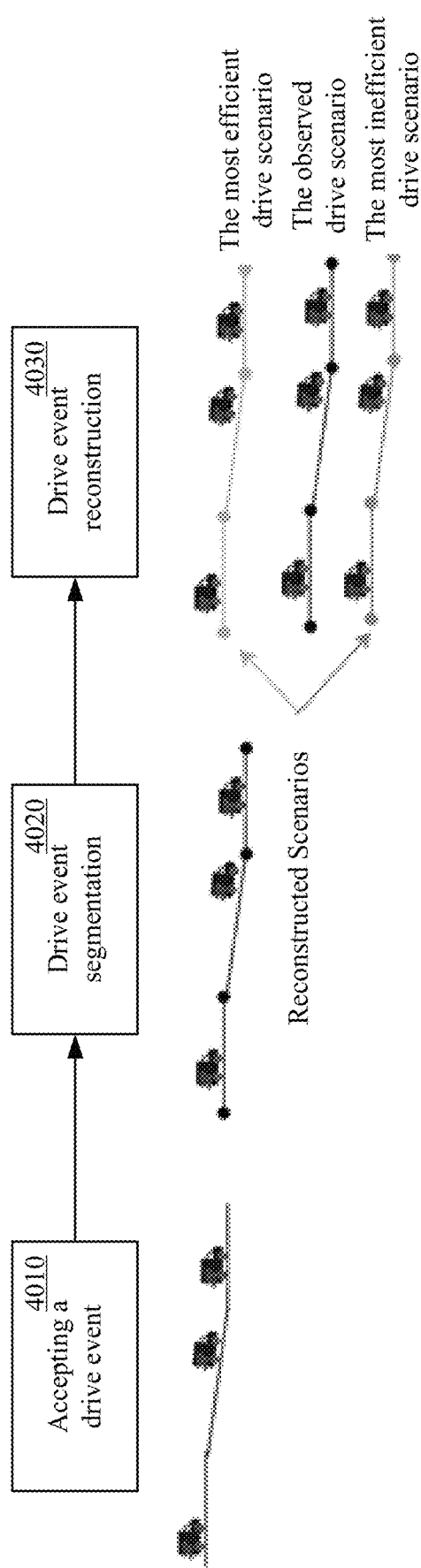
FIG. 40 shows a drive event segmentation and reconstruction, in accordance with aspects of the present technology.

Referring now to FIG. 40, a drive event segmentation and reconstruction, in accordance with aspects of the present technology, is illustrated. The events reconstruction, optimization and ranking unit can be configured to receive an observed scenario 4010 and associated observed energy efficiency. The observed scenario can be segmented 4020 into smaller sub-events. In one implementation, the segmentation can be done by discretizing the drive event based on equal time windows like Δt=10 sec. The algorithm can query the data repositories residing in the data management unit to reconstruct the drive segments. The best and worst possible scenarios and associated best and worst efficiencies can be determined for each segment 4030. In one implementation, the best solution can be generated by stitching the best segments resulting from the queries in a greedy manner. The worst solution can be generated by stitching the worst segments.

The observed energy efficiency can be normalized as a function of the best and worst segment energy efficiencies. In one implementation, upon determining the best and worst driving scenarios and associated efficiencies, the given driving scenario can be normalized and ranked with respect to the best and worst boundary scenarios. The normalized ranking can be expressed in accordance with Equation 2.

$$z = \frac{n_{obs} - n_{worst}}{n_{best} - n_{worst}} \quad (2)$$

where z is the ranking score of the driver or drive event, $n_{obs}$ is the observed efficiency of the given driver or drive event, $n_{best}$ and $n_{worst}$ are efficiencies associated with the best and the worst drivers or drive events. It should be noted that z-score is a continuous variable in the [0,1] interval. However, for categorization purposes, the z-score can also be discretized to categorize the drivers or drive scenarios, such as in the following exemplary performance categories: 1) 0≤z<0.25, very poor performance, 2) 0.25≤z<0.50, poor performance, 3) 0.50≤z<0.75, good performance, 4) 0.75≤z<0.90 very good performance, and 5) 0.90≤z≤1.00, excellent performance.

Referring again to FIG. 34, the normalized performance comparison system 3400 can further include a causation analytics unit 3455. The causation analytics unit 3455 can be configured to extract a plurality of driving rules based on one or more of the best or near best driving scenarios determined by the Monte Carlo simulation. The causation analytics unit 3455 can also extract additional driving rules based on one or more of the worst or near worst driving scenarios. The normalized performance comparison system 3400 can further include a training/assist unit 3460. The training/assist unit 3460 can be configured to output one or more throttle, brake, and gear indications to a driver based on the one or more driving rules in a coaching mode. Alternatively, the training/assist unit 3460 can be configured to modify one or more of a driver throttle input, a driver brake input, a driver gear input and a driver steering based on the one or more driving rules in an assist mode.

Vehicles are an important part of modern society and often used to make numerous endeavors more convenient. Traditionally, various types of vehicles participate in numerous different activities, such as transportation, construction, agriculture, and so on. The costs associated with operating such vehicles can be significant and it is appreciated there are a number of different types of costs that can contribute to the overall operational cost (e.g., energy or fuel costs, maintenance costs, labor/operator costs, insurance, etc.). Typically, the manner in which vehicle operations are implemented (e.g., speed, acceleration/deceleration rates, turning radius, etc.) can have a very significant impact on the operating costs. Implementation of acceleration/deceleration rates and turning radiuses can greatly increase energy consumption and maintenance issues (e.g., wear and tear on breaking systems, tires, shock absorbers, engines, etc.). The way a vehicle is operated can also have significant impacts on secondary costs (e.g., damage to things being carried by the vehicle, damage to roadways, etc.).

Conventional vehicle operation typically involves a feedback loop in which a user is responsible for most or all of the significant control decisions and operations. The user is often responsible for detecting or sensing various conditions (e.g., observing objects, listening for sirens, feeling bumpy pathways, etc.), analyzing the conditions and determining appropriate adjustments (e.g., accelerate/decelerate, turn, etc.), and conveying the adjustments to the vehicle (e.g., step on the pedal an appropriate amount, rotate a steering wheel an appropriate amount, etc.). Traditional users, being subject to human frailties, are also often considered the "weakest link" in conventional vehicle operation feedback loops. Users typically do not have a skill level sufficient to accurately detect operating conditions and control implementation of vehicle operations in a manner that realizes desirable or optimized performance. There is also a great deal of difference in skill level between different users, with the vast majority usually falling far short of being considered optimal or desirable users.

In addition, vehicles are typically utilized in environments that present a great deal of variable and dynamic operating conditions. Differing environmental conditions (e.g., terrain, weather, etc.), numerous path configurations (e.g., straight, curves, winding, etc.), varying traffic conditions (e.g., number of other vehicles, frequency of stop lights/signs, etc.), and the like often require vehicle operation adjustments (e.g., adjust speeds, acceleration/deceleration, gears, etc.) in order to maintain a high performance level. The traditional impediments to users accurately performing traditional feedback loop responsibilities can have significant adverse impacts of vehicle operation performance and corresponding operational costs.

Overcoming vehicle operation performance issues was typically problematic in the past. Conventional attempts at fully autonomous vehicle operation and complete removal of user participation are usually cost prohibit and often impractical. Traditional attempts at maintaining user participation while providing support for vehicle operations are often very limited. For example, traditional status indication aids (speedometers, tachometers, etc.) are typically limited to just presenting an indication of an actual present condition. In some instances, traditional status indications may attempt to provide some warning of a dangerous condition (e.g., overheating, parking break still on, etc.), but do not typically provide a suggestion on implementing vehicle operation. In addition, traditional approaches to assisting with vehicle operation are also typically limited to somewhat simplistic solutions (e.g., static control, setting a cruise control to a specific speed, etc.) that do not address the typical complex conditions (e.g., dynamic conditions, changing traffic speeds, etc.) encountered during vehicle operations. Past vehicle operation approaches do not typically provide a mechanism for realizing sufficiently desirable improved vehicle operation performance. In addition, traditional interaction and interfacing between a user and vehicle are typically limited and do not provide vehicle operation related information in a sufficient amount or suitable manner to facilitate improved vehicle operation and realization of performance objectives.

Systems and methods presented in the following description include efficient and effective interfacing between a user and a vehicle. Proper interactions between the user and vehicle are often important for acceptable vehicle operation. Accurate and convenient conveyance of information between a user and vehicle is typically crucial for realizing good vehicle operation results. In one embodiment, successful implementation of vehicle operations is related to achieving the performance objectives. In one exemplary implementation, conveyance of information between a user and vehicle is associated with various performance objectives. The performance objectives can be associated with operating costs (e.g., costs associated with fuel consumption, wear and tear, etc.). The user and vehicle interaction, including conveyance of information, can occur via a user interface. It is appreciated user and vehicle interaction and interfacing can be associated with various aspects of operating a vehicle and performance objectives.

The nature of user interactions with respect to vehicle operations can vary (e.g., some level of monitoring by a user, some degree of user control in vehicle operations, etc.). In one embodiment, a vehicle can operate in various modes that correspond to the nature or level of user interaction with the vehicle (e.g., a passive mode, a coaching mode, an assist mode, an autonomous mode, etc.). In one exemplary implementation, efficient and effective user and vehicle interfacing plays an important role in improving vehicle operation and increasing the likelihood of achieving performance objectives during various operating modes.

Figure 41:
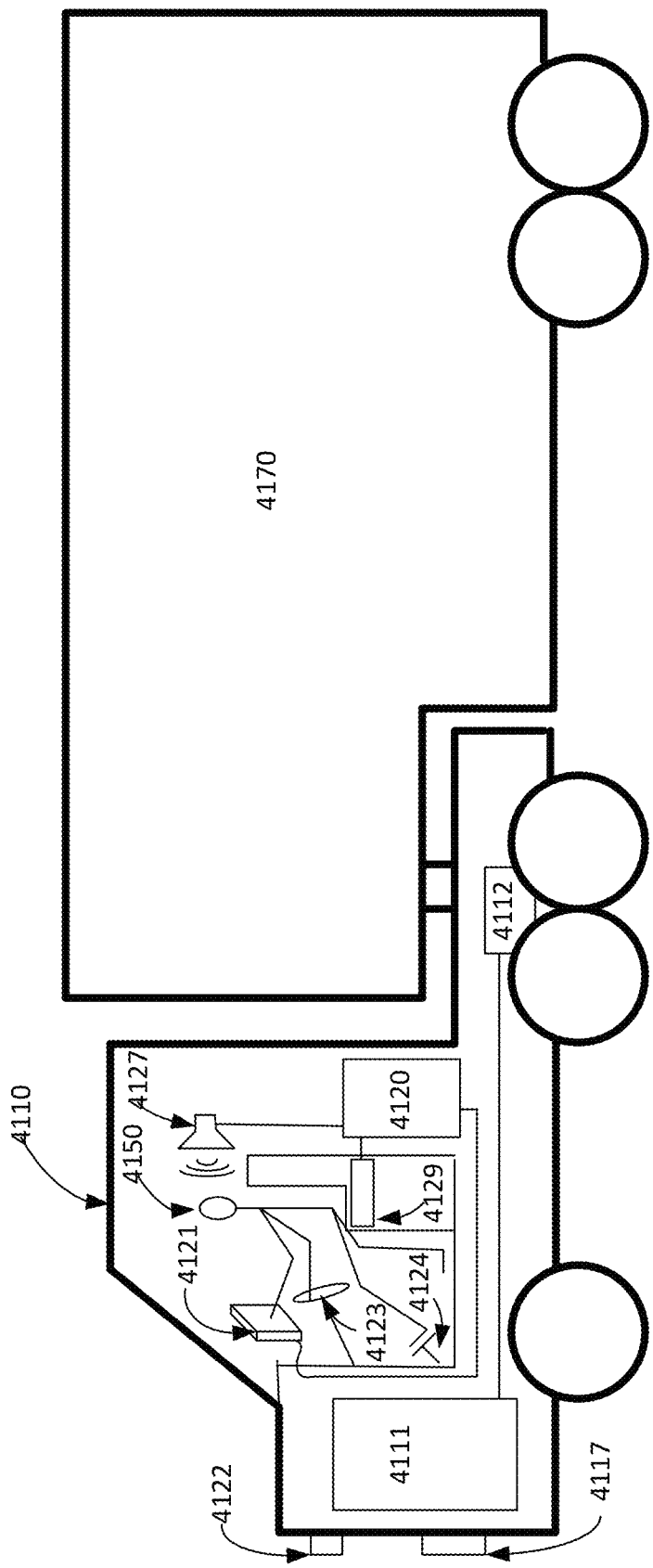
FIG. 41 shows an exemplary vehicle, in accordance with aspects of the present technology.

FIG. 41 is a block diagram of an exemplary vehicle 4100 in accordance with one embodiment. Vehicle 4100 includes a cab portion 4110 and a trailer portion 4170, which can be coupled and uncoupled form one another (e.g. by a hitching component, etc.). Cab portion 4110 includes engine 4111, transmission component 4112, operation analysis system 4120, user interface display 4121, steering wheel 4123, pedals 4124, audio component 4127, haptic component 4129, headlight 4117, and sensor 4122. Engine 4111 creates propulsion drive for the vehicle. Transmission 4112 transmits the propulsion drive to the wheels. Steering wheel 4123 enables the user 4150 to convey steering directions to the vehicle. Pedal 4123 enables the user 4115 to convey acceleration and deceleration directions to the vehicle. Headlight 4117 can illuminate a path for the vehicle. Sensor 4112 can sense environmental conditions (e.g., other cars, trees, visibility, etc.). Operation analysis system 4120 can receive information from various components of the vehicle (engine 4111, steering wheel 4121, pedal 4124, sensor 4122, user interface display 4121, etc.) and can perform various analysis with regards to vehicle operation. Operation analysis system 4120 can also forward information associated with results of the analysis to various components of the vehicle (engine 4111, user interface display 4121, headlights 4117, etc.).

It is appreciated that interface display 4121 and audio component 4127 can be included in a user interface. The user interface can convey information between a user and components of the vehicle. The user interface can convey information between user 4150 and operation analysis system 4120. In one exemplary implementation, the user interface can convey information between user 4150 and other components of the vehicle (e.g., engine 4111, headlights 4117, etc.). In one embodiment, steering wheel 4123, and pedal 4124 convey control directions and information to the vehicle (e.g., engine, wheels, analysis component, etc.) and are considered part of a user interface. It is appreciated that other components can be considered part of a user interface (e.g., a turn signal stalk, headlights switch, hazard light buttons, etc.), In one embodiment, components that convey information (e.g., status, instruction, control, etc.) between a user and a vehicle can also be considered part of a user interface.

It is appreciated a user interface can be implemented in various types of vehicles (e.g., cars, trucks, boats, planes, etc.). The vehicles can have different propulsion mechanisms (e.g., combustible engine, electric engine, turbine engine, sail, human powered, etc.). The vehicle can have different user interface control mechanisms (e.g., steering, acceleration/deceleration, etc). A vehicle can have different types of steering mechanisms (e.g., a steering wheel, a joy stick, etc.).). A vehicle can have different types of acceleration/deceleration mechanisms (e.g., a pedals, dials, buttons, etc.). In one embodiment, user interface display 4121 can operate as a control mechanism (e.g., touch screen up/down button is use to enter a speed value, a rotating hand gesture on an icon enters a steering instruction, etc.).

Figure 42:
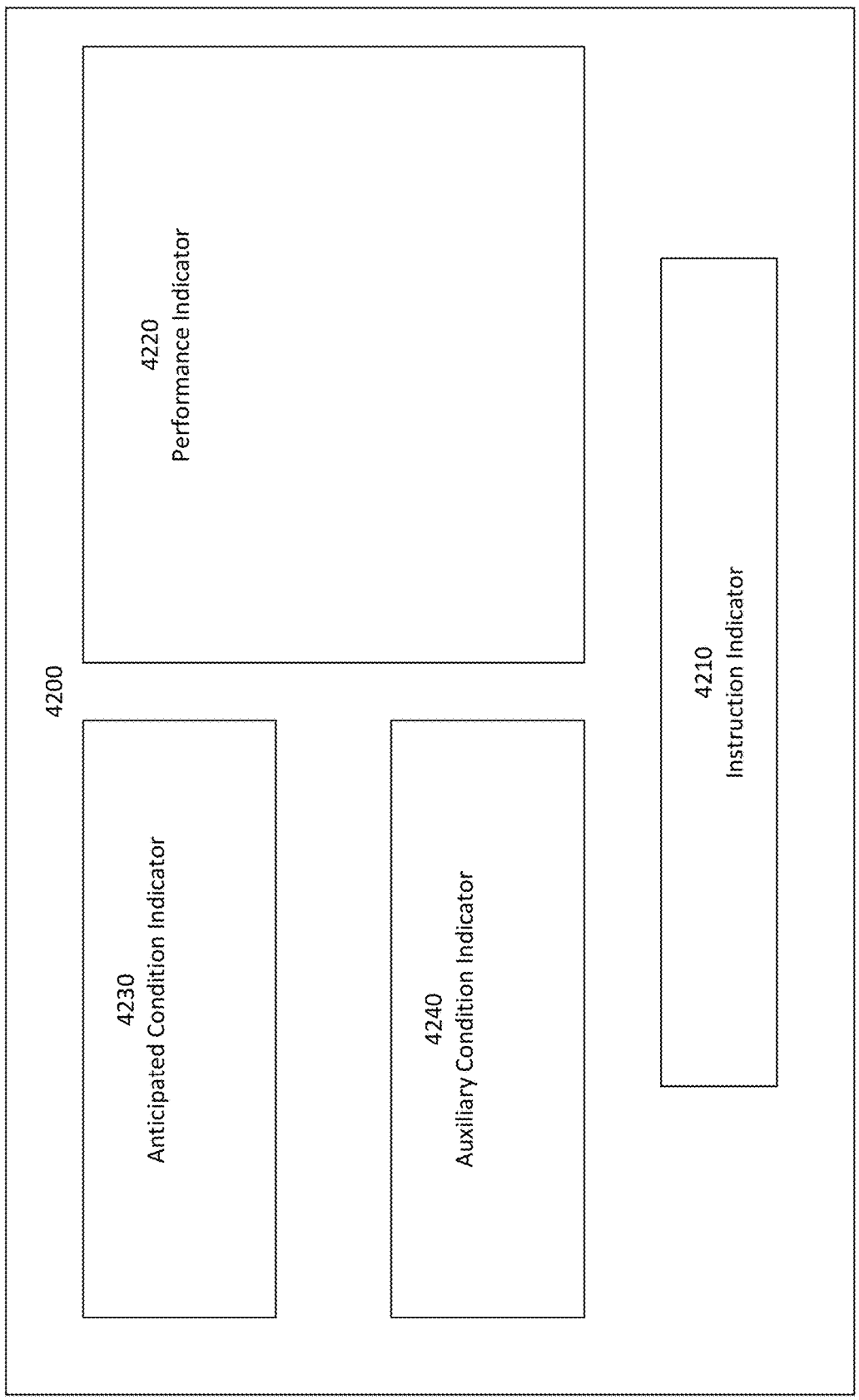
FIG. 42 shows a user interface, in accordance with aspects of the present technology.

FIG. 42 is a block diagram of a user interface 4200 in accordance with one embodiment of the present invention. User interface 4200 includes instruction indicator 4210, performance indicator 4220, anticipated condition indicator 4230, and auxiliary indicator 4240. Instruction indicator 4210 is configured to enable input of user instructions to the vehicle, including conveying user instructions to operation analysis system 4120. Performance indicator 4220 is configured to convey information associated with the various aspects of vehicle operation. An auxiliary indicator 4120 is configured to convey supplementary information, which can include information associated with ancillary functions or conditions (e.g., that can supplement, support, assist, compliment, etc.). The supplemental information can include status of headlights, air conditioning, external weather, and so on.

Figure 43:
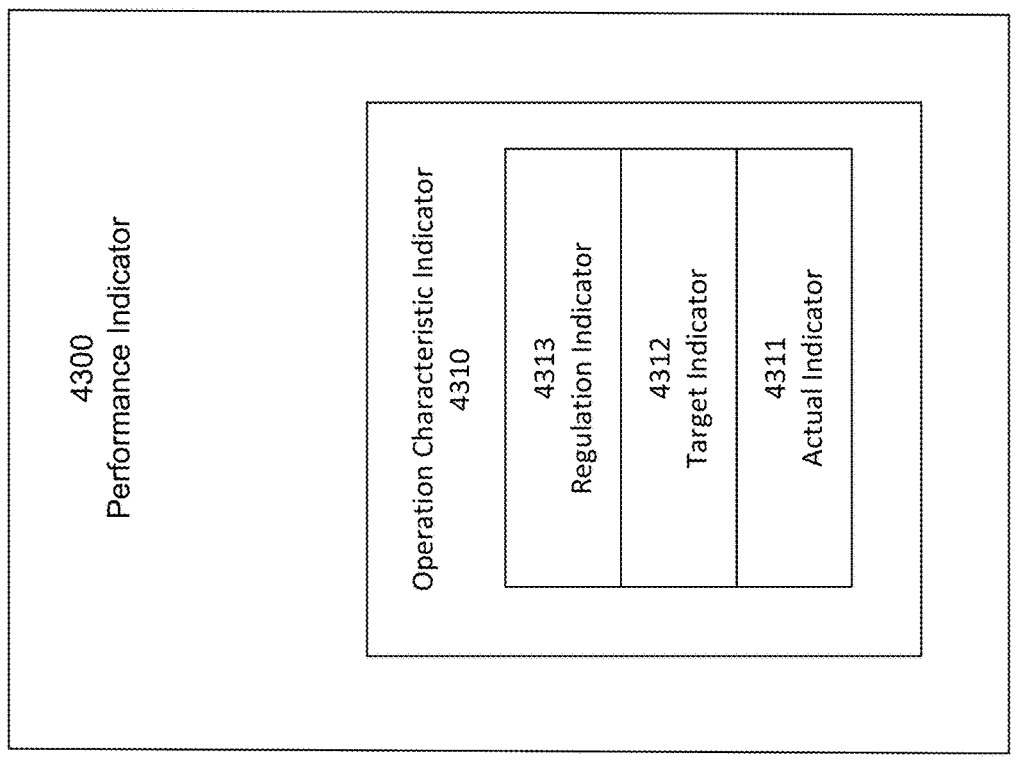
FIG. 43 shows an exemplary performance indicator, in accordance with aspects of the present technology.

It is appreciated there can be various different types of indicators within an indicator category. FIG. 43 is a block diagram of an exemplary performance indicator 4300 in accordance with one embodiment. In one embodiment, performance indicator 4300 is similar to performance indicator 4220. Performance indicator 4300 can include an operational characteristic indicator 4310 that conveys information associated with an operation characteristic (e.g., speed, acceleration, travel direction, steering, etc.). Operational characteristic indicator 4310 can include an actual performance indicator 4311, target indicator 4312, and a regulatory indicator 4313. It is appreciated the performance indicators can be associated with various metrics (e.g., speed, fuel consumption, direction, handling, etc.) associated with the vehicle operation. The actual performance indicator 4311 can convey information regarding the actual performance associated with the vehicle operation. A target indicator 4312 can convey information regarding a target (e.g., goal, objective, aim, aspiration, etc.) performance associated with the vehicle operation. A regulation indicator 4313 can convey information regarding regulatory requirements associated with performance of a the vehicle operation (e.g., speed limit, location of a vehicle such as stopping behind a stop line, parking in a no-parking spot, distance from another object such as a fire hydrant, another vehicle, etc.).

In one embodiment, information associated with configuring and implementing a user interface are generated by a processing component. In one exemplary implementation, the processing component generates graphical display values for creating an image on a display (e.g., pixel illumination values, pixel color values, pixel brightness values, pixel intensity values, etc.). In one embodiment, information associated with configuring and implementing a user interface are generated by an analysis component. The analysis component can be similar to analysis component 4120. The analysis component can also output information associated with vehicle operation and performance objectives.

In one embodiment, an operation analysis system participates in vehicle operation. The analysis system activities can depend upon a vehicle operation mode. A first mode can be considered a passive mode that includes monitoring user and vehicle operation activities and storing corresponding information. A second mode can be considered a coaching mode that includes guidance notification (e.g., advice, coaching, etc.) on vehicle operation and performance to a user. A third mode can be considered an assist mode that includes both guidance notifications and partial assistance on implementation of vehicle operations and realization of performance objective. A fourth mode can be considered an autonomous mode in which the operation analysis system controls implementation of most or all of the vehicle operations. An autonomous mode does not necessarily preclude any user interactions and can include the possibility of some user participation or interaction and interfacing (e.g., utilizing user input if the user wants to provide it, utilizing the user interface to participate in vehicle operation control in an emergency, etc.). In one embodiment, a user interface or HMI can be used to indicate or select a mode of operation that corresponds to a level of vehicle operation monitoring and control assistance capabilities. Characteristics (e.g., amount, type, etc.) of user interaction and associated user interfacing with a vehicle can vary according to the mode selection and corresponding level of vehicle operation monitoring and control assistance capabilities.

In a passive mode, an efficient and effective user interface can be useful. Even though a user is responsible for most or all of the vehicle operation control and an operation analysis system is primarily just monitoring and storing corresponding information, the user may find the efficient and effective conveyance of the monitored information helpful. In one embodiment, a user interface conveys information associated with current information vehicle operation. The user interface can include indications of vehicle speed, RPM, engine condition warning (e.g., overheating, low oil, battery problems, etc.), status of auxiliary features (e.g., such as headlights, air conditioning, emergency/parking brake, etc.), and so on. The convenient and accurate conveyance of information between the user and vehicle via the interface can improve vehicle performance. The user interface features (e.g., clear, intuitive, etc.) enable proper timing of user actions (e.g., turning steering wheel, changing pressure on pedal, etc.) that correspond to improved vehicle operation performance. The user interface features that aid and promote user realization of accurate information enable correct user decisions regarding values for vehicle operation (e.g., proper amount of acceleration/deceleration, speed, turning radius, etc.) that result in proper vehicle operation and performance objective achievement.

In a coaching mode, an efficient and effective user interface is important. The basic nature of a coaching mode is to provide advice information to a user. The coaching mode is similar to the passive mode in that the user is typically making the final control decision and implementing the corresponding vehicle operations. However, the user is utilizing advice from the operation analysis system to make the final control decision. The operation analysis system is capable of overcoming many human frailties associated with detecting conditions that impact driving operations and analyzing the conditions to derive a good plan for suggesting vehicle operations. By utilizing the advice information, a user has the opportunity to implement vehicle operations that improve or maximize vehicle performance. Thus, the conveyance of information in some ways is similar to the passive mode, only more important in that the user is actively seeking and somewhat depending upon the information for proper vehicle operation.

In an assist mode, an operation analysis system is involved in both providing information to a user and participating in implementing vehicle control actions, and an efficient and effective user interface is again very important. Given that both the user and the operation analysis system are involved in what is essentially a participatory relationship, interactions and interfacing between the user and the vehicle are critical to proper assist mode vehicle operation. In the assist mode, implementation of vehicle operations rely heavily on leveraging advantageous characteristics that both the user and operation analysis system have, while avoiding or coping with the weaknesses each have. This depends heavily on the cooperative operation realized through user and vehicle interactions and interfacing between the user and the vehicle.

With regards to an autonomous mode, it may seem that a user interface is not important since the vehicle is essentially operating automatically. However, in some ways an efficient and effective user interface is even more important in an autonomous operation mode. Given that a user may be paying no or little attention to vehicle operation as a general proposition, in those instances where user interaction may be important or critical (e.g., hazardous traffic condition, impending accident, critical operating condition, running out of fuel, etc.) getting a user's attention and conveying significant information immediately and completely can be very important. It may be a situation in which a user's intuitive or reflexive attributes could be very helpful to the autonomous system (e.g., in correctly/completely detecting a detrimental condition or situation, analyzing and implementing corrective action, etc.). In one embodiment, a vehicle can tend to give deference or added weight to the automated analysis in autonomous mode with regard to vehicle operation and performance. In some situations or conditions a user may not naturally or intuitively have the same access and insight into information regarding vehicle operation and performance an analysis system. An analysis system may have path information (e.g., an upcoming curve, a traffic light/sign after the curve, etc.) or other condition information (e.g., radar indication of another vehicle in foggy situation, detection of black ice, etc.) that a human typically has difficulty knowing or detecting. Thus, an efficient and effective user interface that conveys information conveniently and concisely in an autonomous operation mode is also very important.

In one embodiment, modes of vehicle operation are dependent on configuration and implementation of a vehicle operation analysis system. Vehicle operation analysis system can include various features, functions, and characteristics. The features, functions, and characteristics can be associated with associate with various types of analysis (e.g., artificial intelligence, expert systems, machine learning, etc.). The analysis can be based upon historical information. The analysis can produce predictive or future vehicle operation information. In one embodiment, the analysis can include detection and identification of various conditions (e.g., traffic conditions, weather conditions, etc.), different types of analysis (e.g., logical, deductive, inferential, predictive, etc.), and participating in implementation of the vehicle operations (e.g., directing control of acceleration/deceleration activities, steering activities, etc.). In one embodiment, the features, functions, and characteristics of a vehicle operation analysis system are configured to contribute to realization of performance objectives.

Vehicle operation and associated user interaction with the vehicle often involves a significant amount of complex and complicated considerations. There are numerous factors that can impact vehicle operation, such as characteristics of the vehicle (e.g., weight, horsepower, turning radius, etc.), path characteristics (e.g., curves, topography, grade, etc.), environmental characteristics (e.g., weather, traffic congestion, roadway condition, etc.) and so on. There are a number of different metrics (e.g., speed, acceleration/deceleration, turning rate, drive shaft revolutions per minute (RPM) torque, etc.) that can be utilized to describe vehicle operation characteristics. Furthermore, a vehicle can be operated based upon various objectives. The objectives can include performance objectives (e.g. traveling a distance in a particular amount of time, maintaining relatively low costs, fuel efficiency, etc.). Properly addressing these considerations can include conveyance of very complex and complicated information.

It is appreciated that a user interface can include different types of indicators that convey information. A user interface can include indicators that convey information via visual cues (e.g., text, symbols, images, icons, colors, etc.). A user interface can include indicators that convey information via audio cues (e.g., sounds, alarms, horns, voice simulation, words, songs, etc.). A user interface can include indicators that convey information via tactile cues (e.g., vibrations, resistance, force, electricity, heat, cold, etc.). A user interface can convey information via different types of indicators included in various media and mechanisms.

In one embodiment, a user interface can include a display component for displaying information. There can be various different types of display components (e.g., a monitor, a screen, a tablet, a heads-up display, integrated with another component such as a windshield, a projection, etc.). In one exemplary implementation a user interface can include a graphical user interface (GUI). The information can be conveyed via visual cues. It is appreciated characteristics of the visual cues can enable efficient and effective conveyance or information related to vehicle operation and performance objectives. The shape of the indicator can be configured to convey characteristics or status of the information. An indictor in the shape of an arrow can be used to indicate a change in amount (e.g., an arrow pointing up can indicate an increase, arrow pointing down can indicate a decrease, etc.). An indicator in the shape of an "X" or image with a diagonal bar through it can indicate an undesirable condition or characteristic. A color of the indicator can be configured to convey characteristics or status of the information. A green color indicator can convey an operation is within an acceptable or desirable characteristic or condition. A yellow color indicator can convey a warning that an operation is approaching an unacceptable or undesirable characteristic or condition. A red color indicator can convey that operations are in an unacceptable or undesirable characteristic or condition.

The information can be displayed via a graphic image on a user interface display and the graphic image can be configured in a shape and color that is readily observable, discernable, and assists with an intuitive understanding. In one exemplary implementation, an icon or image of a vehicle component (e.g., steering wheel, pedal, etc.) and action indicator (e.g., arrow indicating a turn in the steering wheel, up/down arrow indicating force on the pedal, etc.) are presented or displayed under a highlighted (e.g., flashing, red, etc.) prevent or avoid indicator (e.g., a big "X", circle with a line through its center, etc.) and conveniently conveys that a user should avoid or cease a particular action related to the vehicle component. These features of the presentation enable quick and reliable user detection, analysis, and response. The highlighting grabs the user's attention, the component image instantaneously conveys the component involved, the action indicator similarly conveys the action involved, and the prevent indicator intuitively indicates the correct user reaction. The quick and reliable conveyance of the information also enables the user to make an almost instantaneous analysis of the corrective action to achieve appropriate vehicle operations. The quick and reliable conveyance of the information contribution to the detection and analysis enables rapid and accurate implementation of the appropriate (e.g., desirable, corrective, advantageous, performance objective, etc.) action on the vehicle operation.

In one embodiment, a user interface can include an audio component for conveying information via audio cues. In one embodiment, a user interface includes a speaker configured to convey audio sounds. In one exemplary implementation a user interface includes a microphone configured to convey audio sounds. It is appreciated characteristics of the audio cues can enable efficient and effective conveyance or information related to vehicle operation and performance objectives. Differences in types of sounds (e.g., alarm, horn, ping, etc.) and volume of the sounds can convey characteristics or status of the information. In one embodiment, a load alarm indicates an imminent danger. In one exemplary implementation, changes in a ping sound indicate changes corresponding to vehicle operations (e.g., changing acceleration/deceleration in the vehicle, increasing/decreasing proximity to an object, need for more/less user interaction with a vehicle component, etc.).

A user interface can include audio features that can enable input and output of information in audio form. In one embodiment, a user interface can convey audio related information to a user (e.g., conveyance of verbal information, alarm sounds, etc.). In one embodiment, a user interface conveys audio related information to an operation analysis system via sound detection and recognition (e.g., sound of user voice, car horns, railway crossing gate bell, etc.). User interface audio features can be implemented in various ways (e.g., integrated in a user interface display component, separate speaker component, etc.). Audio sounds can also be conveyed in a convenient and intuitive manner that enables accurate and intuitive detection of a condition, rapid analysis, and implementation of a vehicle operation activity. In one exemplary implementation, different characteristics of an audio sound can convey information associated with vehicle operation. A type of sound (e.g., alarm, ping, etc.) may correspond to a type of condition or operation and a characteristics of a sound (e.g., volume, frequency, duration between occurrence, etc.) can convey information regarding the condition or operation (e.g., seriousness or immediacy of the hazard, rate of change in the activity, etc.). A type of sound (e.g., alarm, siren, horn, etc.) can convey a hazard and a volume of the sound can convey the seriousness or immediacy of the hazard. A type of sound (e.g., alarm, pinging, etc.) can be associated with a particular operation activity (e.g., pressing a pedal, turning a steering wheel, etc.) and changes in the volume or occurrence of the sound can convey a desire/need for a change in the activity (e.g., disengage in an activity such as stop pressing a gas pedal and so on, engage in an activity such as pressing break and so on, increase/decrease an activity such as alter a steering wheel rotation and so on, etc.), The characteristics of the sound enable quick and reliable detection and conveyance of information, and also enables quick and reliable analysis and response to the information. The type and volume of the sound can get a user's attention and convey the condition involved in a manner the user is likely to interpret rapidly and accurately. The rapid and accurate conveyance of the information also enables an accurate and almost instantaneous analysis and generation of actions that achieve appropriate vehicle operation. The quick and reliable conveyance of the information contribution to the detection and analysis in turn enables rapid and accurate implementation of the appropriate (e.g., desirable, corrective, advantageous, performance objective, etc.) action on the vehicle operation.

In one embodiment, a user interface can include a sensory component for conveying information via tactile cues. It is appreciated characteristics of the tactile cues can enable efficient and effective conveyance or information related to vehicle operation and performance objectives. In one embodiment, a vehicle component (e.g., steering wheel, pedal, etc.) can offer more resistance to a user initiated movement or can initiate a force or pressure against the user contact (e.g., initiate a turn of a steering wheel even if a user hand is resting on it, initiate a raising of a pedal even if a user foot is resting on it, etc.). In one exemplary implementation, changes in a tactile can correspond to changes in vehicle operation. In one exemplary implementation, changes in a vibrations of a vehicle component (e.g., steering wheel, pedal, etc.) indicate changes corresponding to vehicle operations (e.g., changing acceleration/deceleration in the vehicle, need for more/less user interaction with a vehicle component, such as amount of a steering wheel rotation or pressing on a pedal, and so on.).

It is appreciated that multiple aspects or mechanisms of a user interface can be used cooperatively to rapidly and accurately convey information. In one embodiment, a user interface display conveys information visually and a user interface audio features convey information via sounds. Similar vehicle operation information can be conveyed cooperatively in a manner that increases the likelihood of accurate conveyance. In one exemplary implementation, a user interface display flashes an icon indicating an instruction to break or reduce speed while at substantially the same time an audio feature emits a verbal instruction to beak or reduce speed. Different vehicle operation information can be conveyed cooperatively in a manner that increases the amount of information that is conveyed. In one exemplary implementation, a user interface display presents an icon indicating a change in vehicle direction or path while at substantially the same time an audio feature emits a verbal indication of a performance objective achievement.

The rapid and accurate conveyance of the information by a user interface (e.g., via a user interface display, audio features, etc.) and corresponding implementation of the appropriate action enables improved vehicle operations and increased likelihood of achieving performance objectives. In one embodiment, the user interface enables cooperative operation of a vehicle leveraging the strengths of user capabilities and vehicle component capabilities (e.g., sensors, automated vehicle operation analysis, etc.), while avoiding capability shortcomings of the user and the vehicle components. In one exemplary implementation, sensors capabilities (e.g., camera, radar. laser, infrared, etc.) associated with detecting a condition (e.g., object, other vehicle, roadway condition, etc.) and analysis capabilities (e.g., artificial intelligence, result predictions, etc.) enable generation of accurate information without human frailties for either automated or a user implementation of a control action. The rapid detection, analysis, and generation of control information enables quick corrective operation action and less operation in undesirable states resulting in improved vehicle operation and relaxation of performance objective. Vehicle operation information generated from user capabilities (e.g., intuitive input, rapid reflexive input, take over in emergency/analysis system failure, etc.) can be input via a user interface. Again, the rapid detection, analysis, and generation of control information enables quick corrective operation action and less operation in undesirable states resulting in improved vehicle operation and relaxation of performance objective. The conveyance of accurate information via the user interface can ensure operation in a correct or desirable state or range and avoid operation in incorrect or undesirable state or range, resulting in improved vehicle operation and relaxation of performance objective.

It is appreciated an analysis system and vehicle condition detection or sensor components enable improved vehicle operation in a manner that overcomes a number of frailties associated with user control. Many vehicle condition detection or sensor components (e.g., radar, laser, lidar, sonar, altitude meter, incline sensor, traction slippage sensor, etc.) can detection or sense conditions a human cannot naturally or intuitively detect. Some of this information in its raw form can be very difficult for a user to interpret and analyze while an analysis component can handle interpretation and analysis of the information from the detector. In one embodiment, the analysis component is able to translate the information into a convenient easy to understand format via a user interface for utilization in user control operations. An analysis component can also have access to large amounts of information (e.g., stored locally, accessed from remote location, received from vehicle sensors/detectors, GPS information, etc.) that a user does not naturally have access to. An analysis component can also the ability to rapidly and accurately process the information in a manner the user can not. Even if a user could over an extended period of time get access to the information and perform some of the processing, a user can not typically perform gather the information and perform the processing or analysis within timing constraints to make the results useful or relevant to a currently or imminently implemented vehicle operation and performance objective. In addition, user gathering of the information and performance of the processing or analysis typically involves some level of human frailty, giving rise to accuracy and repeatability issues that an analysis component and vehicle detectors do not have. The analysis component and vehicle detectors capabilities can enable improved vehicle operation and realization of performance objectives.

With regards to sensors, it is appreciated a vehicle can have sensors that detect conditions external to vehicle components (e.g., other vehicles, objects, weather, etc.) and also have sensors that detect internal vehicle conditions or conditions associated with vehicle operations (e.g., engine temperature, RPM, break wear, tire pressure, oil level, etc.).

In modes involving user participation in vehicle operation, having rapid and convenient conveyance of information between the user and the analysis component can improve implementation of the analysis component and vehicle detectors capabilities can enable improved vehicle operation and realization of performance objectives. In one exemplary implementation of an assist mode, the system relies on the user to receive information via the user interface and implement the vehicle operations based upon information associated the analysis component and vehicle detector capabilities that enable improved vehicle operation and realization of performance objectives. The rapid conveyance of accurate information via the user interface can ensure operation in a correct or desirable state or range and avoid operation in incorrect or undesirable state or range, resulting in improved vehicle operation and relaxation of performance objective.

In one embodiment, user input is utilized to improve analysis system operations. In one exemplary implementation, user input can be utilized to reduce the number of possibilities/contingencies an artificial intelligence (AI) analysis tries to computationally analyze. By reducing the number of possibilities/contingencies the analysis component can provide faster results. It can also free up analytic component resources to participate in additional processing and other activities. In one embodiment, user input can be utilized by artificial intelligence or machine learning operations to improve algorithms abilities to provide accurate and beneficial results.

Figure 44:
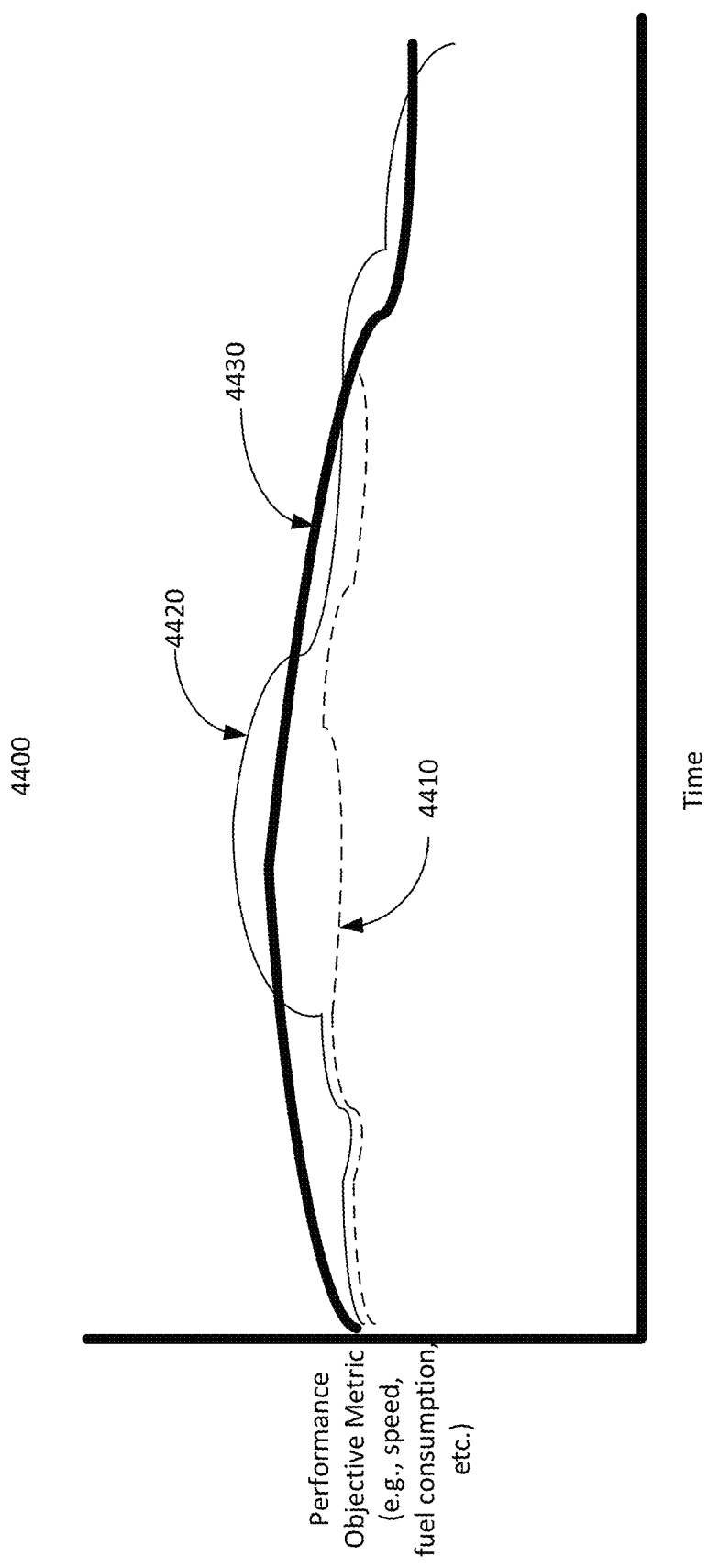
FIG. 44 shows an exemplary performance indicator, in accordance with aspects of the present technology.

It is appreciated that an indicator can be configured to convey information about one or more of past, present, and future operations. FIG. 44 is an illustration of an exemplary performance indicator 4400 in accordance with one embodiment. Performance indicator 4400 conveys information associated with a performance objective related metric (e.g., speed, fuel consumption, safety, etc.) over time. The dashed line 4410 can represent current trip information. The thin solid line 4420 can represent an optimal performance based upon previous trips made by the user. The solid line 4430 can represent performance based upon the performance of another user. In one embodiment, the other user is considered a professional or exceptional vehicle operator.

A user is typically a human and a vehicle is often considered a machine. In one embodiment, an interface is considered a human machine interface (HMI) that participates in activities related to vehicle operations. A human user and a vehicle typically each have abilities that can impact vehicle operation and performance. A human user typically has sensory capabilities, reflexive capabilities, and cognitive capabilities. In one embodiment, a machine includes detection capabilities and control assistance capabilities. The control assistance capabilities can vary from detecting and gathering information on vehicle operations to autonomous control the vehicle operations. Being able to efficiently and effectively convey information between the vehicle and the user is important to implementing desirable vehicle operation.

A user interface can include vehicle operation instruction buttons/icons that are user to input information from a user regarding vehicle operation characteristics. In one embodiment, an indicator can be utilized to convey output information and also as a vehicle operation instruction button/icon to input information. In one exemplary implementation, a display component includes a screen with interactive capabilities (e.g., capacitive sensing, touch screen capabilities, etc.) configured to convey information from the vehicle to the user and from the user to the vehicle.

Figure 45:
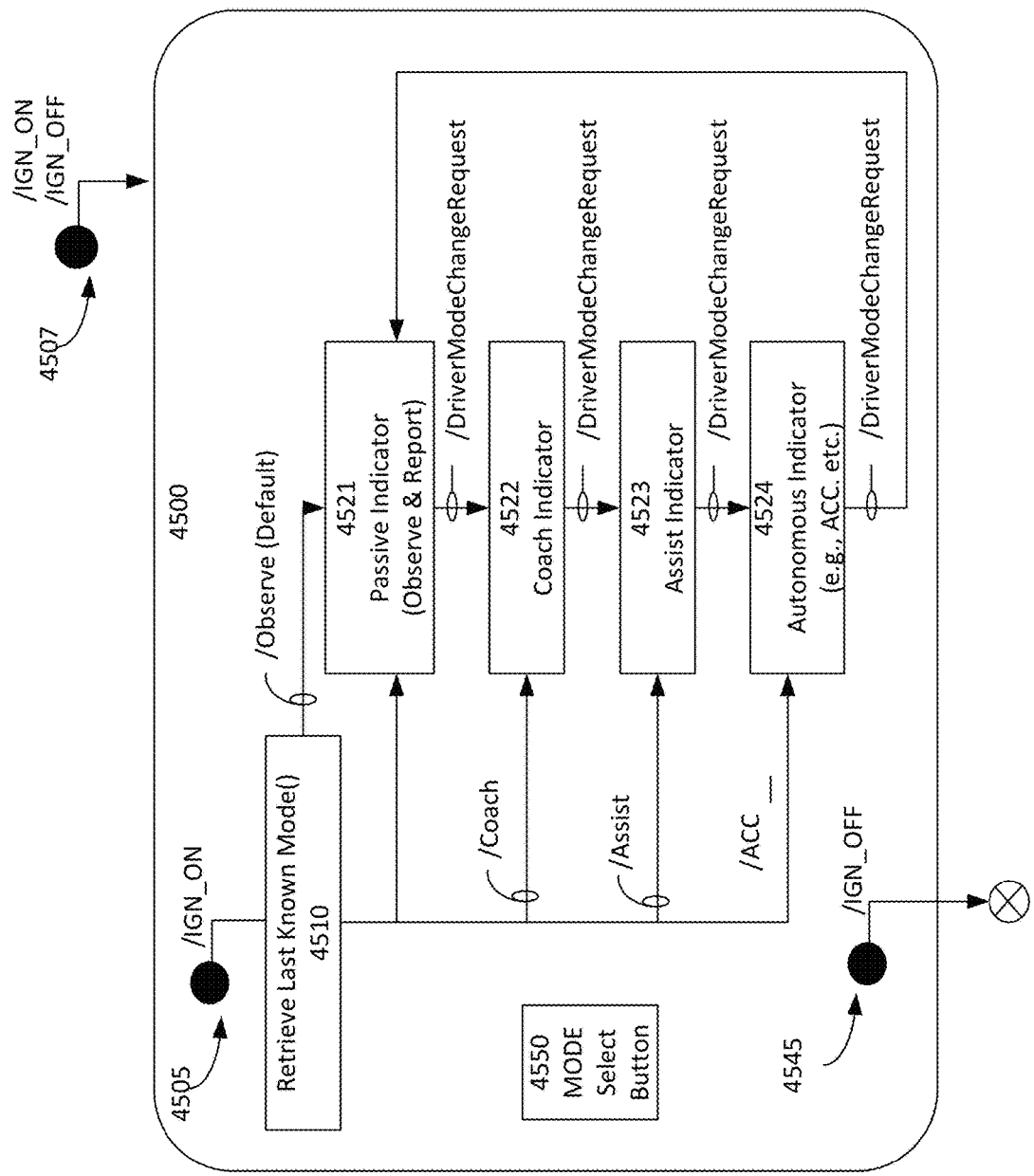
FIG. 45 shows an exemplary mode configuration user interface initial state, in accordance with aspects of the present technology.

In one embodiment, user interfacing includes information associated lane changes. In one exemplary implementation, surrounding traffic conditions (e.g., stopped, slow, merging, etc.) are detecting and a lane change is indicated. In one exemplary implementation, the lane change suggestion is related to realization of a performance objective (e.g., maintain safety, conserve fuel by avoid slow down, etc.), FIG. 45 is a block diagram of an exemplary mode configuration user interface 4500 initial state in accordance with one embodiment. The user interface includes an ignition on button/icon 4505, passive mode indictor 4521, a coach mode indicator 4522, assist mode indicator 4523, autonomous mode indicator 4524, mode select button/icon 4550, and ignition off button 4545. Ignition on button/icon 4505 indicates the vehicle ignition has been activated. In one embodiment, ignition on button/icon 4505 can also be used to activate the ignition (e.g., press, touch screen, etc.). Passive mode indictor 4521, coach mode indicator 4522, assist mode indicator 4523, and autonomous mode indicator 4524 convey information regarding operation of the vehicle in the respective mode. In one exemplary implementation, mode configuration information is conveyed (e.g., output, displayed, etc.) within 1500 milliseconds of ignition "on" being activated. In one embodiment, passive mode indictor 4521, coach mode indicator 4522, assist mode indicator 4523, and autonomous mode indicator 4524 can also be used to activate the respective mode (e.g., press, touch screen, etc.). In one exemplary implementation, mode selection button/icon 4550 is used to activate the respective mode. Ignition off button/icon 4545 indicates the vehicle ignition has been deactivated. In one embodiment, ignition off button/icon 4545 can also be used to deactivate the ignition. It is appreciated that ignition on/off activation can come from other components 4507 (e.g., key, fob, other button, etc.).

It is appreciated a user interface can be utilized to convey information regarding a number of vehicle operation characteristics (e.g., speed, acceleration/deceleration, turning radius, etc.) and corresponding metrics (e.g., miles per hour (MPH), kilometers per hour (km/h), pedal movement/position, degrees of steering wheel rotation, etc.). For ease of explanation, many of the features of a user interface are explained herein in terms of Adaptive Cruise Control (ACC) vehicle operation characteristics and corresponding metrics. One of ordinary skill in the art recognizes that user interface presented features can also be utilized with other vehicle operation characteristics and corresponding metrics.

Figure 46:
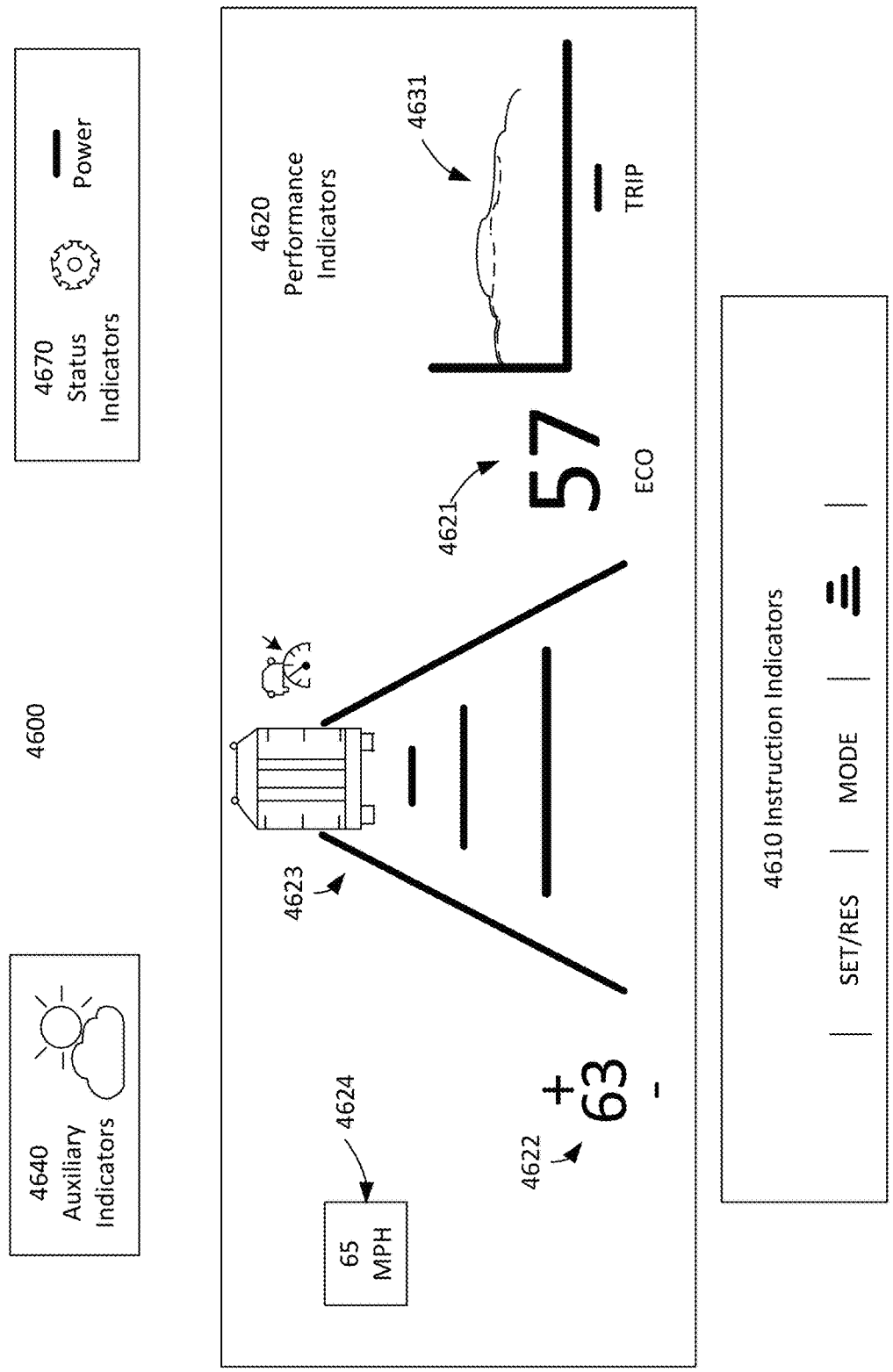
FIG. 46 shows an exemplary user interface, in accordance with aspects of the present technology.

FIG. 46 is a block diagram of an exemplary user interface 4600 in accordance with one embodiment. User interface 4600 includes instruction indicators 4610, performance indicators 4620, auxiliary indicators 4640, and status indictors 4670. Instruction indicators 4610 include a plurality of vehicle operation instruction button/icons. In one embodiment, the vehicle operation instruction button/icons include a set/resume button/icon, a mode button/icon, and a distance button/icon. Performance indicators 4620 includes a speed indicator 4621 for the speed system a vehicle is traveling at a given point in time, a user instructed speed indicator 4622, a actual distance indicator 4623, a regulatory speed indicator 4624, a performance objective realization indicator 4631. Auxiliary indicators 4640 includes an environmental weather condition indicator. Status indicators 4670 include an operation analysis system tools indicator and an operation analysis tools power indicator.

In one exemplary implementation, an Adaptive Cruise Control (ACC) on/off button (not shown) is utilized by a user to start ACC. Upon activation of the ACC on/off button, information regarding a default speed or a no default speed indication is retrieved (e.g., from a memory, register, etc.) and the initial ACC speed is set accordingly. The set/resume button/icon can be used to convey user instructions regarding ACC operations. The set portion can convey a user instruction to establishing a speed for the ACC that correspond to a speed the vehicle is currently traveling at. The resume portion can convey a user instruction to resume a prior stored speed.

A mode button/icon can be used to convey user directions to operate a vehicle in a particular mode. The modes can include a passive mode, a coach mode, an assist mode, and an autonomous mode. In one embodiment the autonomous mode includes ACC.

In one embodiment, a distance instruction button/icon can be used to convey user directions to regarding a distance to maintain between other vehicles.

Figure 47:
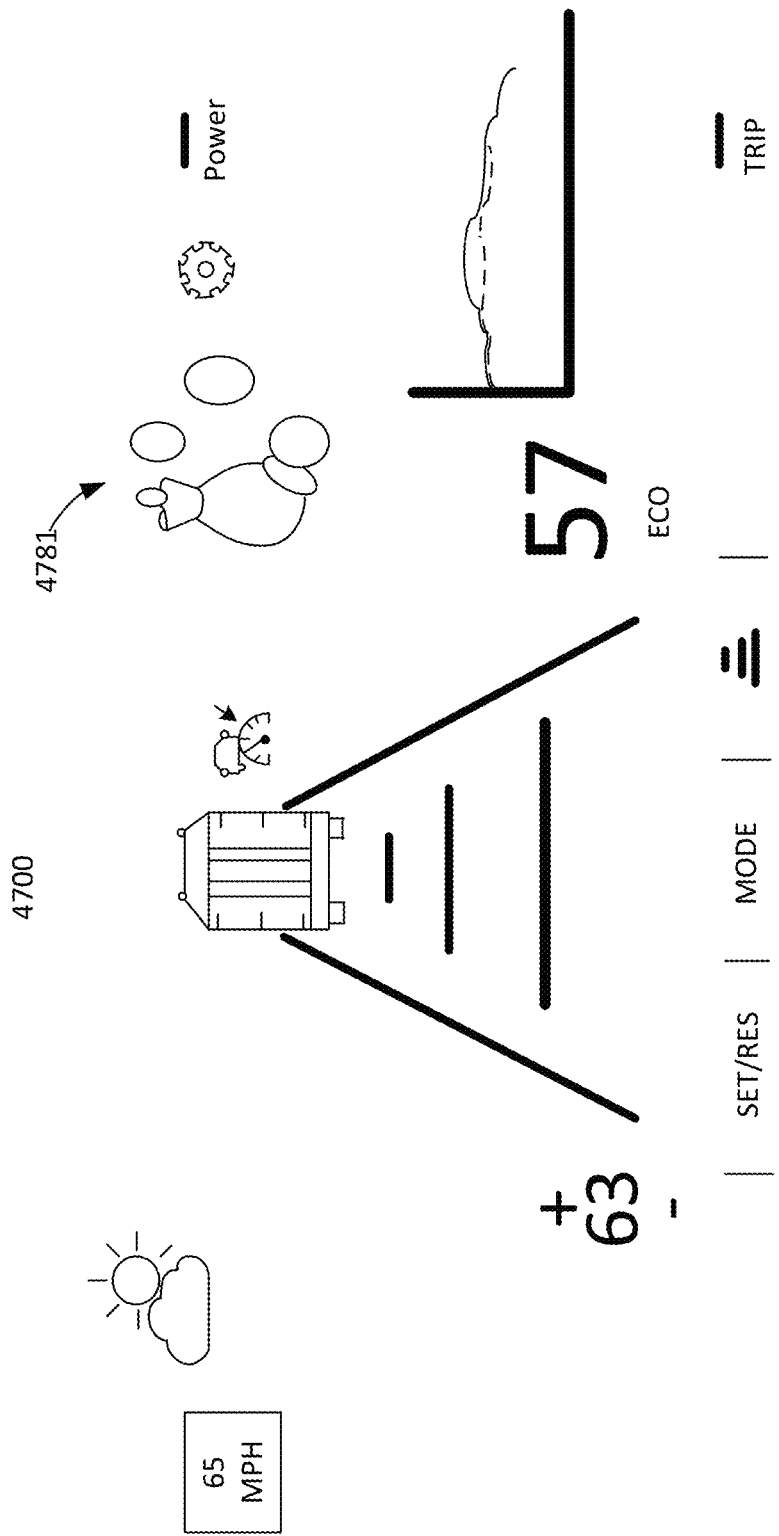
FIG. 47 shows an exemplary user interface conveying performance rewards as a trip progresses, in accordance with aspects of the present technology.

In one embodiment, incentives are available to encourage realization of a performance objective. FIG. 47 is a block diagram of an exemplary user interface 4700 conveying performance rewards as a trip progresses in accordance with one embodiment. User interface 4700 includes active incentive indication 44781 that displays additional coin icons as performance objectives are realized.

Figure 48:
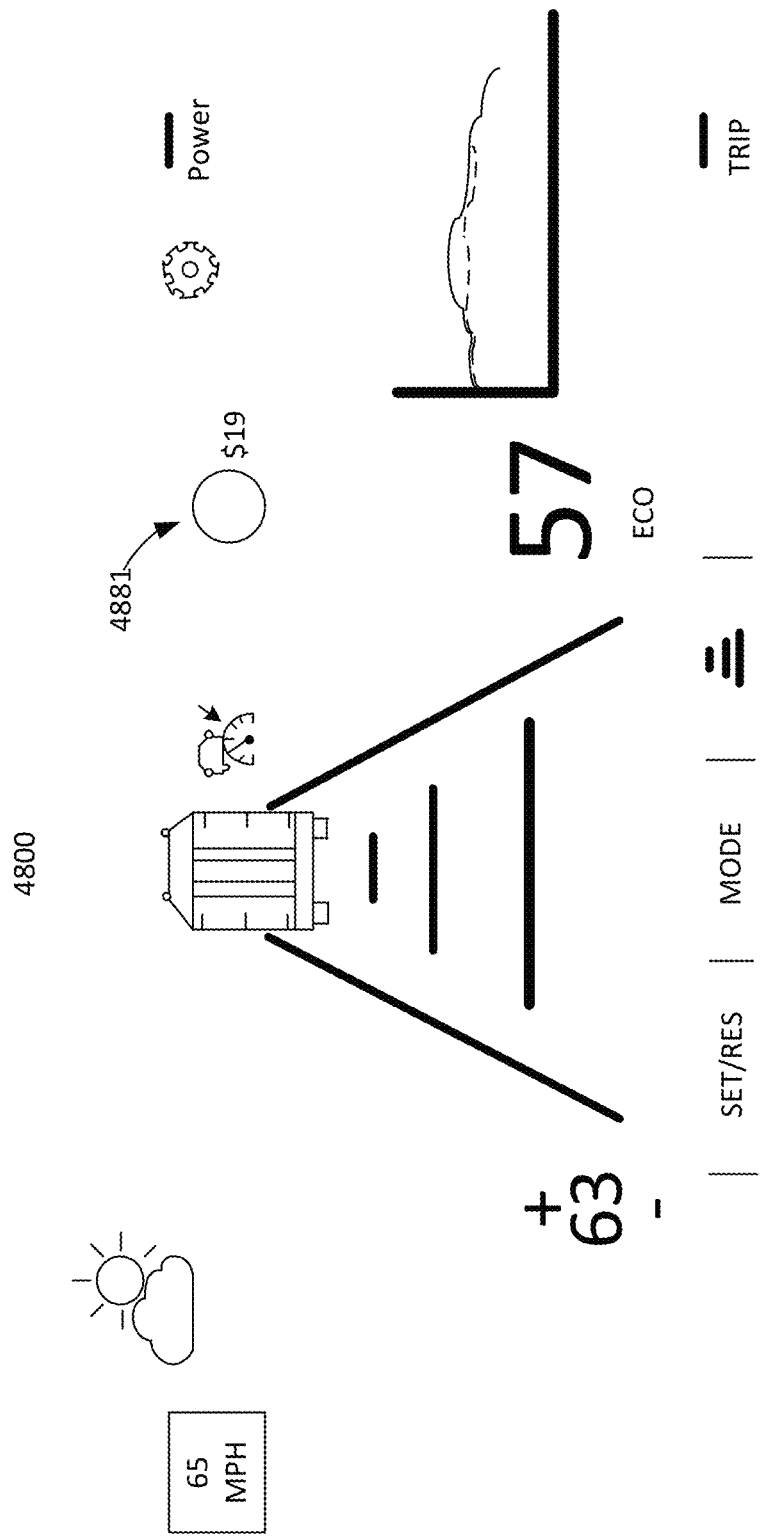
FIG. 48 shows an exemplary user interface conveying total performance rewards, in accordance with aspects of the present technology.

FIG. 48 is a block diagram of an exemplary user interface 4800 conveying total performance rewards in accordance with one embodiment. User interface 4800 includes total incentive indication 4881 that displays total reward values associated with realized performance objectives.

A user interface can convey information associated with a new or changing dynamic element (e.g., a leading vehicle detected, road/route advisory change, etc.). In one embodiment, the dynamic elements are taken into account to increase realization of performance objective (e.g., safety, fuel efficiency, etc.). The dynamic elements can include traffic info, road geometry and topology, weather and so on. The dynamic element indications can also convey information to help a user understand rational associated with operating operation analysis system actions.

Figure 49:
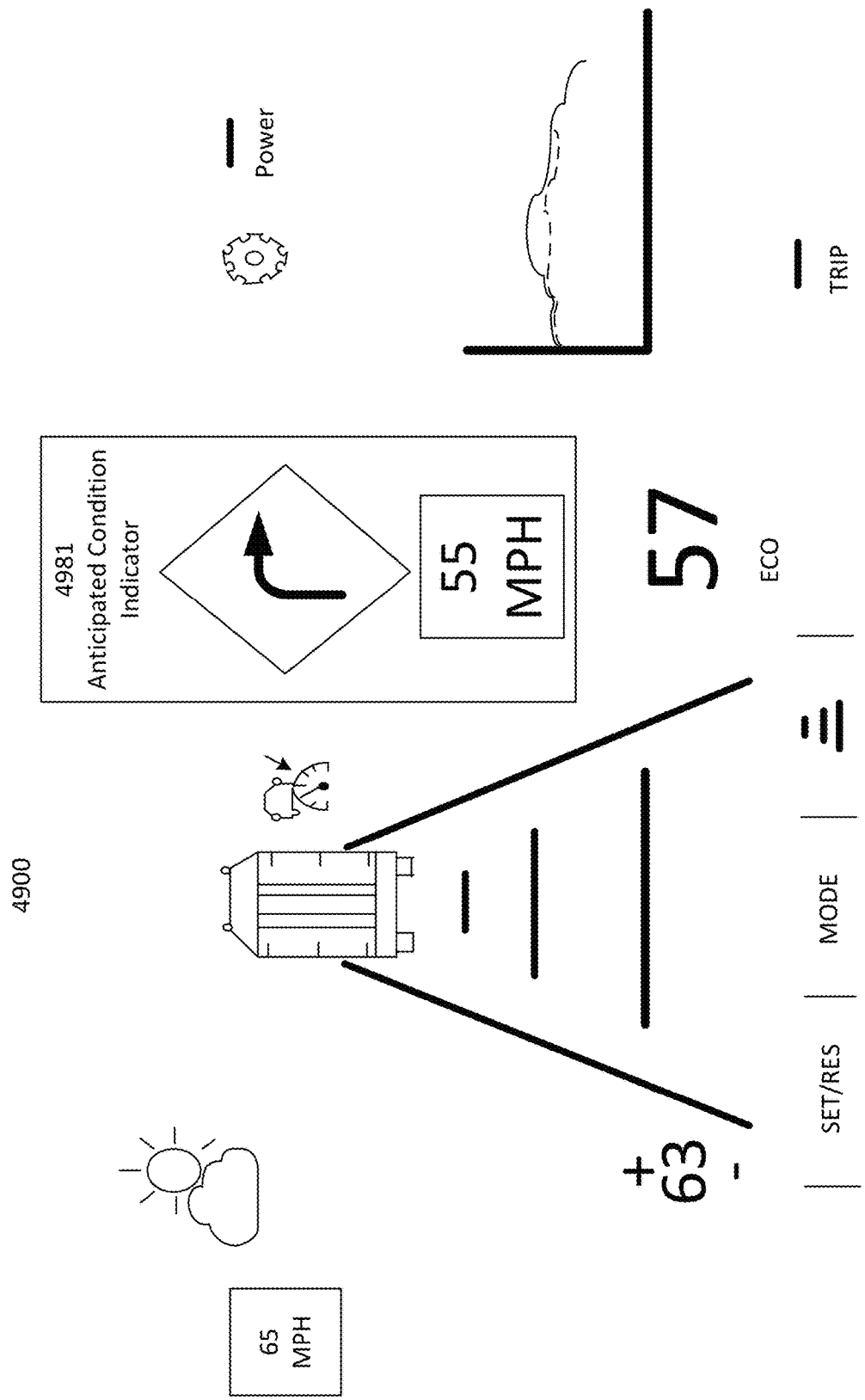
FIG. 49 shows an exemplary user interface conveying dynamic elements, in accordance with aspects of the present technology.

FIG. 49 is a block diagram of an exemplary user interface 4900 conveying dynamic elements in accordance with one embodiment. User interface 4900 includes anticipated condition indicator 4981 that displays an anticipated condition (e.g., change of direction, change in upcoming regulatory speed, etc.).

Figure 50:
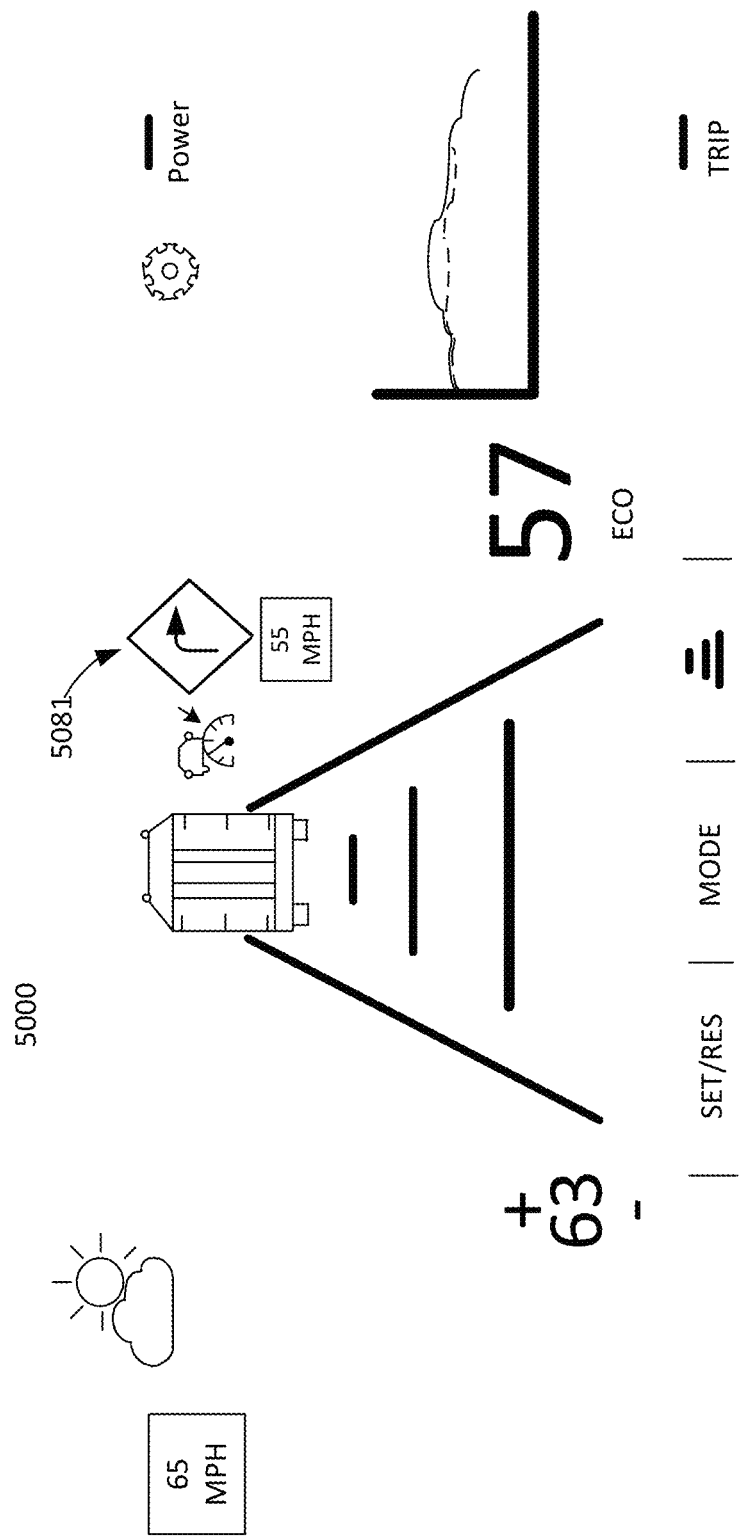
FIG. 50 shows an exemplary user interface conveying dynamic elements arranged in a different configuration, in accordance with aspects of the present technology.

FIG. 50 is a block diagram of an exemplary user interface 5000 conveying dynamic elements arranged in a different configuration in accordance with one embodiment. User interface 5000 includes anticipated condition indicator 5081 that displays an anticipated condition. Anticipated condition indicator 5081 is similar to anticipated condition indicator 5981 except smaller in size and in a difference location on the display 5181.

Figure 51:
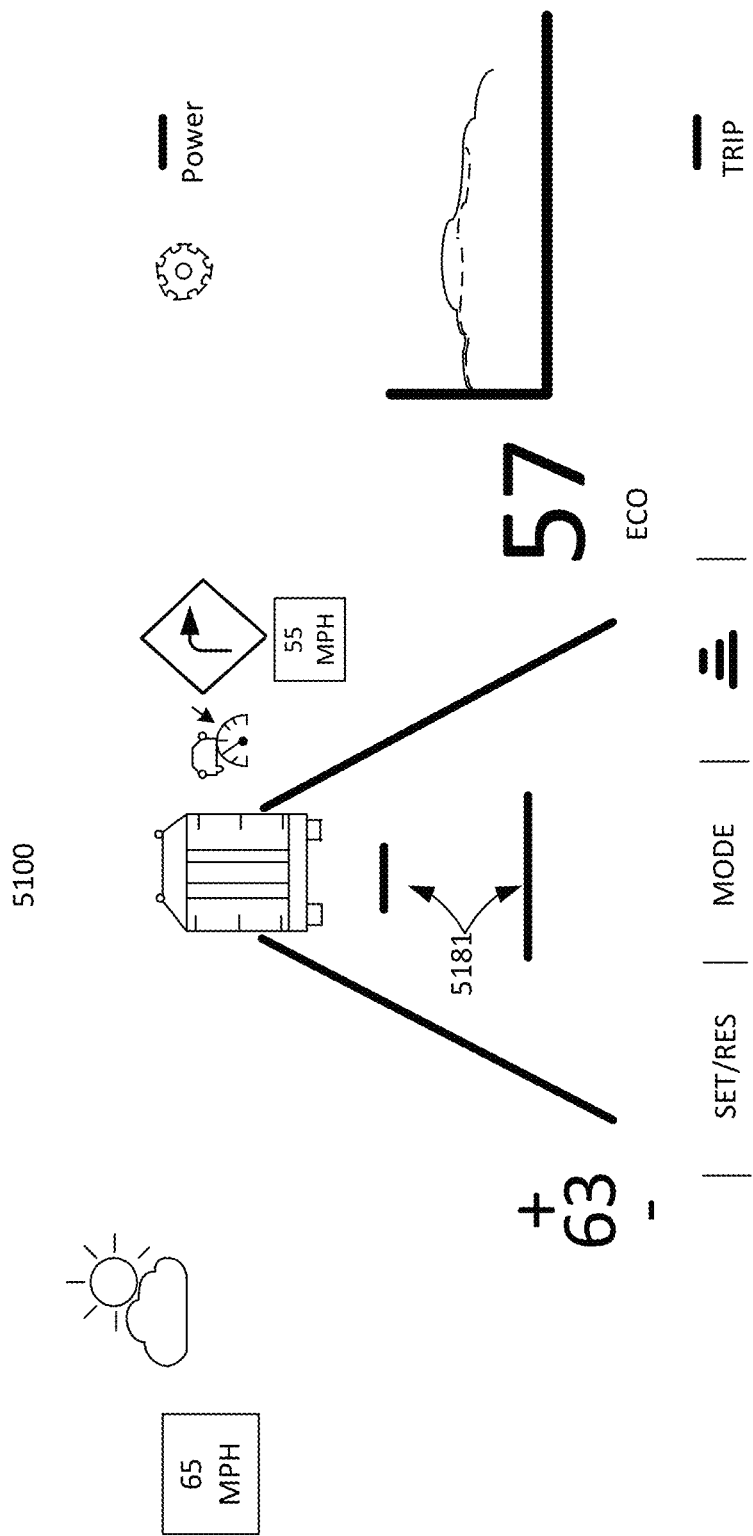
FIG. 51 shows an exemplary user interface conveying a change in dynamic elements, in accordance with aspects of the present technology.

FIG. 51 is a block diagram of an exemplary user interface 5100 conveying a change in dynamic elements in accordance with one embodiment. In one embodiment, the lead vehicle indicator is updated to reflect a change in spacing between the vehicles. In one exemplary implementation, the gap indictors 5181 changes from three in FIG. 50 to two in FIG. 51. In one embodiment, the difference in distances between lines on the display 5181 can conveniently and intuitively conveys a difference in distance or location of the other vehicle. In one exemplary implementation, the reduction in the number of the distance indication lines can also conveniently and intuitively convey a difference in distance or location of the other vehicle.

Figure 52:
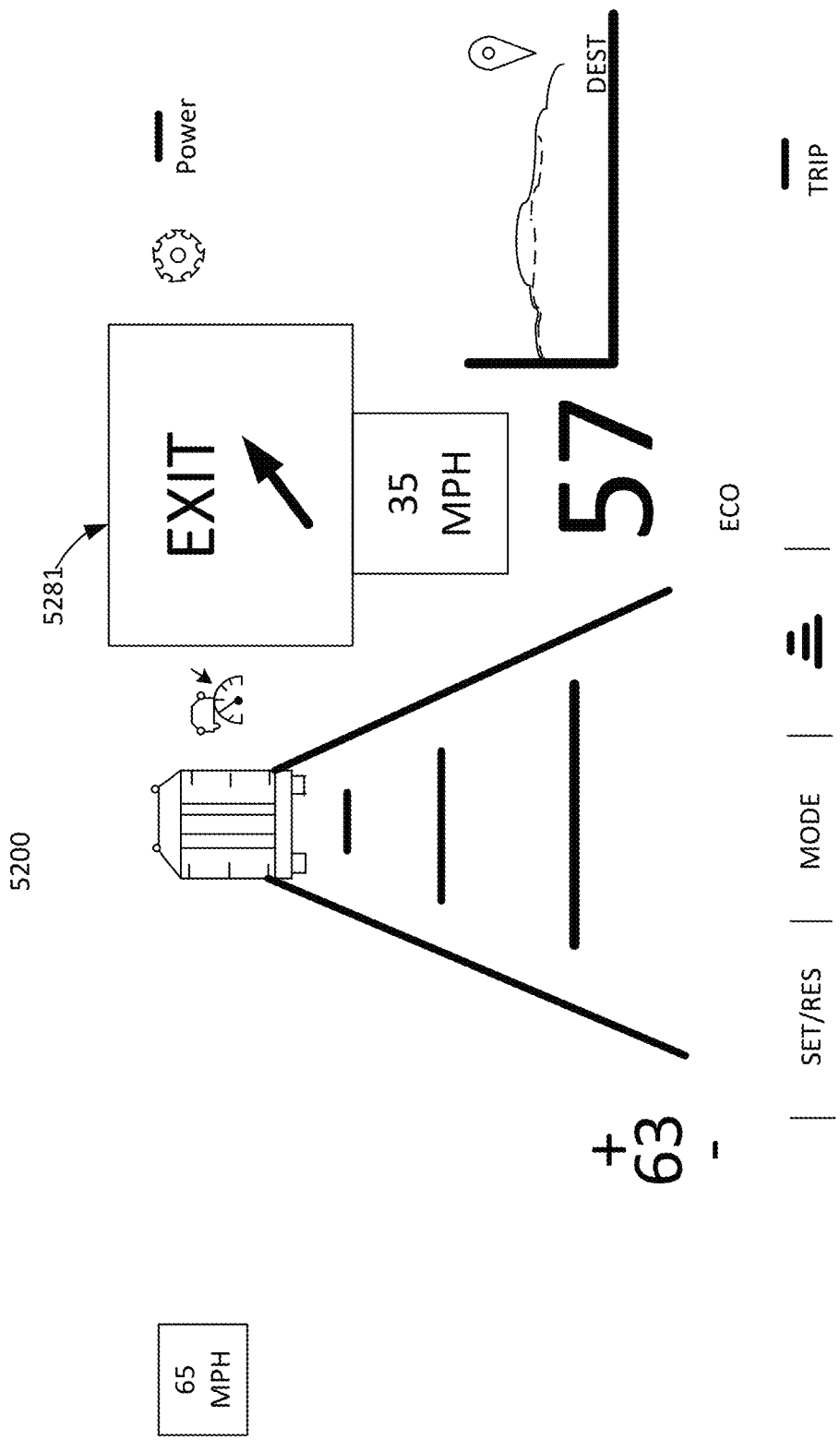
FIG. 52 shows an exemplary user interface conveying an anticipated change, in accordance with aspects of the present technology.

FIG. 52 is a block diagram of an exemplary user interface 5200 conveying an anticipated change in accordance with one embodiment. In one embodiment, an indication 5281 of an upcoming exit is conveyed. Various things can trigger the indication of the anticipated change. The display of the upcoming exit can be based upon apriori knowledge of a trip route, trip route based upon users historical pattern, estimation of vehicle travel path based on vehicle dynamics (e.g., position on the road, driver initiated lane change towards exit lane, driver steering action, etc.).

Figure 53:
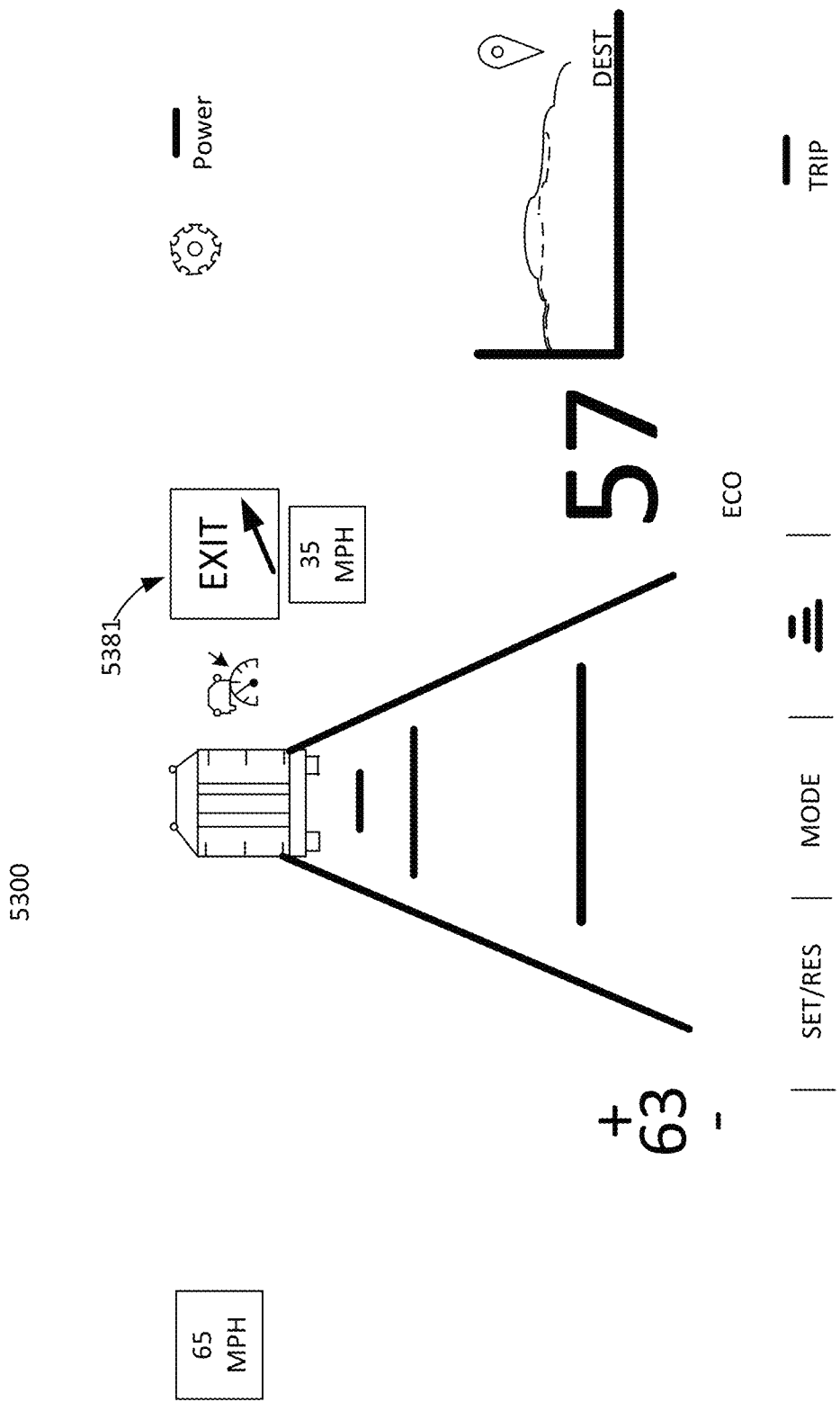
FIG. 53 shows an exemplary user interface conveying anticipated change arranged in a different configuration, in accordance with aspects of the present technology.

FIG. 53 is a block diagram of an exemplary user interface conveying 5300 anticipated change arranged in a different configuration in accordance with one embodiment. In one embodiment, an indication 5381 of an upcoming exit is in a different configuration or location than indication 5281.

In one embodiment, a user interface includes a light bar indicator. The light bar can be used to convey information regarding realization of a number of different performance objectives. The light bar can use changes in lighting (e.g., color, location on the light bar, etc.) to convey information to a user. The information can be associated with desired user changes to vehicle operation input. The driver input can be received via acceleration/deceleration pedals, steering component, gear shift mechanism, eye gaze/attention monitor, and so on. The light bar can include adaptive light that is in the peripheral view of a driver. The light bar can be used to convey passive mode information, coach mode information, and autonomous mode information. In one embodiment illuminating, a first portion of a light bar conveys user input to vehicle operation is within tolerable ranges (e.g., safety range, efficient operation ranges, etc.), illuminating a second portion of the light bar conveys user is providing excessive input to vehicle operation, and illuminating a third portion of the light bar conveys a user is not providing enough input to vehicle operation. In one embodiment illuminating the light bar with a first color conveys user input to vehicle operation is within tolerable ranges (e.g., safety range, efficient operation ranges, etc.), a second color conveys user is providing excessive input to vehicle operation, and a third color conveys a user is not providing enough input to vehicle operation. In one exemplary implementation, the first color is green, the second color is red, and the third color is blue.

Figure 54:
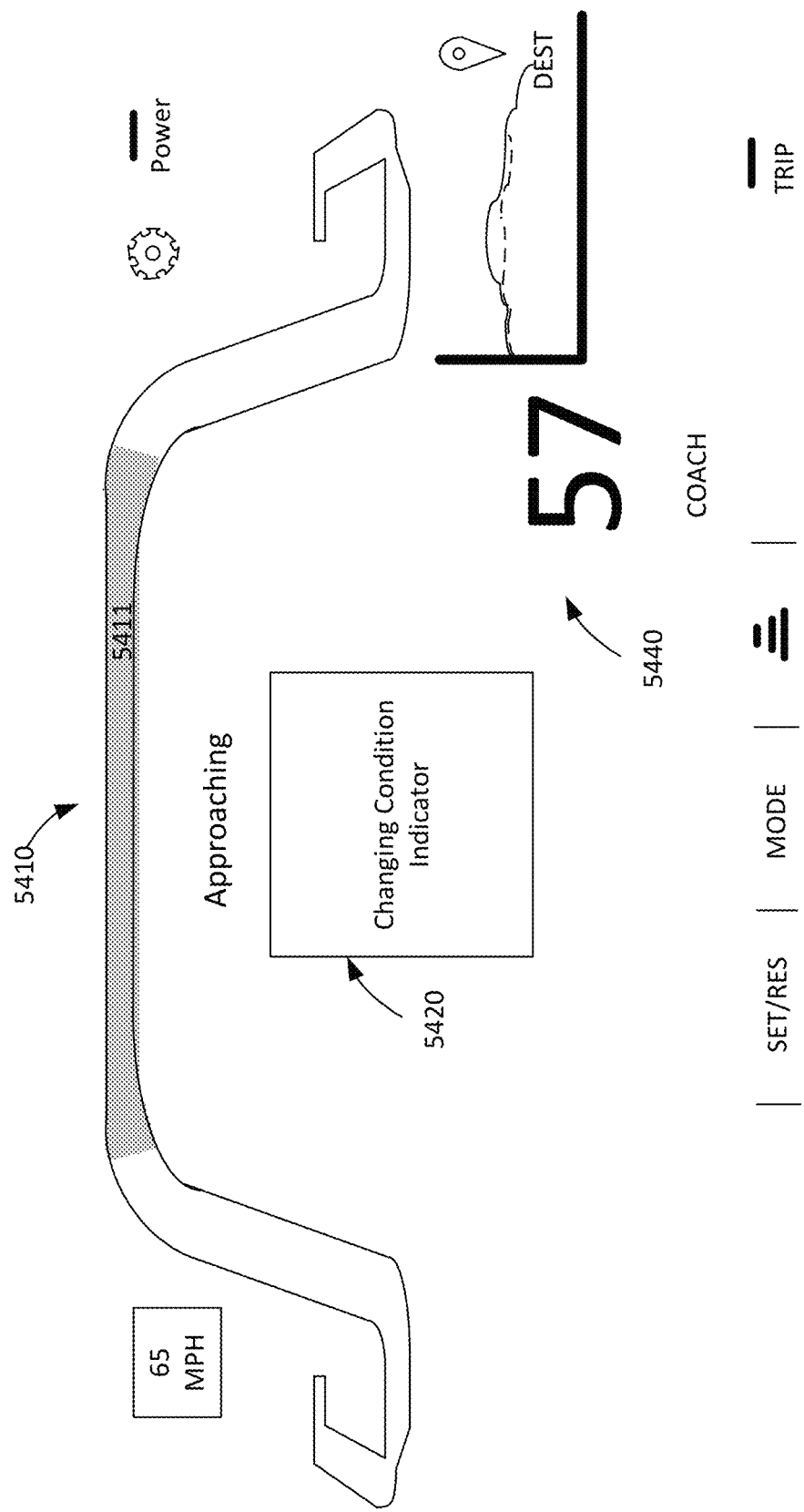
FIG. 54 shows an exemplary user interface conveying vehicle operation acceptability with regards to a condition, in accordance with aspects of the present technology.

FIG. 54 is a block diagram of an exemplary user interface conveying vehicle operation acceptability with regards to a condition in accordance with one embodiment. In one embodiment the user interface includes an indicator 5410 conveying vehicle operation acceptability In exemplary embodiment, the user interface includes a light bar type icon or image. The top illuminated region 5411 of the indicator conveys vehicle operation is acceptable. In one embodiment, the top illuminated region 5411 is illuminated in a color that intuitively indicates vehicle operation acceptability. The color can be blue or some other color that intuitively indicates vehicle operation acceptability. The user interface can also include a changing condition indicator 5420. In one embodiment, the changing condition indicator can be associated with various changing conditions (e.g. changing road conditions, traffic conditions, weather conditions, etc.) The conveyance of information associated with indicator 5410 conveying vehicle operation acceptability and changing condition indicator 5420 can be coordinated. In one exemplary implementation, the indicator 5410 is conveying vehicle operation is acceptable for the approaching changing condition. Indicator 5440 can convey a desired speed.

Figure 55:
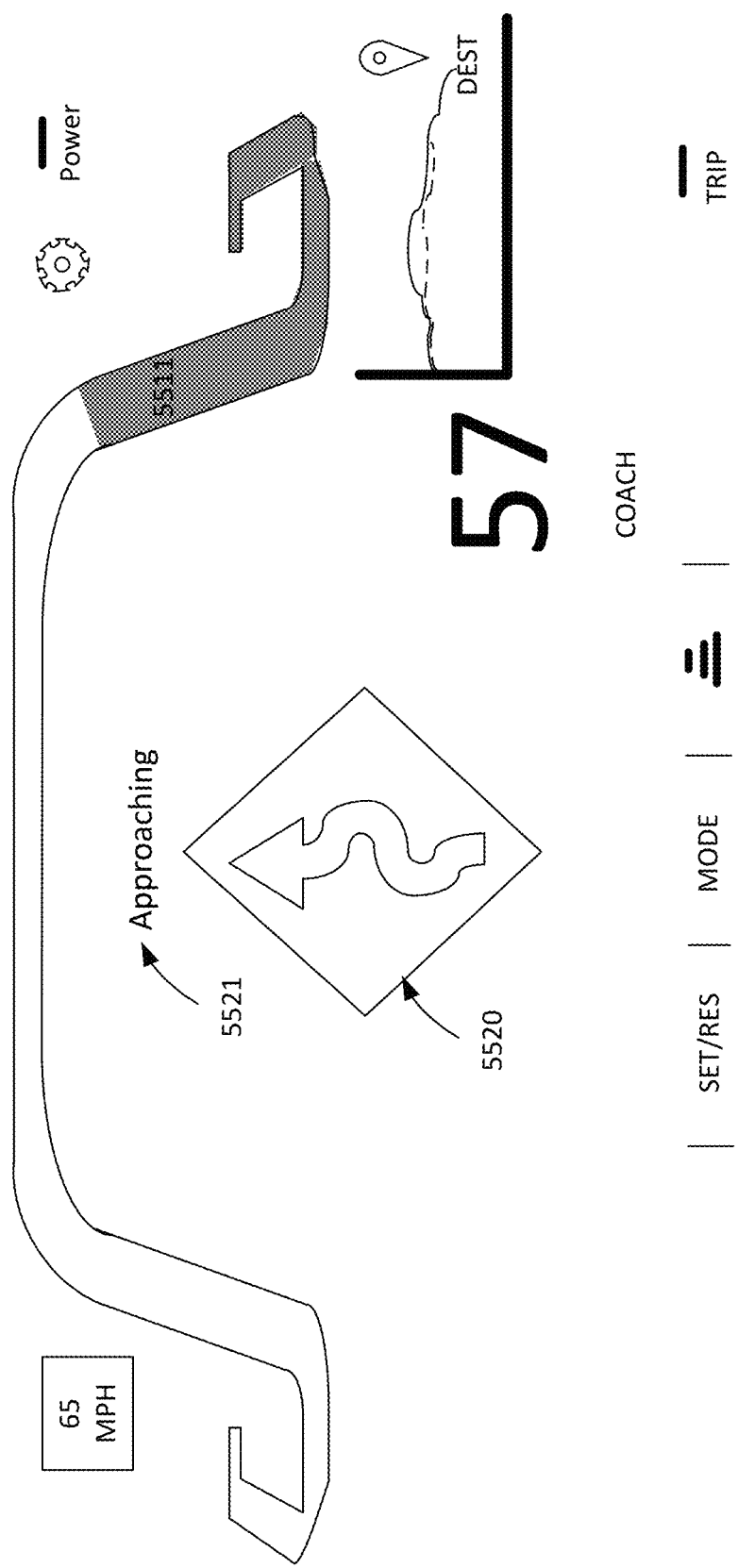
FIG. 55 shows an exemplary user interface conveying vehicle operation unacceptability with regards to a condition, in accordance with aspects of the present technology.

FIG. 55 is a block diagram of an exemplary user interface conveying vehicle operation unacceptability with regards to a condition in accordance with one embodiment. The right side illuminated region 5511 of the indicator conveys a user is providing excessive input to vehicle operation. In one embodiment, the right side illuminated region 5511 of the indicator is illuminated in a color that intuitively indicates conveys a user is providing excessive input to vehicle operation. The color can be red or some other color that intuitively indicates vehicle operation acceptability. In one embodiment, a changing condition indicator can include both a changing condition indicator icon or image 5520 and a changing condition text indicator 5521. In one exemplary implementation, the right side illuminated region 5511 is conveying vehicle operation is unacceptable for the approaching changing road condition conveyed in changing condition indicator icon or image 5520. The changing road condition can be base upon observing the approaching horizon, sensor and detector information, archival map information, and so on.

Figure 56:
FIG. 56 shows an exemplary user interface conveying corrective action in response to vehicle operation unacceptability, in accordance with aspects of the present technology.

FIG. 56 is a block diagram of an exemplary user interface conveying corrective action in response to vehicle operation unacceptability in accordance with one embodiment. A corrective action indicator 5610 can indicate a corrective action (e.g., apply brake, turn steering wheel, reverse, etc.) for the unacceptable condition. In one embodiment, audio output can be provided to the user. In one exemplary implementation, a left side illuminated region of the indicator can convey a user is not providing enough input to vehicle operation.

Figure 57:
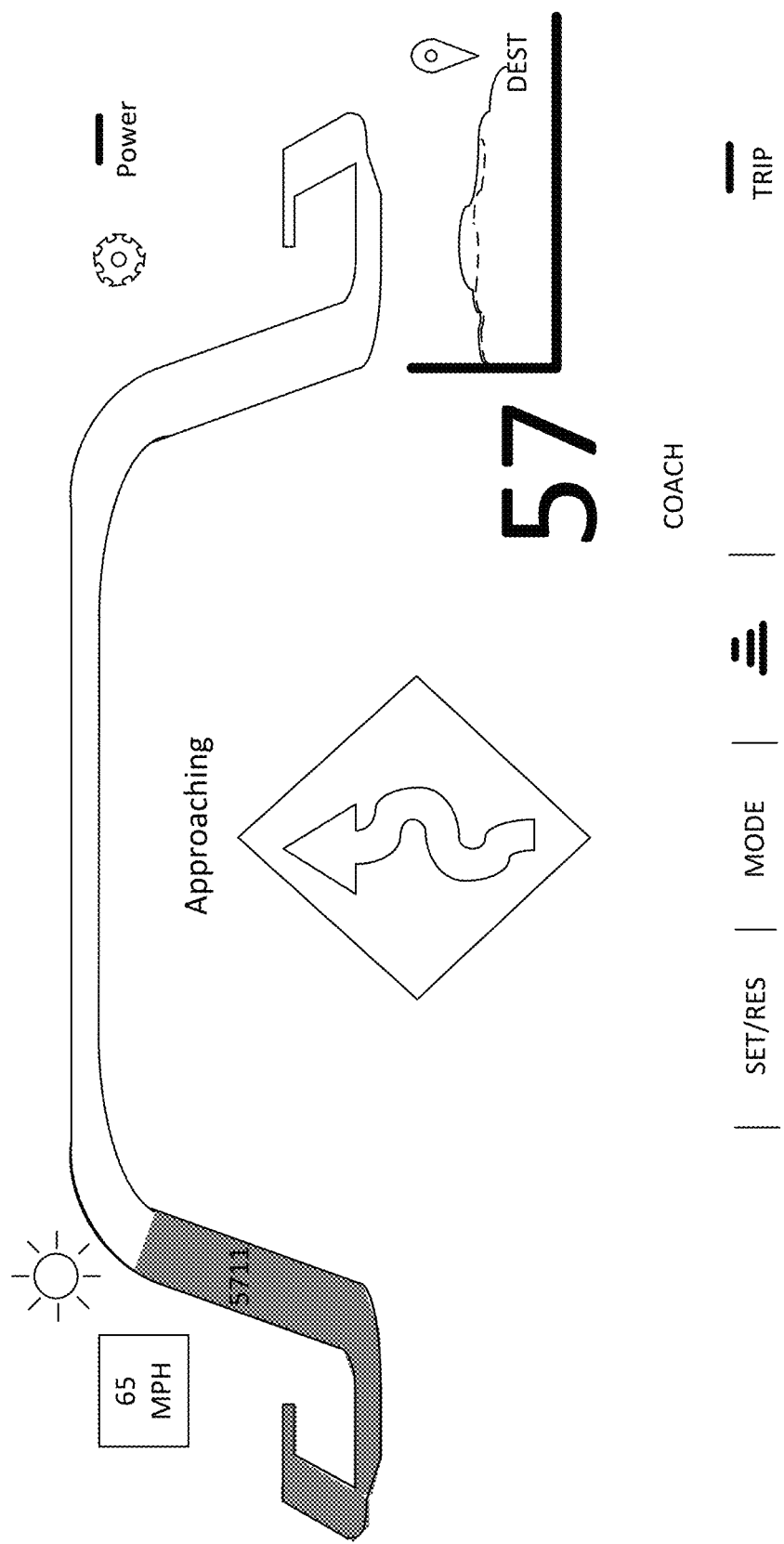
FIG. 57 shows an exemplary user interface conveying corrective action is being implemented correctly, in accordance with aspects of the present technology.

FIG. 57 is a block diagram of an exemplary user interface conveying corrective action is being implemented correctly in accordance with one embodiment. The left side colored region 5711 of the indicator can convey vehicle operation is unacceptable. A left side illuminated region 5711 of the indicator can convey a user is not providing enough input to vehicle operation. In one embodiment the left side illuminated region 5711 can be blue.

Figure 58:
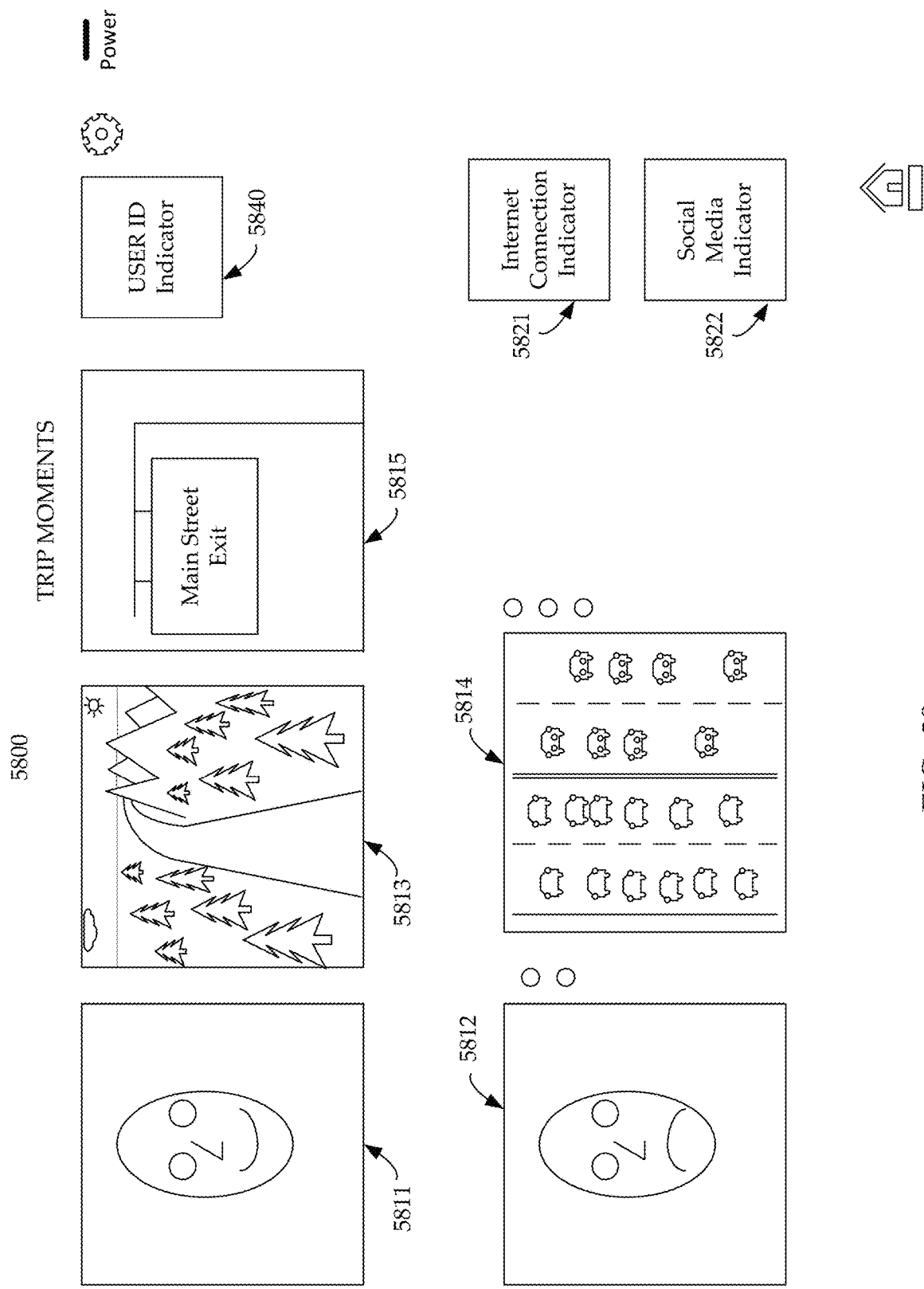
FIG. 58 shows an exemplary user interface conveying trip image capture information, in accordance with aspects of the present technology.

FIG. 58 is a block diagram of an exemplary user interface 5800 conveying trip image capture information in accordance with one embodiment. In one embodiment, user interface 5800 includes captured photo indicators 5811, 5812, 5813, 5814, and 5815, internet connection indicator 5821, social media indicator 5822, and User ID indicator 5840.

Figure 59:
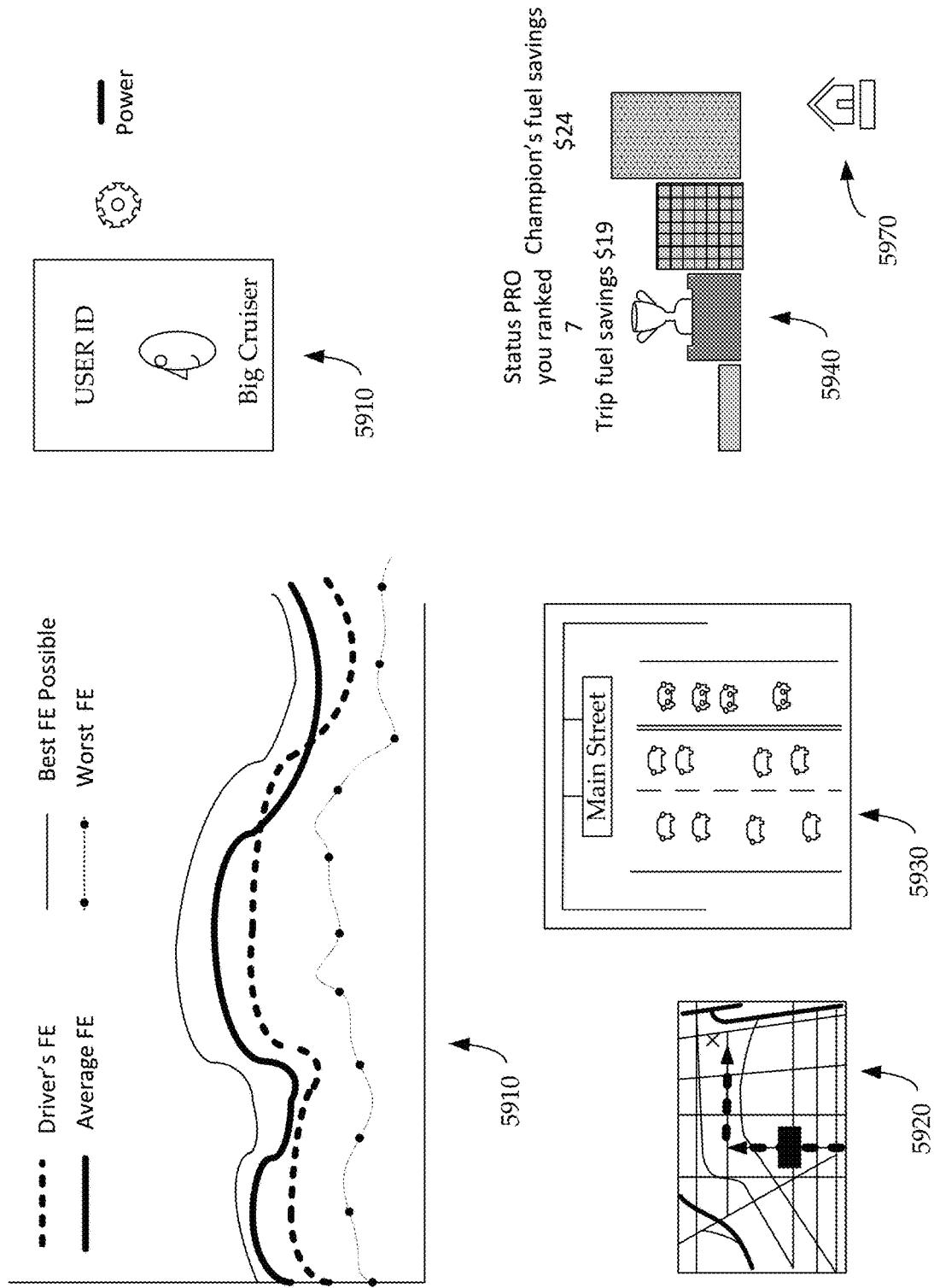
FIG. 59 shows an exemplary user interface conveying trip summary information, in accordance with aspects of the present technology.

FIG. 59 is a block diagram of an exemplary user interface conveying trip summary in accordance with one embodiment. Performance indicator 5110 can convey amount of performance objective realization for the trip. Route indicator 5920 can convey the route taken during trip. In one embodiment, a similar route or map indicator can be conveyed during the trip indicting current location, future route, and proving direction instructions. Image indicator 5930 can convey images captured during trip. Incentive indicator 5940 can convey ranking and rewards corresponding to performance objective realization. User identification indicator 5910 can indicate a user's identification. Navigation icon 5970 can convey information regarding navigation of user interface features (e.g., other screens, portions, etc.).

Figure 60:
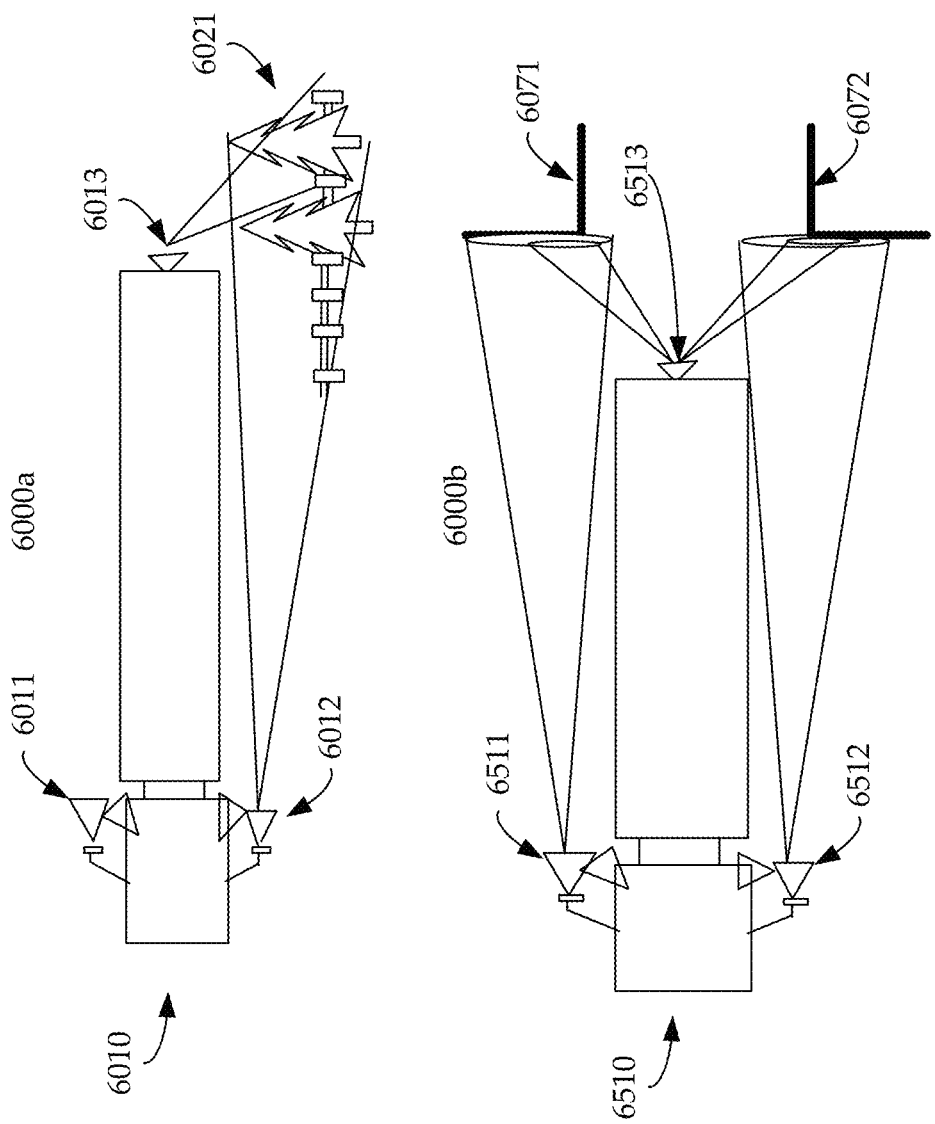
FIG. 60 shows exemplary user interfaces conveying vehicle relation to other objects, in accordance with aspects of the present technology.

FIG. 60 is a block diagram of an exemplary user interfaces 6000a and 6000b conveying vehicle relation to other objects in accordance with one embodiment. User interface 6000a includes vehicle 6010 indictor with sensors icons 6011, 6012, and 6013, and object 6021. User interface 6000a illustrates the vehicle location relation to the object 6021. User interface 6000b includes vehicle 6510 indictor with sensors icons 6511, 6512, and 6513, and objects 6071 and 6072. User interface 6000b illustrates the vehicle location relation to the objects 6071 and 6072.

Figure 61:
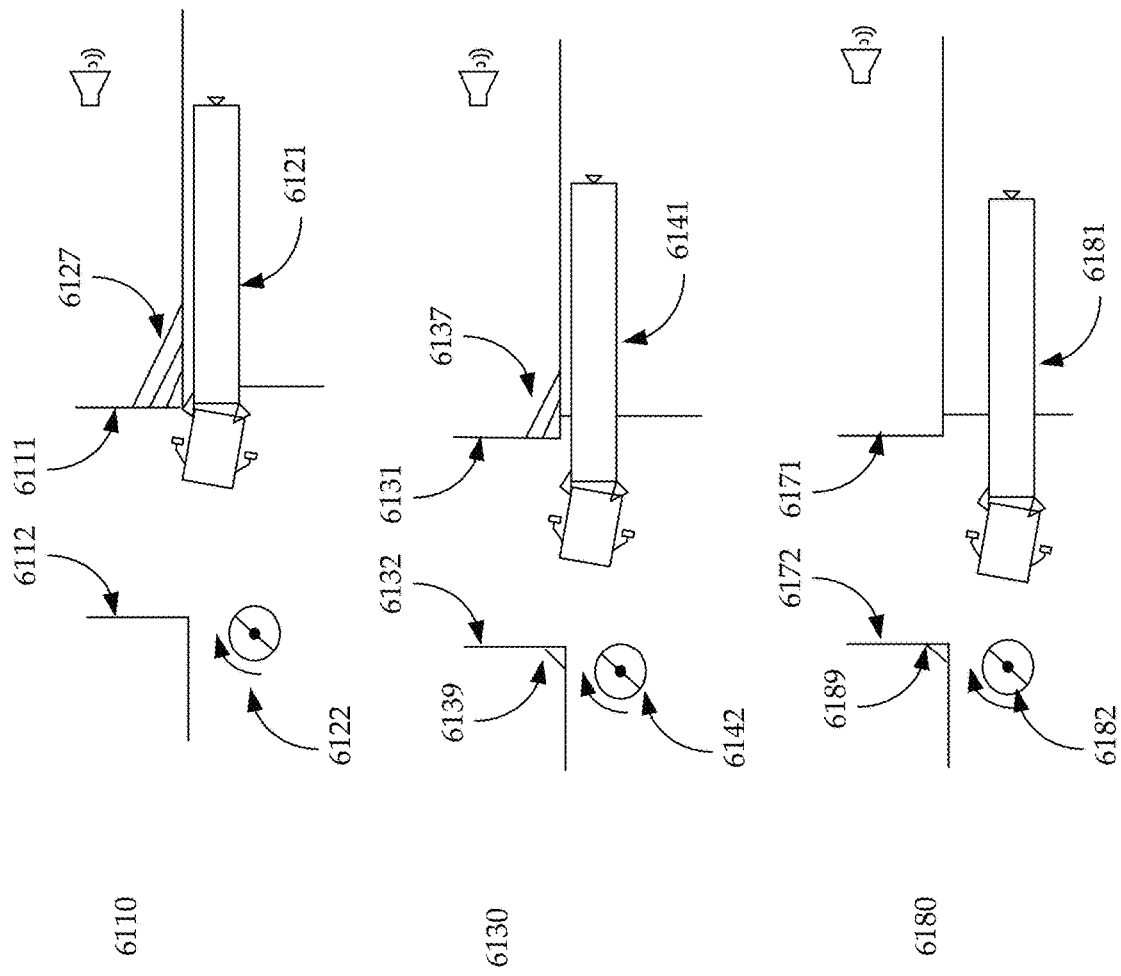
FIG. 61 shows exemplary user interfaces conveying information associated with turning operations of a vehicle, in accordance with aspects of the present technology.

FIG. 61 is a block diagram of an exemplary user interfaces 6110, 6130 and 6180 conveying information associated with turning operations of a vehicle in accordance with one embodiment. User interfaces 6110 includes vehicle indicator 6121, object 6111, object 6112, steering wheel rotation indicator 6122, and warning indicators 6127. Warning indicators 6127 indicates the turn is projected to be too sharp and the vehicle impact object 6111. User interface 6130 includes vehicle indicator 6141, object 6131, object 6132, steering wheel rotation indicator 6142, and warning indicators 6137 and 6139. Warning indicator 6137 indicates the turn is projected to be too sharp and the vehicle impact object 6131. Warning indicators 6139 indicates the turn is projected to be too long and the vehicle impact object 6132. User interface 2180 includes vehicle indicator 6181, object 6171, object 6172, steering wheel rotation indicator 6182, and warning indicator 6189. Warning indicators 6189 indicates the turn is projected to be too long and the vehicle impact object 6172.

Figure 62:
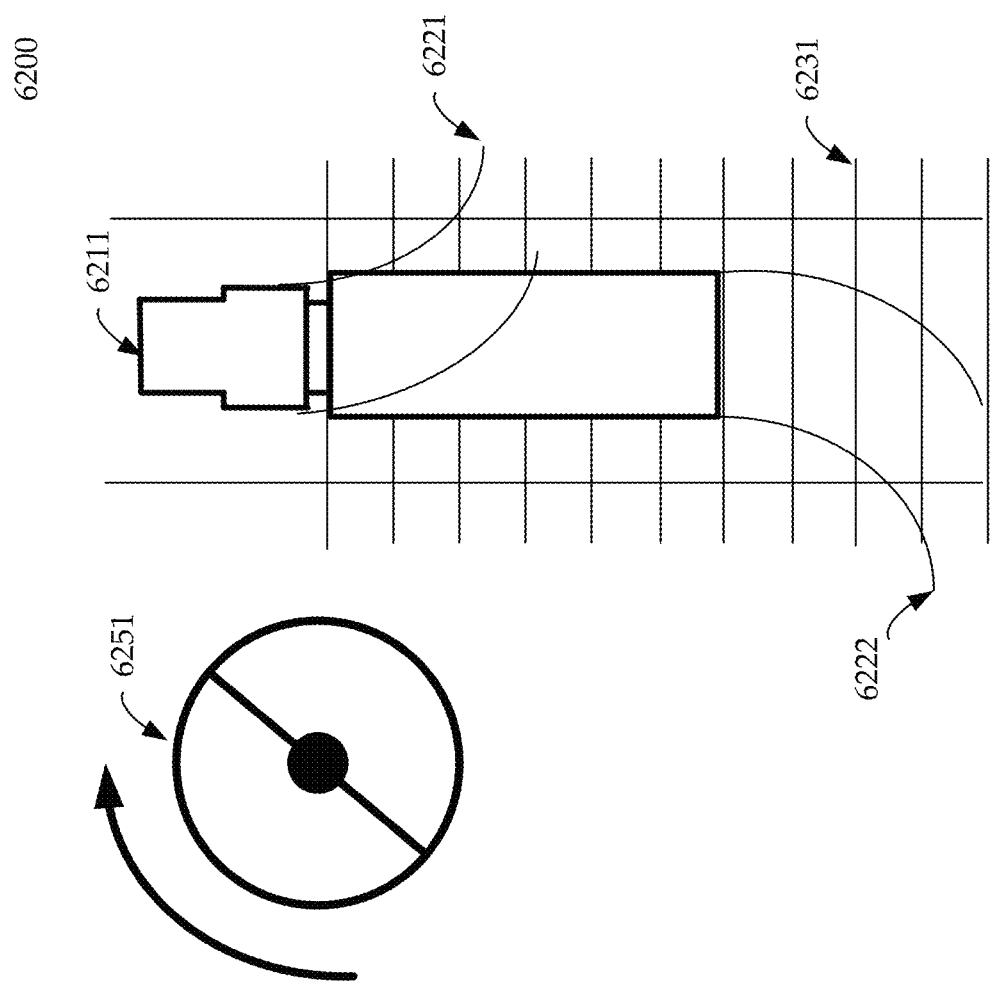
FIG. 62 shows an exemplary user interface conveying information associated with a vehicle reversing operation, in accordance with aspects of the present technology.

FIG. 62 is a block diagram of an exemplary user interface 6200 conveying information associated with a reversing operation of the vehicle in accordance with one embodiment. User interfaces 6200 includes vehicle indicator 6211, steering wheel rotation indicator 6251, and path indicator 6221, path indicator 6222, and distance indicators 6231.

Figure 63:
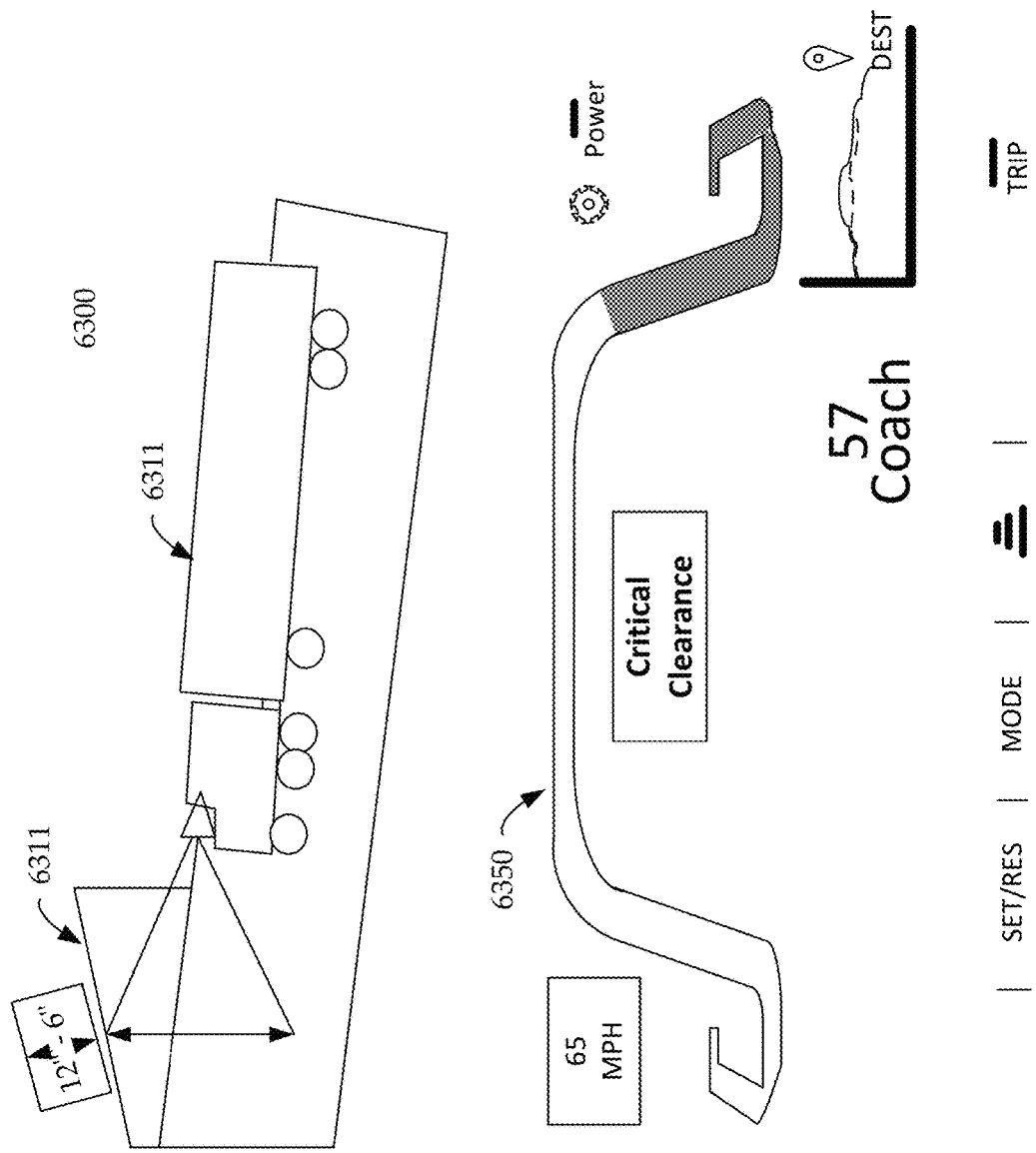
FIG. 63 shows an exemplary user interface conveying information associated operating a vehicle under another object, in accordance with aspects of the present technology.

FIG. 63 is a block diagram of an exemplary user interface 6300 conveying information associated operating a vehicle under another object in accordance with one embodiment. User interface 6300 includes a vehicle indicator 6311, overhead object 6311, and light bar 6350.

FIG. 64 is a flow chart of exemplary user interface method 6400 in accordance with one embodiment. In one embodiment, of user interface method 6400 creating interface information and presenting interface information are based upon an operating mode of the vehicle, wherein the operating mode is selected from one of a passive mode, a coaching mode, an assist mode, and an autonomous mode.

In block 6410, input information associated with vehicle operation is received.

In block 6420, the input information is processed. In one embodiment, the processing can include evaluating performance of the vehicle operation.

In block 6430, output information is generated based upon evaluation of the ground vehicle operation. In one embodiment the output information includes information associated with performance of the ground vehicle operation.

In block 6440, interface information is created. The interface information can be configured to convey results of the evaluation.

In block 6450, interface information is presented, including presenting information indicating metrics corresponding to performance of the ground vehicle operation. In one exemplary implementation, interface information includes guidance on implementation (e.g., current, future, etc.) of an operational characteristic of the ground vehicle with respect to realizing a performance objective.

It is appreciated an analysis component can be implemented in various configurations. An analysis component can similar to of configured in an analysis system, a processing system, a predictive enhanced cruise controller, an energy consumption cruise controller, and so on.

Figure 65:
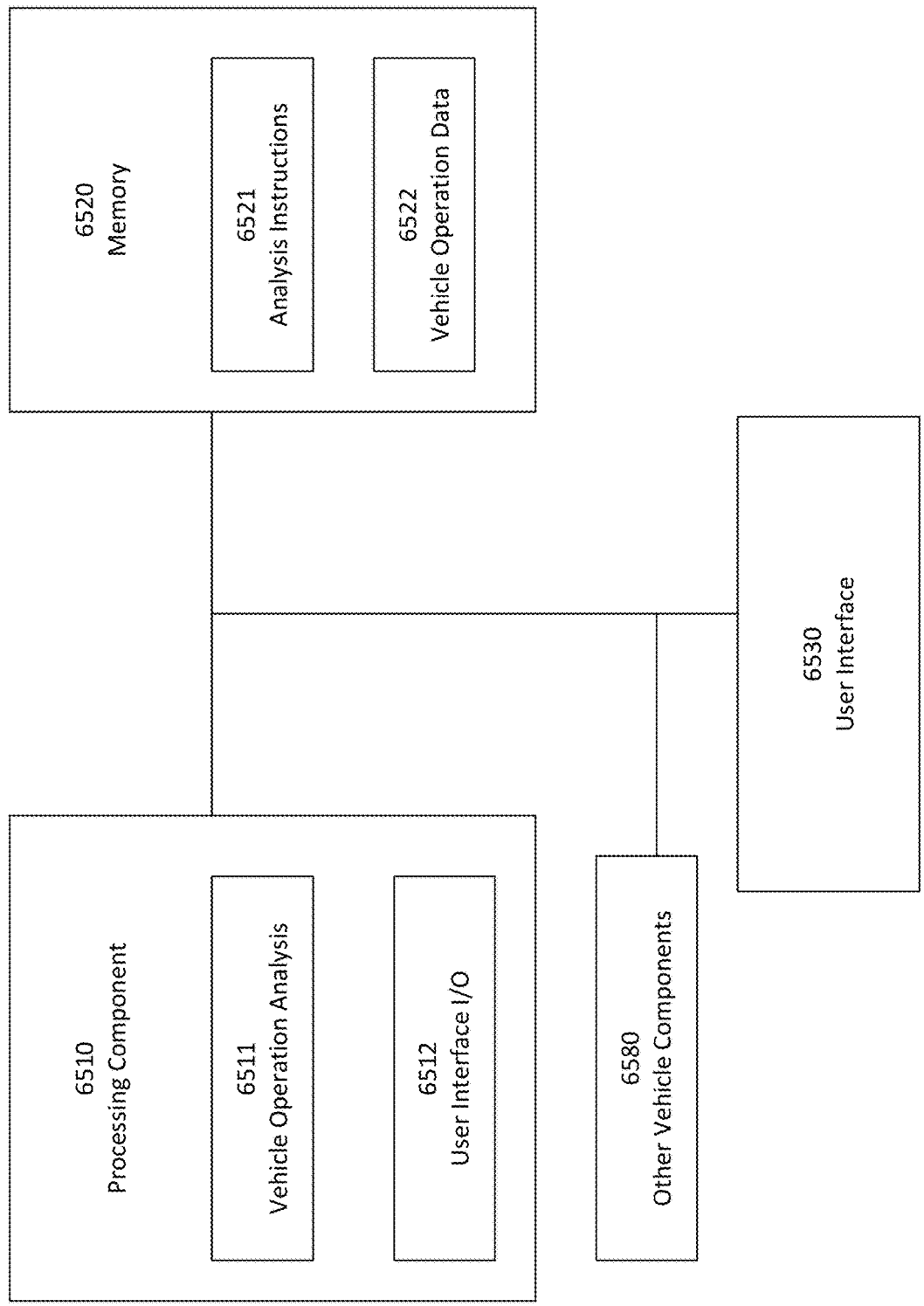
FIG. 65 shows exemplary analysis system, in accordance with aspects of the present technology.

FIG. 65 is a flow chart of exemplary analysis system 6500 in accordance with one embodiment. In one embodiment analysis system is similar to analysis system 4120. Analysis system 6500 includes processing component 6510 and memory 6520. In one embodiment processing component 6510 processes information associated with vehicle operation and realization of performance objectives. Processing component 6510 includes vehicle operation analysis component 6511 configured to analyze information associated with vehicle operation and realization of performance objectives. Processing component 6510 includes user interface input/output (I/O) component 6511 configured to input and output information from and to user interface 6530. Processing component 6510 can also receive and forward information from and to other vehicle components 6580.

Memory component 6520 can store information associated with vehicle operation and realization of performance objectives. Memory component includes a storage capacity to store analysis instructions and vehicle operation data associated with processing information by processing component 6510.

Efficiently and effectively conveying the information between a user and a vehicle via a user interface enables characteristics leveraging of both a user (e.g., instinct, sensory input, cognitive abilities, human oversight etc.) and a vehicle (e.g., enhanced detection mechanisms, large information availability and storage, significant processing capability, accuracy, avoiding human frailties, repeatability, etc.). The interactions and characteristics leveraging of the user and the vehicle via the user interface enables improved vehicle operation and performance.

It is appreciated that types of vehicle can vary (car, plane, boat, etc,) and operating environments (e.g., ground, air, water, space, etc.) can have different challenges (e.g., associated with different conditions, characteristics, etc.) that can have a significant impact on a user/machine interface. Ground vehicle operations are typically very different than other types of vehicle operation (e.g., water, air, etc.) and involve unique and perilous conditions and challenges. For example, ground vehicle operations often involve objects (e.g., other vehicles, pedestrians, buildings, trees, etc.) in closer proximity to the vehicle (e.g., require quicker reactions, less forgiving with a guidance action (hit something fast), less time to correct a mistake, pedestrians, etc.). In addition, there are often significant operational differences between types of ground vehicles (e.g., cars, commercial trucks, etc.). These constraints can mean the user interface is critical to proper vehicle operation and efficient and effective user interfaces can enable improved vehicle operations and performance. Furthermore, while there may be relatively consistent high level of user abilities for other types of (e.g., airplane pilots usually have advanced training and experience, ship captains typically have many years of training and experience, etc.), it is not necessarily the same for ground vehicle users. There is often significant differences in ground vehicle user abilities and corresponding vehicle operation. Efficient and effective user interfaces enable convenient and accurate interactions between the user and the vehicle which in turn enable improved vehicle operation and performance.

Figure 66:
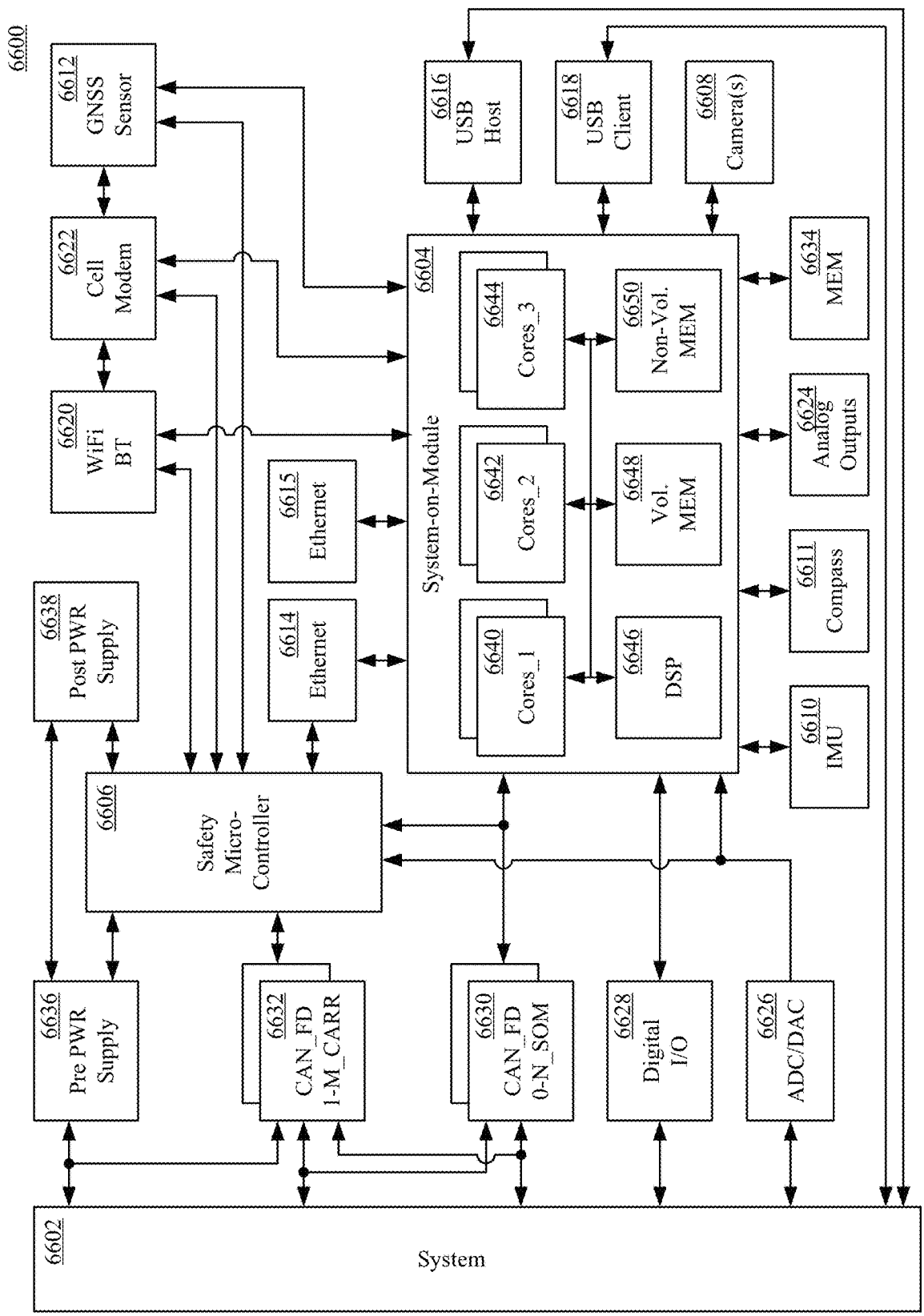
FIG. 66 shows a computing device in accordance with aspects of the present technology.

Referring now to FIG. 66, a computing device, in accordance with aspects of the present technology, is shown. The computing device 6600 can be configured to control the operation and or performance of a system 6602. In one implementation, the computing device 6600 can be an advanced vehicle controller configured to control the operation and or performance of one or more types of vehicles including but not limited to trucks, buses, agriculture equipment, construction equipment, cars, and recreational vehicles (RVs). For example, the computing device can be configured for automated driving of trucks and other vehicles.

The computing device 6600 can include one or more system-on-modules (SOM) 6604, one or more safety microcontrollers 6606, one or more sensors 6608-6612, and a plurality of communication interfaces 6614-6632. The computing device 6600 can also include one or more memories 6634 and or one or more power supplies 6636, 6638. It is to be appreciated that the one or more SOMs 6604, one or more safety controllers 6606, one or more sensors 6608-6612, one or more memories 6634, and one or more power supplies 6636, 6638 can be coupled together directly or indirectly by any combination of one or more communication interfaces 6614-6632 for transmission of data and or control signals. Furthermore, the one or more SOMs 6604, one or more safety controllers 6606, one or more sensors 6608-6612, plurality of communication interfaces 6614-6632, one or more memories 6634, and one or more power supplies 6636, 6638 can be coupled together directly or indirectly by one or more power supply distribution links. The data and control signal links and power distribution links as illustrated in FIG. 66 are not intended to be exclusive and or comprehensive. Numerous other data and control signal links and power distribution links can be included in the computing device to couple the one or more SOMs 6604, one or more safety controllers 6606, one or more sensors 6608-6612, plurality of communication interfaces 6614-6632, one or more memories 6634, and one or more power supplies 6636, 6638 together. In one implementation, a SOM 6604, a safety microcontroller 6606, a plurality of sensors, a plurality of communication interfaces 6614, one or more memories and one or more power supplies 6636, 6638 can be arranged on a printed circuit board assembly (PCBA) as a carrier board module. In one implementation, a plurality of carrier board modules can be communicatively coupled together as a set of communicatively coupled computing devices 6600.

In one implementation, the one or more sensors 6608-6612 can include, but not limited to, one or more image sensors 6608, one or more inertial measurement units (IMU) 6610, one or more compasses 6611, one or more global navigation satellite system (GNSS) sensors 6612 and the like communicatively coupled to the one or more SOMs 6604. In one implementation, the one or more image sensors 6608 can include one or more picture or video sensors. For example, one or more charge-coupled device (CCD) image or video sensors can be coupled by one or more serial interfaces to the SOM 6604. In one implementation, the one or more IMUs 6610 can include, but is not limited to, one or more accelerometers and one or more gyroscopes. The one or more IMUs 6610, one or more compasses can also be coupled to the SOM 6604. The accelerometers can for example comprise a three-dimensional (3D) accelerometer. In one implementation, the one or more GNSS sensors 6612 can include a real-time clock (RTC). Alternatively, the real-time clock (RTC) can be independent of the one or more GNSS sensors 6612, and coupled to either the one or more SOMs 6604, the one or more safety microcontrollers 6606 or both. The one or more GNSS sensors 6612 and one or more IMUs 6610 can be configured for automotive dead reckoning.

The plurality of communication interfaces 6614-6632 can be configured to communicatively couple the SOM 6604, the safety controller 6606 and the system 6602 together. The plurality of communication interfaces 6614-6632 can also provide a communication interface to the system 6602. For example, one or more control area network (CAN) interfaces 6630, 6632, one or more universal serial bus (USB) interfaces 6616, 6618, one or more Ethernet interfaces 6614, 6615, one or more WiFi interfaces, one or more Bluetooth interfaces and or the like can provide one or more wired or wireless communication interfaces to the system 6602. In one implementation, the plurality of communication interfaces 6614-6632 can include one or more wired interfaces including, but not limited to, one or more Ethernet interfaces 6614, 6615 one or more universal serial bus (USB) interfaces 6616, 6618, one or more high-definition multimedia interfaces (HDMI), one or more local interconnect network (LIN) interfaces and the like. In one implementation, the one or more Ethernet interfaces can include one or more gigabit Ethernet interfaces. The one or more Ethernet interfaces can be configured for debug and development of the computing device 6600. In one implementation, the one or more USB interfaces can include one or more USB 2.0 interfaces and one or more USB 3.0 interfaces. The one or more USB interfaces can include one or more USB host interfaces 6616 and or one or more USB client interfaces 6618. The plurality of communication interfaces 6614-6632 can also include one or more wireless interfaces including, but not limited to, one or more WiFi interfaces, one or more Bluetooth (BT) interface 6620, and one or more cellular telephone modems 6622. In one implementation, the wireless interfaces can provide a full set of internet-of-thing (IoT) features. In one implementation, the one or more WiFi interfaces can be 802.11a/b/g/n/ac interfaces, and can include the ability to be used as a hotspot. In one implementation, the one or more Bluetooth interfaces can be Bluetooth 5, dual-mode interfaces, that can include basic rate, extended rate and low energy functions. In one implementation, the one or more cellular telephone modems 6622 can include fourth or fifth generation (4G, 5G) long term evolution (LTE), universal mobile telecommunications system (UMTS) and or global system for mobile communications (GSM) bands. The plurality of communication interfaces 6614-6632 can also include one or more analog outputs 6624, one or more analog-to-digital/digital-to-analogy converters (ADC/DACs) 6626, one or more digital input/outputs 6628, one or more control area network (CAN) interfaces 6630, 6632 and one or more universal asynchronous receiver-transmitters (UART). In one implementation, one or more CAN interfaces 6630 can communicatively couple the SOM 6604 to the system 6602. One or more CAN interfaces 6632 can also communicatively couple the safety microcontroller 6606 to the system 6602. One or more CAN interfaces 6630 can also be shared with the SOM 6604 and safety microcontroller 6606. In one implementation, the one or more CAN interface 6630, 6632 can be control area network flexible-data rate (CAN-FD) compliant. In one implementation, the one or more ADC/DAC interfaces 6626 can include be a plurality of protected ADCs. In one implementation, the one or more ADC/DAC interfaces 6626 can include a plurality of buffered DACs. In one implementation, the one or more digital I/O interfaces 6628 can include a plurality of general-purpose input output (GPIO) interfaces communicatively coupling the SOM 6604 to the system 6602. The SOM 6604 can be configured to act as a gateway between one or more of the sensors 6608-6612, one or more communication interfaces 6614-6632 and or the system 6602. The SOM 6604 and or safety microcontroller 6606 can also be configured to perform signal integrity checks on the one or more communication interfaces 6614-6632 and or one or more sensors 6608-6612.

In one implementation, the safety microcontroller 6606 can comprise a multi core safety supervisory processor. The safety microcontroller 6606 can be configured to execute one or more supervisory applications that watch the execution of one or more system control application executing on the SOM 6604 to determine if the execution of the one or more system control applications differs from one or more predetermined system control execution parameters. When the one or more supervisory applications determines a fault based on a detected difference between the execution of the one or more control application and the one or more predetermined systems control execution parameters, the one or more supervisory applications can respond to mitigate or correct the determined fault. For example, the one or more supervisory applications can interrupt system control outputs from the SOM 6604 flowing through the one or more CAN interfaces 6630, 6632, Ethernet interfaces 6614, 6615, or the like interfaces. The safety microcontroller 6606 can also be configured to enable and or disable communications between the SOM 6604 and the system 6602 through one or more of the communication interfaces 6614-6632. Alternatively or in addition, the one or more supervisory applications can initiate execution of one or more backup system control applications on the safety microcontroller 6606 to provide a backup or reduced set of system control functions. In one implementation, the safety microcontroller 6606 can be an automotive safety integrity level D (ASIL-D) compliant safety supervisor processor. The safety microcontroller 6606 can include one CPU channel in lockstep. The safety microcontroller 6606 can monitor data in common with the SOM 6604 to detect and or resolve faults. The safety microcontroller 6606 can be configured to detect, diagnose and safely mitigate the occurrence of faults. The safety microcontroller 6606 can execute one or more safety based mechanisms, that can include software test libraries, built in self tests (BIST) and the like. The test libraries, BISTs and the like can provide fault diagnostic capabilities. The one or more supervisory applications executing on the safety microcontroller 6606 can be separate software the one or more system control applications executing on the SOM 6604, thereby permitting the computing device 6600 to be architecture independent of the given SOM 6604 implementation.

In one implementation, the SOM can include a plurality of different types of processor cores 6640-6646, and one or more types of memory 6648, 6650 communicatively coupled together by one or more buses of the SOM 6604. In one implementation, the one or more types of cores can include one or more different types of instruction set architectures. In one implementation, the one or more types of cores can include, but are not limited to, one or more advanced reduced instruction set cores (ARM) 6640-6644, one or more digital signal processor (DSP) cores 6646 and one or more graphics processing unit (GPU) cores. For example, the SOM 6604 can include a plurality of Cortex-A72 cores, a plurality of A53 cores, a plurality of Cortex-M4F cores, and one or more HIFI4 DSP cores. The one or more type of memory 6648, 6650 of the SOM can include, but is not limited to, volatile memory 6648 and non-volatile memory 6650. For example, the memory can include synchronous dynamic random-access ram (SDRAM) memory and Flash memory. In multi-SOM implementations, the SOMs 6604 can be homogeneous, including the same set of cores and memory. Alternatively, the SOMs can be heterogenous, wherein SOMs can have different combinations of cores and or memory in type and or number. In multi-SOM implementations, the SOMs can be synchronized by clock sharing through a CAN interface 6630, 6632, Ethernet interface 6614, 6615 or the like.

Computing device executable instructions (e.g., software) executing on the SOM 6604 and or the safety microcontroller 6606 can include, but is not limited to, an embedded Linux operating system and real-time operating systems (RTOS). In one implementation, an embedded Linux operating system such as a Yocto project open source embedded operating system can execute on the SOM 6604. The Yocto embedded Linux software can provide development tools including, but not limited to, a compiler and one or more debuggers. In one implementation, a real-time operating system such as FreeRTOS or SafeRTOS can execute on the safety microcontroller 6606. The real-time operating system can be based on deterministic priority based scheduling. The real-time operating system can be configured to schedule operation of supervisory applications, safety monitors, safety functions and the like. The computing device executable instructions executing on the SOM 6604 and the safety microcontroller 6606 can further include self-diagnostic programs, and software for peripherals such as the GNSS, CAN, GPIO and IMU. The computing device executable instructions executing on the SOM 6604 and the safety microcontroller 6606 can further include dataloggers, over-the-air (OTA) interfaces, and other application software. One or more power supplies of the SOM 6604, communication interfaces 6614-6632, and sensors 6608-6612 can be coupled through the safety microcontroller 6606, to enable the RTOS, safety monitors or the like to provide protection from hazards after power on, brown out, or the like events. The RTOS, safety monitors or the like can be configured to place the system 6600 into a predetermined safe state within a specified time period.

The safety controller 6606 and or SOM 6604 can be configured to wake the computing device 6600 in response to communications on the one or more CAN interfaces 6630, 6632. For example, the computing device 6600 can wake upon ignition in a vehicle system 6602. The safety controller 6606 and or SOM 6604 can also be configured to place the SOM 6604, the SAM 6604 and safety controller 6606, or the complete computing device 6600 in a low power mode in response to one or more inputs or states of the system 6602. The safety controller 6606 and or SOM 6604 can also be configured to remain powered on for a period of time in the absence of a power source. For example, the one or more power supplies 6638, 6638 can include a battery, capacitor or the like to provide backup power to the safety microcontroller 6606 to enable the supervisory applications, safety monitors, safety functions and or the like to continue to operate at least for a predetermined period of time in the event of a power failure so that the system 6602 can be placed in a safe state. The safety controller 6606 and or SOM 6604 can also be configured to remain powered on when the system 6602 is powered off to perform housekeeping functions of the computing device 6600.

Figure 67:
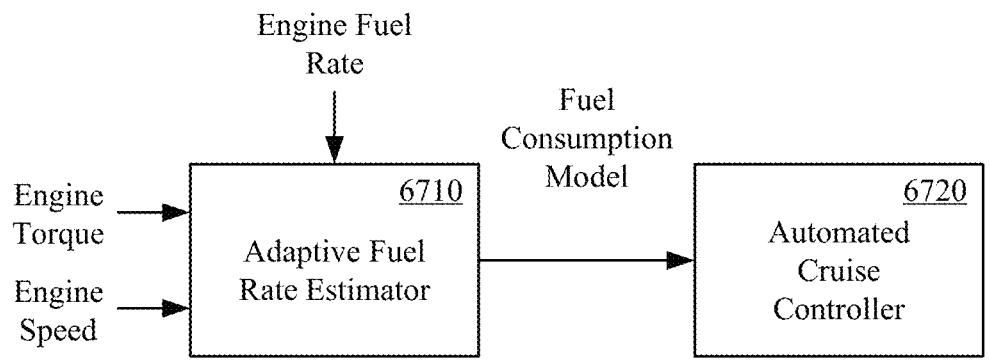
FIG. 67 shows a fuel energy consumption modelling method, in accordance with aspects of the present technology.

For a given set of operating conditions such as speed and torque, fuel consumption for a ground vehicle may vary based on the fuel composition (electric, hybrid, internal combustion and or the like) ambient conditions, life of the engine. Referring now to FIG. 67, a fuel energy consumption modelling method, in accordance with aspects of the present technology, is shown. The adaptive fuel rate estimator 6710 can provide an up-to-date fuel consumption model to an enhanced cruise control system 6720 for optimizing energy consumption. The adaptive fuel rate estimator 6710 can receive an engine fuel rate, an engine torque and an engine speed as inputs. Real-time energy consumption parameters of the fuel consumption model can be obtained by solving a constrained least square optimization in accordance with Equation 1:

$$\min_{C_0, C_1, \ldots, C_5} \sum_{i=0}^{N_h} \|\dot{e}(k-i) - \hat{e}(k-i)\|^2$$

subject to the constraints of:

$$\dot{e}(k-i) = c_0 + c_1 T_e(k-i) + c_2 \omega_e(k-i) + c_3 T_e(k-i)\omega_e(k-i) + c_4 T_e^2(k-i) + c_5 \omega_e^2(k-i)$$

$$4C_4 C_5 - C_3^2 > 0$$

$$C_4 + C_5 > 0$$

The constraints (3) and (4) ensure the obtained model is convex for filing a global optimal (e.g., economical) solution. $N_h$ is the historical window to be used by the estimator, $C_0, C_1, \ldots, C_5$ are the model parameters, $\dot{e}$ is the fuel rate/energy consumption estimated by the model, and $\hat{e}$ is the actual fuel rate/energy consumption.

Figure 68:
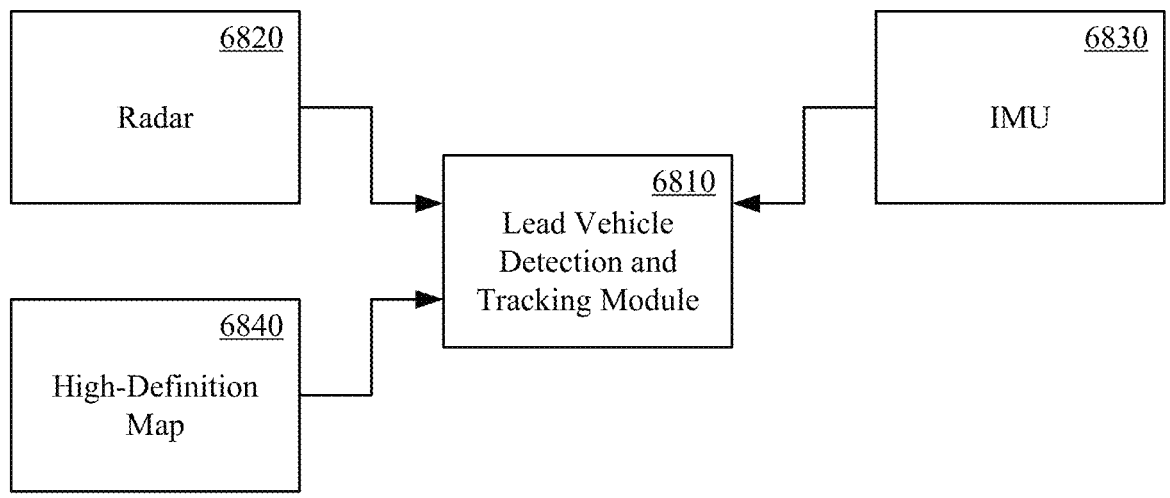
FIG. 68 shows a fuel energy consumption modelling method, in accordance with aspects of the present technology.
Figure 69:
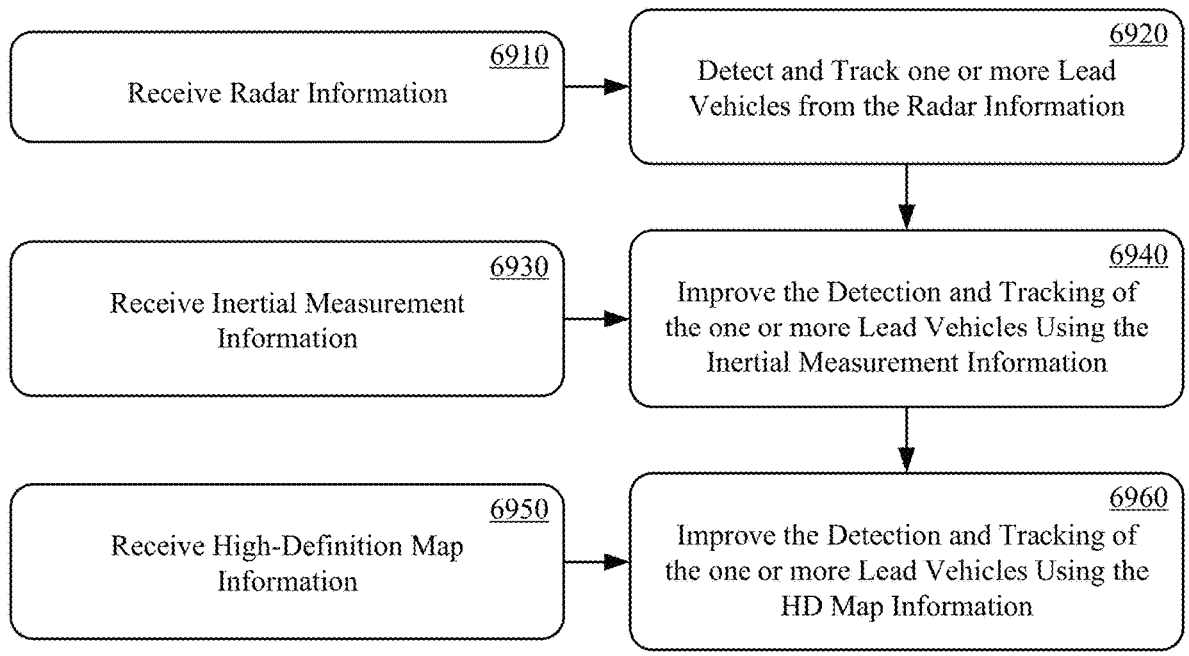
FIG. 69 shows a fuel energy consumption modelling method, in accordance with aspects of the present technology.

Recognizing one or more other ground vehicles (also referred to as lead vehicle by the subject ground vehicle (also referred to as the ego vehicle) from multiple detected targets can be challenging using radar, LIDAR, video or the like sensors. For example, it can be difficult for an ego vehicle to detect and or track a lead vehicle when the ego vehicle is approaching or exiting a curve in the roadway. Similarly, it can be difficult for an ego vehicle to detect and/or track a lead vehicle when the lead vehicle is exiting a roadway or entering a curve. If the lead vehicle is detected or tracked exiting the roadway, the lead vehicle should be forgotten. If a curve is perceived, the tracking of the lead vehicle should be continued. In another example, if the ego vehicle is in a straight portion of a roadway, the grade of the roadway can result in un-detection of the lead vehicle. Referring now to FIG. 68, a lead vehicle detection system, in accordance with aspects of the present technology, is shown. The lead vehicle detection system can include a lead vehicle detection and tracking module 6810 communicatively coupled to a radar 6820. The lead vehicle detection system can optionally include an inertial measurement unit (IMU) 6830 and or a high-definition (HD) map 6840. The lead vehicle detection system will be further explained with reference to FIG. 69. The lead vehicle detection and tracking module 6810 can receive radar information, at 6910, and detect and track one or more lead vehicles from the radar data, at 6920, from the driving environment information received from the radar 6820.

The lead vehicle detection and tracking module 6810 can further receive the inertial measurement information, at 6950, and improve the detection and tracking of the one or more lead vehicles using the inertial measurement information, at 6960. The IMU unit 6830 can provide yaw information for use in improving the detection and tracking of one or more lead vehicles. The lead vehicle detection and tracking module 6810 can further receive high-definition (HD) map information, at 6930, and improve the detection and tracking of the one or more lead vehicles using the HD map information, at 6940. The HD map 6840 can include road curvature, road grade, exit lane and the like HD map information.

The lead vehicle detection and tracking module 6810 can apply lane straightening to correct a lateral distance for lead vehicle detection and tracking. The lead vehicle detection and tracking module 6810 can utilize yaw rate from the IMU 6830 to determine a road curvature at the current position of the ego vehicle. The same road curvature can be applied for all targets regardless of the distance between the ego vehicle and the lead vehicles. For example, when the ego vehicle is in a straight section of the roadway, but the lead vehicle enters a curve, yaw rate from the IMU 6830 is almost zero and is not useful for lane straightening. For this situation, road curvature based on the distance of each lead vehicle from the ego vehicle can be extracted and used for lane straightening. The road curvature can also help to recognize that the lead vehicle is entering a curve or an exit. For this situation, exit lane information from the HD map 6840 can be utilized to increase the robustness of lead vehicle detection. In other situations, the ego vehicle can still be on a curve and a lead vehicle can be entering a straight section of a roadway. In such case, the yaw rate can be applied with a given value while the road curvature at the position of the lead vehicle is substantially zero. For the given value, a weighted average of road curvature information from the HD map 6840 from the position of the ego vehicle to the position of the lead vehicle is used for lane straightening with regard to the lead vehicle. In another case, when there is a road grade ahead and a lead vehicle is temporarily undetected, the road grade information from the HD map 6840 can be utilized to increase a remember time and estimate a position and velocity of the lead vehicle for a longer duration.

Figure 70:
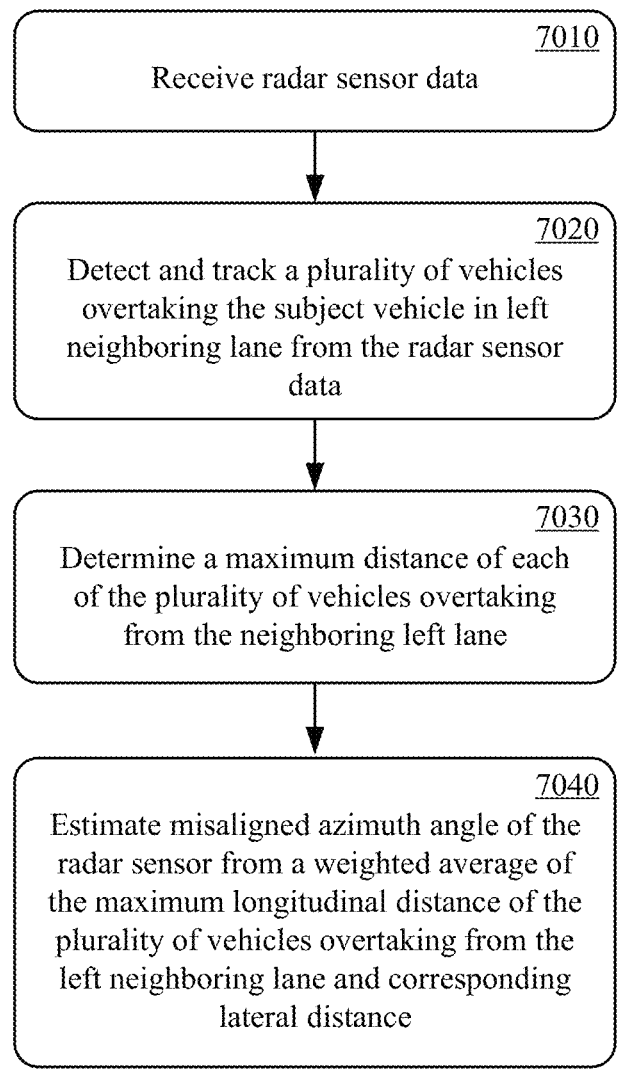
FIG. 70 shows a radar misalignment detection and calibration technique, in accordance with aspects of the present technology

Misalignment of radar sensors can deleteriously affect the performance of cruise control system. Referring now to FIG. 70, a radar misalignment detection and calibration technique, in accordance with aspects of the present technology, is shown. The method can include receiving radar sensor data, at 7010, and detecting and tracking a plurality of vehicles overtaking the subject vehicle (e.g., ego vehicle) from the left neighboring lane from the received radar sensor data, at 7020. In one implementation, the left neighboring lanes can be tracked using a Kalman filter as soon as they are detected, and will have a very small longitudinal distance from the subject vehicle. Misalignment in azimuth angle is not affected by the tracked vehicle being very close to the subject vehicle. Optionally, vehicles in the same lane as the subject vehicle can also be tracked. Similarly, vehicles in the second left neighboring lane can also optionally be tracked. Those vehicles that stay prominently in the left neighboring lane as compared to the same lane and the subject vehicle and or the second left lane can be utilized for determining misalignment.

At 7030, a maximum distance of each of the plurality of vehicles overtaking the subject vehicle from the neighboring left lane can be determined. At 740, a misalignment of the azimuth angle of the radar sensor can be estimated from a weighted average of the maximum longitudinal distance of the plurality of vehicles overtaking from the left lane and corresponding lateral distance. The process of 7010-7040 can be iteratively performed to determine a closed-loop misalignment angle that can be considered as a error and input into a proportional control-like approach until the error is below a predetermined threshold. Accordingly, the present radar misalignment method can provide real-time radar misalignment detection and calibration. The misalignment detection and calibration can advantageously be utilized when other radar calibration techniques are not available.

Figure 71:
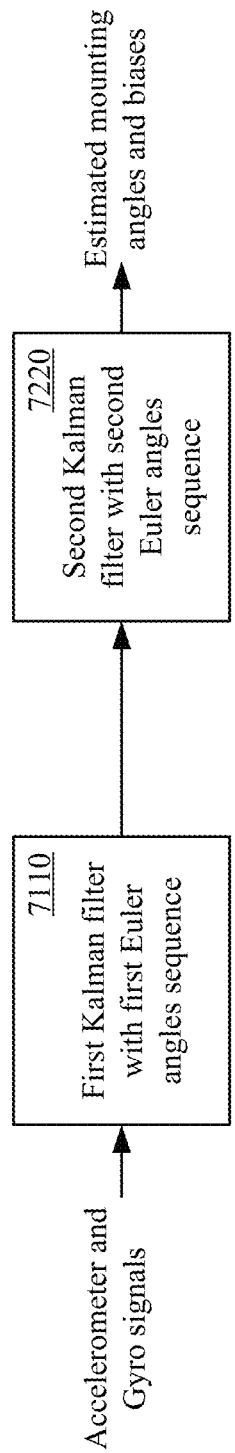
FIG. 71 shows an inertial measurement unit (IMU) calibration method, in accordance with aspects of the present technology.

Referring now to FIG. 71, an inertial measurement unit (IMU) calibration method, in accordance with aspects of the present technology, is shown. The calibration method can include inputting accelerometer and gyro signals of an IMU to a Kalman filter with a first Euler angles sequence 7110. To avoid singularities of the first Euler angles sequence, a second Kalman filter with different Euler angles sequence and different singularity points 7120 is utilized. Therefore, when the first Kalman filter approaches its one singularity, the estimation is switched to the second Kalman filter with second Euler angles sequence and different singularity point to estimate mounting angles and biases. Accordingly, the present IMU calibration method can provide real-time IMU mounting calibration.

Figure 72:
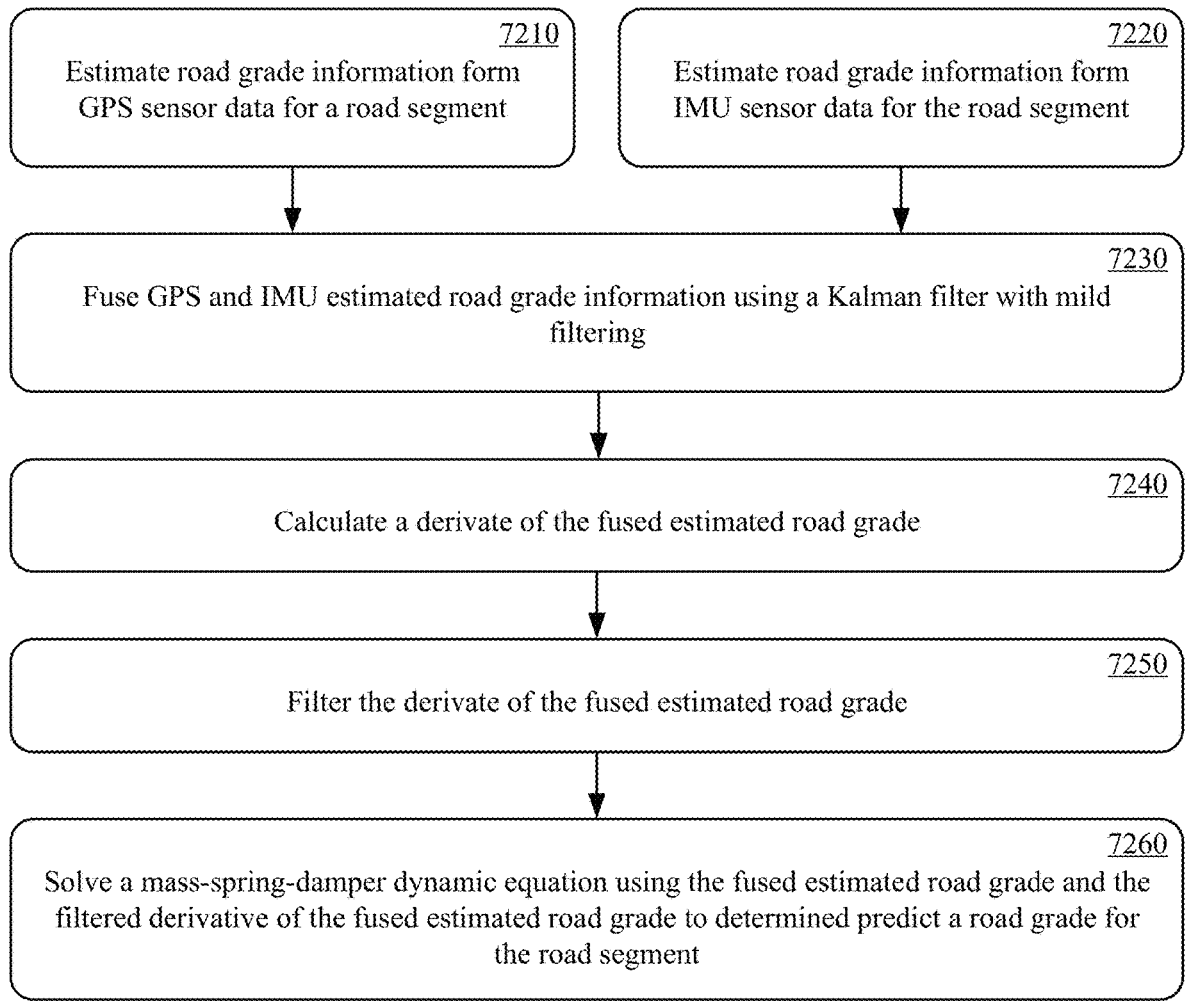
FIG. 72 shows a road grade prediction method, in accordance with aspects of the present technology.

Vehicle control for fuel efficiency using predictive control typically utilized road grade information for a horizon (e.g., current segment of roadway). However, road grade information is not always available. Referring now to FIG. 72, a road grade prediction method, in accordance with aspects of the present technology, is shown. The road grade prediction method can include received an estimated road grade from a GPS sensor 7210, and an estimated road grade from an inertial measurement unit (IMU) sensor data 7220 of a roadway segment. At 7230 the GPS and IMU estimated road grade information can be used using a Kalman filter with mild filtering At 7240, a derivate of the fused estimated road grade can be calculated. At 7250, the derivate of the fused estimated road grade can be filtered. Strong filter can be applied to achieve robustness At 7260, a mass-spring-damper dynamic equation using the fused estimated road grade and the filtered derivative of the fused estimated road grade can be solved to determine a predicted road grade for the road segment.

Major components of an electric vehicles include batteries and one or more electric motor. Batteries are used to store chemical energy while electric motor is used to drive or decelerate the vehicle. When propulsion torque is required by the vehicle, the motor would be in motor mode during which the chemical energy stored in batteries is converted to mechanical energy and is transferred to the wheels. When deceleration torque is required by the vehicle some or all of it can be obtained by the motor by operating in regeneration mode. In regeneration mode motor would be operating as a generator using which the vehicles kinetic energy can be converted into electrical energy and to recharge the batteries. Electric vehicles do not produce $CO_2$ emissions during their operation and the source for energy that is required to charge the batteries is not limited to nonrenewable sources and include renewable energy. In fact, many electric charging stations use renewable energy. Also, using regenerative braking, some of the kinetic energy can be converted into electric energy instead of it being wasted as heat energy. For these reasons, the overall $CO_2$ emissions by electric vehicles are less.

Hybrid electric vehicles are powered by an internal combustion engine (ICE) and a combination of one or more electric motor and generator. The mechanical energy generated by engine and motor are combined using various mechanisms and then then transferred to the wheels to drive or decelerate the vehicle. In hybrid electric vehicles, the addition of motor helps reduction of $CO_2$ emissions by various mechanisms. Some of such mechanisms are allowing a downsized internal combustion engine, optimization of the of engine operating point, regeneration of battery charge during deceleration.

Range in an electric vehicle can be defined as the total miles the vehicle could travel with one full charge cycle and in case of hybrid vehicle, as the total miles the vehicle could travel with one tank full of fuel. The range of a vehicle depends on several factors such as general driving style, drive cycle, terrain (hills, curves, etc.), weather, traffic, etc. One driver may obtain significantly more range or MPG than another driver when driven on the same drive cycle, terrain, weather, and traffic conditions. The driver-to-driver differences due to manual decision-making process can be minimized by employing cruise control systems. However, traditional cruise control systems only utilize basic information for its decision making, such as vehicle sensory data and target vehicle distance. By utilizing additional information such as maps, GPS, weather, traffic, side radar, etc., further range extension can be obtained.

In one implementation, the range extension cruise control system uses a long horizon controller, medium horizon controller, vehicle parameter estimator, driver interface, on board map data base, vehicle and environment sensory information and information from any higher-level planning algorithms. The vehicle parameter estimator determines the vehicle parameters such as vehicle GVW, aerodynamic drag coefficient, rolling resistance, battery State Of Charge (SOC) models, ICE fuel consumption models, etc. In one implementation the long horizon controller can be configured to utilize the above-mentioned information and determine target vehicle performance plan such as target speed, minimum speed, maximum speed, target SOC, etc. as a function of distance along the route. The long horizon controller can be configured to re-evaluate the target vehicle performance parameters upon several events occurring such as re-routing, changes in traffic, weather, time of arrival requirements, etc. or every few miles of distance travelled.

In one implementation the long horizon control problem can be formulated as a mathematical optimization problem based on the theory of predictive control. The mathematical optimization problem can be solved on the onboard ECU or can be solved offline, and the results can be transmitted to the onboard ECU. In this implementation, the long horizon is discretely sampled as a function of distance along the route. Distance along the route is an independent variable and all other decision variables are a function of it. As an example, the mathematical optimization can be formulated for parallel hybrid electric vehicle as:
minimize $$\Sigma_{k=1}^{N_p} Q_s(k)(V(k)-V_{max}(k))_2 + \Sigma_{k=1}^{N_p} Q_f(k)f'(k)$$

subject to equality constraints $$V(k) = V(k-1) + D_s\left(-k_{l_1} - k_{l_2}V(k) - \frac{k_{l_3}}{V(k)} + \frac{g\sin(\alpha(k))}{V(k)} + \frac{K_{l_4}T_w(k)}{V(x)}\right)$$

$$\varphi(k) = \varphi(k-1) - \frac{D_s\left(R_{\mathit{eff}}(k)T_m(k) + \frac{P_{on}(k)}{V(k)}\right)}{\varphi_{cap}(c_0 + c_1\varphi(k) + c_2\varphi^2(k))}$$

$$t(k) = t(k-1) + \frac{D_s}{V(k)}$$

$$W_e(k) = \frac{R_d R_g(k)}{R_w} V(k)$$

subject to inequality constraints $$0 \le T_e(k) < a_0 + a_1 W_e(k) + a_2 W_e^2(k) + a_3 W_e^3(k)$$

$$b_0 + b_1 W_e(k) + b_2 W_e^2(k) + b_3 W_e^3(k) \le T_r(k) \le 0$$

$$\frac{P_{mmin}(k)}{R_m} \le T_m(k)W_e(k) \le \frac{P_{mmax}(k)}{R_m}$$

for parallel single shaft arrangement $$\frac{R_w P_{mmin}(k)}{R_d R_m} \le T_m(k)V(k) \le \frac{R_w P_{mmax}(k)}{R_d R_m}$$

for parallel double shaft arrangement $$T_{bmin} \le T_b(k) \le 0$$

$$W_{emin} \le W_e(k) \le W_{emax}$$

$$\varphi_{min} \le \varphi(k) \le \varphi_{max}$$

$$t(k) \le t_{max}$$

The following can be substituted into the above optimization problem during the actual implementation $$\dot{f}(k) = k_1 T_e^2(k) + k_2 T_e(k) + k_3 T_e(k)W_e(k) + k_4 W_e(k) + k_5 W_e^2(k) + k_6 T_e^2(k)W_e^2(k) + k_7$$

$$f'(k) = \frac{\dot{f}(k)}{V(k)}$$

$$T_w(k) = \eta_{gb} R_d R_g(k)(T_e(k) + T_f(k) + T_r(k) + R_m T_m(k)) + T_b(k)$$

for parallel single shaft arrangement $$R_{\mathit{eff}}(k) = \frac{R_d R_m R_g(k)}{R_w}$$

for parallel-single shaft arrangement $$T_w(k) = \eta_{gb} R_d R_g(k)(T_e(k) + T_f(k) + T_r(k)) + \eta_{red} R_m T_m(k) + T_b(k)$$

for parallel double shaft arrangement $$R_{\mathit{eff}}(k) = \frac{R_d R_m}{R_w}$$

for parallel-double shaft arrangement

In the above equations, k is the long horizon index, $N_p$ is the number of steps in the long horizon, V is the vehicle velocity, $V_{max}$ is the maximum vehicle velocity, $V_{mm}$ is the minimum vehicle velocity, $\dot{f}$ is fuel per second, $f'$ is fuel per distance of the internal combustion engine, $Q_s$ and $Q_f$ are objective function weights, $k_{11}$, $k_{12}$, $k_{13}$, $k_{14}$ are vehicle longitudinal dynamic parameters, $D_s$ is the sample distance with which the long horizon is discretized, g is the acceleration due to gravity, a is road grade, $T_v$ is total wheel torque, $R_{\mathit{eff}}$ is the effective gear ratio of the transmission, $T_e$, $T_r$, $T_m$, $T_b$, $T_r$ are engine, retarder, motor, brake and friction torque respectively $P_{on}$ is the power consumption by onboard devices, $\varphi_{cap}$ is the battery capacity, $\varphi$, $\varphi_{min}$, $\varphi_{max}$ is the battery state of charge, minimum required state of charge and max required state of charge, $c_0$, $c_1$, $c_2$ are the coefficients that represent the battery state of charge dynamics, $a_0$, $a_1$, $a_2$ are the coefficients that represent the engine maximum available torque dynamics, $b_0$, $b_1$, $b_2$ are the coefficients that represent the retarder minimum available torque dynamics, $P_{mmin}$, $P_{mmax}$ are the minimum and maximum available motor power respectively, $R_m$, $R_g$, $R_d$ are the motor, gear and final gear ratios respectively, $R_w$ is the wheel radius $W_e$, $W_{emin}$, $W_{emax}$ are engine speed, minimum allowed and maximum allowed engine speed respectively, $\eta_{gb}$ is the gearbox efficiency, $\eta_{red}$ is the efficiency of additional gear box connected to the motor, t is the time taken and $t_{max}$ is the maximum allowed time.

The above equations are only for general information purpose and are in no way limiting the scope of the work. In other configurations, such as series hybrid, etc., the equations may be different, but the ideas still apply. In case of full electric vehicle configurations, the optimization problem formulation will be based on the above but without the additional decision variables pertaining to the internal combustion engine.

In one implementation, the medium horizon controller uses the information determined by the vehicle parameter estimator and additional vehicle sensory information to execute the target vehicle performance plan determined by the long horizon controller to determine target torque profiles from individual vehicle actuators (ICE, motor, foundation brakes, etc.) at each point of time in the medium horizon, which could range several meters.

In one implementation the medium horizon control problem can be formulated as a mathematical optimization problem based on the theory of predictive control. The mathematical optimization problem can be solved in onboard ECU or can be solved offline, and the results can be transmitted to onboard ECU. The medium horizon is discretely sampled as a function of time. Time is an independent variable and all other decision variables are a function of it. The mathematical optimization can be written as:
minimize $$\Sigma_{k=1}^{N_p} Q_{di}(k)((D(k)+(T_{gdes}+T_c)V(k))-(D_l-D_s+T_s\Sigma_{i=1}^{k}V_l(k)+T_cV_l(k)))^2+\Sigma_{k=1}^{N_p}Q_{si}(k)(D_{int}+T_s\Sigma_{i=1}^{k}V_{des}(k)-D(k))^2+\Sigma_{k=1}^{N_p}Q_s(k)(V(k)-V_{des}(k))^2+\Sigma_{k=1}^{N_p}Q_f(k)\hat{f}(k)+\Sigma_{k=1}^{N_p}Q_{soc}(k)(\varphi(k)-\varphi_{des}(k))^2$$

subject to equality constraints $$D(k) = D(k-1) + T_s V(k)$$

$$V(k) = V(k-1) + T_s\left(-k_{l_1}V(k) - k_{l_2}V^2(k) - K_{l_3} + g\sin(\alpha(k)) + K_{l_4}T_w(k)\right)$$

$$Q(k) = Q(k-1) - \frac{T_s(R_{eff}(k)T_m(k)V(k) + P_{on}(k))}{Q_{cap}c_0}$$

$$W_e(k) = \frac{R_d R_g(k)}{R_w} V(k)$$

subject to inequality constraints $$D(k) + (T_{gmin} + T_c)V(k) \le D_l - D_s + T_s\sum_{i=1}^{k}V_l(k) + T_cV_l(k)$$

$$V_{min}(k) \le V(k) \le V_{max}(k)$$

$$0 \le T_e(k) \le a_0 + a_1W_e(k) + a_2W_e^2(k) + a_3W_e^3(k)$$

$$b_0 + b_1W_e(k) + b_2W_e^2(k) + b_3W_e^3(k) \le T_r(k) \le 0$$

$$\frac{P_{mmin}(k)}{R_m} \le T_m(k)W_e(k) \le \frac{P_{mmax}(k)}{R_m}$$

for parallel single shaft arrangement $$\frac{R_w P_{mmin}(k)}{R_d R_m} \le T_m(k)V(k) \le \frac{R_w P_{mmax}(k)}{R_d R_m}$$

for parallel double shaft arrangement $$T_{bmin} \le T_b(k) \le 0$$

$$W_{emin} \le W_e(k) \le W_{emax}$$

$$\varphi_{min} \le \varphi(k) \le \varphi_{max}$$

In the above equations, k is the long horizon index, $N_p$ is the number of steps in the long horizon, $T_s$ is the sample time with which the long horizon is discretized, $Q_{di}$, $Q_{si}$, $Q_s$, $Q_f$, $Q_{soc}$ are the objective function weights, D is the distance travelled, $T_{gdes}$, $T_{bmin}$, $T_c$ are desired time gap, minimum time gap and minimum time to collision between the vehicle and leading vehicle, $V_l$ is the velocity of leading vehicle, $V_{des}$ is the desired vehicle velocity, $D_{int}$ is the integral of error between desired and actual vehicle speed and $\varphi_{des}$ the desired SOC. All other symbols are as defined in [00334]. $V_{des}$ and is $\varphi_{des}$ are target vehicle performance parameters obtained from long horizon controller in [00334].

In yet another implementation where route information is not available, the medium horizon controller can also determine the most probable path.

Energy consumption cruise controllers in accordance with aspects of the present technology are configured to reduce the use of one or more of energy and time by using information about one or more of road attributes, routes, depot logistics, weather, traffic, driver hours of service and other related information. Road attributes may include but is not limited to high-definition maps that may provide one or more of the following, road grade, curvature, speed limit, number of lanes, type of road, and other related information. Information about routes may include one or more of the following pertaining to route segments, route distance, estimated speeds that may be based on historical speed data or models of traffic, estimated energy consumption necessary to traverse the route or energy rating based on historical data or energy models, and other related information. Depot logistics are here defined as information of one or more of schedule of trucks to be unloaded, dwell times, delays or backups, or the overall readiness of the depot to support the receiving and unloading of a truck. The system may be provided the aforementioned information real time using a telematics system that is connected to providers of weather, traffic, depot logistics, and similar information or the system may predict the information using historical data or models.

The aforementioned speed management system may use the information to determine a current or future speed profile of the vehicle that will reduce the energy use of the vehicle. The system may reduce energy use by traveling at a more energy efficient speed for the route and current and future road attributes of that route. This may include taking into account grade, curvature, energy efficient speed information based on historical or model data and other similar data to determine the current and future speed profile of the vehicle. For instance, managing the inertia of the vehicle in the presence of grades or recommended speed changes can result is reduction of energy lost due to retardation by the vehicle and result in a reduction of energy used to provide thrust to the vehicle.

The system may also reduce energy use by adjusting the current or future speed profile based on depot logistics. This may include reducing the vehicle speed in particular sections of the trip to coordinate arrival with the times delivery can be accepted by the depot. This information may be combined with the previous mentioned avenue of reducing energy, using road attributes, and with other methods mentioned here.

A routing system that on its own or combined with the previous speed management system to reduce one or both of energy use and drive time by using information about one or more of road attributes, routes, depot logistics, weather, traffic, driver hours of service and other related information. The system may be provided the aforementioned information real time using a telematics system that is connected to providers of weather, traffic, depot logistics, and similar information or the system may predict the information using historical data or models.

Figure 73:
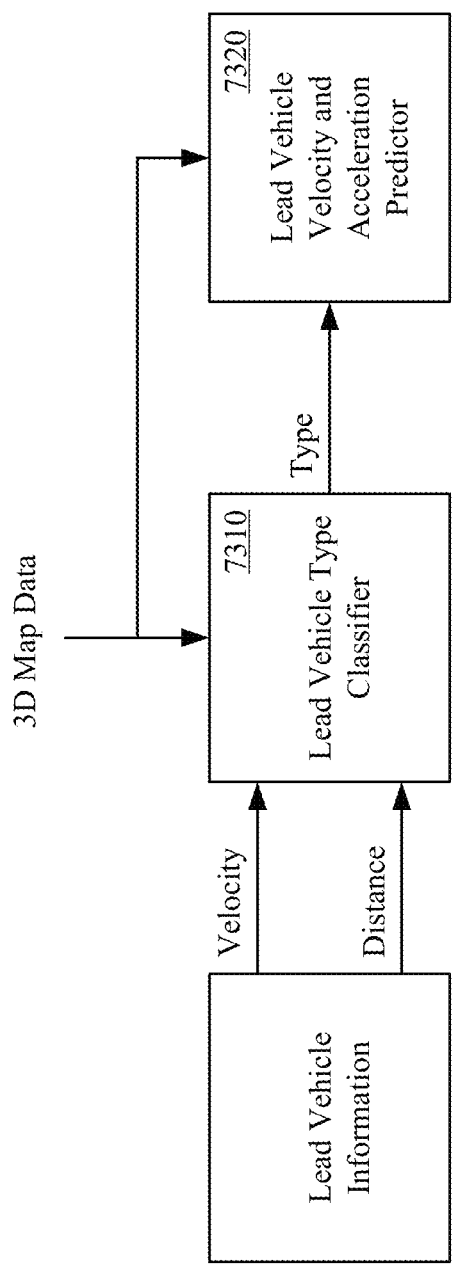
FIG. 73 shows a lead vehicle classification system, in accordance with aspects of the present technology.

Performance of the energy consumption cruise controller in accordance with embodiments of the present technology can be improved, including fuel efficiency and safter, by optimizing the subject vehicle (e.g., ego vehicle). Referring now to FIG. 73, a lead vehicle classification system, in accordance with aspects of the present technology is shown. Accurate estimated of a lead vehicles future velocity provide can optimize performance. In addition, estimation of the lead vehicle type can be used for predicting the future lead vehicle velocity profile. For example, a heavy-duty (HDV) type vehicle will react to the road grade by slowing down when going uphill more often than a light moto vehicle. The lead vehicle classifier 7310 can use historical lead vehicle information such as velocity and distance, along with road topography information to estimate a category of the lead vehicle. The road topography information can be received from a three-dimension (3D) map. The lead vehicle type classifier 7310 can be implemented using one or more neural networks. The lead vehicle type can be utilized by a lead vehicle velocity and/or acceleration predictor 7320 to predict velocity and or acceleration of corresponding lead vehicles.

It is appreciated that components, functions, method steps, and the like described herein can be implemented in various configurations. Performance considerations can include one or more performance objectives. Vehicle operation considerations can include one or more vehicle operations. Vehicle component considerations can include one or more vehicle components. User interaction considerations can include one or more user interactions. User interface considerations can include one or more indicators.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical or quantum computing device) that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of some specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. An automated cruise control system comprising:
    a plurality of driving environment sensors associated with a ground vehicle that maneuvers on a roadway that are configured to detect a plurality of driving parameters associated with the ground vehicle as the ground vehicle maneuvers along a plurality of segments of the roadway, wherein the driving parameters are indicative to a driving environment that the ground vehicle is operating, and wherein the plurality of segments of the roadway comprise respective portions of the roadway that include a respective specific geometry;
    a ground vehicle control detector associated with the ground vehicle that is configured to detect a plurality of ground vehicle control inputs associated with an operation of the ground vehicle as the ground vehicle maneuvers along the plurality of segments of the roadway, wherein the ground vehicle control inputs are generated from operation of the ground vehicle along the plurality of segments of the roadway; and
    an energy consumption cruise controller communicatively coupled to the plurality of driving environment sensors and the ground vehicle control detector, the energy consumption cruise controller configured to automatically adjust the operation of the ground vehicle as the ground vehicle maneuvers along respective segments of the roadway to maintain the operation of the ground vehicle within an operation threshold of the respective segments of the roadway based on the detected driving parameters and ground vehicle control inputs of the respective segments of the roadway, wherein the operation threshold is the operation of the ground vehicle that decreases an amount of energy consumption by the ground vehicle, over the plurality of segments of the roadway and maintains speed of the ground vehicle within a speed threshold associated with the respective segments of the roadway.

2. The automated cruise control system of claim 1, wherein the plurality of driving environment sensors include:
    a plurality of visual detection devices configured to detect a plurality of visual detection driving parameters that are associated with the ground vehicle as the ground vehicle maneuvers along the respective segments of the roadway, wherein the visual detection driving parameters are driving parameters that are visually identifiable as detected by the visual detection devices and are indicative to the driving environment that the ground vehicle is operating.

3. The automated cruise control system of claim 2, wherein the energy consumption cruise controller is further configured to:
    identify the visual detection driving parameters for the respective segments of the roadway as detected by the visual detection devices in real-time as the ground vehicle maneuvers along the respective segments of the roadway;
    determine an impact that each of the visual detection driving parameters for the respective segments of the roadway are having on the driving environment that the ground vehicle is operating in real-time; and automatically adjust the operation of the ground vehicle as the ground vehicle maneuvers along respective the segments of the roadway to maintain the operation of the ground vehicle within the operation threshold to accommodate for each of the visual detection driving parameters as each visual detection driving parameter impacts the driving environment for the respective segments of the roadway that the ground vehicle is operating in real-time.

4. The automated cruise control system of claim 1, wherein the energy consumption cruise controller is further configured to:
identify each ground vehicle control input as detected by the ground vehicle control detector in real-time as the ground vehicle maneuvers along the respective segments of the roadway;
determine a current state of operation of the ground vehicle and a driver inputs for the respective segments of the roadway from each ground vehicle control input for the respective segments of the roadway as the ground vehicle is operating in real-time, wherein the current state of the operation of the ground vehicle is indicative as to a current operation of the ground vehicle as the ground vehicle is operating in real-time and the driver input is an input as to a state of control of the ground vehicle that the driver requests to operate the ground vehicle in real-time; and
automatically further adjust the operation of the ground vehicle as the ground vehicle maneuvers along the respective segments of the roadway to accommodate for the current state of the operation of the ground vehicle and the driver input of the driver of the ground vehicle for the respective segments of the roadway in real-time.

5. The automated cruise control system of claim 1, further comprising:
a vehicle load estimator configured to:
detect a plurality of vehicle load parameters associated with a vehicle load of the ground vehicle in real-time as the ground vehicle maneuvers along the respective segments of the roadway, wherein the vehicle load parameters are generated from the operation of the ground vehicle as the ground vehicle reacts to the vehicle load as the ground vehicle maneuvers along the respective segments of the roadway and from a three-dimensional geometry of the respective segments of the road, and
determine an estimated load of the ground vehicle in real-time as the ground vehicle maneuvers along the respective segments of the roadway based on the vehicle load parameters detected in real-time, wherein the estimated load impacts the operation of the ground vehicle in real-time as the ground vehicle maneuvers along the respective segments of the roadway.

6. The automated cruise control system of claim 5, wherein the energy consumption cruise controller is further configured to:
automatically adjust the operation of the ground vehicle as the ground vehicle maneuvers along the respective segments of the roadway to maintain the operation of the ground vehicle within the operation threshold based on the estimated load of the ground vehicle of the respective segments of the roadway determined in real-time, wherein the estimated load of the ground vehicle impacts the amount of energy consumption by the ground vehicle as the ground vehicle operates along the plurality of segments of the roadway in real-time.

7. The automated cruise control system of claim 6, wherein the vehicle load estimator is further configured to:
detect one or more of a speed or acceleration vehicle load parameter associated with the vehicle load of the ground vehicle in real-time as the ground vehicle maneuvers along the respective segments of the roadway, wherein the speed/acceleration vehicle load parameter is indicative as to the vehicle load of the ground vehicle in real-time as the speed or acceleration vehicle load parameter varies in real-time as the ground vehicle maneuvers along the respective segments of the roadway in real-time; and
determine the estimated load of the ground vehicle in real-time as the ground vehicle maneuvers along the respective segments of the roadway based on one or more of the speed or acceleration vehicle load parameter detected in real-time, wherein an increased speed or acceleration vehicle load parameter corresponds to an increased vehicle load of the ground vehicle.

8. The automated cruise control system of claim 7, wherein the energy consumption cruise controller is further configured to:
automatically adjust the operation of the ground vehicle in real-time as the ground vehicle maneuvers along the respective segments of the roadway to accommodate for the one or more of the speed or acceleration vehicle load parameter as the one or more of the speed or acceleration vehicle load parameter varies in real-time thereby impacting the vehicle load of the ground vehicle in real-time to maintain the operation of the ground vehicle within the operation threshold for the respective segments of the roadway.

9. The automated cruise control system of claim 1, further comprising:
a risk estimator configured to:
detect a plurality of driving risk conditions associated with the driving environment of the ground vehicle in real-time as the ground vehicle maneuvers along the respective segments of the roadway, wherein the driving risk conditions are generated from the driving environment of the respective segments of the roadway that the ground vehicle is operating in real-time and a driver status of a driver of the ground vehicle that is indicative of an engagement of the driver in operating the ground vehicle in the respective segments of the roadway in real-time, and
determine a combined driving risk level for the ground vehicle as the ground vehicle maneuvers along the respective segments of the roadway based on the driving risk conditions detected in real-time, wherein the combined driving risk level impacts the operation of the ground vehicle in real-time as the ground vehicle maneuvers along the respective segments of the roadway.

10. The automated cruise control system of claim 9, wherein the energy consumption cruise controller is further configured to:
automatically adjust the operation of the ground vehicle as the ground vehicle maneuvers along the respective segments of the roadway to maintain the operation of the ground vehicle within the operation threshold based on the combined driving risk level of the ground vehicle determined in real-time, wherein the driving risk level for the ground vehicle impacts the amount of energy consumption by the ground vehicle as the ground vehicle operates along the plurality of segments of the roadway in real-time.

11. Non-transitory machine-readable medium storing instructions when executed by one or more processor perform a method for automatically adjusting an operation of a ground vehicle as the ground vehicle maneuvers along a plurality of segments of a roadway to automatically decrease energy consumption of the ground vehicle, comprising:

detecting a plurality of driving parameters associated with the ground vehicle as the ground vehicle maneuvers along the plurality of segments of the roadway, wherein the driving parameters are indicative of a driving environment that the ground vehicle is operating;

detecting a plurality of ground vehicle control inputs associated with an operation of the ground vehicle as the ground vehicle maneuvers along the plurality of segments of the roadway, wherein the ground vehicle control inputs are generated from operation of the ground vehicle along the plurality of segments of the roadway; and automatically adjusting the operation of the ground vehicle as the ground vehicle maneuvers along the respective segments of the roadway to maintain the operation of the ground vehicle within an operation threshold for the respective segments of the roadway based on the detected driving parameters and ground vehicle control inputs of the respective segments of the roadway, wherein the operation threshold is the operation of the ground vehicle that decreases an amount of energy consumption by the ground vehicle as the ground vehicle operates along the respective segments of the roadway and maintains a speed of the ground vehicle within a speed threshold associated with the respective segments of the roadway.

12. The method of claim 11, wherein the detecting of the plurality of driving parameters comprises:

detecting a plurality of visual detection driving parameters that are associated with the ground vehicle as the ground vehicle maneuvers along the respective segments of the roadway, wherein the visual detection driving parameters are driving parameters that are visually identifiable as detected by a plurality of visual detection devices and are indicative of the driving environment that the ground vehicle is operating.

13. The method of claim 11, wherein the automatic adjusting of the operation of the ground vehicle comprises:

identifying the visual detection driving parameters as detected by the visual detection devices in real-time as the ground vehicle maneuvers along the respective segments of the roadway;

determining an impact that each of the visual detection driving parameters are having on the driving environment that the ground vehicle is operating; and automatically adjusting the operation of the ground vehicle as the ground vehicle maneuvers along the respective segments of the roadway to maintain the operation of the ground vehicle within the operation threshold to accommodate for each of the visual detection driving parameters as each visual detection driving parameter impacts the driving environment that the ground vehicle is operating in real-time.

14. The method of claim 11, wherein the automatic adjusting of the operation of the ground vehicle further comprises:

identifying each ground vehicle control input as detected by a ground vehicle control detector in real-time as the ground vehicle maneuvers along the respective segments of the roadway;

determining a current state of operation of the ground vehicle and a driver input from each ground vehicle control input as the ground vehicle is operating in real-time, wherein the current state of the operation of the ground vehicle is indicative as to a current operation of the ground vehicle as the ground vehicle is operating in real-time and the driver input is an input that the driver requests to operate the ground vehicle in real-time; and automatically further adjusting the operation of the ground vehicle as the ground vehicle maneuvers along the respective segments of the roadway to accommodate for the current state of the operation of the ground vehicle and the driver input of the driver of the ground vehicle in real-time.

15. The method of claim 11, further comprising:

detecting a plurality of vehicle load parameters associated with a vehicle load of the ground vehicle in real-time as the ground vehicle maneuvers along the respective segments of the roadway, wherein the vehicle load parameters are generated from the operation of the ground vehicle as the ground vehicle reacts to the vehicle load as the ground vehicle maneuvers along the respective segments of the roadway and from a three-dimensional geometry of the respective segments of the road; and determining an estimated load of the ground vehicle in real-time as the ground vehicle maneuvers along the respective segments of the roadway based on the vehicle load parameters detected in real-time, wherein the estimated load impacts the operation of the ground vehicle in real-time as the ground vehicle maneuvers along the respective segments of the roadway.

16. The method of claim 15, wherein the automatic adjusting of the operation of the ground vehicle further comprises:

automatically adjusting the operation of the ground vehicle as the ground vehicle maneuvers along the respective segments of the roadway to maintain the operation of the ground vehicle within the operation threshold based on the estimated load of the ground vehicle determined in real-time, wherein the estimated load of the ground vehicle impacts the amount of overall energy consumption by the ground vehicle as the ground vehicle operates along the respective segments of the roadway in real-time.

17. The method of claim 16, further comprising:

detecting one or more of a speed or acceleration vehicle load parameter associated with the vehicle load of the ground vehicle in real-time as the ground vehicle maneuvers along the respective segments of the roadway, wherein the one or more speed or acceleration vehicle load parameter is indicative as to the vehicle load of the ground vehicle in real-time as the one or more speed or acceleration vehicle load parameter varies in real-time as the ground vehicle maneuvers along the respective segments of the roadway in real-time; and determining the estimated load of the ground vehicle in real-time as the ground vehicle maneuvers along the respective segments of the roadway based on the one or more of the speed or acceleration vehicle load parameter detected in real-time, wherein an increased speed or acceleration vehicle load parameter corresponds to an increased vehicle load of the ground vehicle.

18. The method of claim 17, wherein the automatic adjusting of the operation of the ground vehicle further comprises:

automatically adjusting the operation of the ground vehicle in real-time as the ground vehicle maneuvers along the respective segments of the roadway to accommodate for the one or more speed or acceleration vehicle load parameter as the one or more speed or acceleration vehicle load parameter varies in real-time thereby impacting the vehicle load of the ground vehicle in real-time to maintain the operation of the ground vehicle within the operation threshold for the respective segments of the roadway.

19. The method of claim 11, further comprising:

detecting a plurality of driving risk conditions associated with the driving environment of the ground vehicle in real-time as the ground vehicle maneuvers along the respective segments of the roadway, wherein the driving risk conditions are generated from the driving environment of the respective segments of the roadway that the ground vehicle is operating in real-time and a driver status of a driver of the ground vehicle that is indicative of an engagement of the driver in operating the ground vehicle in real-time; and determining a combined driving risk level for the ground vehicle as the ground vehicle maneuvers along the respective segments of the roadway based on the driving risk conditions detected in real-time, wherein the combined driving risk level impacts the operation of the ground vehicle in real-time as the ground vehicle maneuvers along the respective segments of the roadway.

20. The method of claim 17, wherein the automatic adjusting of the operation of the ground vehicle further comprises:

automatically adjusting the operation of the ground vehicle as the ground vehicle maneuvers along the respective segments of the roadway to maintain the operation of the ground vehicle as the ground vehicle maneuvers along the respective segments of the roadway to maintain the operation of the ground vehicle within the operation threshold based on the combined driving risk level of the ground vehicle determined in real-time, wherein the combined driving risk level for the ground vehicle impacts the amount of energy consumption by the ground vehicle as the ground vehicle operates along the respective segments of the roadway in real-time.

* * * * *